US008317650B2

(12) United States Patent
Nichols et al.

(10) Patent No.: US 8,317,650 B2
(45) Date of Patent: Nov. 27, 2012

(54) CONTINUOUSLY VARIABLE TRANSMISSION

(75) Inventors: Jon M Nichols, Georgetown, TX (US); Brad P Pohl, Leander, TX (US); Daniel J Dawe, Austin, TX (US); Oronde J Armstrong, Austin, TX (US); Charles B Lohr, Austin, TX (US); Loren T McDaniel, Austin, TX (US); Matthew P Simister, Austin, TX (US); Fernand A Thomassy, Liberty Hill, TX (US); Ghayyurul I Usmani, Yukon, OK (US); Paul M Elhardt, Charlotte, NC (US); Terry L Stewart, Blanchard, OK (US); Peter D Poxton, Mustang, OK (US); Elton L Eidson, Norman, OK (US)

(73) Assignee: Fallbrook Intellectual Property Company LLC, San Diego, CA (US)

( * ) Notice: Subject to any disclaimer, the term of this patent is extended or adjusted under 35 U.S.C. 154(b) by 1204 days.

(21) Appl. No.: 12/137,480

(22) Filed: Jun. 11, 2008

(65) Prior Publication Data

US 2008/0236319 A1 Oct. 2, 2008

Related U.S. Application Data

(63) Continuation of application No. 11/543,311, filed on Oct. 3, 2006, now Pat. No. 7,959,533.

(60) Provisional application No. 60/749,315, filed on Dec. 9, 2005, provisional application No. 60/789,844, filed on Apr. 6, 2006, provisional application No. 60/833,327, filed on Jul. 25, 2006.

(51) Int. Cl.
*F16H 15/26* (2006.01)

(52) U.S. Cl. ........................................... 476/38

(58) Field of Classification Search .............. 476/36–38, 476/43

See application file for complete search history.

(56) References Cited

U.S. PATENT DOCUMENTS 719,595 A  2/1903 Huss
(Continued)

FOREIGN PATENT DOCUMENTS

CH  118064  12/1926
(Continued)

OTHER PUBLICATIONS

Office Action dated Mar. 18, 2010 from U.S. Appl. No. 12/137,464, filed Jun. 11, 2008.
Office Action dated Feb. 17, 2010 from Japanese Patent Application No. 2006-508892.
Office Action dated Feb. 12, 2010 from Japanese Patent Application No. 2009-294086.
(Continued)

*Primary Examiner* — William C Joyce
(74) *Attorney, Agent, or Firm* — Knobbe Martens Olson & Bear LLP

(57) ABSTRACT

Inventive embodiments are directed to components, subassemblies, systems, and/or methods for continuously variable transmissions (CVT). In one embodiment, a main axle is adapted to receive a shift rod that cooperates with a shift rod nut to actuate a ratio change in a CVT. In another embodiment, an axial force generating mechanism can include a torsion spring, a traction ring adapted to receive the torsion spring, and a roller cage retainer configured to cooperate with the traction ring to house the torsion spring. Various inventive idler-and-shift-cam assemblies can be used to facilitate shifting the ratio of a CVT. Embodiments of a hub shell and a hub cover are adapted to house components of a CVT and, in some embodiments, to cooperate with other components of the CVT to support operation and/or functionality of the CVT.

8 Claims, 111 Drawing Sheets

U.S. PATENT DOCUMENTS

| | | |
|---|---|---|
| 1,121,210 A | 12/1914 | Techel |
| 1,175,677 A | 3/1916 | Barnes |
| 1,207,985 A | 12/1916 | Null et al. |
| 1,380,006 A | 5/1921 | Nielson |
| 1,390,971 A | 9/1921 | Samain |
| 1,629,902 A | 5/1927 | Arter et al. |
| 1,686,446 A | 10/1928 | Gilman |
| 1,793,571 A | 2/1931 | Vaughn |
| 1,847,027 A | 2/1932 | Thomsen et al. |
| 1,858,696 A | 5/1932 | Weiss |
| 1,865,102 A | 6/1932 | Hayes |
| 1,903,228 A | 3/1933 | Thomson |
| 1,947,044 A | 2/1934 | Gove |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A * | 10/1938 | Christiansen .................. 476/43 |
| 2,152,796 A | 4/1939 | Erban |
| 2,209,254 A | 7/1940 | Ahnger |
| 2,259,933 A | 10/1941 | Holloway |
| 2,325,502 A | 7/1943 | Georges |
| 2,469,653 A | 5/1949 | Kopp |
| 2,480,968 A | 9/1949 | Ronai |
| 2,596,538 A | 5/1952 | Dicke |
| 2,597,849 A | 5/1952 | Alfredeen |
| 2,675,713 A | 4/1954 | Acker |
| 2,730,904 A | 1/1956 | Rennerfelt |
| 2,748,614 A | 6/1956 | Weisel |
| 2,868,038 A | 1/1959 | Billeter |
| 2,883,883 A | 4/1959 | Chillson |
| 2,913,932 A | 11/1959 | Oehru |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 3,086,704 A | 4/1963 | Hurtt |
| 3,087,348 A | 4/1963 | Kraus |
| 3,163,050 A | 12/1964 | Kraus |
| 3,176,542 A | 4/1965 | Monch |
| 3,184,983 A | 5/1965 | Kraus |
| 3,211,364 A | 10/1965 | Wentling et al. |
| 3,216,283 A | 11/1965 | General |
| 3,248,960 A | 5/1966 | Schottler |
| 3,273,468 A | 9/1966 | Allen |
| 3,280,646 A | 10/1966 | Lemieux |
| 3,292,443 A | 12/1966 | Felix |
| 3,407,687 A | 10/1968 | Hayashi |
| 3,440,895 A | 4/1969 | Fellows |
| 3,464,281 A | 9/1969 | Azuma et al. |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,769,849 A | 11/1973 | Hagen |
| 3,800,607 A | 4/1974 | Zurcher |
| 3,802,284 A | 4/1974 | Sharpe et al. |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,984,129 A | 10/1976 | Hege |
| 3,996,807 A | 12/1976 | Adams |
| 4,103,514 A | 8/1978 | Grosse-Entrup |
| 4,169,609 A | 10/1979 | Zampedro |
| 4,177,683 A | 12/1979 | Moses |
| 4,227,712 A | 10/1980 | Dick |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,526,255 A | 7/1985 | Hennessey et al. |
| 4,560,369 A | 12/1985 | Hattori |
| 4,574,649 A | 3/1986 | Seol |
| 4,585,429 A | 4/1986 | Marier |
| 4,628,766 A | 12/1986 | De Brie Perry |
| 4,630,839 A | 12/1986 | Seol |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,857,035 A | 8/1989 | Anderson |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,961,477 A | 10/1990 | Sweeney |
| 4,964,312 A | 10/1990 | Kraus |
| 5,020,384 A | 6/1991 | Kraus |
| 5,033,322 A | 7/1991 | Nakano |
| 5,037,361 A | 8/1991 | Takahashi |
| 5,069,655 A | 12/1991 | Schievelbusch |
| 5,121,654 A | 6/1992 | Fasce |
| 5,125,677 A | 6/1992 | Ogilvie et al. |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,273,501 A | 12/1993 | Schievelbusch |
| 5,318,486 A | 6/1994 | Lutz |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,451,070 A | 9/1995 | Lindsay et al. |
| 5,489,003 A | 2/1996 | Ohyama et al. |
| 5,508,574 A | 4/1996 | Vlock |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,690,346 A | 11/1997 | Keskitalo |
| 5,746,676 A | 5/1998 | Kawase et al. |
| 5,799,541 A | 9/1998 | Arbeiter |
| 5,823,052 A | 10/1998 | Nobumoto |
| 5,846,155 A | 12/1998 | Taniguchi et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 6,000,707 A | 12/1999 | Miller |
| 6,006,151 A | 12/1999 | Graf |
| 6,015,359 A | 1/2000 | Kunii |
| 6,019,701 A | 2/2000 | Mori et al. |
| 6,042,132 A | 3/2000 | Suenaga et al. |
| 6,045,481 A | 4/2000 | Kumagai |
| 6,053,833 A | 4/2000 | Masaki |
| 6,053,841 A | 4/2000 | Koide et al. |
| 6,066,067 A | 5/2000 | Greenwood |
| 6,071,210 A | 6/2000 | Kato |
| 6,095,940 A | 8/2000 | Ai et al. |
| 6,113,513 A | 9/2000 | Itoh et al. |
| 6,119,539 A | 9/2000 | Papanicolaou |

| | | |
|---|---|---|
| 6,119,800 A | 9/2000 | McComber |
| 6,159,126 A | 12/2000 | Oshidan |
| 6,174,260 B1 | 1/2001 | Tsukada et al. |
| 6,186,922 B1 | 2/2001 | Bursal et al. |
| 6,217,473 B1 | 4/2001 | Ueda et al. |
| 6,241,636 B1 | 6/2001 | Miller |
| 6,243,638 B1 | 6/2001 | Abo et al. |
| 6,312,358 B1 | 11/2001 | Goi et al. |
| 6,322,475 B2 | 11/2001 | Miller |
| 6,325,386 B1 | 12/2001 | Shoge |
| 6,340,067 B1 | 1/2002 | Fujiwara |
| 6,375,412 B1 | 4/2002 | Dial |
| 6,390,946 B1 | 5/2002 | Hibi et al. |
| 6,406,399 B1 | 6/2002 | Ai |
| 6,419,608 B1 | 7/2002 | Miller |
| 6,461,268 B1 | 10/2002 | Milner |
| 6,492,785 B1 | 12/2002 | Kasten et al. |
| 6,499,373 B2 | 12/2002 | Van Cor |
| 6,527,662 B2 | 3/2003 | Miyata et al. |
| 6,532,890 B2 | 3/2003 | Chen |
| 6,551,210 B2 | 4/2003 | Miller |
| 6,575,047 B2 | 6/2003 | Reik et al. |
| 6,672,418 B1 | 1/2004 | Makino |
| 6,676,559 B2 | 1/2004 | Miller |
| 6,679,109 B2 | 1/2004 | Gierling et al. |
| 6,689,012 B2 | 2/2004 | Miller |
| 6,805,654 B2 | 10/2004 | Nishii |
| 6,931,316 B2 | 8/2005 | Joe et al. |
| 6,942,593 B2 | 9/2005 | Nishii et al. |
| 6,945,903 B2 | 9/2005 | Miller |
| 6,949,049 B2 | 9/2005 | Miller |
| 6,991,579 B2 | 1/2006 | Kobayashi et al. |
| 7,004,487 B2 | 2/2006 | Matsumoto et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,086,979 B2 | 8/2006 | Frenken |
| 7,086,981 B2 | 8/2006 | Ali et al. |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,219 B2 | 5/2007 | Miller |
| 7,217,220 B2 | 5/2007 | Careau et al. |
| 7,232,395 B2 | 6/2007 | Miller et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,320,660 B2 | 1/2008 | Miller |
| 7,322,901 B2 | 1/2008 | Miller et al. |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,547,264 B2 | 6/2009 | Usoro |
| 7,727,115 B2 | 6/2010 | Serkh |
| 2001/0008192 A1 | 7/2001 | Morisawa |
| 2003/0022753 A1 | 1/2003 | Mizuno et al. |
| 2003/0036456 A1 | 2/2003 | Skrabs |
| 2003/0181286 A1* | 9/2003 | Miller ............................ 476/38 |
| 2003/0221892 A1 | 12/2003 | Matsumoto et al. |
| 2004/0058772 A1 | 3/2004 | Inoue et al. |
| 2004/0204283 A1 | 10/2004 | Inoue |
| 2005/0037876 A1 | 2/2005 | Unno et al. |
| 2005/0178893 A1 | 8/2005 | Miller et al. |
| 2005/0227809 A1 | 10/2005 | Bitzer et al. |
| 2006/0084549 A1 | 4/2006 | Smithson et al. |
| 2006/0108956 A1 | 5/2006 | Clark |
| 2006/0111212 A9 | 5/2006 | Ai et al. |
| 2006/0180363 A1 | 8/2006 | Uchisasai |
| 2007/0004552 A1 | 1/2007 | Matsudaira et al. |
| 2007/0041823 A1 | 2/2007 | Miller |
| 2007/0049450 A1 | 3/2007 | Miller |
| 2007/0155567 A1 | 7/2007 | Miller et al. |
| 2007/0155580 A1 | 7/2007 | Nichols et al. |
| 2007/0167275 A1 | 7/2007 | Miller |
| 2007/0167277 A1 | 7/2007 | Miller |
| 2007/0167278 A1 | 7/2007 | Miller |
| 2007/0167279 A1 | 7/2007 | Miller |
| 2007/0167280 A1 | 7/2007 | Miller |
| 2007/0179013 A1 | 8/2007 | Miller et al. |
| 2007/0197337 A1 | 8/2007 | Miller et al. |
| 2007/0219696 A1 | 9/2007 | Miller et al. |
| 2007/0270265 A1 | 11/2007 | Miller et al. |
| 2007/0270266 A1 | 11/2007 | Miller et al. |
| 2007/0270267 A1 | 11/2007 | Miller et al. |
| 2007/0270268 A1 | 11/2007 | Miller et al. |
| 2007/0270269 A1 | 11/2007 | Miller et al. |
| 2007/0270270 A1 | 11/2007 | Miller et al. |
| 2007/0270271 A1 | 11/2007 | Miller et al. |
| 2007/0270272 A1 | 11/2007 | Miller et al. |
| 2007/0270278 A1 | 11/2007 | Miller et al. |
| 2007/0275809 A1 | 11/2007 | Miller et al. |
| 2007/0281819 A1 | 12/2007 | Miller et al. |
| 2007/0287578 A1 | 12/2007 | Miller |
| 2007/0287579 A1 | 12/2007 | Miller et al. |
| 2007/0287580 A1 | 12/2007 | Miller |
| 2008/0032852 A1 | 2/2008 | Smithson et al. |
| 2008/0032853 A1 | 2/2008 | Smithson et al. |
| 2008/0032854 A1 | 2/2008 | Smithson et al. |
| 2008/0034585 A1 | 2/2008 | Smithson et al. |
| 2008/0034586 A1 | 2/2008 | Smithson et al. |
| 2008/0039269 A1 | 2/2008 | Smithson et al. |
| 2008/0039270 A1 | 2/2008 | Smithson et al. |
| 2008/0039271 A1 | 2/2008 | Smithson et al. |
| 2008/0039272 A1 | 2/2008 | Smithson et al. |
| 2008/0039273 A1 | 2/2008 | Smithson et al. |

| | | | | | | |
|---|---|---|---|---|---|---|
| 2008/0039274 | A1 | 2/2008 | Smithson et al. | GB | 1 376 057 | 12/1974 |
| 2008/0039275 | A1 | 2/2008 | Smithson et al. | GB | 2031822 | 4/1980 |
| 2008/0039276 | A1 | 2/2008 | Smithson et al. | GB | 2 035 482 | 6/1980 |
| 2008/0039277 | A1 | 2/2008 | Smithson et al. | GB | 2 080 452 | 8/1982 |
| 2008/0040008 | A1 | 2/2008 | Smithson et al. | JP | 42-2843 | 2/1967 |
| 2008/0070729 | A1 | 3/2008 | Miller et al. | JP | 42-2844 | 2/1967 |
| 2008/0073136 | A1 | 3/2008 | Miller et al. | JP | 47-29762 | 11/1972 |
| 2008/0073137 | A1 | 3/2008 | Miller et al. | JP | 48-54371 | 7/1973 |
| 2008/0073467 | A1 | 3/2008 | Miller et al. | JP | 49-12742 | 3/1974 |
| 2008/0079236 | A1 | 4/2008 | Miller et al. | JP | 50-114581 | 9/1975 |
| 2008/0081715 | A1 | 4/2008 | Miller et al. | JP | 51-25903 | 8/1976 |
| 2008/0085795 | A1 | 4/2008 | Miller et al. | JP | 51-150380 | 12/1976 |
| 2008/0085796 | A1 | 4/2008 | Miller et al. | JP | 47-20535 | 8/1977 |
| 2008/0085797 | A1 | 4/2008 | Miller et al. | JP | 53 048166 | 1/1978 |
| 2008/0085798 | A1 | 4/2008 | Miller et al. | JP | 55-135259 | 4/1979 |
| 2008/0121486 | A1 | 5/2008 | Miller et al. | JP | 58065361 | 4/1983 |
| 2008/0121487 | A1 | 5/2008 | Miller et al. | JP | 59069565 | 4/1984 |
| 2008/0125281 | A1 | 5/2008 | Miller et al. | JP | 60-247011 | 12/1985 |
| 2008/0125282 | A1 | 5/2008 | Miller et al. | JP | 61-144466 | 7/1986 |
| 2008/0132373 | A1 | 6/2008 | Miller et al. | JP | 61-173722 | 10/1986 |
| 2008/0132377 | A1 | 6/2008 | Miller et al. | JP | 63-219953 | 9/1988 |
| 2008/0139363 | A1 | 6/2008 | Williams | JP | 63219953 | 9/1988 |
| 2008/0141809 | A1 | 6/2008 | Miller et al. | JP | 63-160465 | 10/1988 |
| 2008/0141810 | A1 | 6/2008 | Miller et al. | JP | 1-210653 * | 8/1989 |
| 2008/0146403 | A1 | 6/2008 | Miller | JP | 02157483 | 6/1990 |
| 2008/0146404 | A1 | 6/2008 | Miller | JP | 02271142 | 6/1990 |
| 2008/0161151 | A1 | 7/2008 | Miller | JP | 04-166619 | 6/1992 |
| 2008/0188345 | A1 | 8/2008 | Miller | JP | 04-272553 | 9/1992 |
| 2008/0200300 | A1 | 8/2008 | Smithson et al. | JP | 52-35481 | 9/1993 |
| 2008/0305920 | A1 | 12/2008 | Nishii et al. | JP | 7-42799 | 2/1995 |
| 2009/0082169 | A1 | 3/2009 | Kolstrup | JP | 7-139600 | 5/1995 |
| 2009/0107454 | A1 | 4/2009 | Hiyoshi et al. | JP | 08170706 A | 7/1996 |
| 2009/0164076 | A1 | 6/2009 | Vasiliotis et al. | JP | 09024743 A | 1/1997 |
| 2009/0280949 | A1 | 11/2009 | Lohr | JP | 09-089064 | 3/1997 |
| 2009/0312145 | A1 | 12/2009 | Pohl et al. | JP | 411063130 | 3/1999 |
| 2010/0056322 | A1 | 3/2010 | Thomassy | JP | 11-257479 | 9/1999 |
| 2010/0093479 | A1 | 4/2010 | Carter et al. | JP | 2001521109 A | 11/2001 |
| 2010/0093480 | A1 | 4/2010 | Pohl et al. | JP | 2002-147558 | 5/2002 |
| 2010/0093485 | A1 | 4/2010 | Pohl et al. | JP | 2002-250421 | 6/2002 |
| 2010/0131164 | A1 | 5/2010 | Carter et al. | JP | 2003-028257 | 1/2003 |
| 2010/0264620 | A1 | 10/2010 | Miles et al. | JP | 2003-524119 | 8/2003 |
| 2010/0267510 | A1 | 10/2010 | Nichols et al. | JP | 2003-336732 | 11/2003 |
| 2011/0088503 | A1 | 4/2011 | Armstrong et al. | JP | 2004162652 A | 6/2004 |
| 2011/0105274 | A1 | 5/2011 | Lohr et al. | JP | 8-247245 | 9/2004 |
| 2011/0127096 | A1 | 6/2011 | Schneidewind | JP | 2005/240928 A | 9/2005 |
| 2011/0172050 | A1 | 7/2011 | Nichols et al. | JP | 2006015025 | 1/2006 |
| 2011/0218072 | A1 | 9/2011 | Lohr et al. | JP | 2007-535715 | 12/2007 |
| 2011/0230297 | A1 | 9/2011 | Shiina et al. | JP | 2008-002687 | 1/2008 |
| 2011/0319222 | A1 | 12/2011 | Ogawa et al. | JP | 03-149442 | 1/2009 |
| 2012/0035016 | A1 | 2/2012 | Miller et al. | JP | 2010069005 | 4/2010 |
| 2012/0043841 | A1 | 2/2012 | Miller | NE | 98467 | 7/1961 |
| | | | | WO | WO 01/73319 | 10/2001 |

FOREIGN PATENT DOCUMENTS

| | | |
|---|---|---|
| CN | 1157379 A | 8/1997 |
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 | 5/2000 |
| DE | 10155372 A1 | 5/2003 |
| EP | 0 432 742 | 12/1990 |
| EP | 0528382 | 2/1993 |
| EP | 635639 A1 | 1/1995 |
| EP | 0638741 | 2/1995 |
| EP | 0976956 | 2/2000 |
| EP | 1136724 | 9/2001 |
| EP | 1366978 | 3/2003 |
| EP | 1811202 A1 | 7/2007 |
| FR | 620375 | 4/1927 |
| FR | 2590638 | 5/1987 |
| GB | 391448 | 4/1933 |
| GB | 592320 | 9/1947 |
| GB | 906 002 A | 9/1962 |
| GB | 919430 A | 2/1963 |
| GB | 1132473 | 11/1968 |
| GB | 1165545 | 10/1969 |
| WO | WO 02/088573 | 11/2002 |
| WO | WO 03100294 | 12/2003 |
| WO | WO 2005/083305 | 9/2005 |
| WO | WO 2009/157920 | 12/2009 |
| WO | WO2010/017242 | 2/2010 |
| WO | WO 2010/024809 | 3/2010 |
| WO | WO 2010/044778 | 4/2010 |
| WO | WO 2011/101991 | 8/2011 |

OTHER PUBLICATIONS

International Search Report and Written Opinion dated Feb. 2, 2010 from International Patent Application No. PCT/US2008/068929, filed on Jan. 7, 2008.

International Search Report and Written Opinion dated Nov. 13, 2009 from International Patent Application No. PCT/US2008/053951, filed on Feb. 14, 2008.

International Search Report and Written Opinion dated Jan. 25, 2010 from International Patent Application No. PCT/US2009/052761, filed on Aug. 4, 2009.

Office Action dated Jan. 20, 2012 for U.S. Appl. No. 12/137,456.

Thomassy: An Engineering Approach to Simulating Traction EHL. CVT-Hybrid International Conference Mecc/Maastricht/The Netherlands, Nov. 17-19, 2010, p. 97.

* cited by examiner

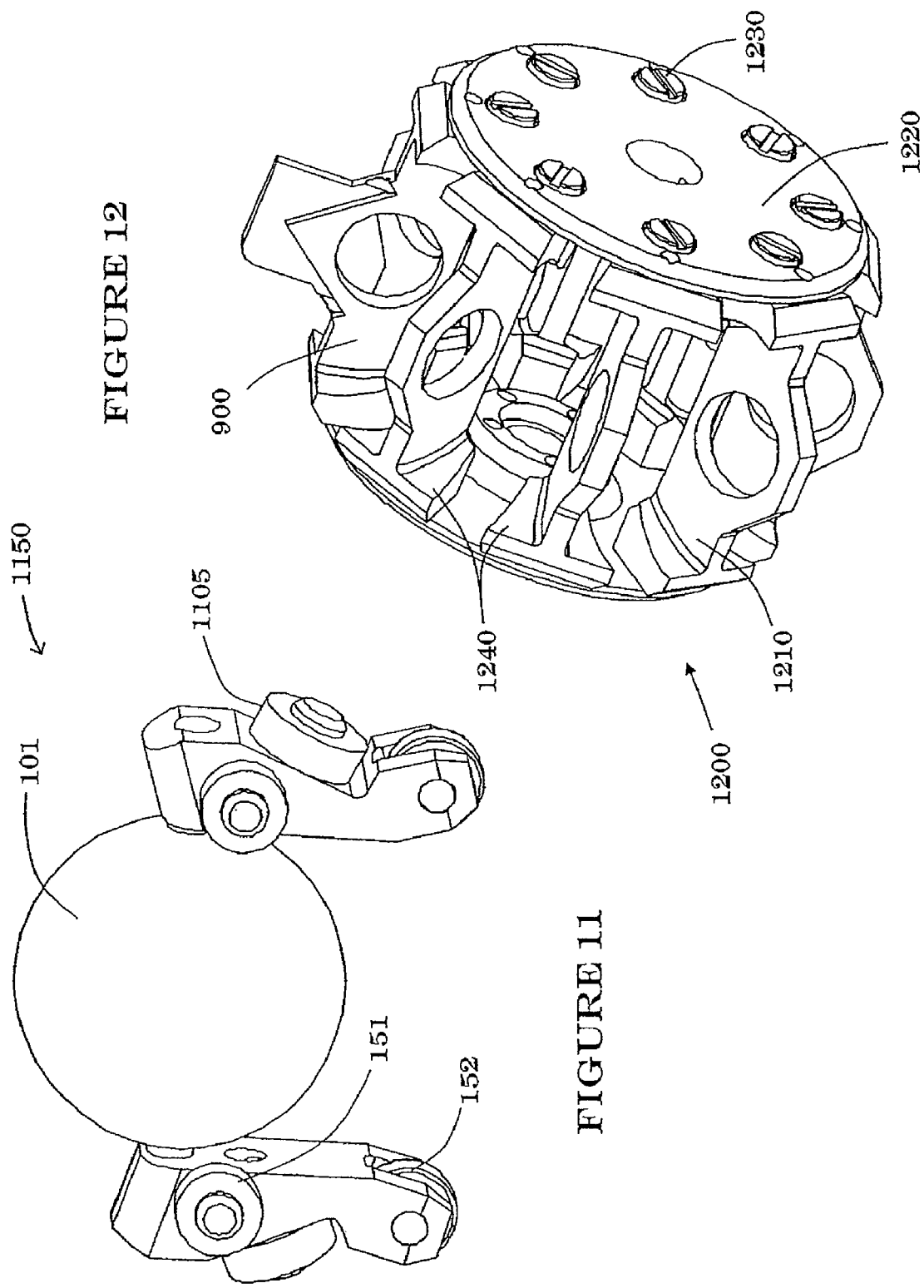

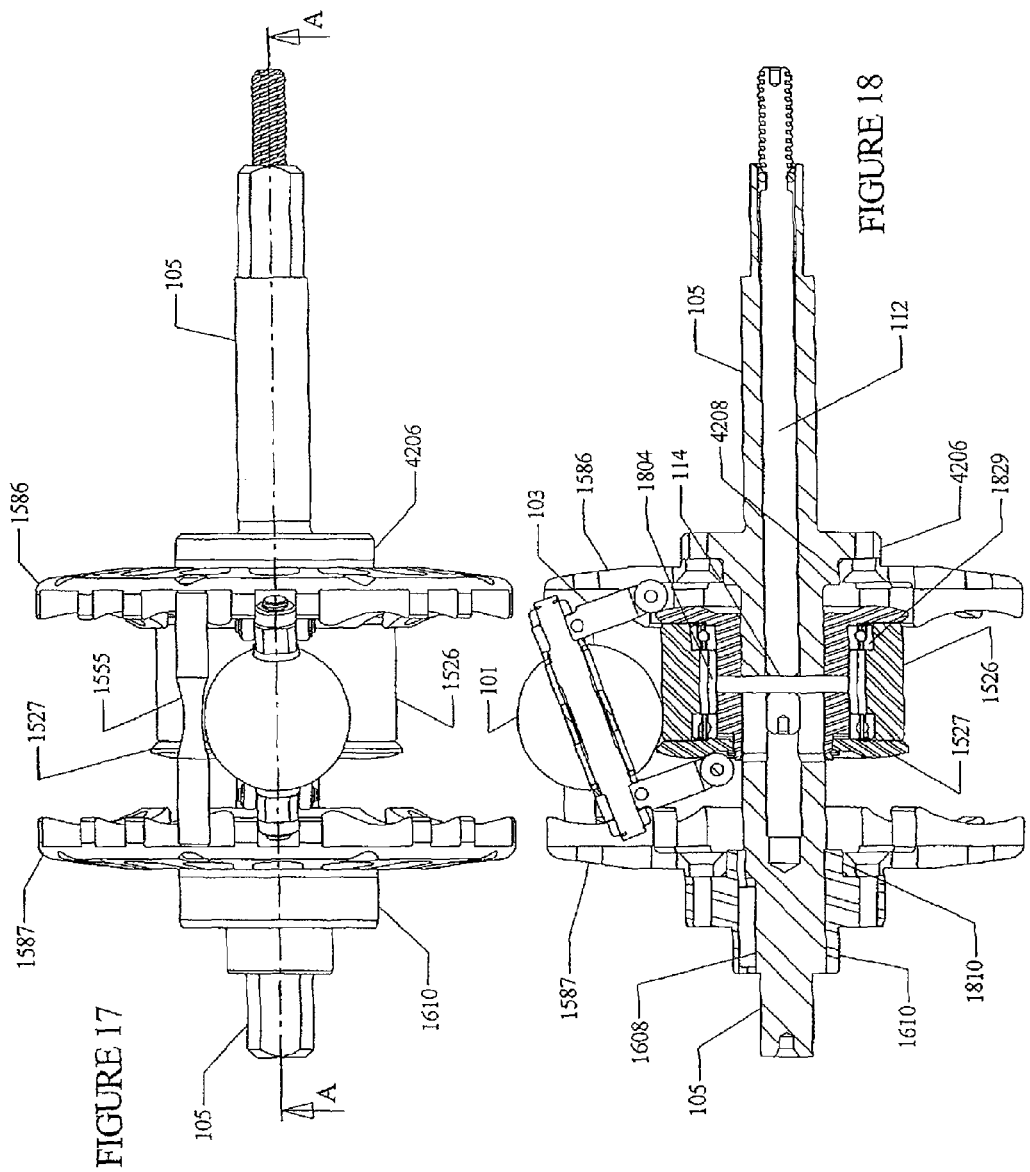

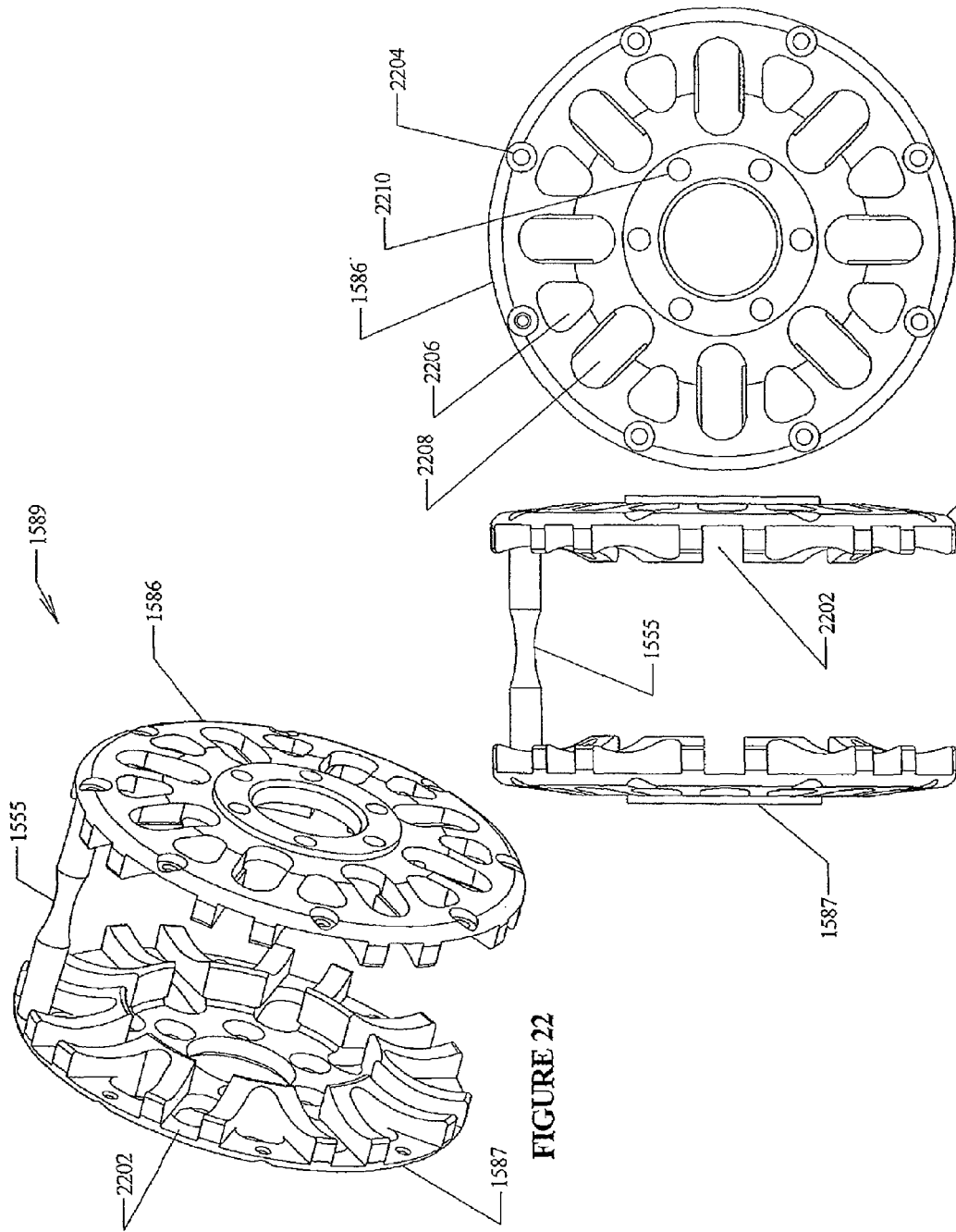

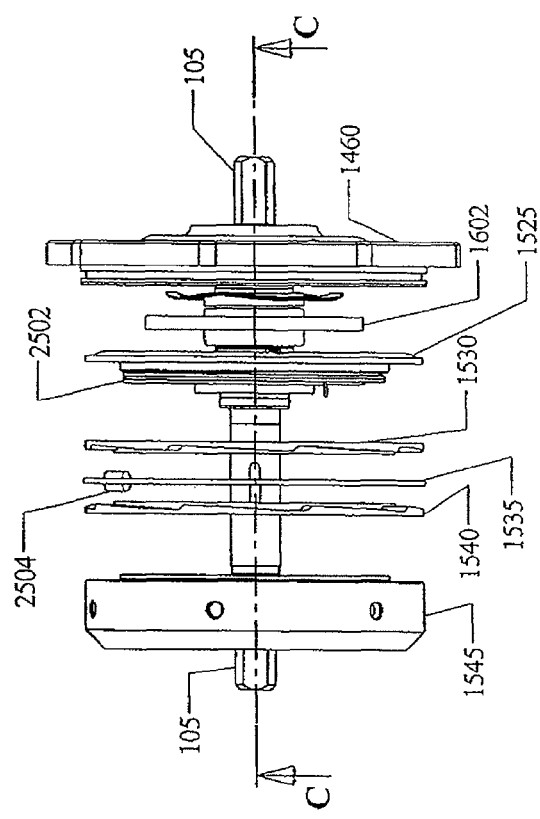
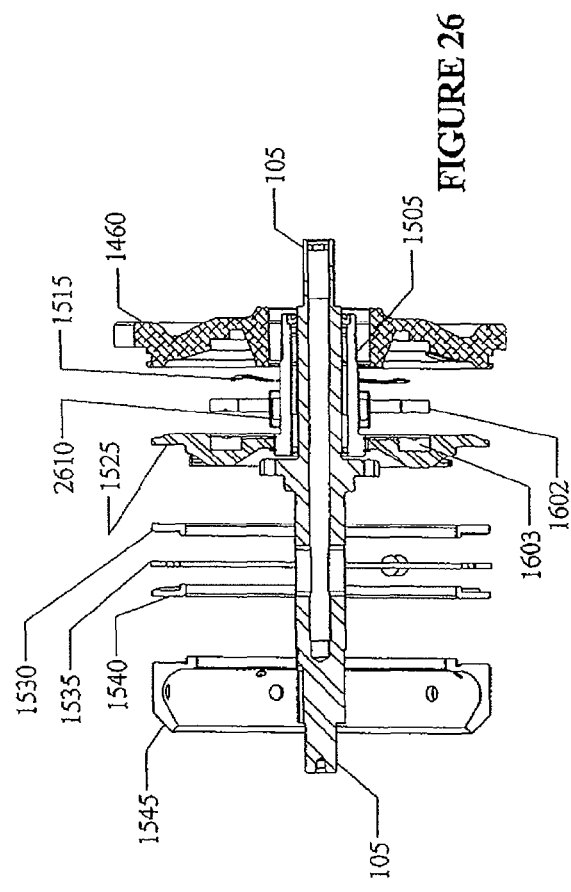

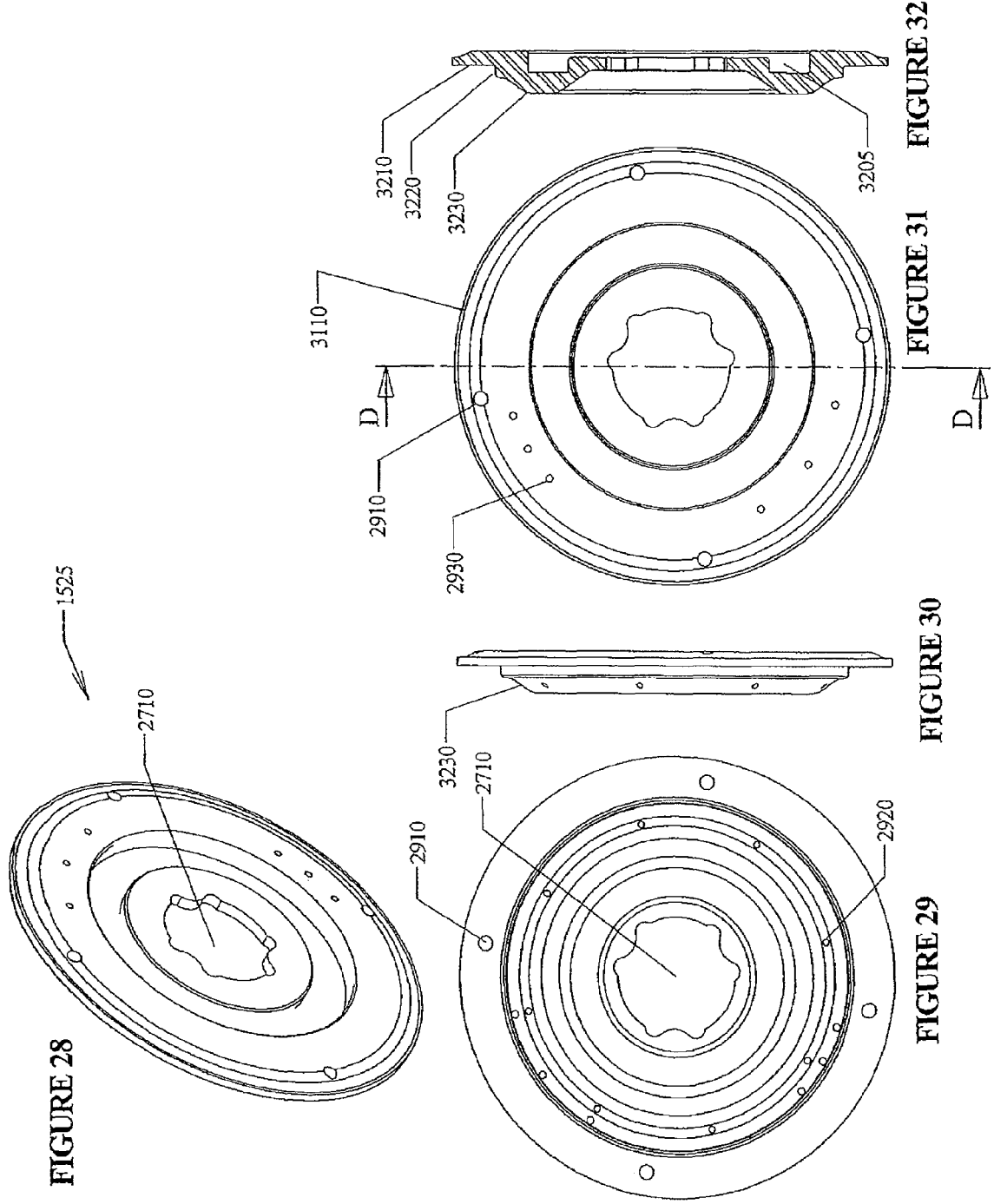

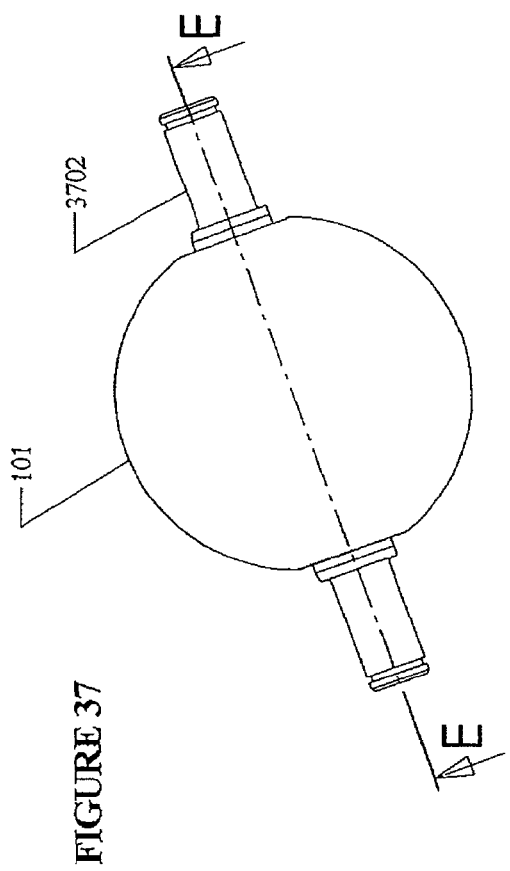
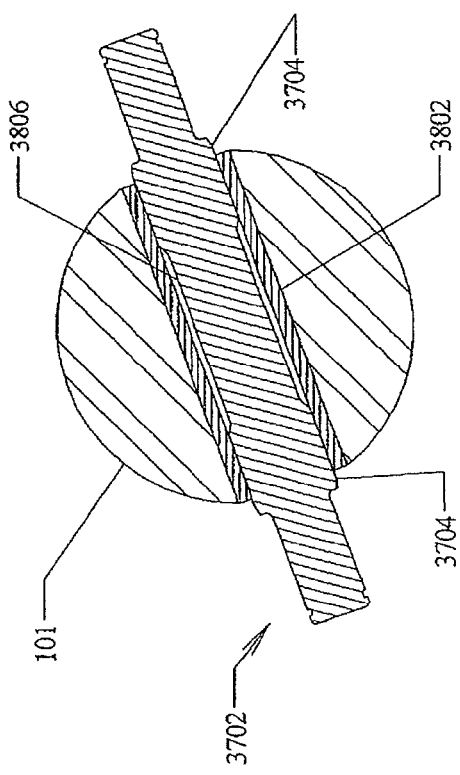
FIGURE 37
FIGURE 38

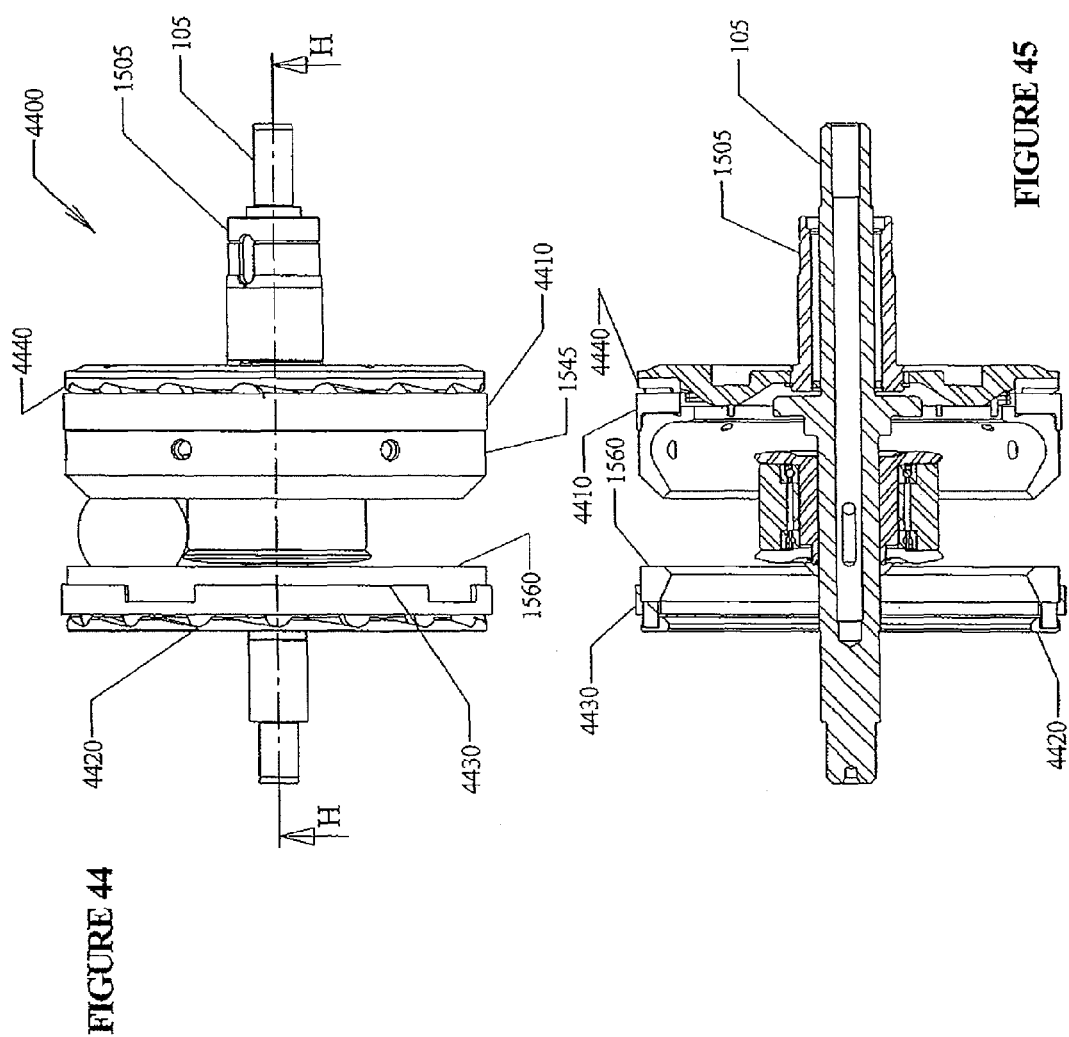

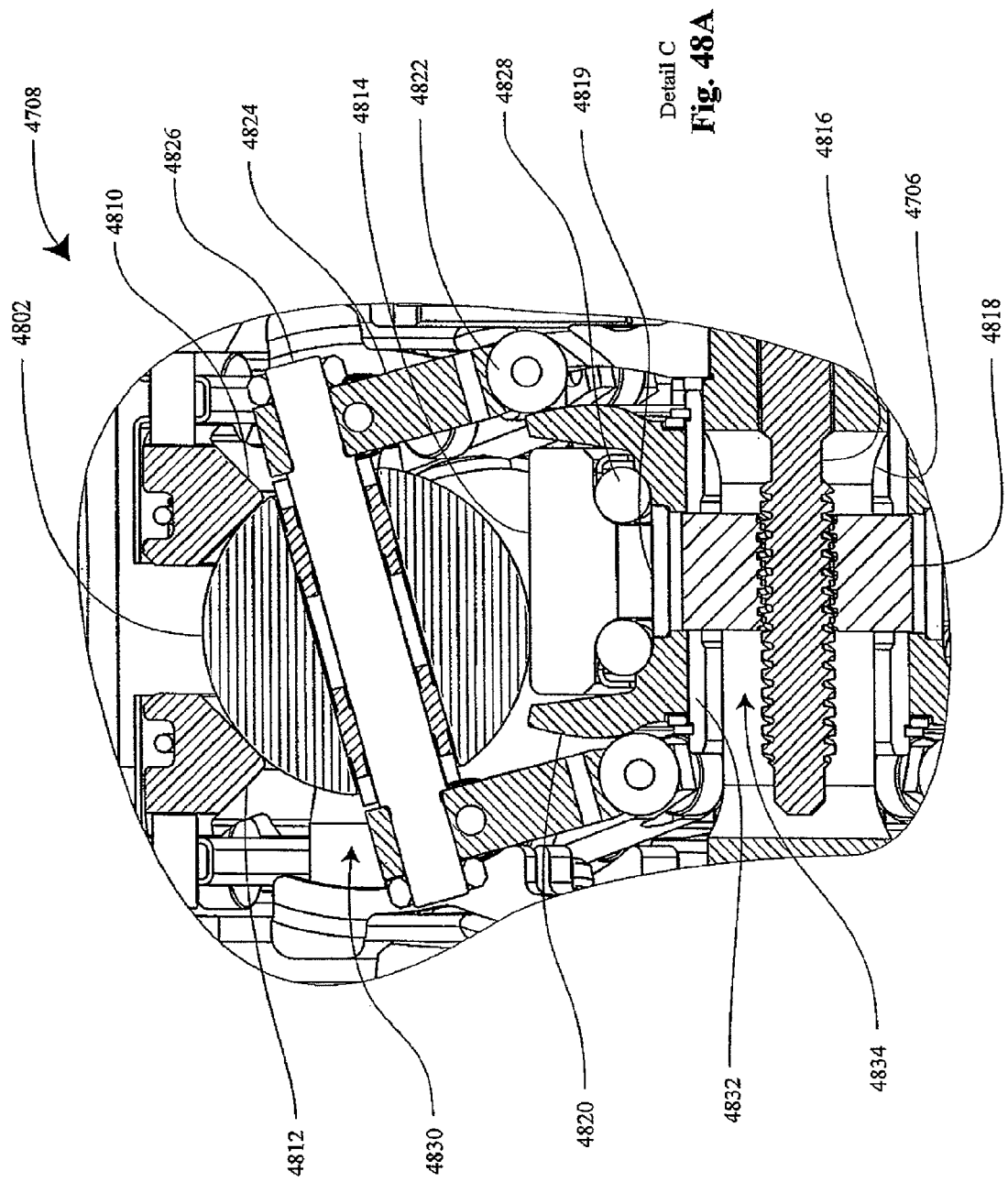

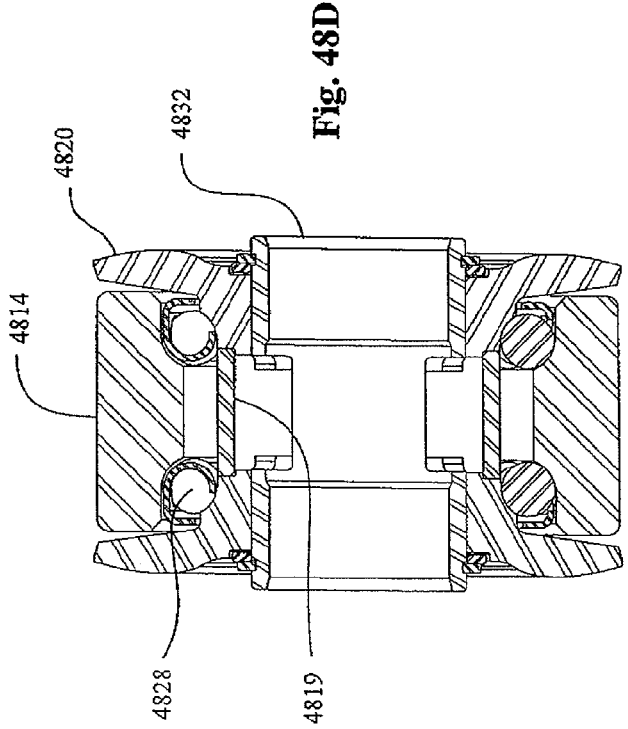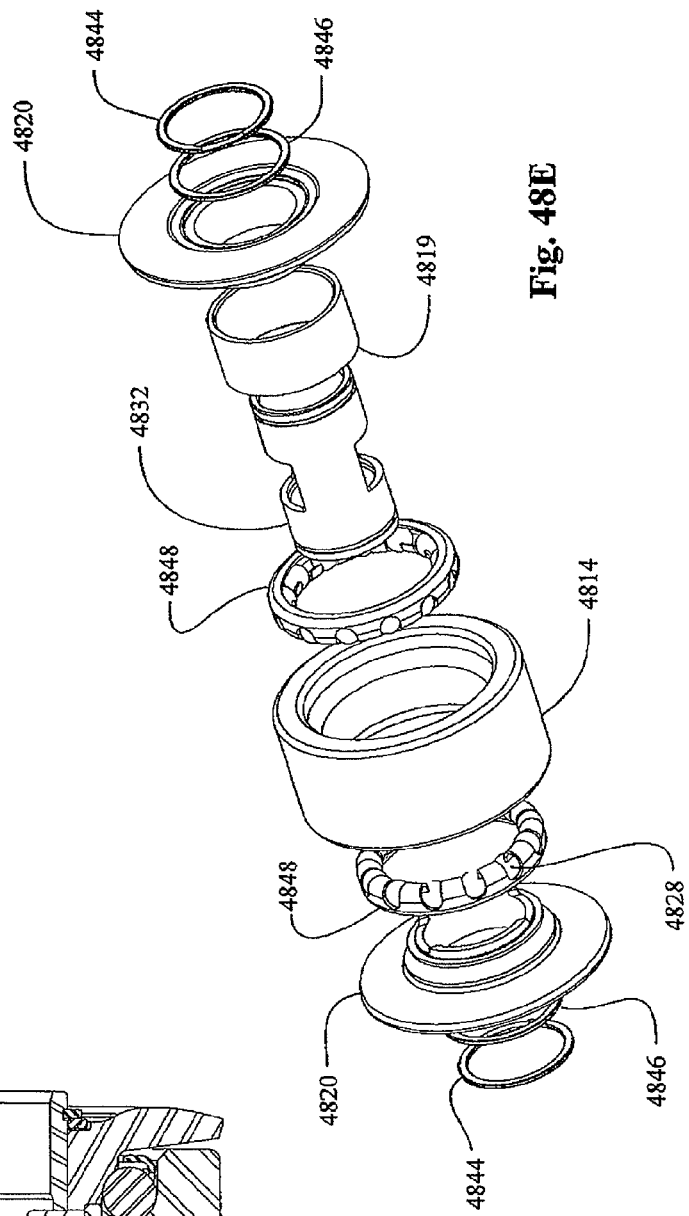

Detail D

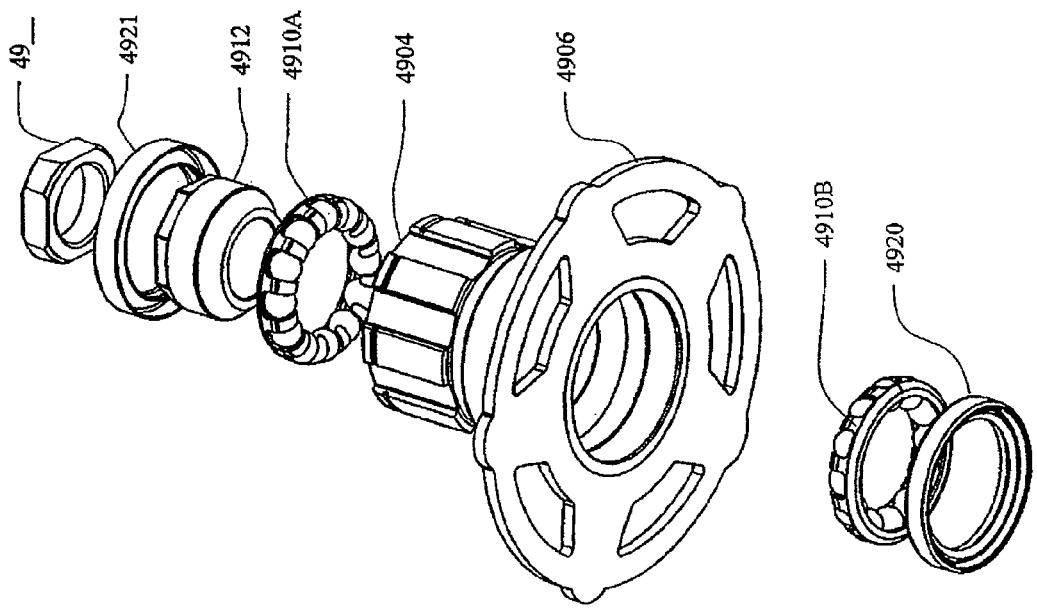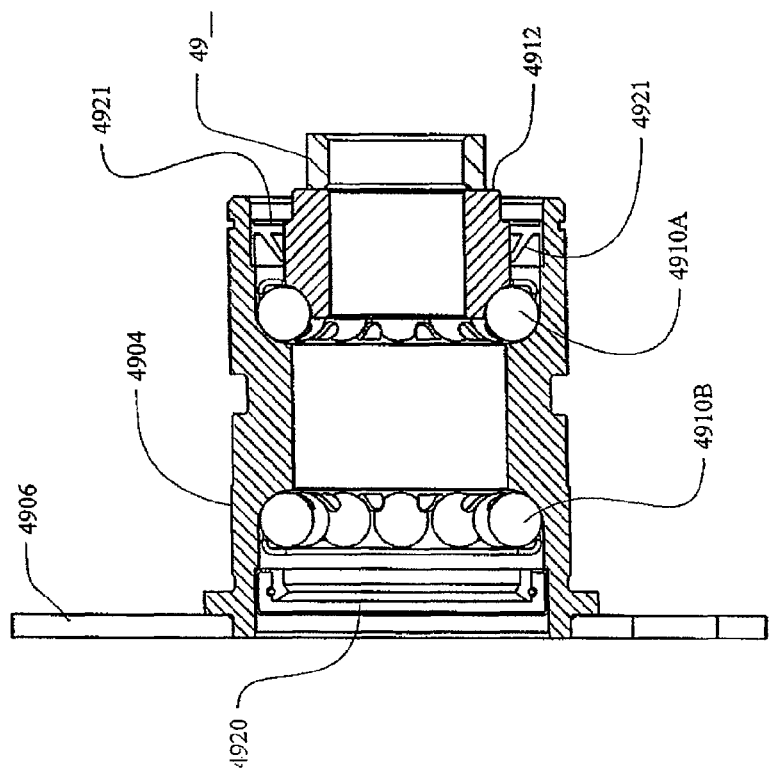
Fig. 49D
Fig. 49C

Detail E

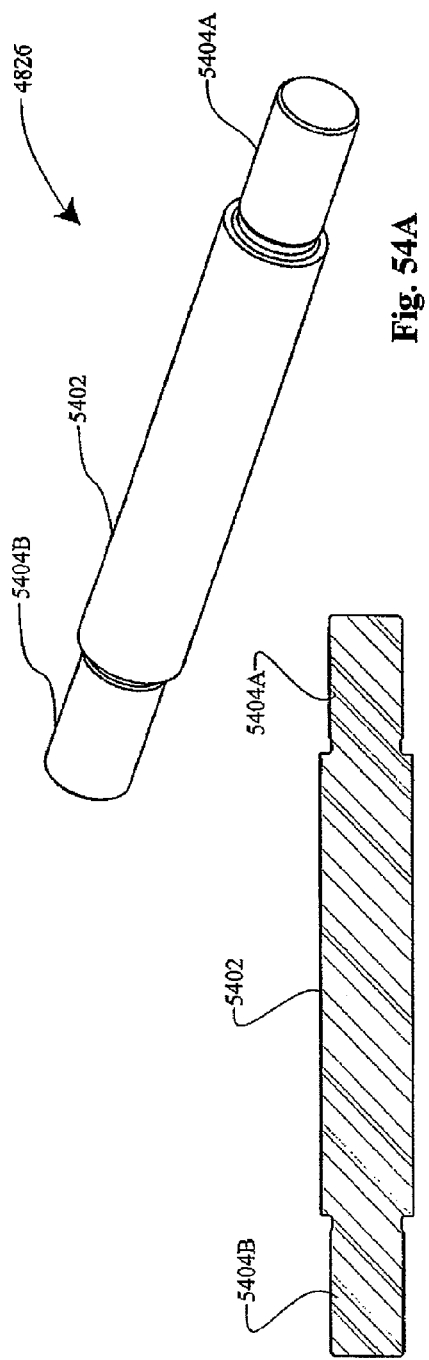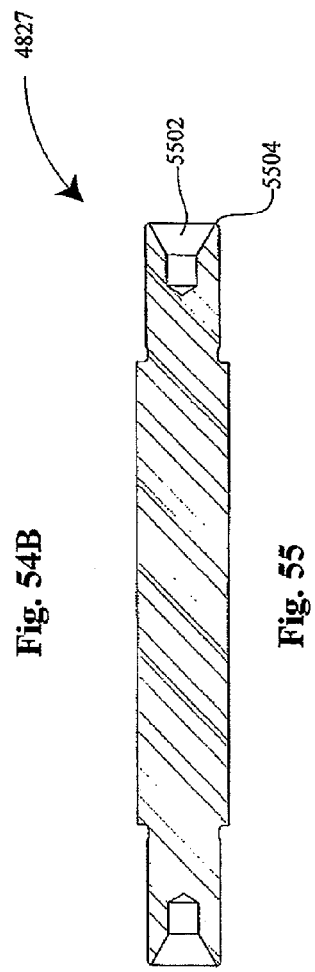
Fig. 54A
Fig. 54C
Fig. 54B
Fig. 55

Section I-I

Detail H

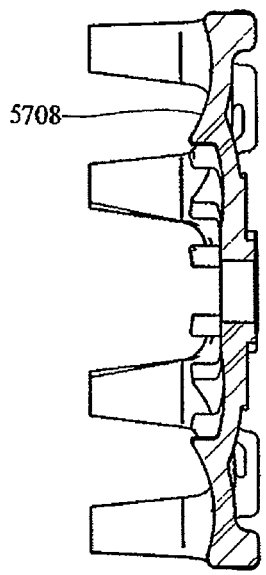
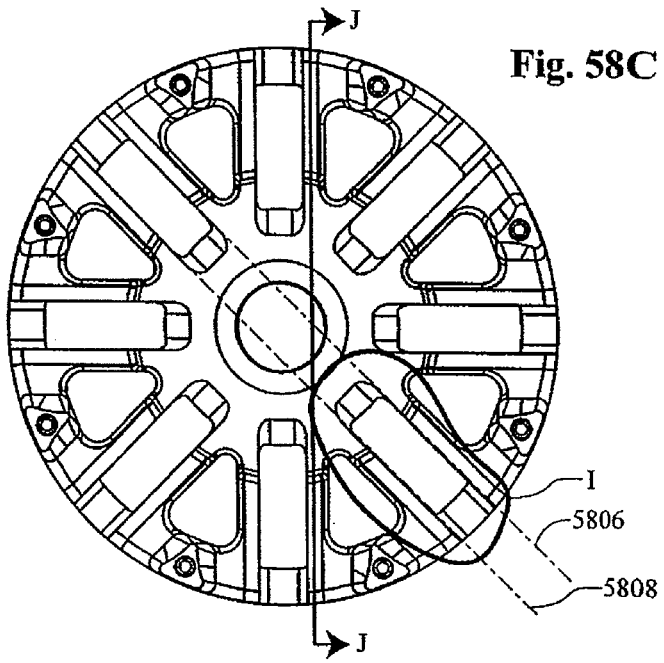
Fig. 58C
Section J-J
Fig. 58D
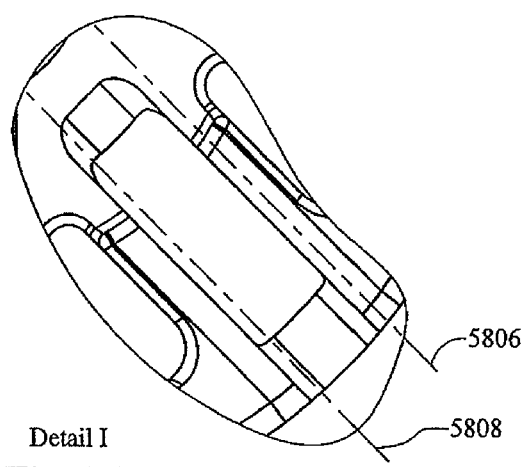
Detail I
Fig. 58E

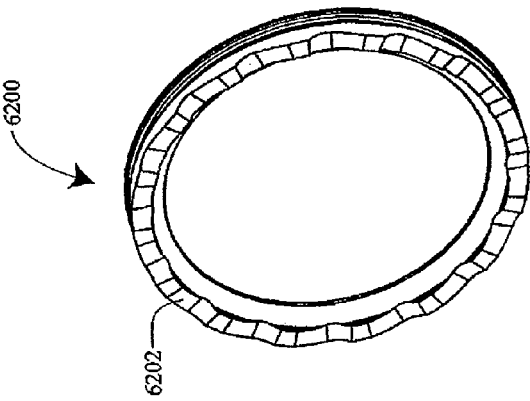
Fig. 62A
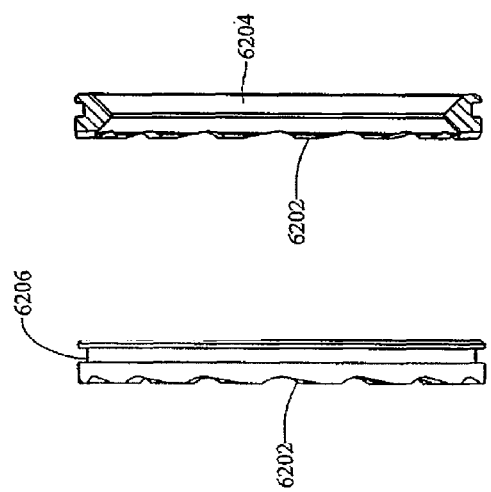
Fig. 62D
Fig. 62C
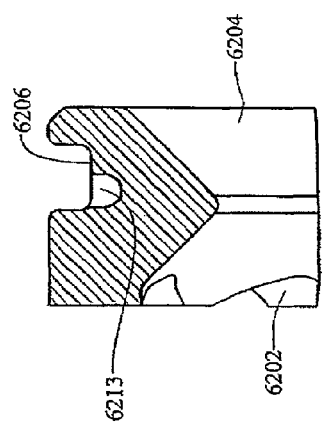
Fig. 62E
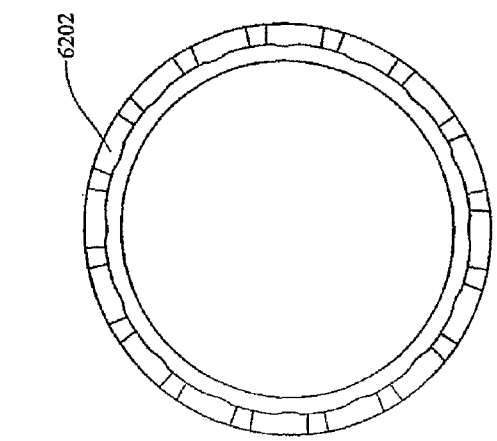
Fig. 62B

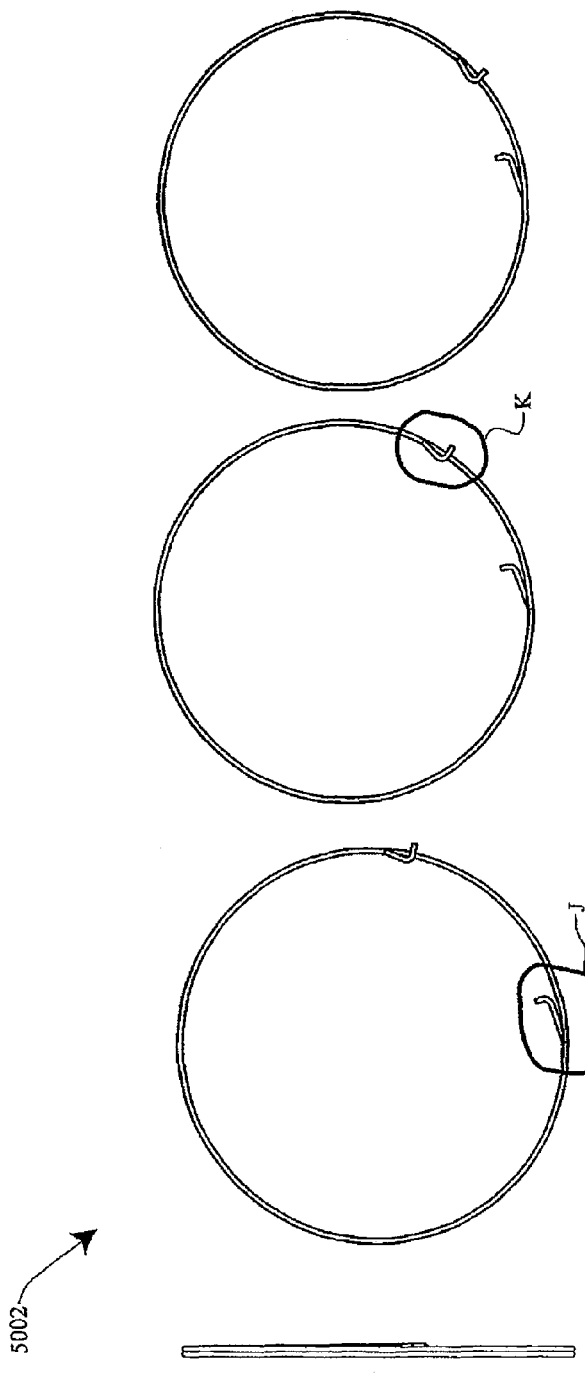

Detail L

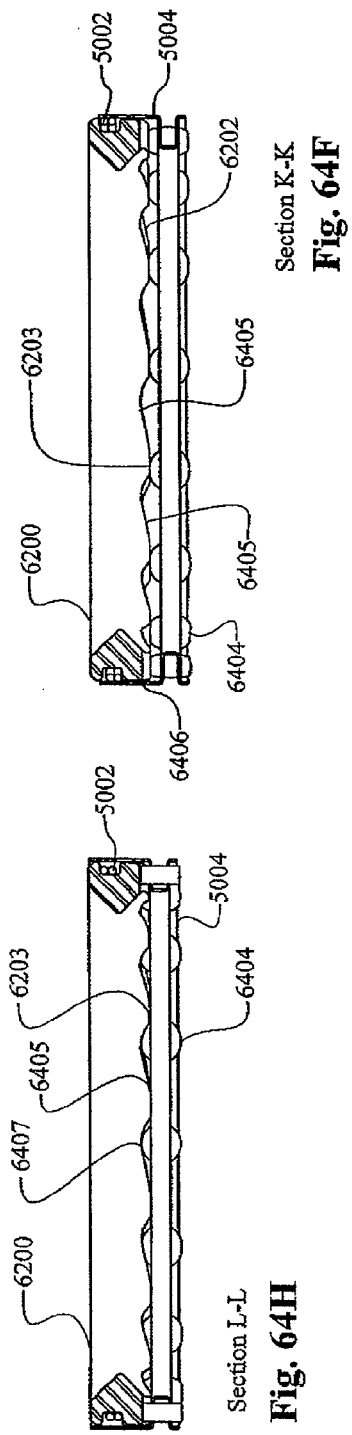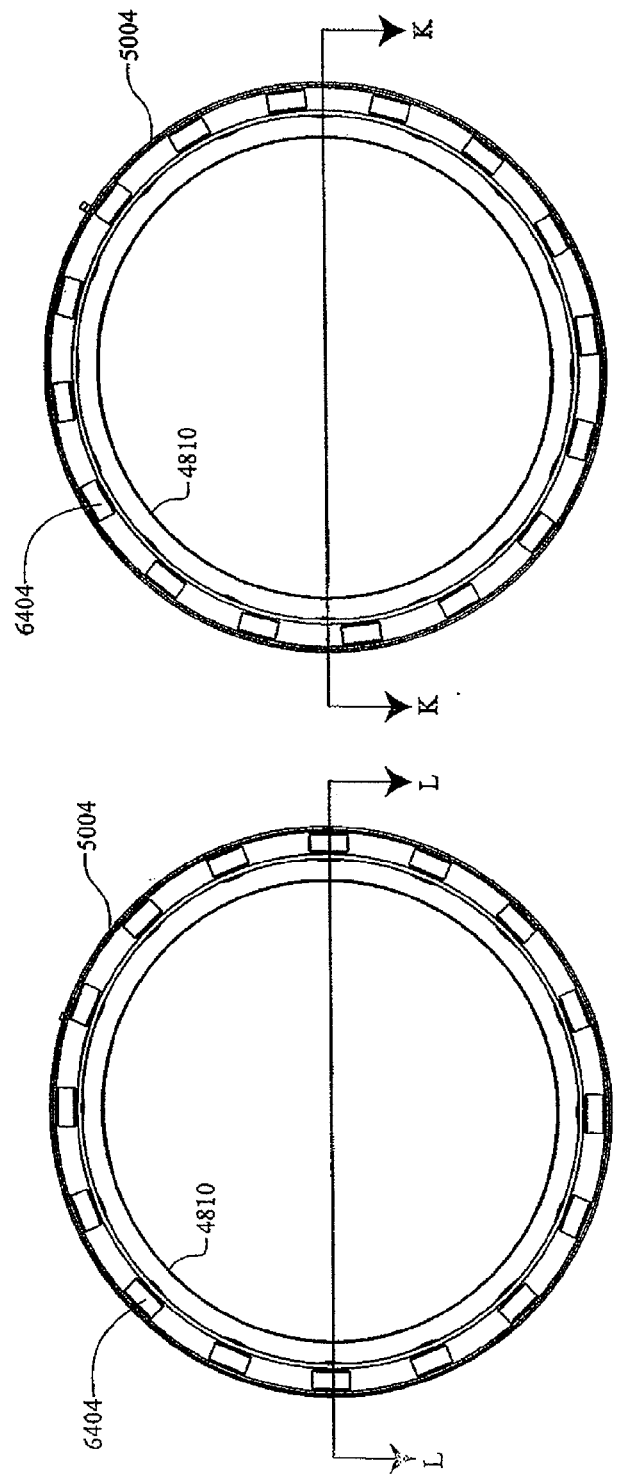

Detail G

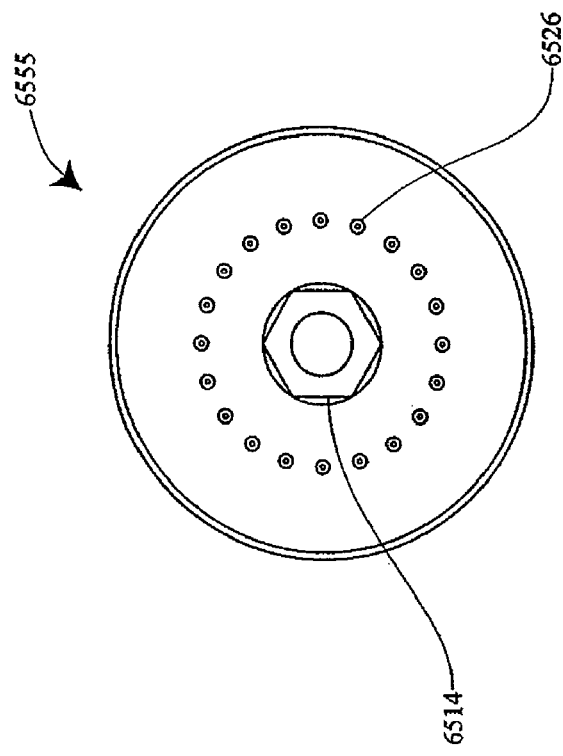
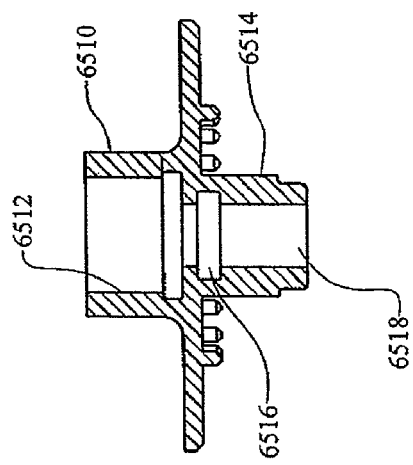
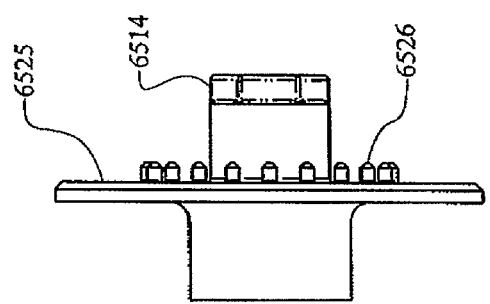

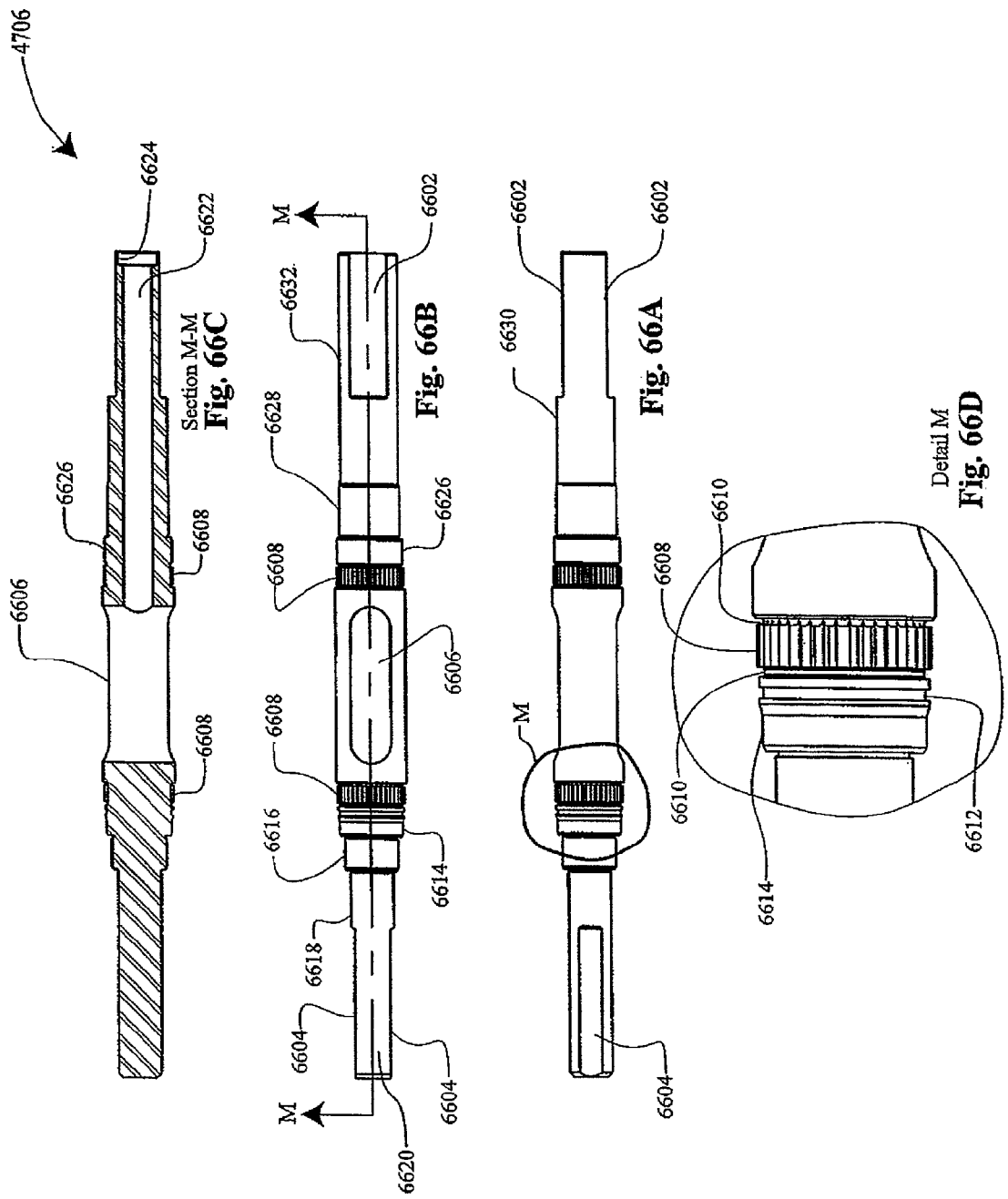

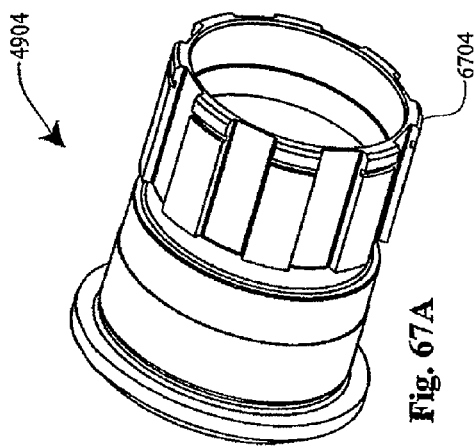
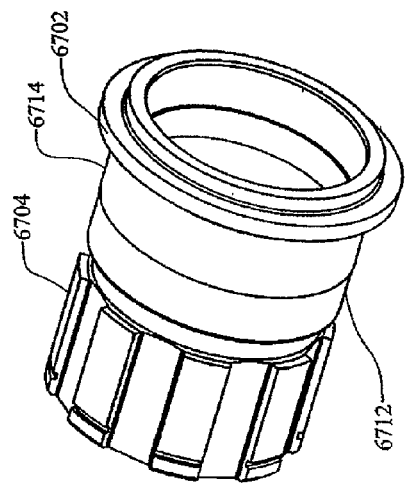
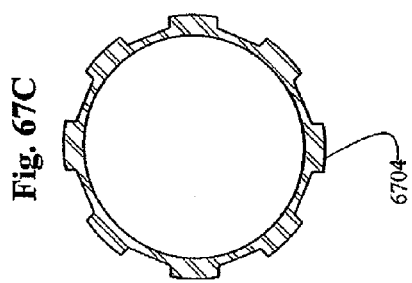
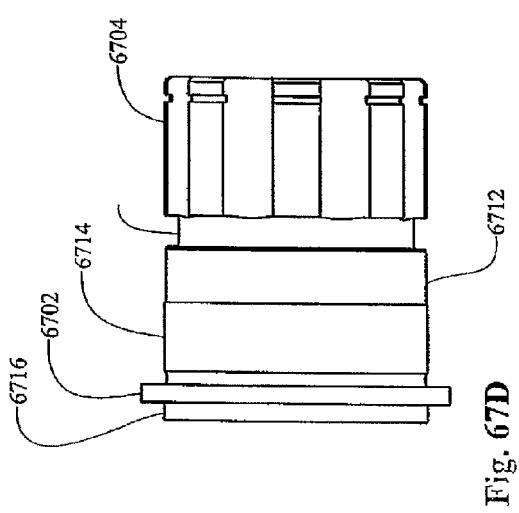
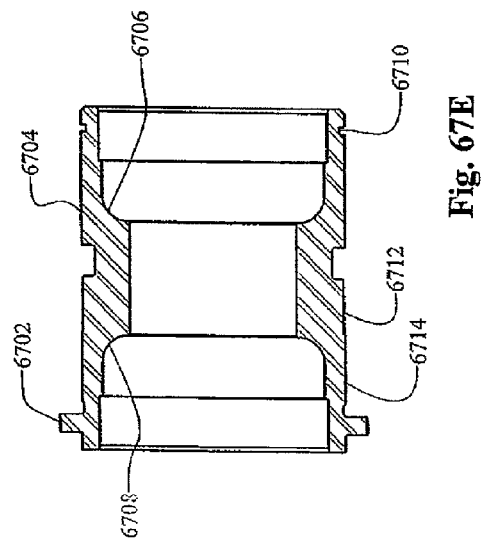
Fig. 67A
Fig. 67B
Fig. 67C
Fig. 67D
Fig. 67E

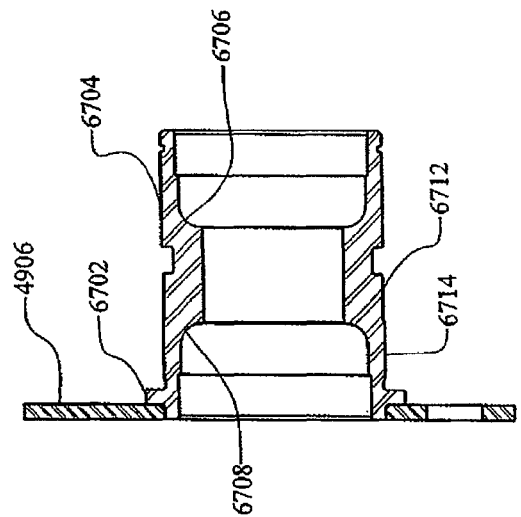
Fig. 69C
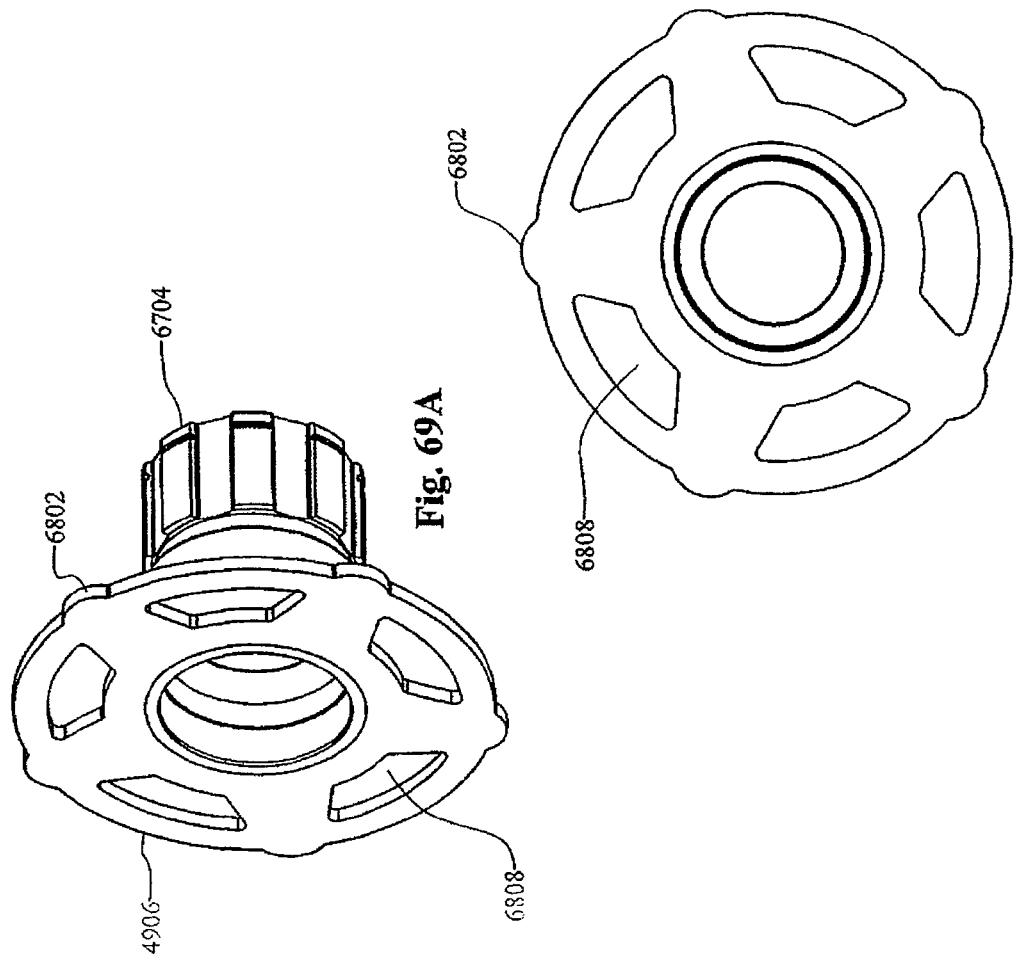
Fig. 69A
Fig. 69B

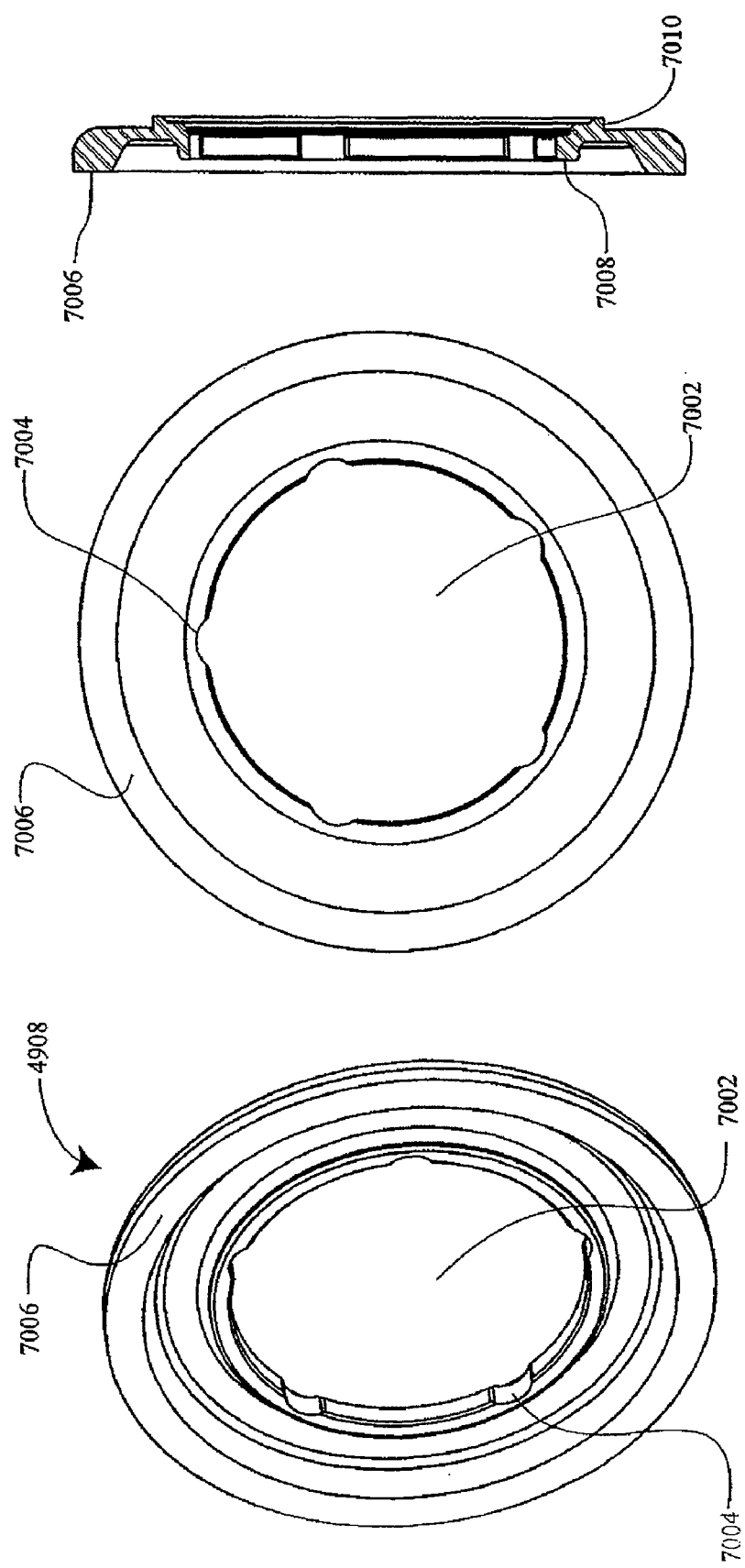

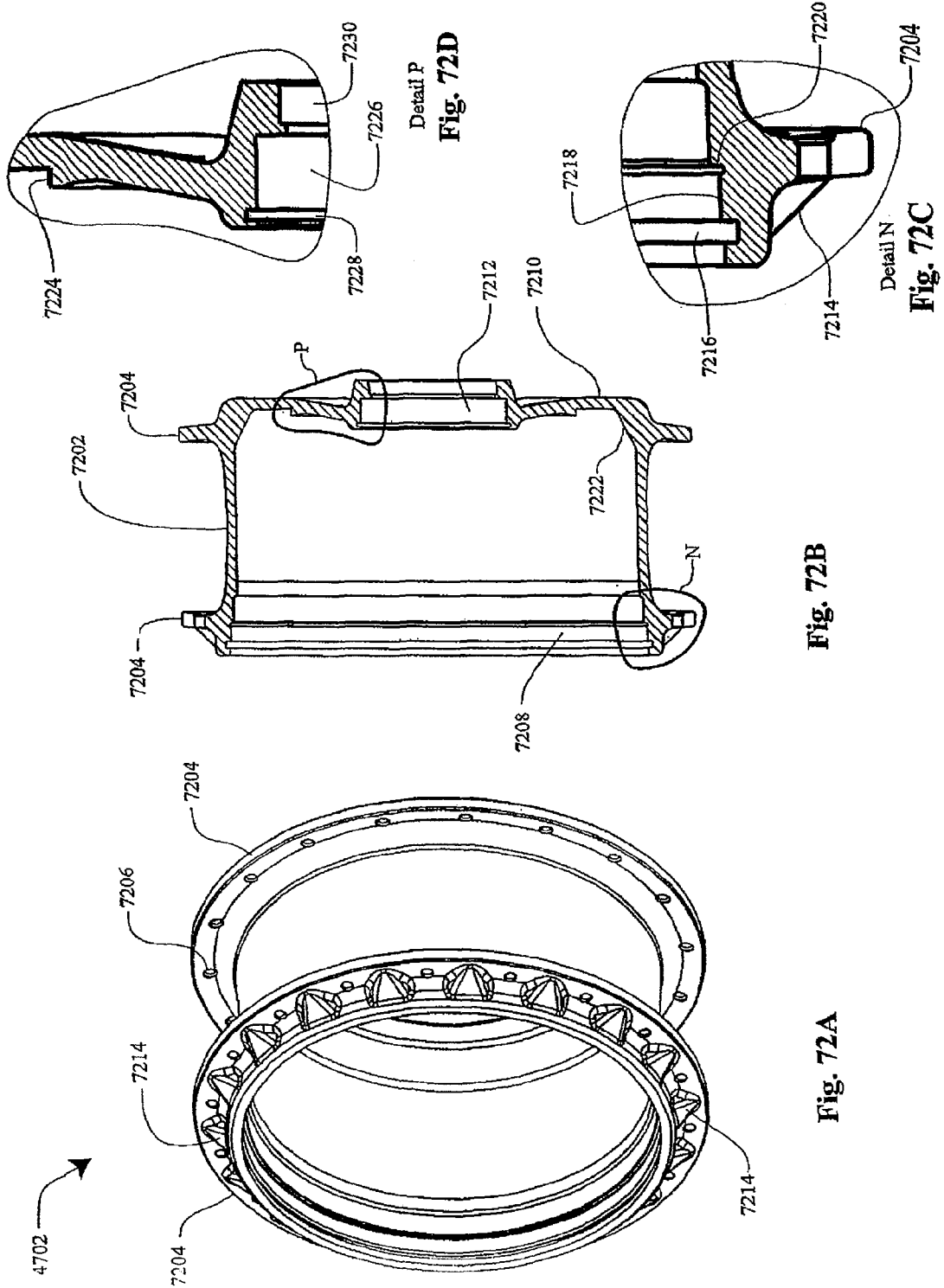

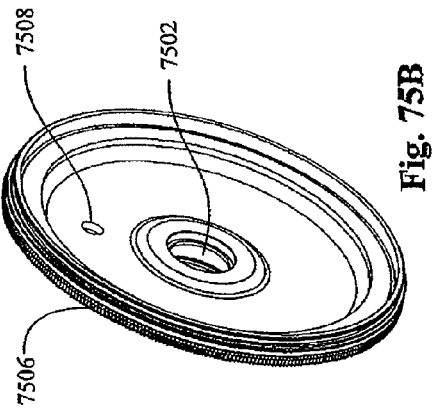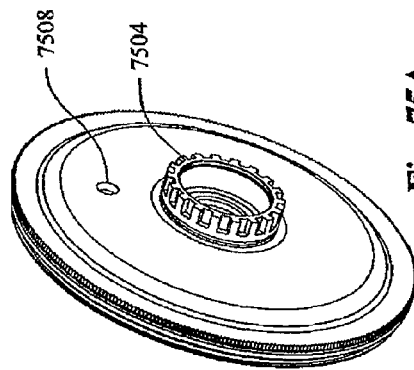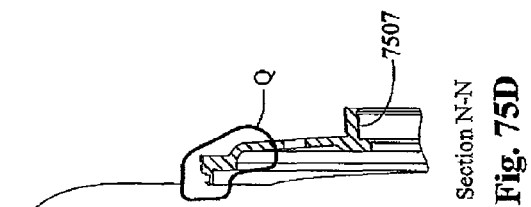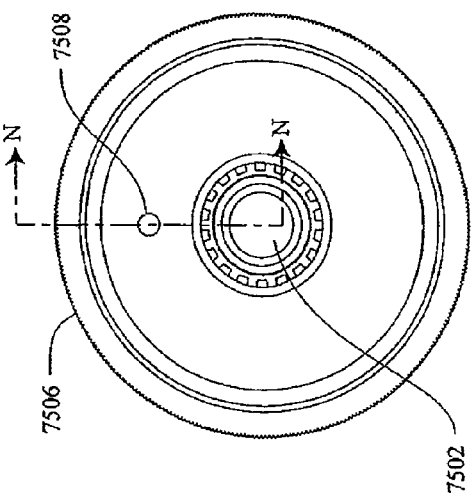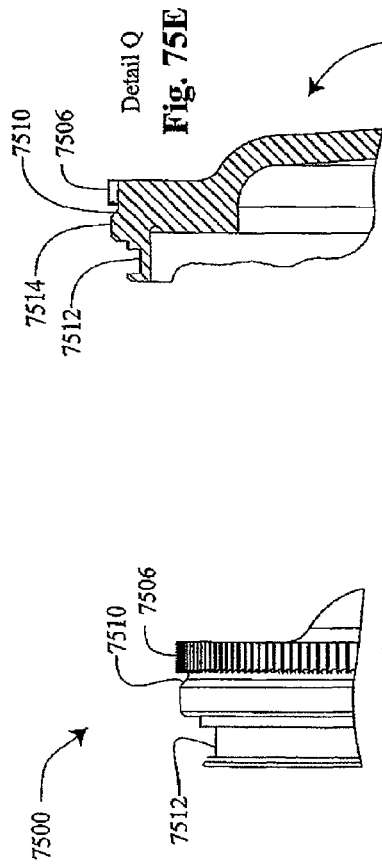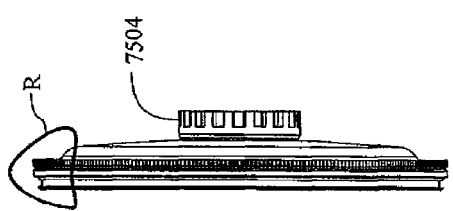

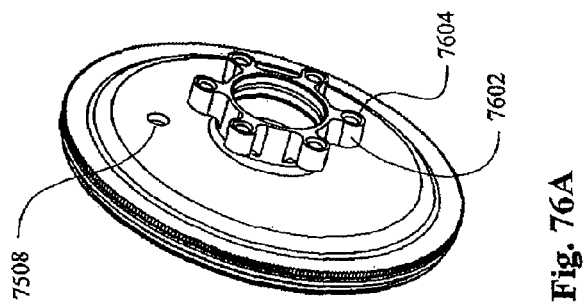
Fig. 76A
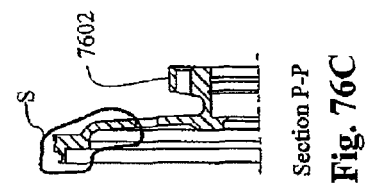
Fig. 76D
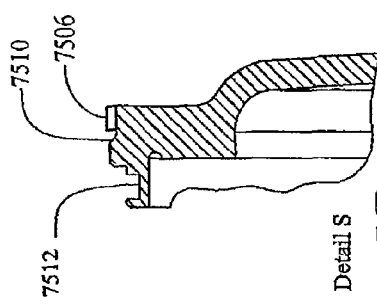
Fig. 76F
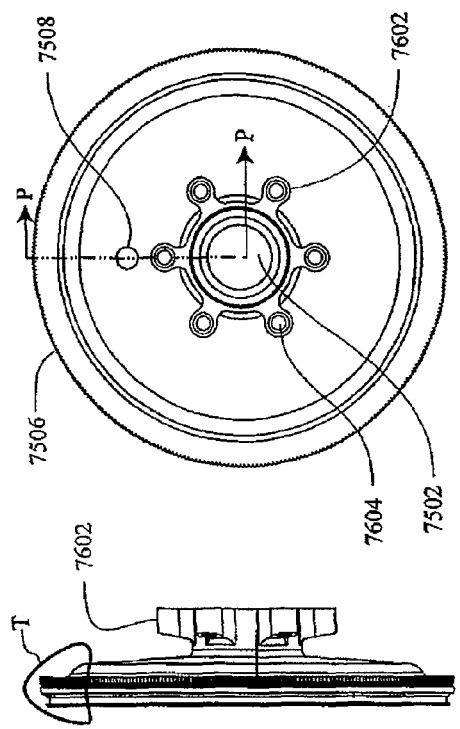
Fig. 76B
Fig. 76C
Fig. 76E
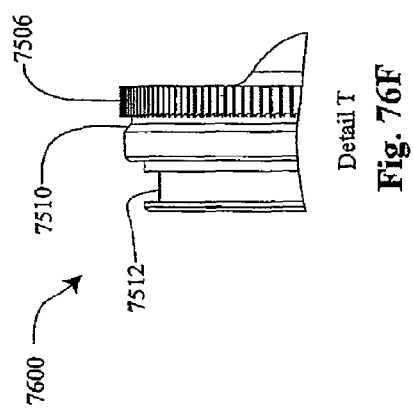

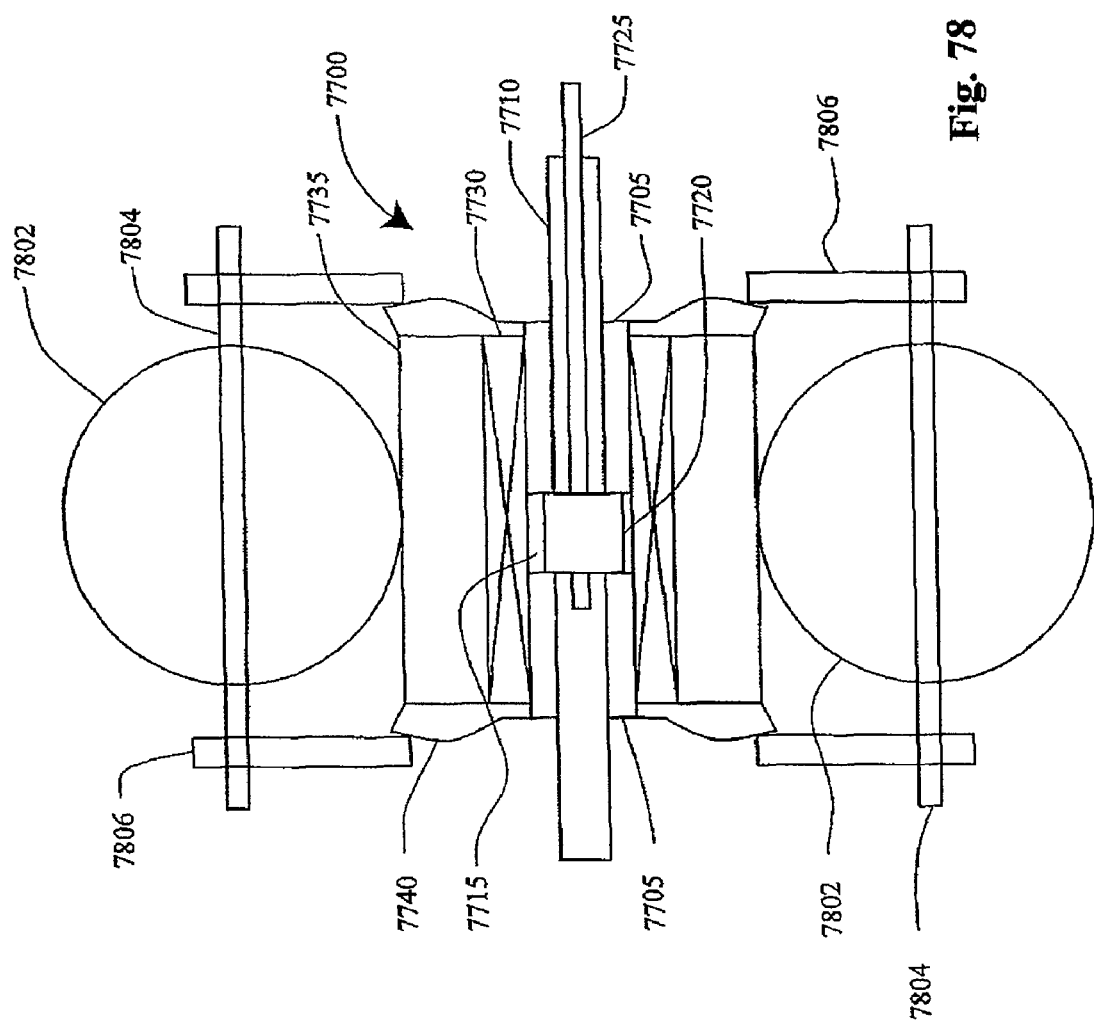

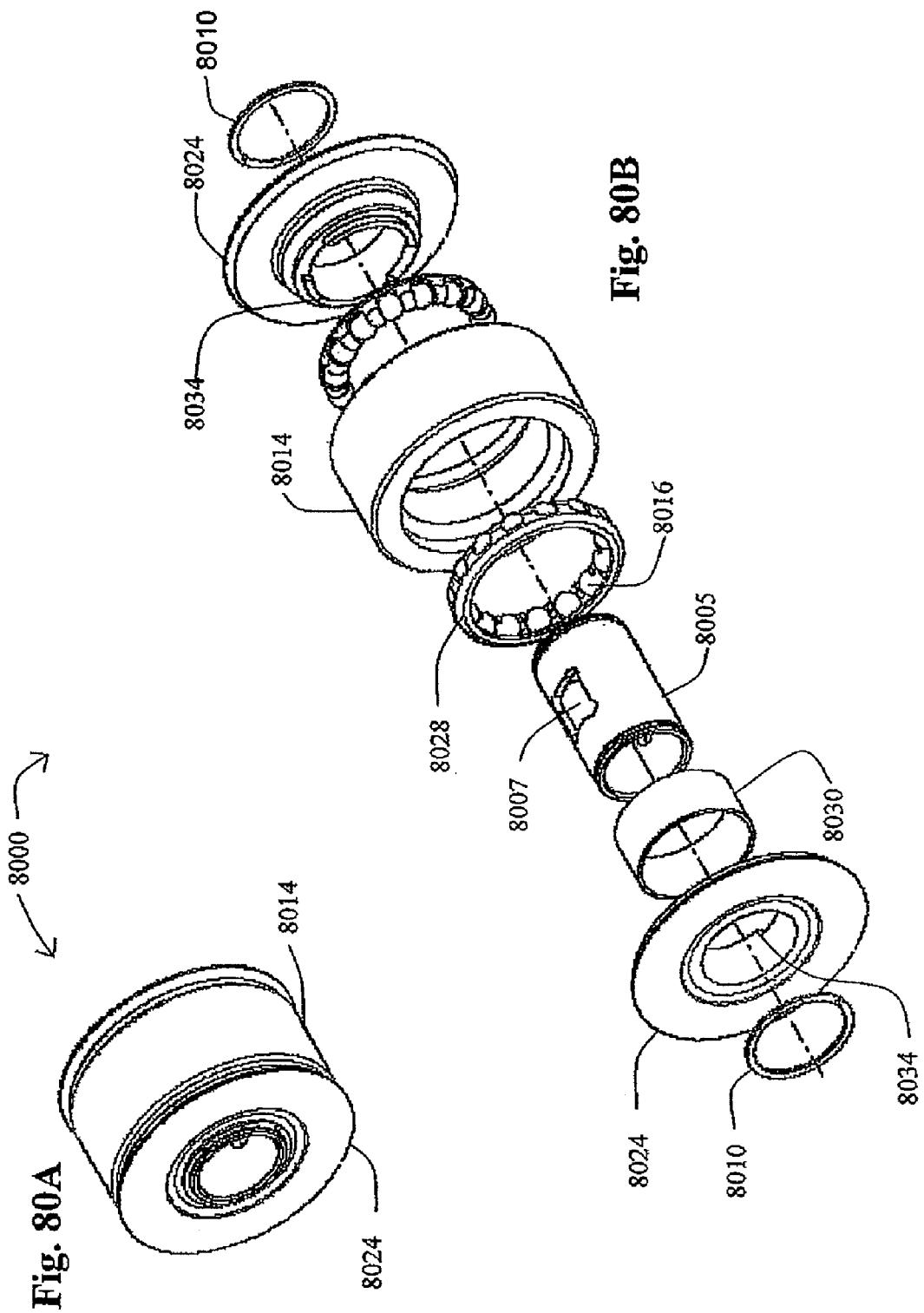

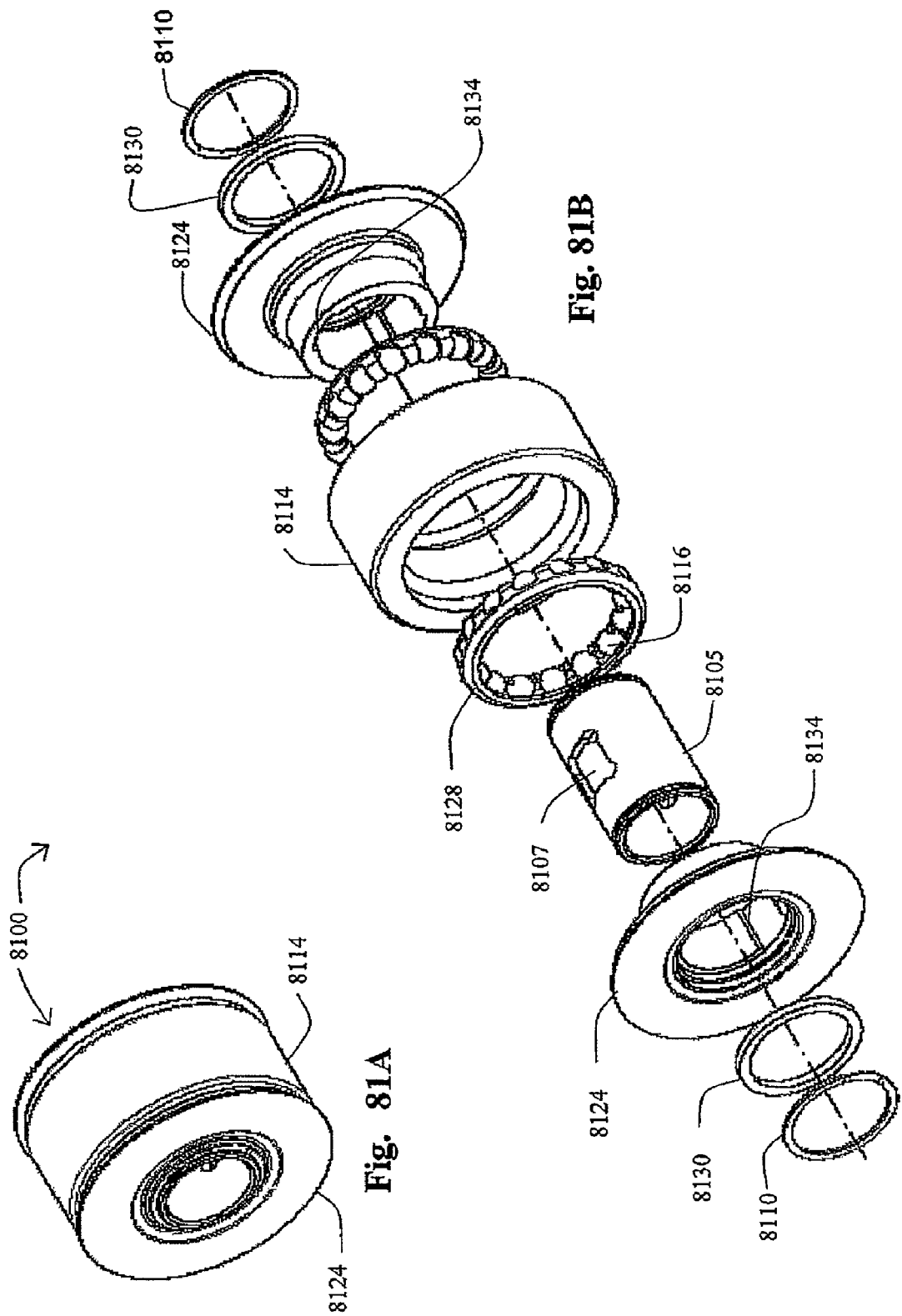

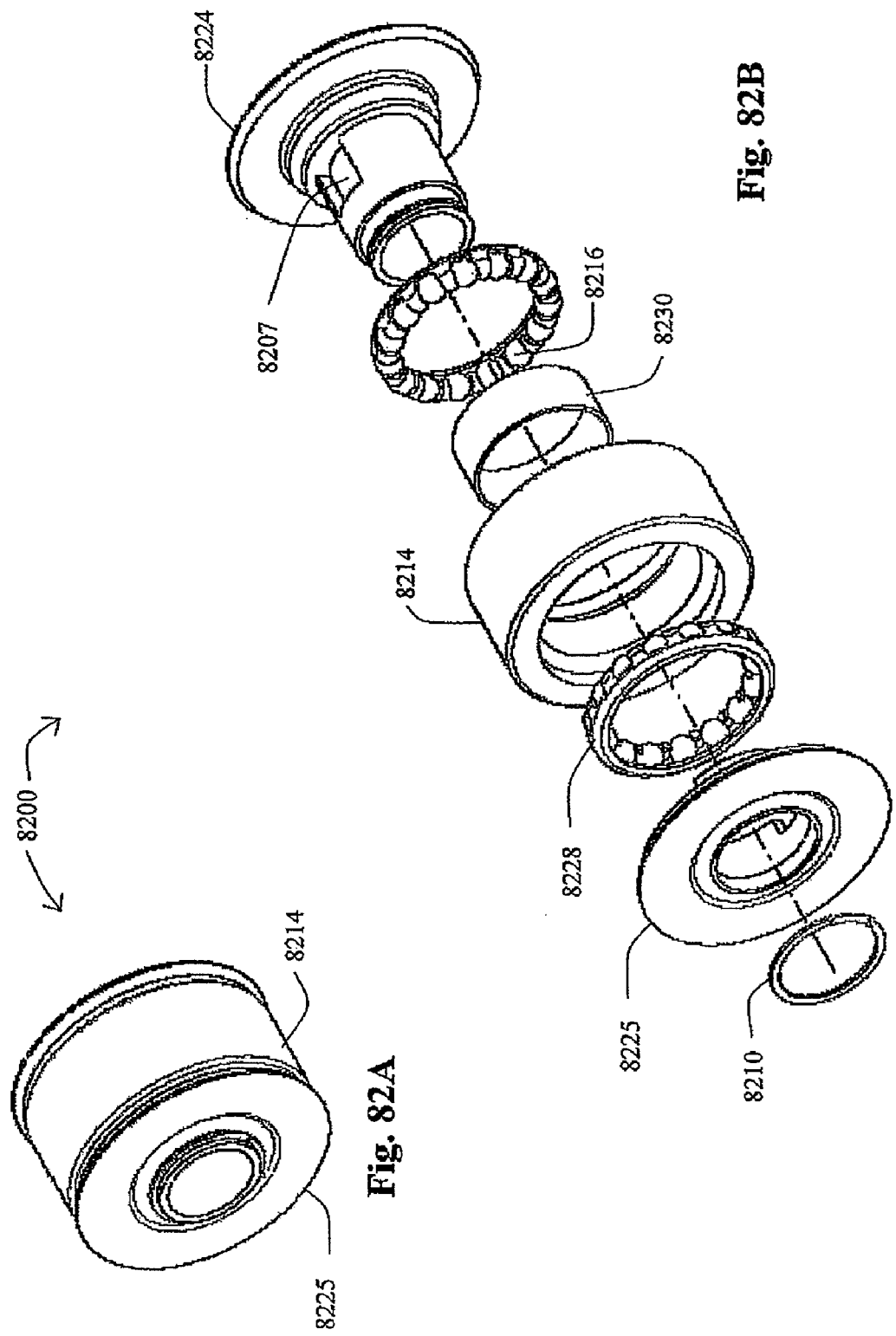

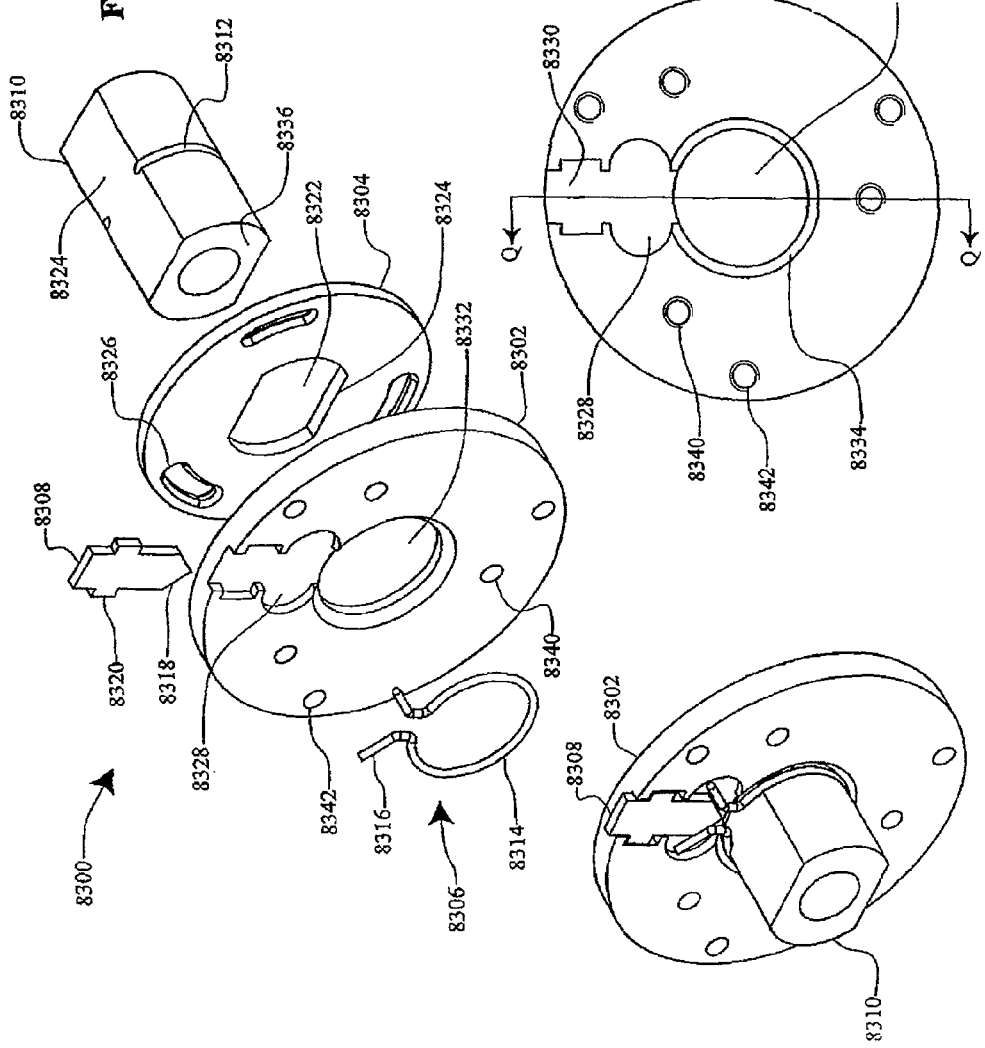

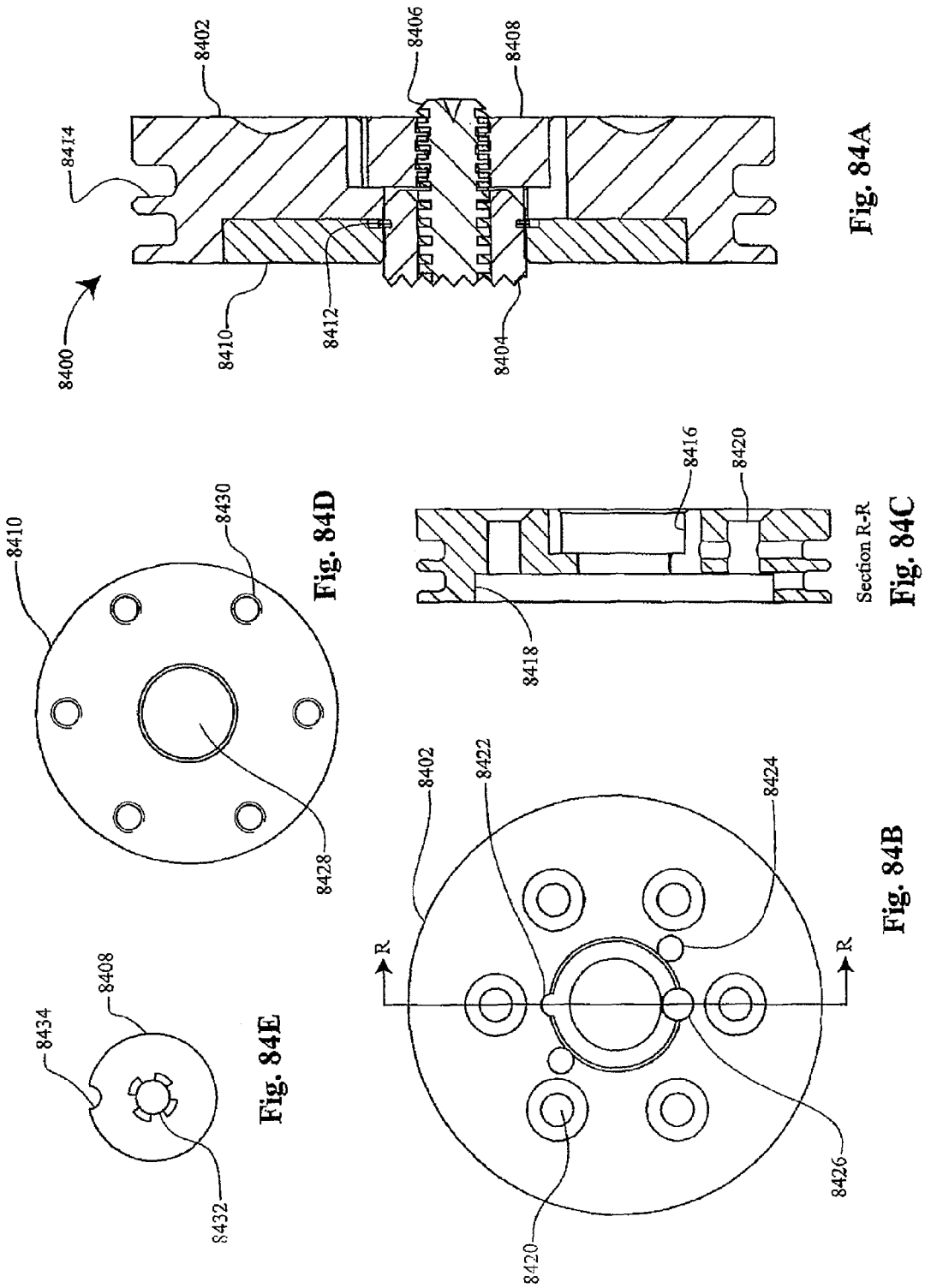

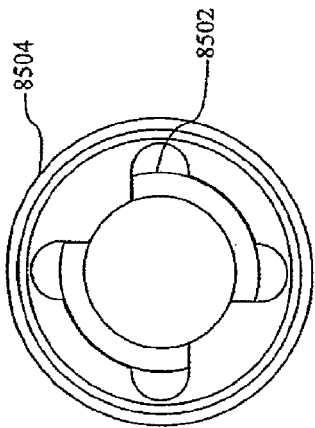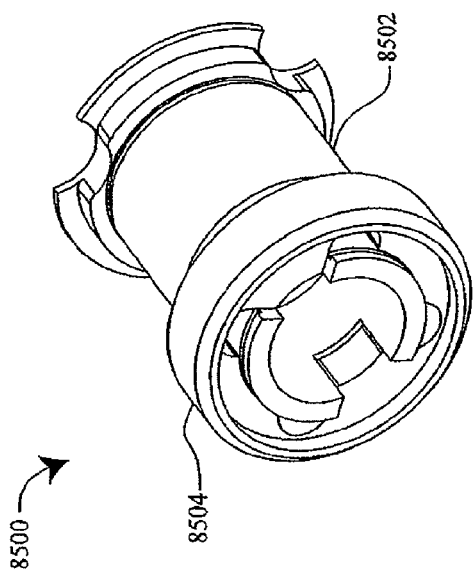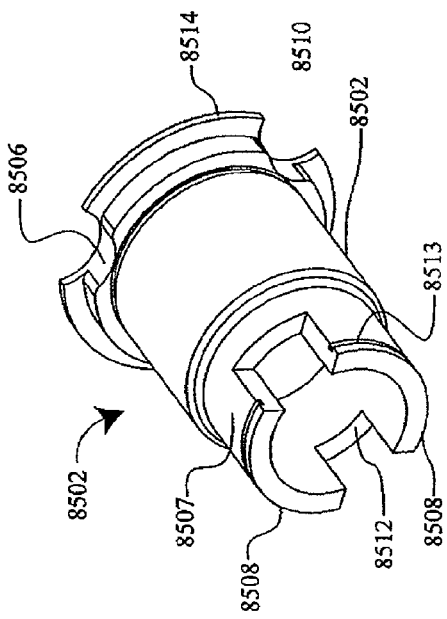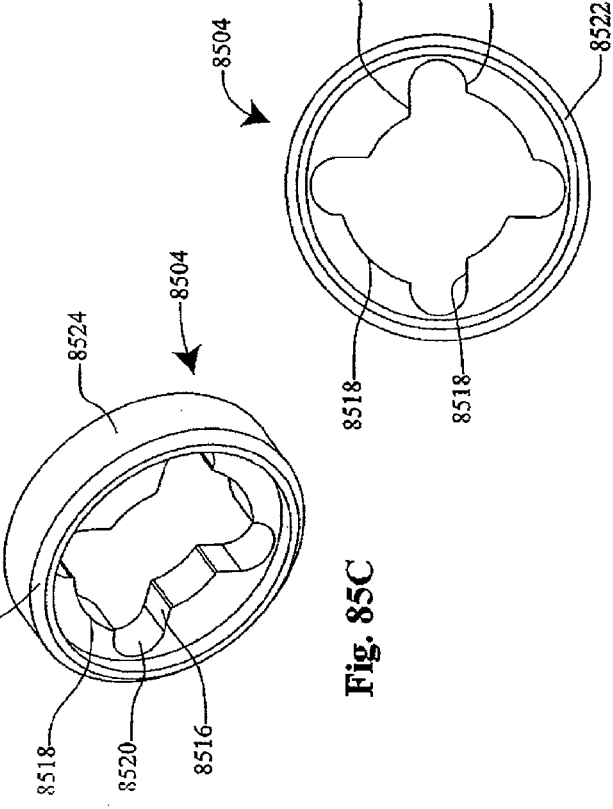

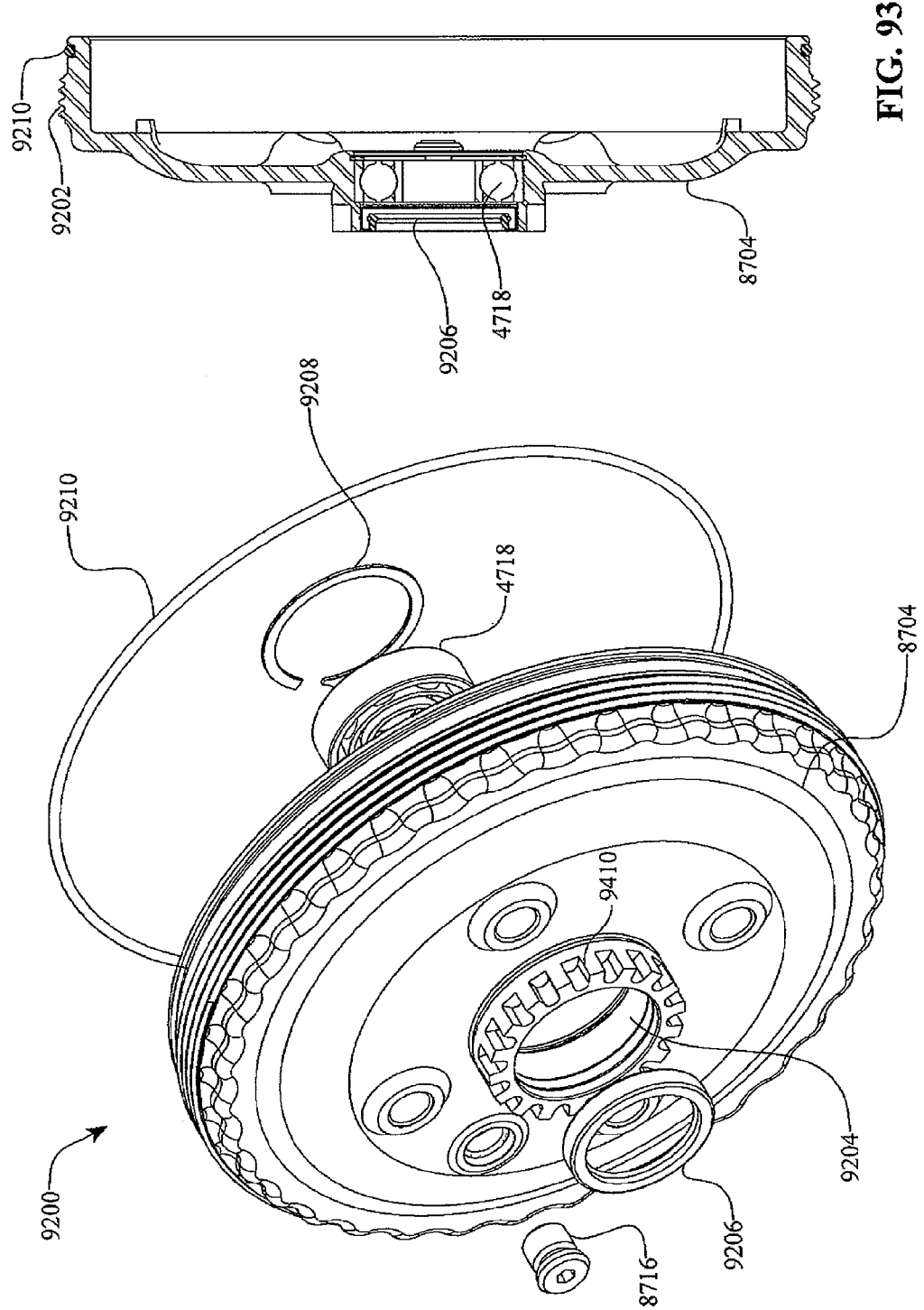

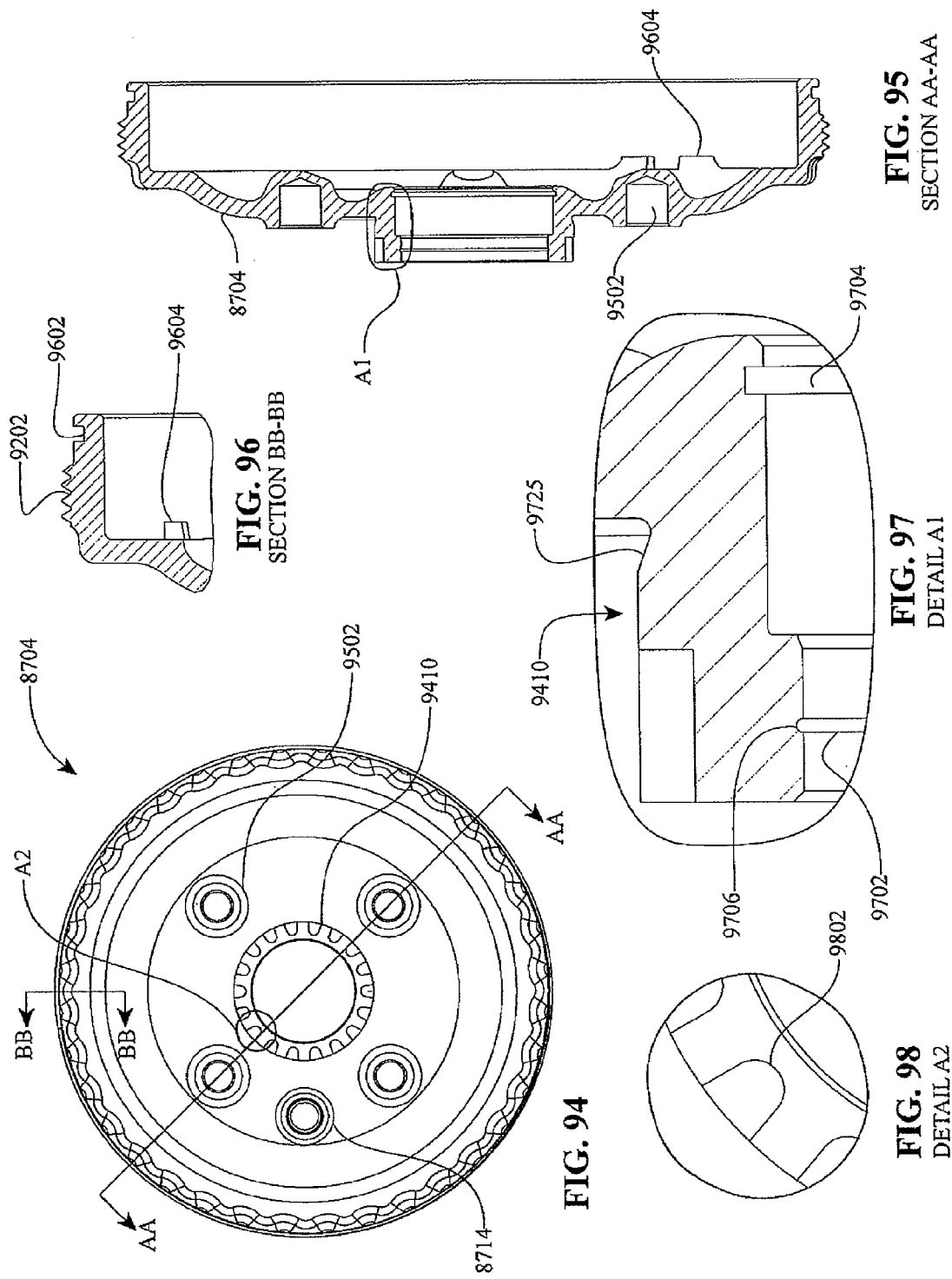

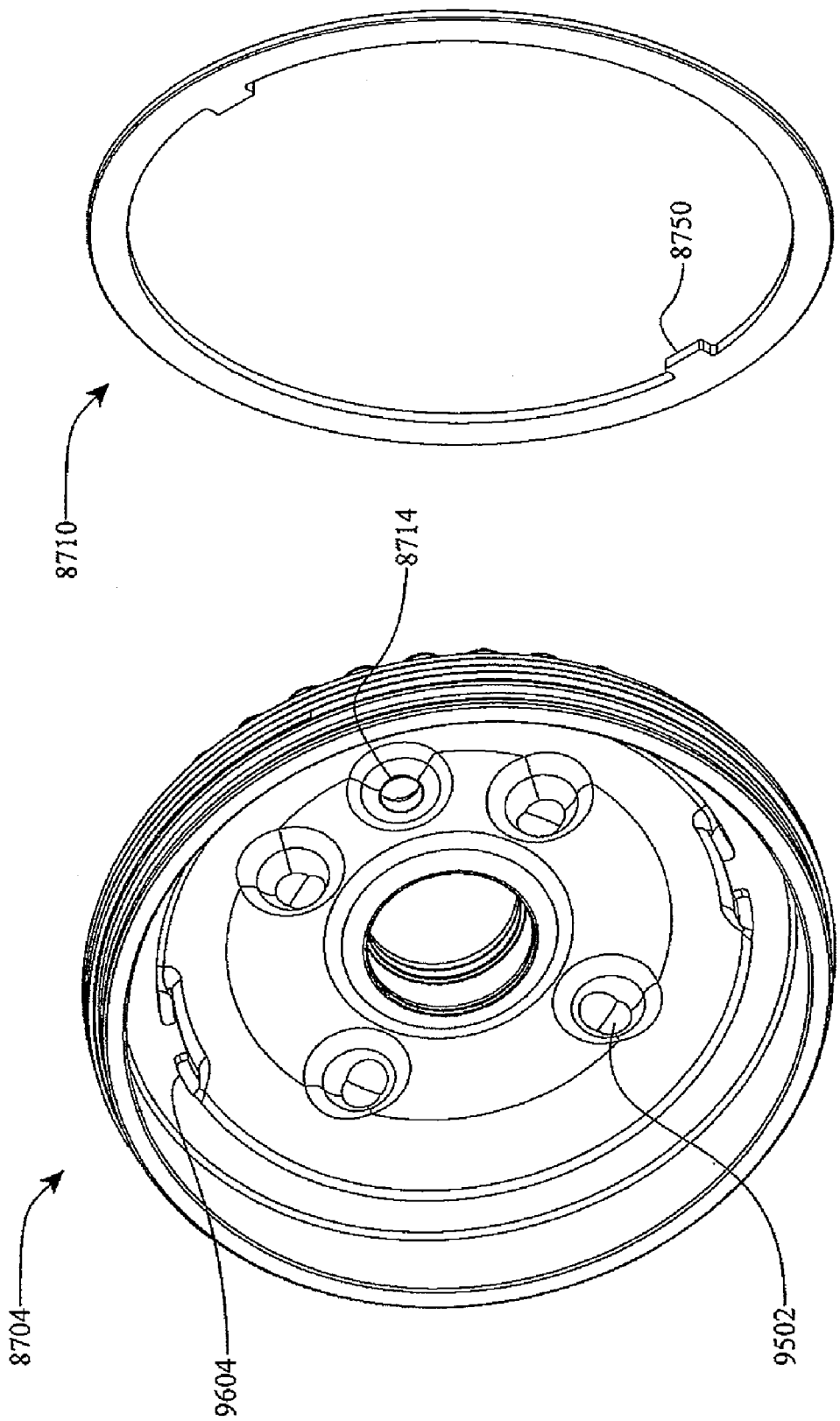

SECTION CC-CC

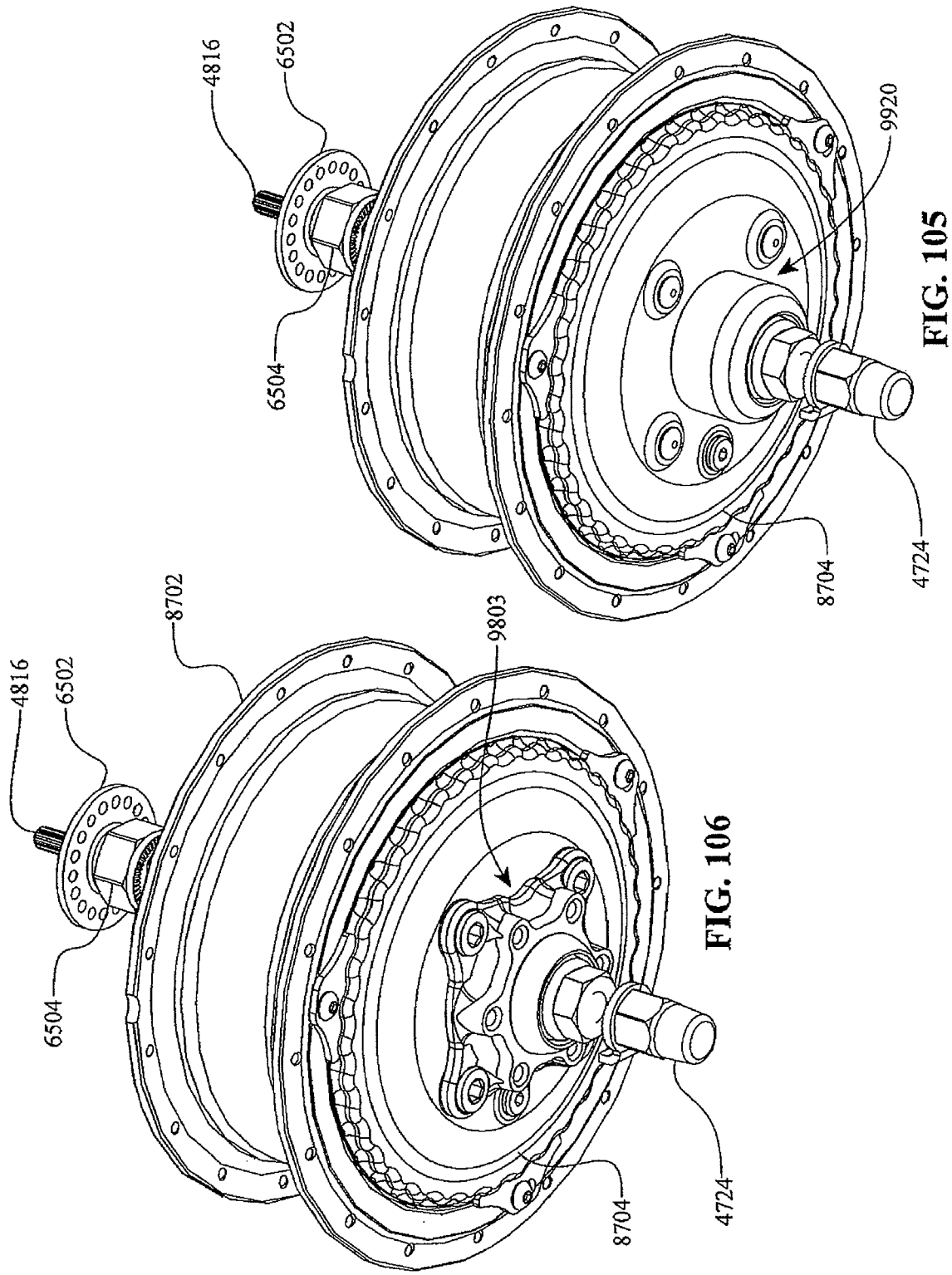

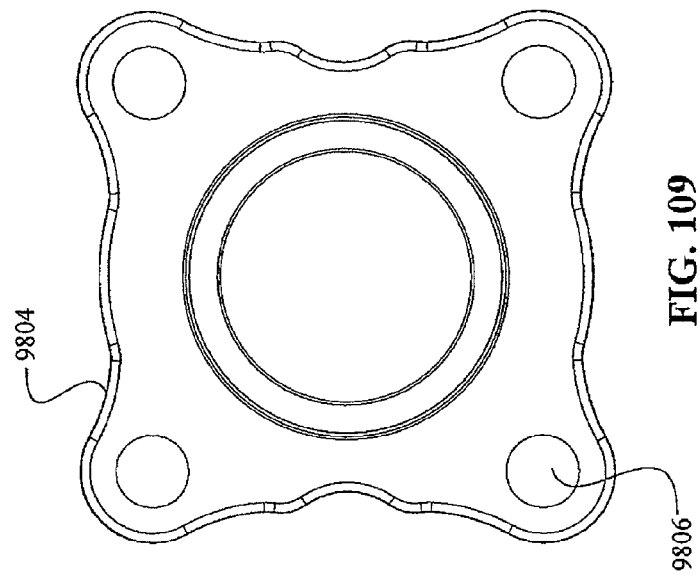
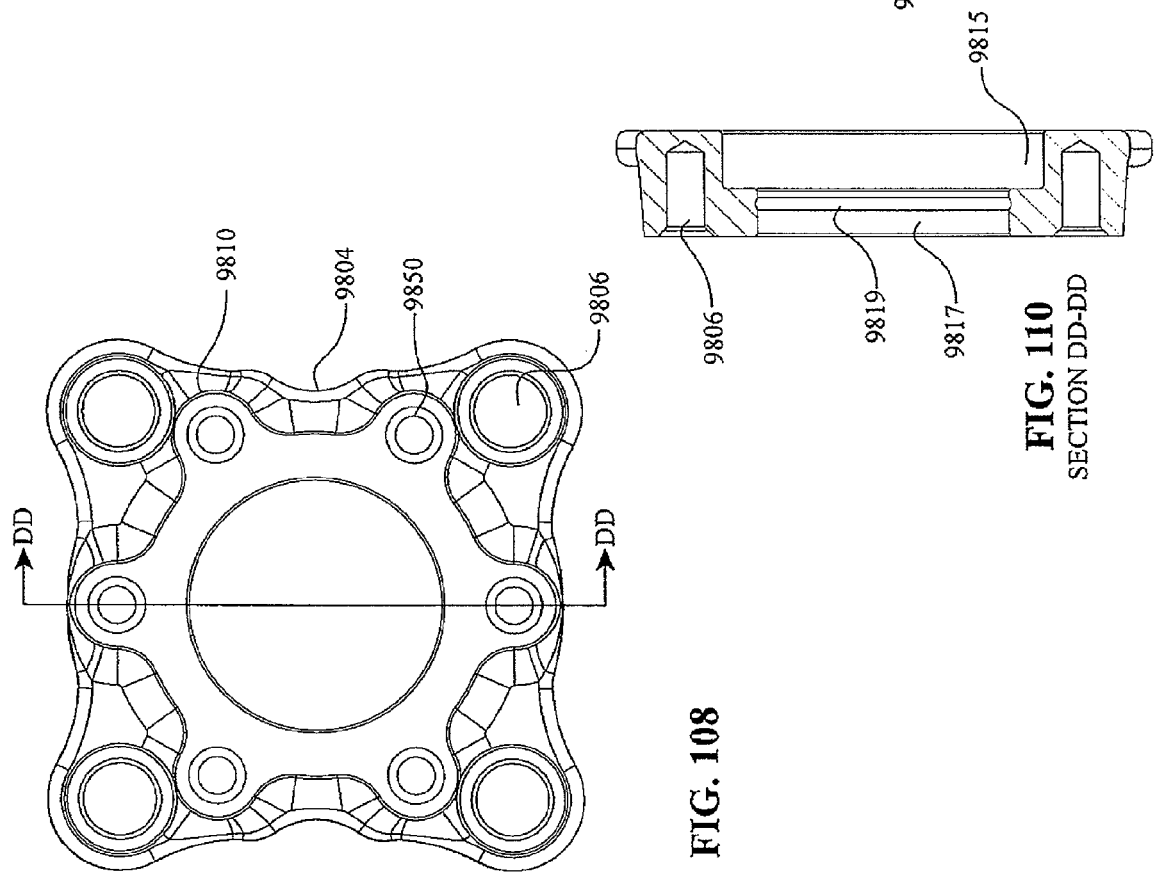
FIG. 109
FIG. 110
SECTION DD-DD
FIG. 108

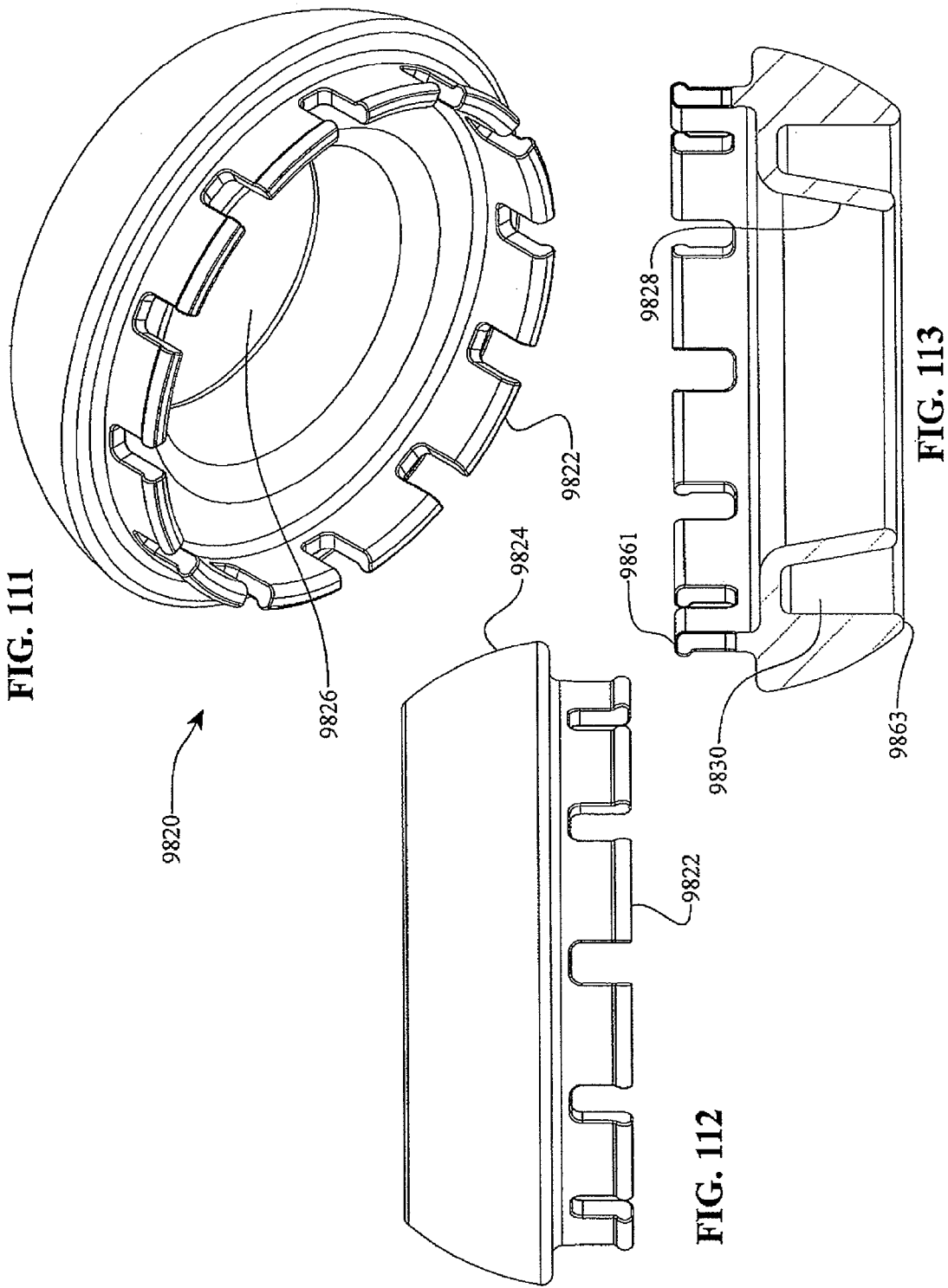

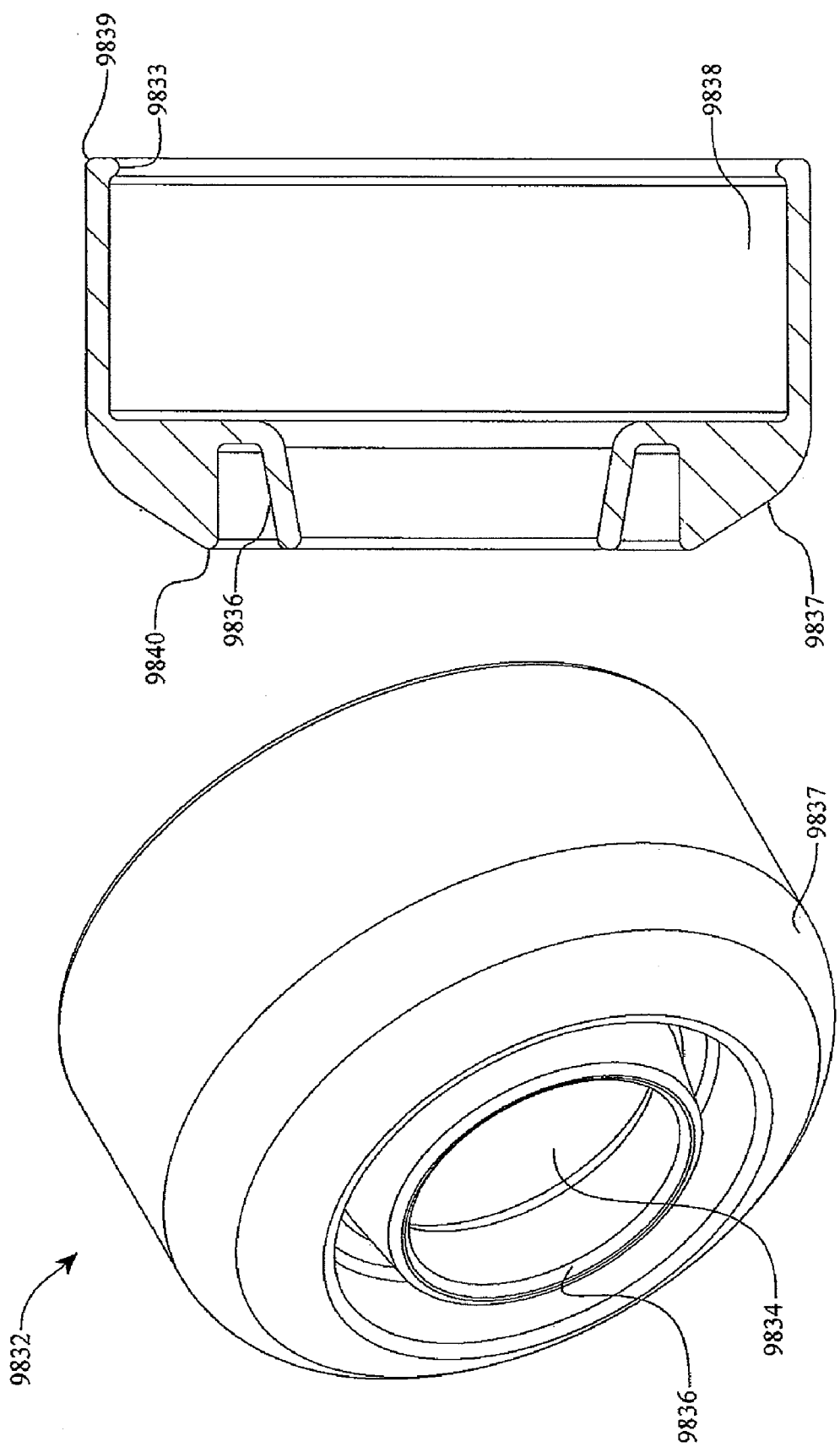

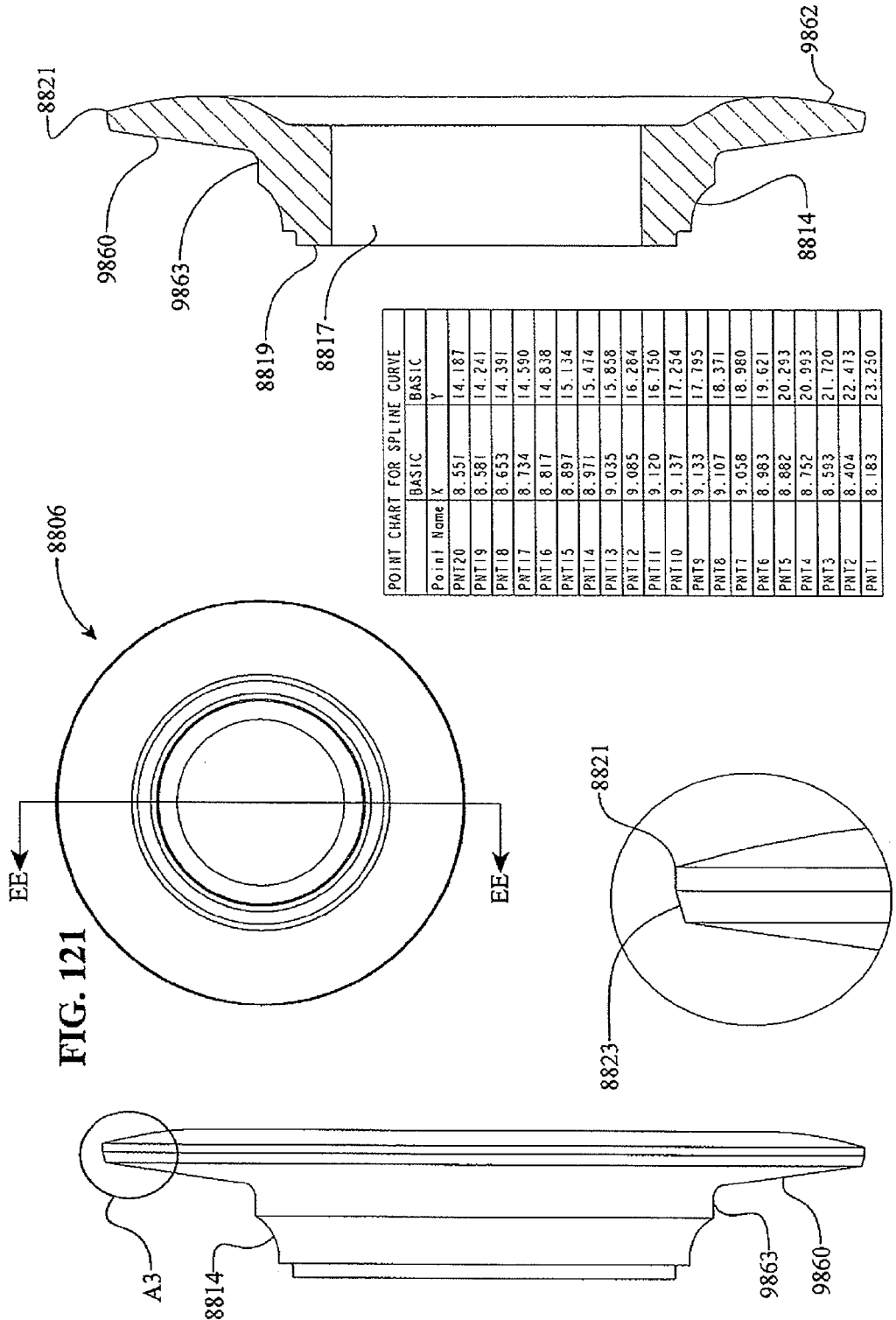

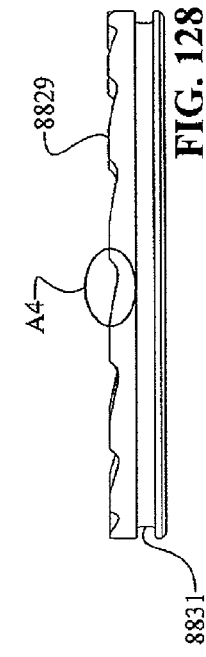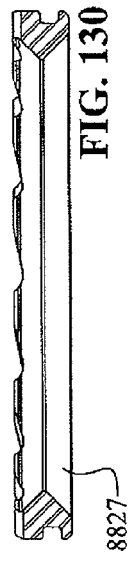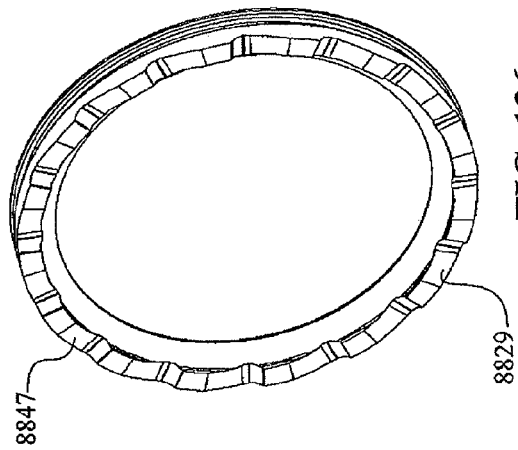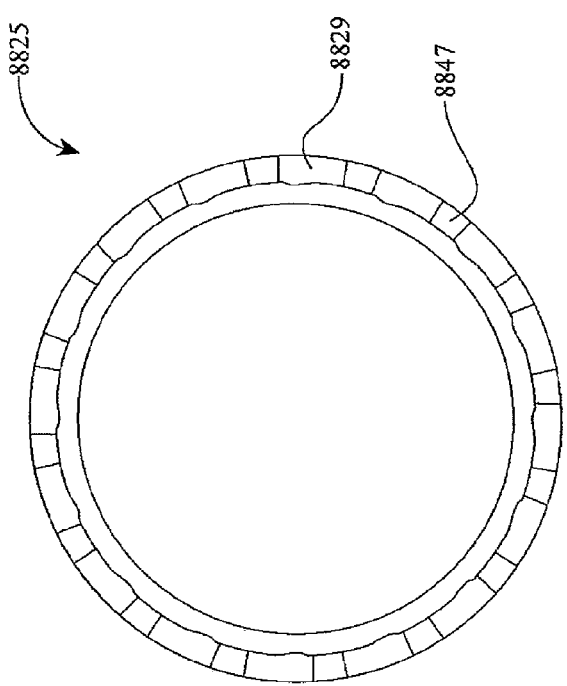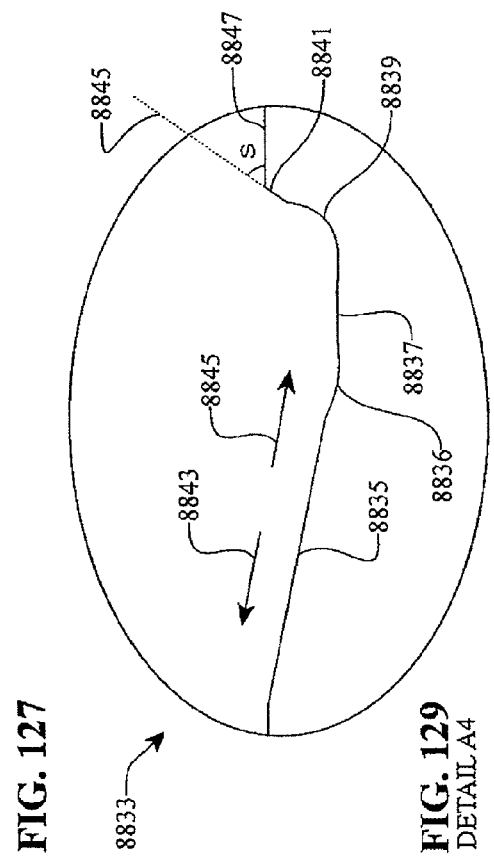

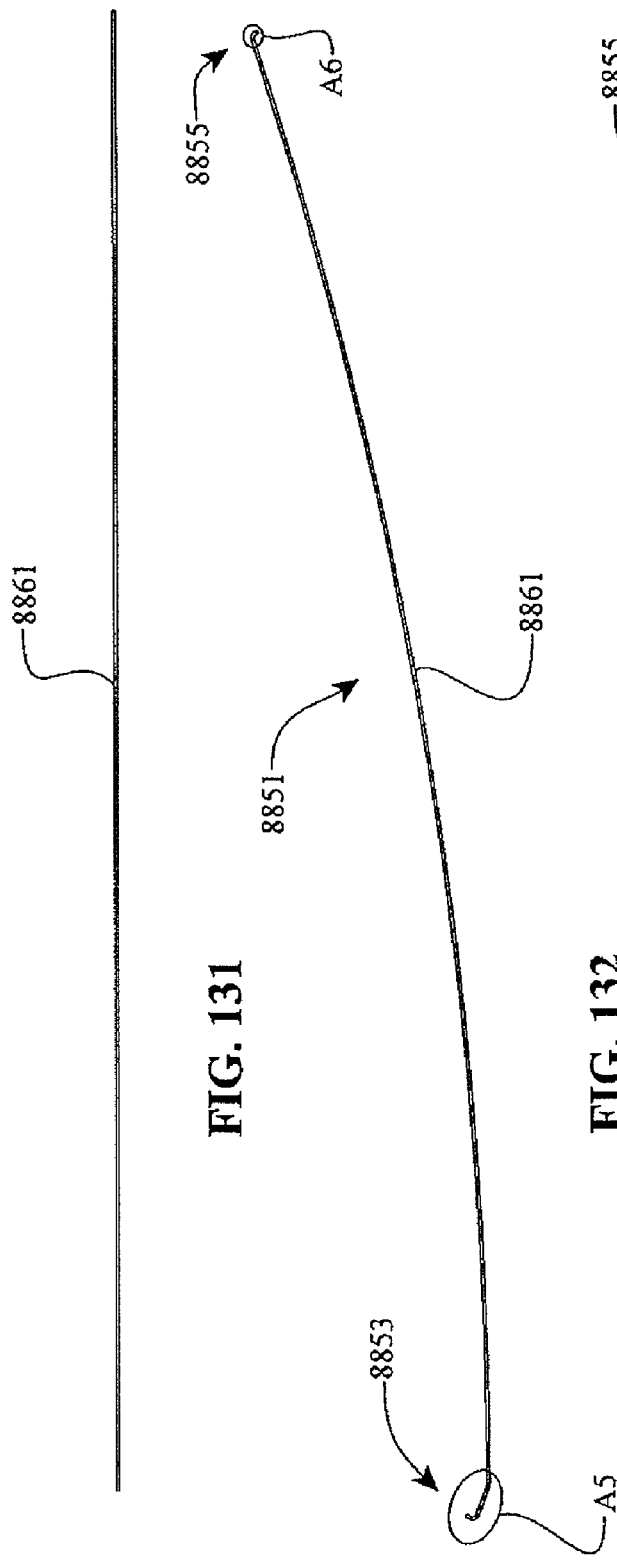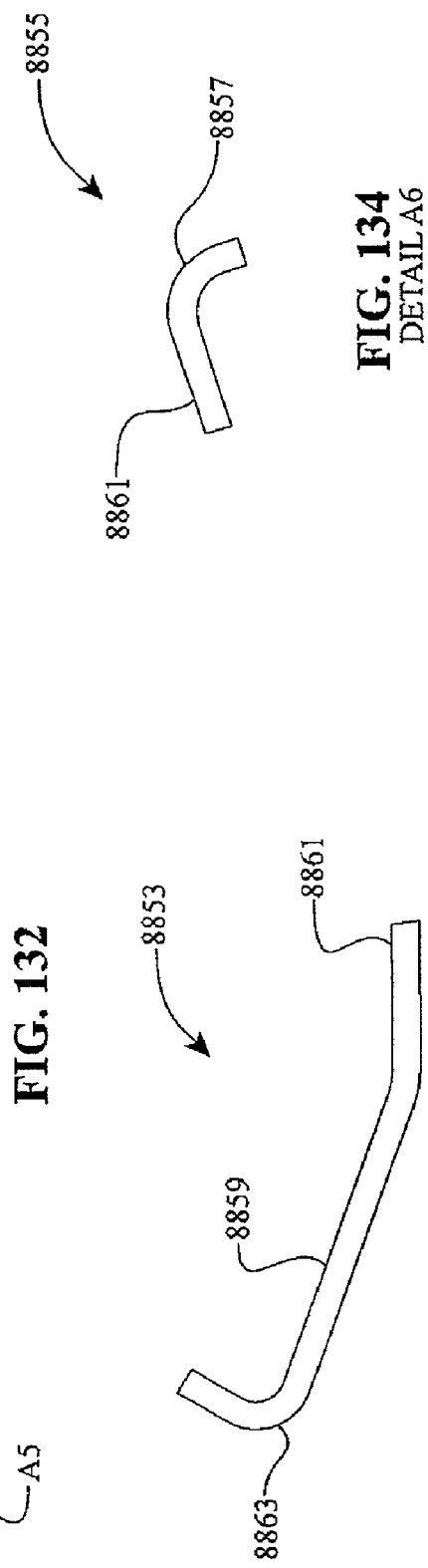

DETAIL Y

CONTINUOUSLY VARIABLE TRANSMISSION

RELATED APPLICATIONS

This application is a continuation of U.S. patent application Ser. No. 11/543,311, filed on Oct. 3, 2006, which claims the benefit of U.S. Provisional Application 60/749,315, filed on Dec. 9, 2005, U.S. Provisional Application 60/789,844, filed on Apr. 6, 2006, and U.S. Provisional Application 60/833,327 filed on Jul. 25, 2006. Each of the above-referenced applications is hereby incorporated by reference in its entirety.

BACKGROUND OF THE INVENTION

1. Field of the Invention

The field of the invention relates generally to transmissions, and more particularly to continuously variable transmissions (CVTs).

2. Description of the Related Art

There are well-known ways to achieve continuously variable ratios of input speed to output speed. The mechanism for adjusting an input speed from an output speed in a CVT is known as a variator. In a belt-type CVT, the variator consists of two adjustable pulleys having a belt between them. The variator in a single cavity toroidal-type CVT has two partially toroidal transmission discs rotating about a shaft and two or more disc-shaped power rollers rotating on respective axes that are perpendicular to the shaft and clamped between the input and output transmission discs.

Embodiments of the invention disclosed here are of the spherical-type variator utilizing spherical speed adjusters (also known as power adjusters, balls, sphere gears or rollers) that each has a tiltable axis of rotation; the adjusters are distributed in a plane about a longitudinal axis of a CVT. The rollers are contacted on one side by an input disc and on the other side by an output disc, one or both of which apply a clamping contact force to the rollers for transmission of torque. The input disc applies input torque at an input rotational speed to the rollers. As the rollers rotate about their own axes, the rollers transmit the torque to the output disc. The input speed to output speed ratio is a function of the radii of the contact points of the input and output discs to the axes of the rollers. Tilting the axes of the rollers with respect to the axis of the variator adjusts the speed ratio.

SUMMARY OF THE INVENTION

The systems and methods described herein have several features, no single one of which is solely responsible for the overall desirable attributes. Without limiting the scope as expressed by the claims that follow, the more prominent features of certain embodiments of the invention will now be discussed briefly. After considering this discussion, and particularly after reading the section entitled "Detailed Description of Certain Inventive Embodiments," one will understand how the features of the systems and methods provide several advantages over related traditional systems and methods.

In one aspect, a continuously variable transmission is described comprising, a first traction ring, a second traction ring, a plurality of power rollers interposed between and in contact with the first and second traction rings, wherein the power rollers are configured to spin about a tiltable axis, a shift rod nut operationally coupled to actuate a tilt in said axis, and a shift rod coupled to the shift rod nut, wherein a rotation of the shift rod causes the shift rod nut to translate axially.

In another aspect, a continuously variable transmission is described comprising a first traction ring, a second traction ring, a plurality of power rollers interposed between and in contact with the first and second traction rings, wherein the power rollers are configured to spin about a tiltable axis, a first torsion spring, and wherein the first traction ring includes a recess adapted to receive and partially house the first torsion spring.

In another aspect, a continuously variable transmission is described comprising, a first traction ring, a second traction ring, a plurality of power rollers interposed between and in contact with the first and second traction rings, wherein the power rollers are configured to spin about a tiltable axis, an idler in contact with each of the power roller and located radially inward of the point of contact between the power rollers and the first and second traction rings, a main axle, the main axle having a central bore, and wherein the idler mounts coaxially about the main axle, and a shift rod having a threaded end, wherein said shift rod is inserted in said central bore, and wherein threaded end is substantially concentric with said idler.

In yet another aspect, a continuously variable transmission is described comprising, a plurality of spherical power rollers, each power roller adapted to spin about a tiltable axis, first and second traction rings, an idler mounted about a main axle, wherein each of the spherical power rollers is interposed in three point contact between the first and second traction rings and the idler, a load cam driver, a first plurality of load cam rollers, wherein the first plurality of load cam rollers are interposed between the load cam driver and the first traction ring, a thrust bearing, a hub shell, wherein the thrust bearing is positioned between load cam driver and the hub shell, a hub shell cover, and a second plurality of load cam rollers, said second plurality of load cam rollers interposed between the second traction ring and the hub shell cover.

In still another aspect, a transmission housing is described comprising, a shell having a first opening and an integral bottom, wherein the integral bottom has a shell central bore that is smaller in diameter than the diameter of the first opening, and a shell cover adapted to substantially cover said first opening, and wherein the shell cover has a cover central bore that is substantially coaxial with the shell central bore when the shell and the shell cover are coupled together to form said transmission housing.

In another aspect, a continuously variable transmission is described comprising, a first traction ring, a second traction ring, a plurality of power rollers interposed between and in contact with the first and second traction rings, wherein the power rollers are configured to spin about a tiltable axis, a load cam driver operationally coupled to the first traction ring, a torsion plate adapted to drive the load cam driver, an input driver configured to drive the torsion plate, wherein the first and second traction rings, load cam driver, torsion plate, and input driver mount coaxially about a main axle of the continuously variable transmission, and a one-way clutch adapted to drive the input driver.

In another aspect, an input driver is described comprising, a substantially cylindrical and hollow body having a first end and a second end, a set of splines formed on the first end, and first and second bearing races formed in the inside of the hollow body.

In another aspect, a torsion plate is described comprising, a substantially circular plate having a central bore and an outer diameter, wherein the outer diameter comprises a set of splines, and wherein the central bore is adapted to receive an input driver.

In another aspect, a power input assembly is described comprising an input driver having a first end and a second end, wherein the first end has a first set of splines, and a torsion plate having a central bore adapted to couple to the second end of the input driver, the torsion plate having a second set of splines.

In yet another aspect, a load cam driver for a transmission, the load cam driver is described comprising, a substantially annular plate having a central bore, a set of splines formed in the central bore, and a reaction surface formed on the annular plate.

In another aspect, an axle for a transmission is described, the axle comprising, a first end, a second end, and a middle portion, a through slot located substantially in the middle portion, a central bore extending from the first end to the through slot, and first and second knurled surfaces, one on each side of the through slot.

In yet another aspect, a stator plate for a transmission is described, the stator plate comprising, a central bore, a plurality of reaction surfaces arranged radially about the central bore, and wherein the reaction surfaces opposite one another, as referenced with respect to the central bore, are offset relative to one another.

In another aspect, a stator plate for a transmission, the stator plate comprising, a central bore, an outer ring, a plurality of connecting extensions that extend substantially perpendicularly from the outer ring, and a plurality of reaction surfaces arranged radially about the central bore, the reaction surfaces located between the central bore and the outer ring.

In yet another aspect, a stator rod for a carrier of a transmission is described, the stator rod comprising, a first shoulder portion and a second shoulder portion, a waist located between the first and second shoulder portions, a first end portion adjacent to the first shoulder, a second end portion adjacent to the second shoulder, and wherein each of the first and second ends comprises a countersink hole.

In another aspect, a carrier for a power roller-leg subassembly is described, the carrier comprising, a first stator plate having a first stator plate central bore and a plurality of first stator reaction surfaces arranged angularly about the first stator plate central bore, wherein opposite first stator plate reaction surfaces across the first stator plate central bore are offset relative to one another, and a second stator plate having a second stator plate central bore and a plurality of second stator plate reaction surfaces arranged angularly about the second stator plate central bore, wherein opposite second stator plate reaction surfaces across the second stator plate central bore are offset relative to one another.

In another aspect, a shifting mechanism for a transmission is described, the shifting mechanism comprising, a shift rod having a threaded end, a middle portion, a splined end, and a flange, a shift rod nut having a first central bore adapted to engage the threaded end of the shift rod, and an axle having a second central bore adapted to receive the shift rod, wherein the axle comprises a counterbore adapted to engage the flange of the shift rod.

In yet another aspect, a shift rod for a transmission is described, the shift rod comprising, a first end, a middle portion, and a second end, a set of threads on the first end, a piloting tip adjacent to the set of threads, a set of splines on the second end, a flange between the middle portion and the second end, a neck adapted to support a shift rod retainer nut, wherein the neck is located between the flange and the set of splines.

In another embodiment, a traction ring for a transmission is described, the traction ring comprising, an annular ring having a first side, a middle portion, and a second side, a set of ramps on the first side, a recess in the middle portion, said recess adapted to receive a torsion spring, and a traction surface on the second side.

In yet another aspect, a torsion spring for use with an axial force generating system is described, the torsion spring comprising, a wire loop having a first end and a second end, a first straight portion and a first bend portion on the first end, and a second bend portion and an auxiliary bend portion on the second end.

In another aspect, a load cam roller retainer for use with an axial force generating mechanism, the load cam roller retainer comprising, a load cam roller retainer ring, and a retainer extension that extends from the load cam retainer ring.

In yet another aspect, an axial force generation mechanism for a transmission is described, the axial force generation mechanism comprising, a traction ring having a first side, a middle portion, and a second side, wherein the first side comprises a set of ramps and wherein the second side comprises a traction surface, a torsion spring having a first end and a second end, wherein the middle portion of the traction ring comprises a recess adapted to receive the torsion spring, and a load cam roller retainer having a retainer extension adapted to cooperate with the recess of the traction ring for substantially housing the torsion spring.

In some aspects, an axial force generation mechanism for a transmission is described, the axial force generation mechanism comprising, an annular ring having a first reaction surface, a traction ring having a second reaction surface, wherein the traction ring comprises an annular recess, a number of load cam rollers interposed between the first and second reaction surfaces, a load cam roller retainer adapted to retain the load cam rollers, wherein the load cam roller retainer comprises a retainer extension, and a torsion spring, adapted to be at least partially housed between the annular recess and the retainer extension.

In another aspect, an axial force generation mechanism for a transmission is described, the axial force generation mechanism comprising, a hub shell cover having a first reaction surface, the hub shell cover adapted to couple to a hub shell, a traction ring having a second reaction surface, wherein the traction ring comprises an annular recess, a number of load cam rollers interposed between the first and second reaction surfaces, a load cam roller retainer adapted to retain the load cam rollers, wherein the load cam roller retainer comprises a retainer extension, and a torsion spring, adapted to be at least partially housed between the annular recess and the retainer extension.

In another aspect, a shifter interface for a transmission is described, the shifter interface comprising, an axle having a central bore and a counterbore formed in the central bore, a shift rod having a shift rod flange adapted to be received in the counterbore, and a shift rod retainer nut having an inner diameter adapted to cooperate with the counterbore to axially restraint the shift rod flange.

In yet another aspect, a shift rod retainer nut is described comprising, a hollow, cylindrical body having an inner diameter and an outer diameter, a set of threads on the inner diameter and a set of threads on the outer diameter, a flange adjacent to one end of the cylindrical body, and an extension connected to the flange, said extension adapted to receive a tightening tool.

In another aspect, a shift rod retainer nut comprising, a hollow, cylindrical body have an inner diameter and an outer diameter, a flange coupled to one end of the cylindrical body, and wherein the flange comprises a flange outer diameter having a profiled surface.

In another aspect, a shift rod retainer nut is described comprising, a hollow, cylindrical body have an inner diameter and an outer diameter, a flange coupled to one end of the cylindrical body, and wherein the flange comprises a plurality of extensions adapted to facilitate the positioning of a shifting mechanism.

In another aspect, a freewheel for a bicycle is described, the freewheel comprising, a one-way clutch mechanism, a cylindrical body adapted to house the one-way clutch mechanism, wherein the cylindrical body comprise an inner diameter having a set of splines, and a set of teeth on an outer diameter of the cylindrical body, wherein the set of teeth is offset from a center line of the cylindrical body.

In another aspect, a hub shell for a transmission is described, the hub shell comprising, a generally cylindrical, hollow shell body having a first end and a second end, a first opening at the first end of the shell body, said opening adapted to couple to a hub shell cover, a bottom at the second end of the shell body, said bottom comprising a first central bore, a reinforcement rib at the joint between the bottom and the shell body, and a seat adapted to support a thrust washer, said seat formed in said bottom.

In another aspect, a hub shell cover for a hub shell of a transmission is described, the hub shell cover comprising, a substantially circular plate having a central bore and an outer diameter, a splined extension extending from the central bore, wherein the splined extension comprises a first recess for receiving a bearing, and wherein the outer diameter comprises a knurled surface adapted to cut into a hub shell body.

In another aspect, a hub shell cover for a hub shell of a transmission is described, the hub shell cover comprising, a substantially circular plate having a central bore and an outer diameter, a disc brake fastening extension extending from the central bore, wherein the disc brake fastening extension comprises a first recess for receiving a bearing, and wherein the outer diameter comprises a knurled surface adapted to cut into a hub shell body.

In another aspect, a ball-leg assembly for a power roller transmission, the ball-leg assembly comprising, is described a power roller having a central bore, a power roller axle adapted to fit in said central bore, the power roller axle having a first end and a second end, a plurality of needle bearings mounted on said axle, wherein the power roller spins on said needle bearings, at least one spacer between said needle bearings, and first and second legs, the first leg coupled to the first end of the power roller axle, and the second leg coupled to the second end of the power roller axle.

In another aspect, a leg subassembly for shifting a transmission, the leg subassembly comprising, a leg portion having a first bore for receiving an end of a power roller axle, the leg portion further having a second bore and two leg extensions, each leg extension having a shift cam roller axle bore, a shift guide roller axle positioned in the second bore of the leg portion, the shift guide roller axle having first and second ends, first and second shift guide rollers mounted, respectively, on the first and second ends of the shift guide roller axle, a shift cam roller axle positioned in the shift cam roller axle bore of the leg extensions, and a shift cam roller mounted on the shift cam roller axle, the shift cam roller located between the leg extensions.

In another aspect, a power roller for a transmission is described, the power roller comprising a substantially spherical body, a central bore through said spherical body, the central bore having first and second ends, and wherein the first and second ends each comprises an angled surface.

In still another aspect, a power roller and power roller axle assembly for a transmission is described, the power roller and power roller axle assembly comprising, a substantially spherical body, a central bore through said spherical body, the central bore having first and second ends, wherein the first and second ends each comprises an angled surface, a power roller axle adapted to fit in said central bore, the power roller axle having a first end and a second end, a plurality of needle bearings mounted on said axle, wherein the power roller spins on said needle bearings, and at least one spacer mounted on said axle and located between said needle bearings.

In an aspect, a continuously variable transmission is described comprising, an input traction ring, an output traction ring, an idler, a plurality of power rollers contacting the input traction ring, the output traction ring, and the idler, wherein each of the power rollers has a central bore, and a plurality of roller axles, one for each power roller and fitting in said central bore, wherein each roller axle comprises first and second ends, and wherein said first and second ends each comprises a countersink.

In another aspect, an idler assembly for a transmission is described, the idler assembly comprising, an inner bushing having a cylindrical body and having an opening cut through the cylindrical body about an axis perpendicular to the main axis of the cylindrical body, two angular contact bearings mounted on said cylindrical body; and an idler mounted on said angular contact bearings, and two shift cams, mounted about the cylindrical body, wherein the idler is located between the shift cams.

In another aspect, an idler assembly for a transmission is described, the idler assembly comprising, an inner bushing having a cylindrical body and having an opening cut through the cylindrical body about an axis perpendicular to the main axis of the cylindrical body, two shift cams, mounted about the cylindrical body, each shift cam having a shift cam bearing race, a plurality of bearing rollers, and an idler having two idler bearing races, wherein the idler bearing races and the shift cam bearing races are adapted to form angular contact bearings when the plurality of bearing rollers are interposed between the idler bearing races and the shift cam bearing races.

In another aspect, an idler assembly for a transmission is described, the idler assembly comprising, an inner bushing having a cylindrical body and having an opening cut through the cylindrical body about an axis perpendicular to the main axis of the cylindrical body, two shift cams, mounted about the cylindrical body, each shift cam having a shift cam bearing race, a plurality of bearing rollers, an idler having two idler bearing races, wherein the idler bearing races and the shift cam bearing races are adapted to form angular contact bearings when the plurality of bearing rollers are interposed between the idler bearing races and the shift cam bearing races, and wherein each shift cam comprises an extension having a retaining key adapted to rotationally constrain and radially locate a shift rod retainer nut.

In another aspect, an idler assembly for a transmission is described, the idler assembly comprising, a first shift cam comprising a tubular extension, wherein said extension comprises an opening cut through the extension, a first bearing race formed on said first shift cam, a second shift cam, mounted about said extension, a second bearing race formed on said second shift, an idler having third and fourth bearing races formed on an inner diameter of the idler, and a plurality of bearing rollers, wherein the first, second, third, and fourth bearing races cooperate to form angular contact thrust bearings when the bearing rollers are interposed between the bearing races.

In another aspect, a quick release shifter mechanism is described comprising a retaining ring, a release key, a backing plate adapted to receive the retaining ring and the release key, and wherein the release key and the retaining ring are adapted such that the release key expands the retaining ring when the release key is urged toward the retaining ring.

In yet another aspect, a shifter interface for a transmission is described, the shifter interface comprising, a shifter actuator, a shift rod nut coupled to the shifter actuator, a backing plate adapted to mount on an axle, wherein the backing plate is coupled to the shifter actuator, and retaining means, located between the shifter actuator and the backing plate, for axially constraining the shifter actuator.

In another aspect, a power input assembly is described comprising, an input driver having a first end and a second end, wherein the first end comprises a splined surface, and wherein the second end comprises at least two torque transfer extensions, and a torque transfer key having at least two torque transfer tabs configured to mate with the at least two torque transfer extensions.

In one aspect, an idler assembly for a CVT includes a shift rod nut and at least two shift cams, wherein the shift rod nut is placed between the shift cams, with the shift cams substantially abutting against the shift rod nut. In some such configurations, the shift rod nut provides position control for the shift cams.

In yet another aspect, a housing for a CVT can include a hub shell having a first threaded bore, a hub shell cover having a second threaded bore adapted to thread onto the first threaded bore, and wherein the hub shell and the hub shell cover each has a central bore for allowing passage of a main axle through said central bore. Said hub shell cover can additionally include a first set of locking grooves. In some applications, the housing can have one or more locking tabs having a second set of locking grooves adapted to mate to the first set of locking grooves.

In other aspects, a disc brake adapter kit can incorporate a fastening plate, a disc brake adapter plate, and at least one seal. In some applications, the fastening plate and the disc brake adapter kit are one integral piece. The fastening plate can be provided with a recess for receiving a roller brake flange.

In some aspects, a load cam profile can have one or more features including a first substantially flat portion and a first radiused portion contiguous to the first flat portion. The load cam profile can additionally have a second substantially flat portion, wherein the first radiused portion is placed between the first and second flat portions. The load cam profile, in other embodiments, can be provided also with a second radiused portion contiguous to the second flat portion, and a third substantially flat portion, wherein the second radiused portion is placed between the second and third flat portions. The radius of the first radiused portion is preferably greater than the radius of the second radiused portion. Relative to a radius R of a roller, which is used in conjunction with the load cam profile, the radius of the first radiused portion is preferably at least 1.5×R, the radius of the second radiused portion is preferably at least 0.25×R and less than about 1.0×R.

In one aspect, a hub shell cover for a hub shell of a CVT is a generally annular plate having a central bore and an outer periphery. The hub shell cover can include a set of threads formed on the outer periphery, and a set of locking tabs formed in the annular plate. The hub shell cover can also have one or more keys for retaining components of the CVT. In some applications, the hub shell cover can be provided with a splined flange.

In yet another aspect, a locking tab for a hub shell and hub shell cover of a CVT is defined by a thin plate having a plurality of locking grooves, each groove having at least one crest and one trough, and at least one slot formed in the thin plate. The slot is substantially elliptical in shape, and the foci of the slot are angularly spaced by a first angle about a central point. The locking grooves can be angularly spaced by a second angle about said central point. In some cases, the first angle is about one-half the value of the second angle. A first focus of the slot aligns angularly with a crest of a locking groove, and a second focus of the slot aligns angularly with a trough of the locking groove; the crest and the trough are contiguous. In other aspects, a locking ring for a hub shell and hub shell cover of a CVT has a generally angular ring, a number of locking tabs formed in an inner diameter of the ring, and a plurality of bolt slots formed in an outer diameter of the ring.

In one aspect, an input driver for a CVT includes a generally cylindrical body having an inner diameter and an outer diameter, a helical groove on the inner diameter, and a plurality of splines on the outer diameter, wherein not all of the splines have the same dimension. In yet another aspect a power roller axle includes a generally cylindrical body having a first end and a second end, a plurality of countersink drill holes, with a countersink drill hole on each of the first and second ends. The power roller axle can additionally have one or more grooves coaxial with the countersink holes, on an outer diameter of the body, wherein the grooves are adapted to collapse to allow the ends of the countersink holes to expand in an arc toward a portion of the body located between the first and second ends.

In yet another aspect, a wire that can be formed into a torsion spring for use with an axial force generation mechanism includes one or two conforming bends placed toward the end segments of the wire. In some embodiments, the conforming bends have a radius that is between about 110% to 190% of the radius of a roller cage that cooperates with the torsion spring in the axial force generation mechanism. In one embodiment, one or both of the conforming bends have an arc length defined by angle that is between 0 to 90 degrees, or 0 to 60 degrees, or 0 to 30 degrees.

These and other inventive embodiments will become apparent to those of ordinary skill in the relevant technology based on the following detailed description and the corresponding figures, which are briefly described next.

BRIEF DESCRIPTION OF THE FIGURES

FIG. 11 is a perspective view of a ball-leg assembly for use in a CVT.

FIG. 12 is a perspective view of a cage that can be used in a ball-type CVT.

FIG. 17 is a top elevational view of certain assemblies of the CVT of FIG. 15.

FIG. 18 is a sectional view along section A-A of the assemblies of FIG. 17.

FIG. 22 is perspective view of a cage assembly that can be used with the CVT of FIG. 15.

FIG. 23 is a front elevational view of the cage assembly of FIG. 22.

FIG. 24 is a right side elevational view of the cage assembly of FIG. 22.

FIG. 25 is a partially exploded, front elevational view of certain axial force generation components for the CVT of FIG. 15.

FIG. 26 is a cross-sectional view along section C-C of the CVT components shown in FIG. 25.

FIG. 28 is a perspective view of the torsion disc of FIG. 27.

FIG. 29 is a left side elevational view of the torsion disc of FIG. 28.

FIG. 30 is a front elevation view of the torsion disc of FIG. 28.

FIG. 31 is a right side elevational view of the torsion disc of FIG. 28.

FIG. 32 is a sectional view along section D-D of the torsion disc of FIG. 31.

FIG. 37 is a top side elevational view of a ball and axle assembly that can be used with the CVT of FIG. 15.

FIG. 38 is a cross-sectional view along section E-E of the ball and axle assembly of FIG. 37.

FIG. 44 is a top elevational view of an alternative embodiment of a CVT that can be used with the bicycle hub of FIG. 14.

FIG. 45 is a cross-sectional view along section H-H of the CVT of FIG. 44.

FIG. 48A is a detail view C, of the cross-section shown in FIG. 47, showing generally a variator subassembly.

FIG. 48D is a cross-section of one embodiment of an idler subassembly for the CVT shown in FIG. 47.

FIG. 48E is a perspective, exploded view of the idler assembly of FIG. 48D.

FIG. 49C is a cross-sectional view of certain components of the power input means subassembly shown in FIG. 49A.

FIG. 49D is a perspective, exploded view of the CVT components shown in FIG. 49C.

FIGS. 54A-54C show perspective, cross-sectional, and top views of a power roller axle that may be used with the power roller-leg subassembly of FIG. 52A.

FIG. 55 is a cross-sectional view of an alternative embodiment of a power roller axle.

FIG. 58C is a plan view of the left side of the stator plate of FIG. 58A.

FIG. 58D is a cross-sectional view, along the section line J-J, of the stator plate of FIG. 58C.

FIG. 58E is a detail view I, of the plan view shown in FIG. 58C, generally showing a stator plate slot offset.

FIG. 62A is a perspective view of a traction ring as may be used with the variator subassembly of FIG. 48A.

FIG. 62B is a plan view of the left side of the traction ring shown in FIG. 62A.

FIG. 62C is a front side, plan view of the traction ring shown in FIG. 62A.

FIG. 62D is a cross-sectional view of the traction ring shown in FIG. 62A.

FIG. 62E is a detail, cross-sectional view, of the traction ring shown in FIG. 62A.

FIG. 63A is a plan view of the right side of a torsion spring that may be used with the axial force generation subassemblies of FIG. 50A or FIG. 51.

FIG. 63B is a plan view of the front of a torsion spring in its relaxed state.

FIG. 63C is a detail view J of the torsion spring of FIG. 63B.

FIG. 63D is a plan view of the front of a torsion spring in a partially wound state, as the torsion spring may be while housed in a traction ring and a roller cage.

FIG. 63E is a detail view K of the torsion spring of FIG. 63D.

FIG. 63F is a plan view of the front of a torsion spring in a substantially completely wound state, as the torsion spring may be while housed in a traction ring and a roller cage.

FIG. 64E is a plan view of a certain state of an axial force generation and/or preloading subassembly as may be used with the axial force generation subassemblies of FIG. 50A or FIG. 51.

FIG. 64F is a cross-sectional view, along section line K-K, of the subassembly shown in FIG. 64E.

FIG. 64G is a plan view of a different state of the axial force generation and/or preloading subassembly of FIG. 64E.

FIG. 64H is a cross-sectional view, along section line L-L, of the subassembly shown in FIG. 64G.

FIG. 65H is a plan view of the front side of yet another alternative shift rod retainer nut.

FIG. 65J is a plan view of the left side of the shift rod retainer nut of FIG. 65H.

FIG. 65K is a cross-sectional view of the shift rod retainer nut of FIG. 65H.

FIG. 66A is a plan view of the front side of a main axle that can be used with the CVT shown in FIG. 47.

FIG. 66B is a plan view of the top side of the main axle of FIG. 66A.

FIG. 66C is a cross-sectional view, along the section line M-M, of the main axle of FIG. 66B.

FIG. 66D is a detail view M of the main axle shown in FIG. 66A.

FIG. 67A is a perspective view of a power input driver that may be used with the CVT of FIG. 47.

FIG. 67B is a second perspective view of the input driver of FIG. 67A.

FIG. 67C is a plan view of the back side of the input driver of FIG. 67B.

FIG. 67D is a plan view of the right side of the input driver of FIG. 67B.

FIG. 67E is a cross-sectional view of the input driver of FIG. 67D.

FIG. 68A is a perspective view of a torsion plate that may be used with the CVT of FIG. 47.

FIG. 68B is a plan view of the torsion plate of FIG. 68A.

FIG. 69A is a perspective view of a power input means subassembly that includes a power input driver and a torsion plate.

FIG. 69B is a plan view of the power input means subassembly of FIG. 69A.

FIG. 69C is a cross-sectional view of the power input means subassembly of FIG. 69A.

FIG. 70A is a perspective view of a cam driver that may be used with the CVT of FIG. 47.

FIG. 70B is a plan view of the cam driver of FIG. 70A.

FIG. 70C is a cross-sectional view of the cam driver of FIG. 70B.

FIG. 71A is a perspective view of a freewheel that may be used with the CVT of FIG. 47.

Figure 71A:
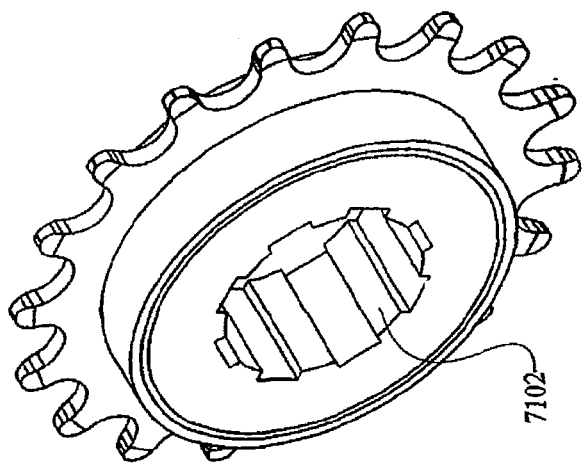
Figure 71C:
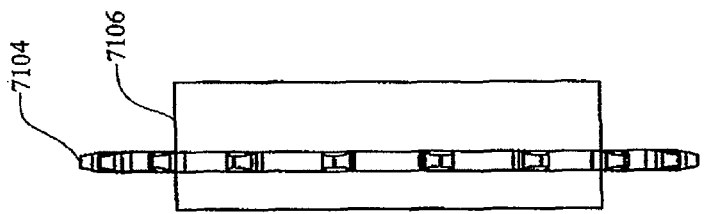
Figure 71B:
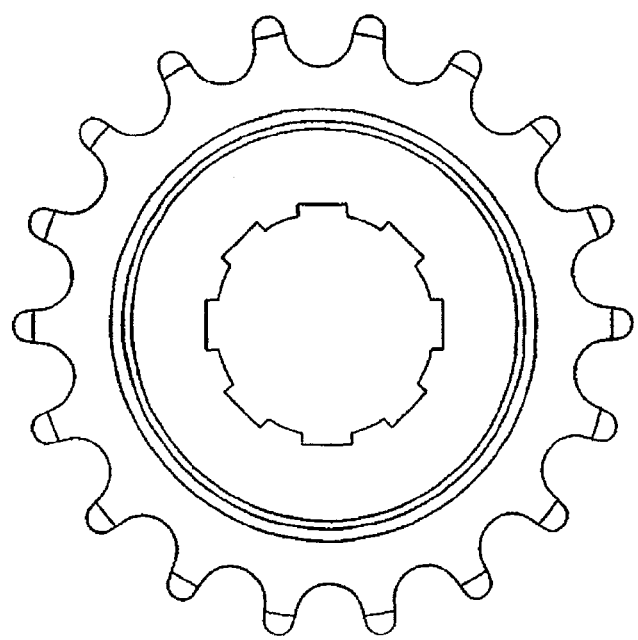

FIG. 71B is a plan view of the front side of the freewheel of FIG. 71A.

FIG. 71C is a plan view of the top side of the freewheel of FIG. 71B.

Figure 47:
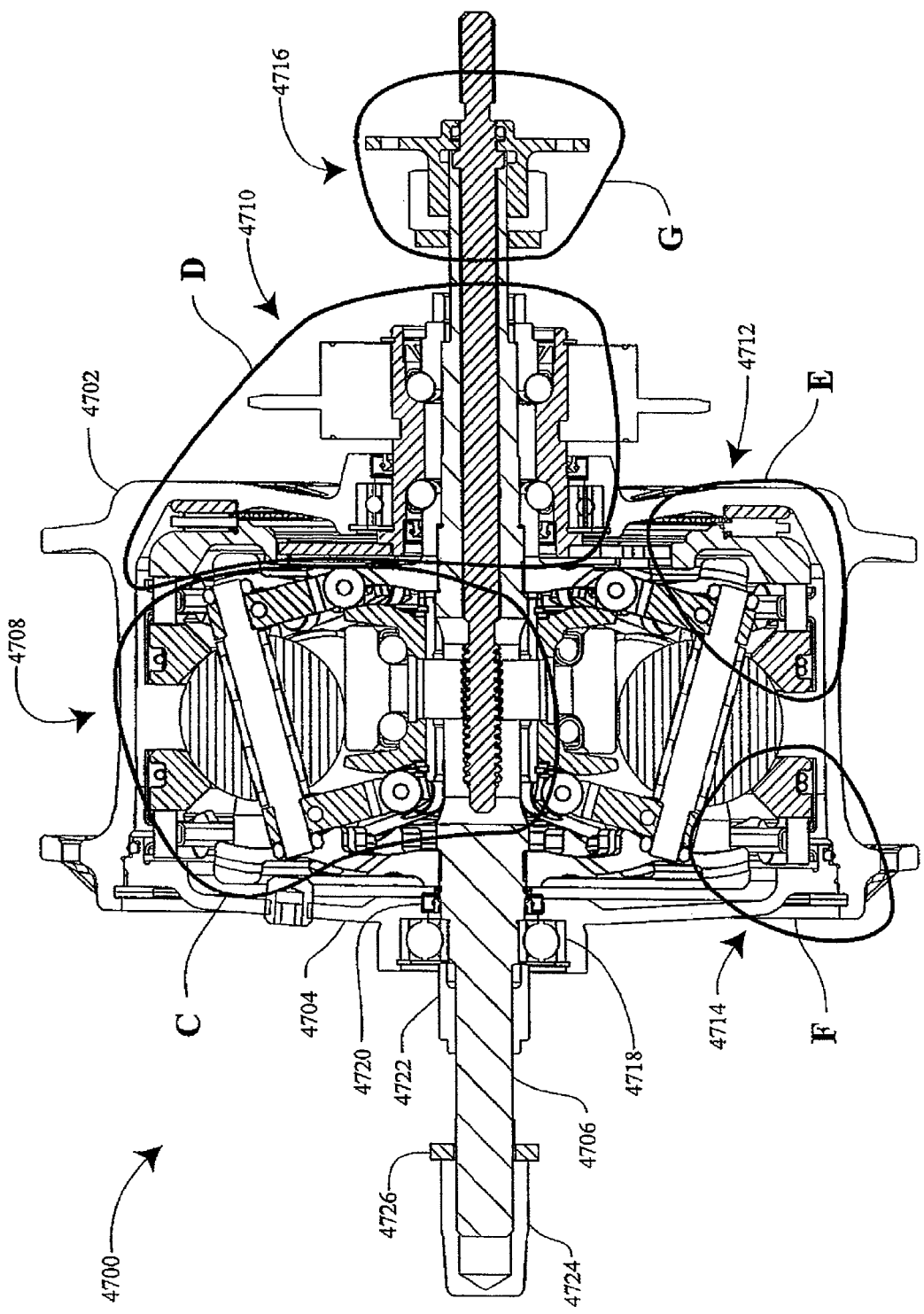
FIG. 47 is a cross-section of yet another embodiment of a continuously variable transmission (CVT).

FIG. 72A is a perspective view of a hub shell that can be used with the CVT of FIG. 47.

FIG. 72B is a cross-sectional view of the hub shell of FIG. 72A.

FIG. 72C is a detail view N of the hub shell of FIG. 72B.

FIG. 72D is a detail view P of the hub shell of FIG. 72B.

Figure 73:
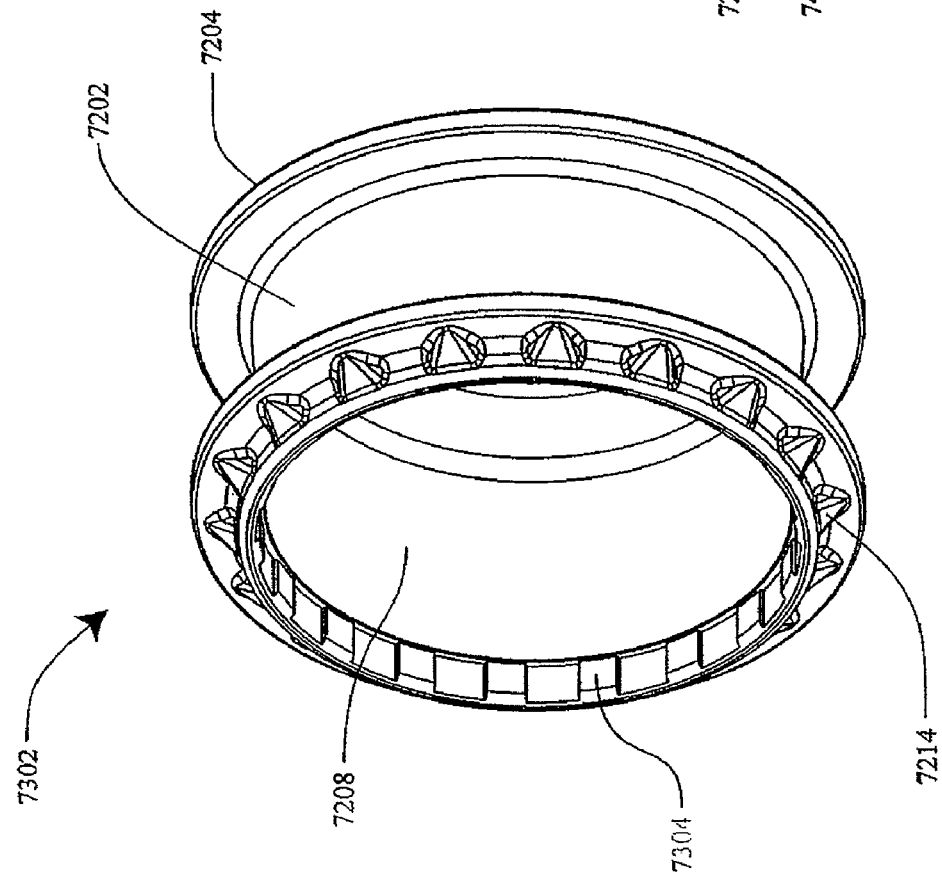

FIG. 73 is a perspective view of an alternative hub shell.

Figure 74:
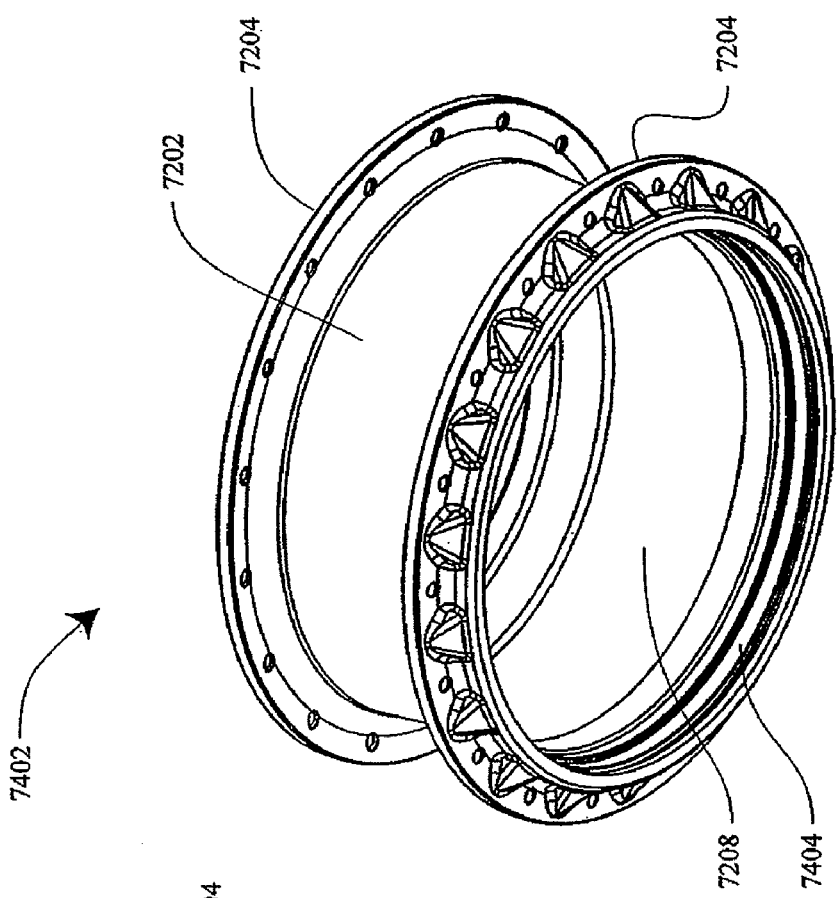

FIG. 74 is a perspective view of yet another hub shell.

FIG. 75A is a perspective view of a hub shell cover that can be used with the CVT of FIG. 47.

FIG. 75B is a second perspective view of the hub shell cover of FIG. 75A.

FIG. 75C is a plan view of the front side of the hub shell cover of FIG. 75A.

FIG. 75D is a cross-sectional view, along the section line N-N, of the hub shell cover of FIG. 75C.

FIG. 75E is detail view Q of the cross-sectional view shown in FIG. 75D.

FIG. 75F is a plan view of the left side of the hub shell cover of FIG. 75A.

FIG. 75G is a detail view R of the cross-sectional view shown in FIG. 75F.

FIG. 76A is a perspective view of an alternative hub shell cover that can be used with the CVT of FIG. 47.

FIG. 76B is a plan view of the front side of the hub shell cover of FIG. 76A.

FIG. 76C is a cross-sectional view, along the section line P-P, of the hub shell cover of FIG. 76B.

FIG. 76D is detail view S of the cross-sectional view shown in FIG. 76C.

FIG. 76E is a plan view of the left side of the hub shell cover of FIG. 76A.

FIG. 76F is a detail view T of the plan view shown in FIG. 76E.

Figure 77:
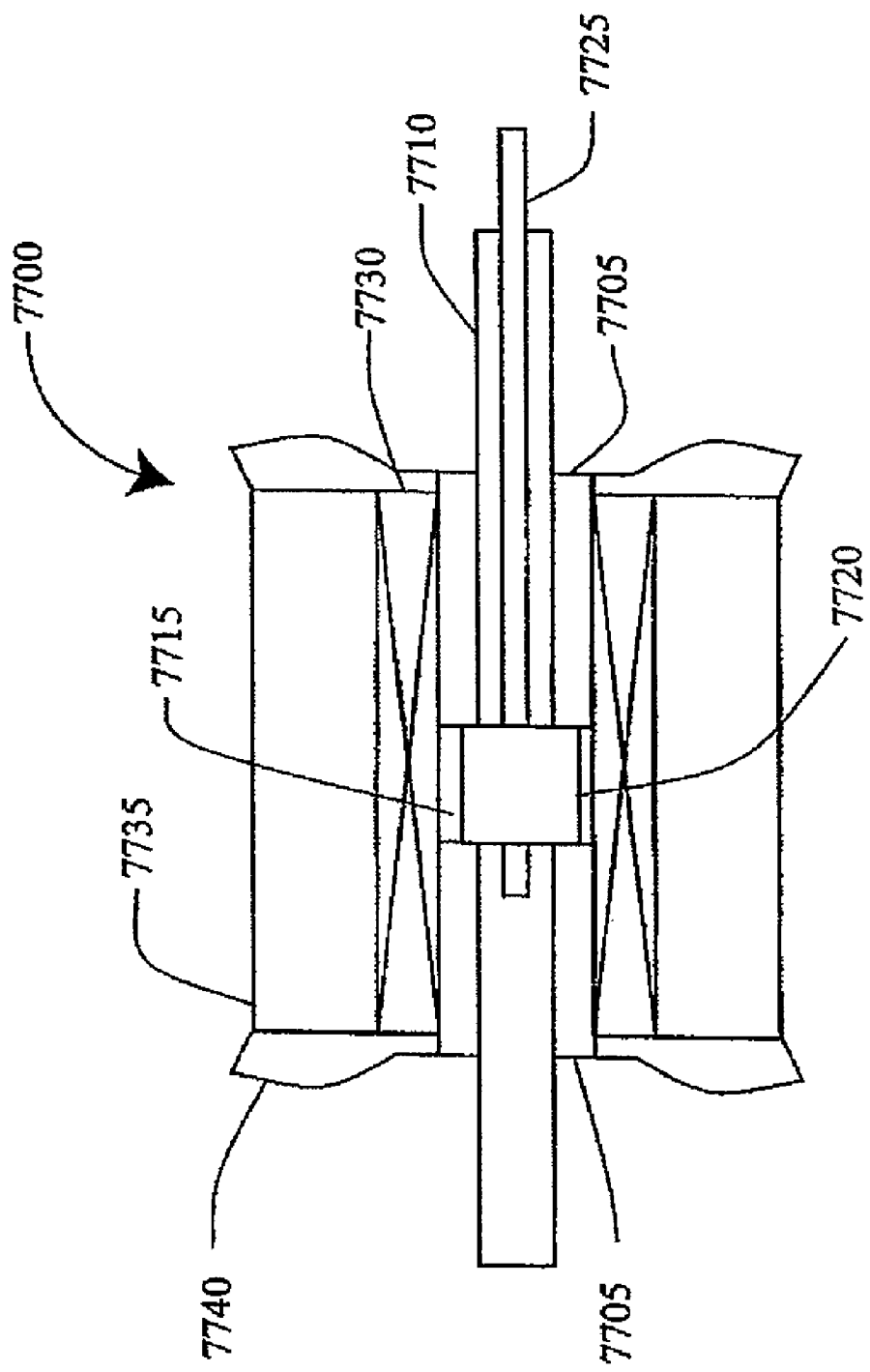

FIG. 77 is a cross-section of one embodiment of an idler and shift cam assembly.

Figure 1:
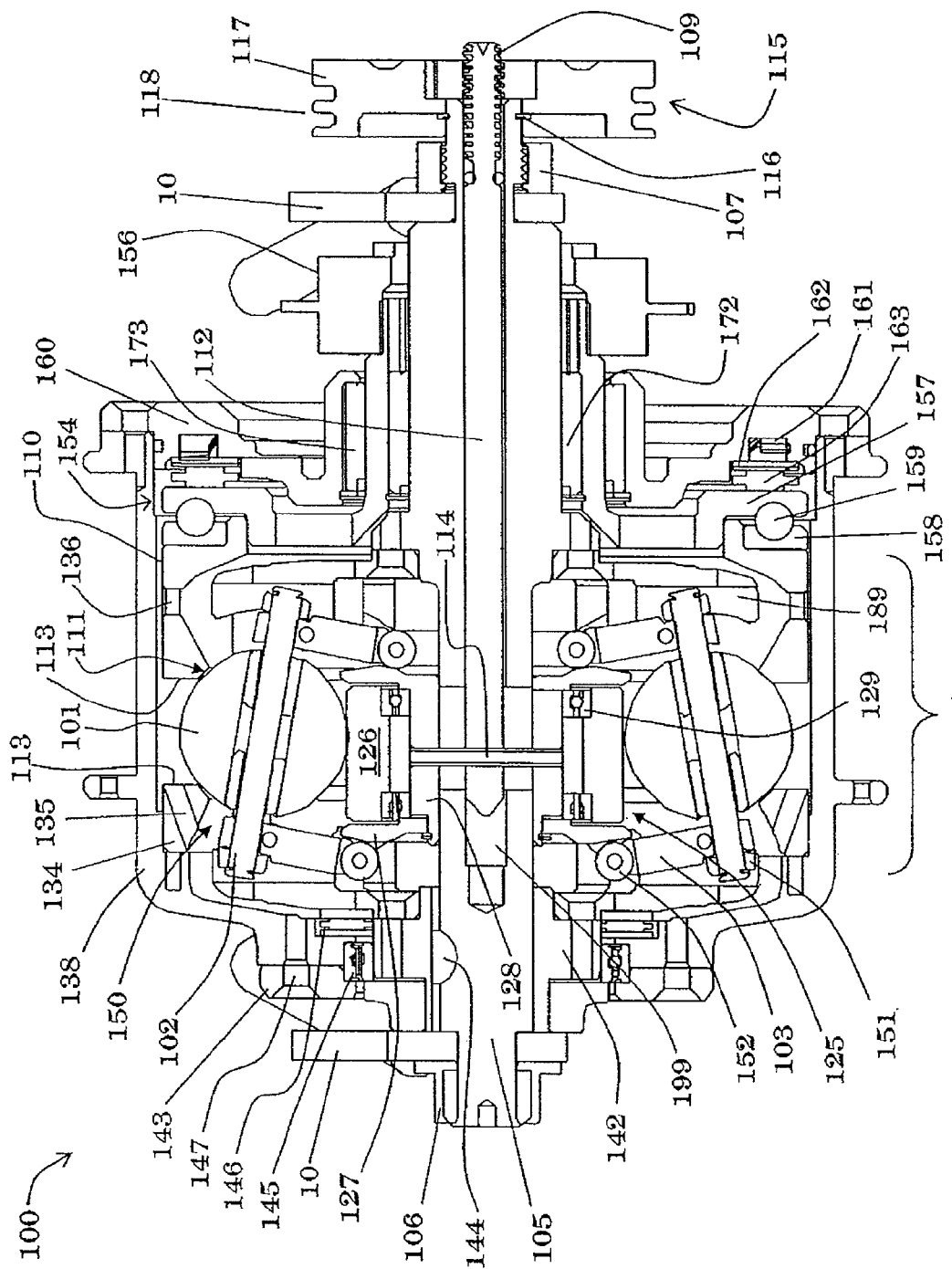
FIG. 1 is a cross-sectional view of one embodiment of a CVT.

FIG. 78 is a cross-section of the idler and shift cam assembly of FIG. 1 along with a ball-leg assembly.

Figures 79A, 79B:
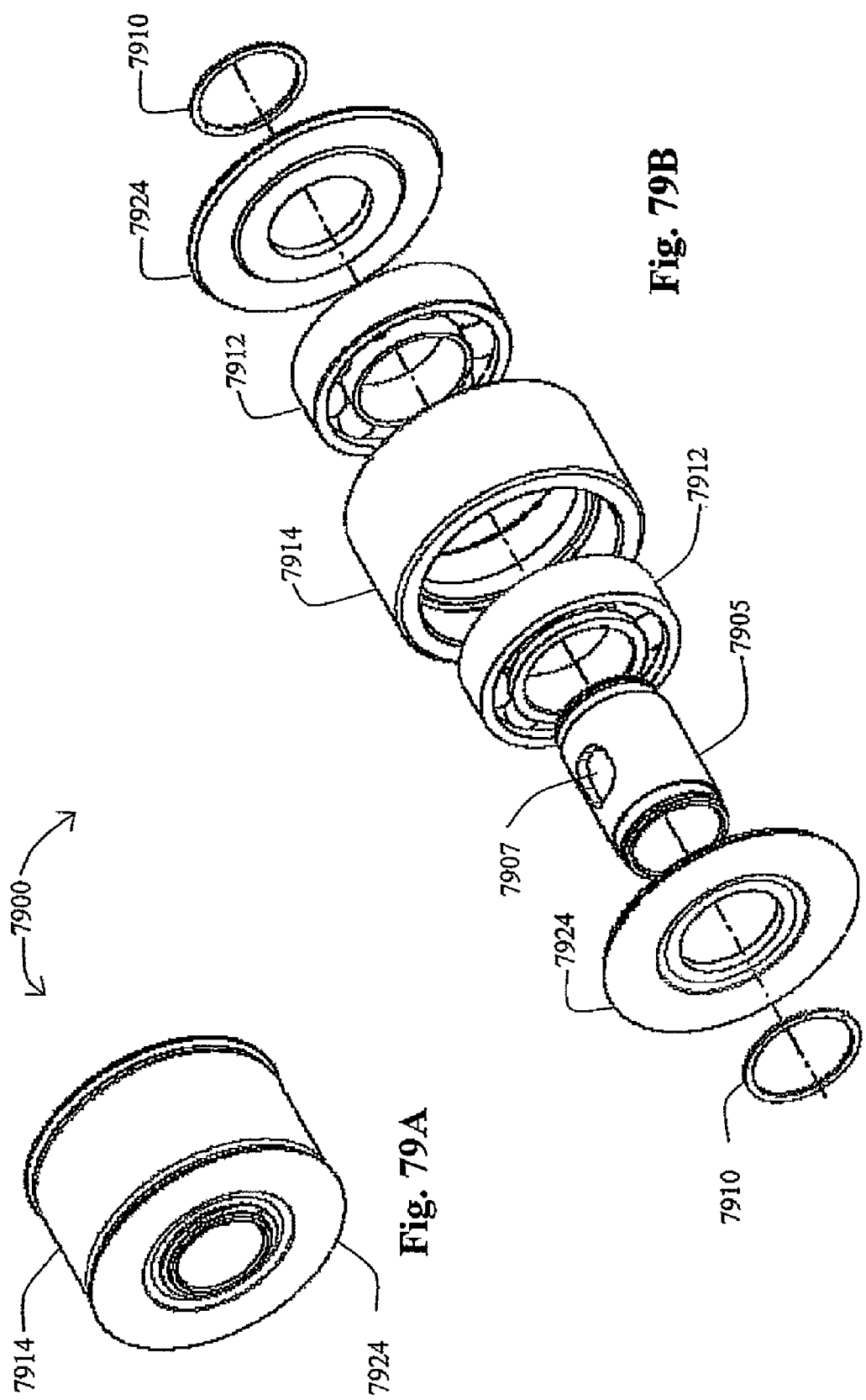

FIG. 79A is a perspective view of an alternative embodiment of an idler and shift cam assembly.

FIG. 79B is an exploded view of the idler and shift cam assembly of FIG. 79A.

Figure 79C:
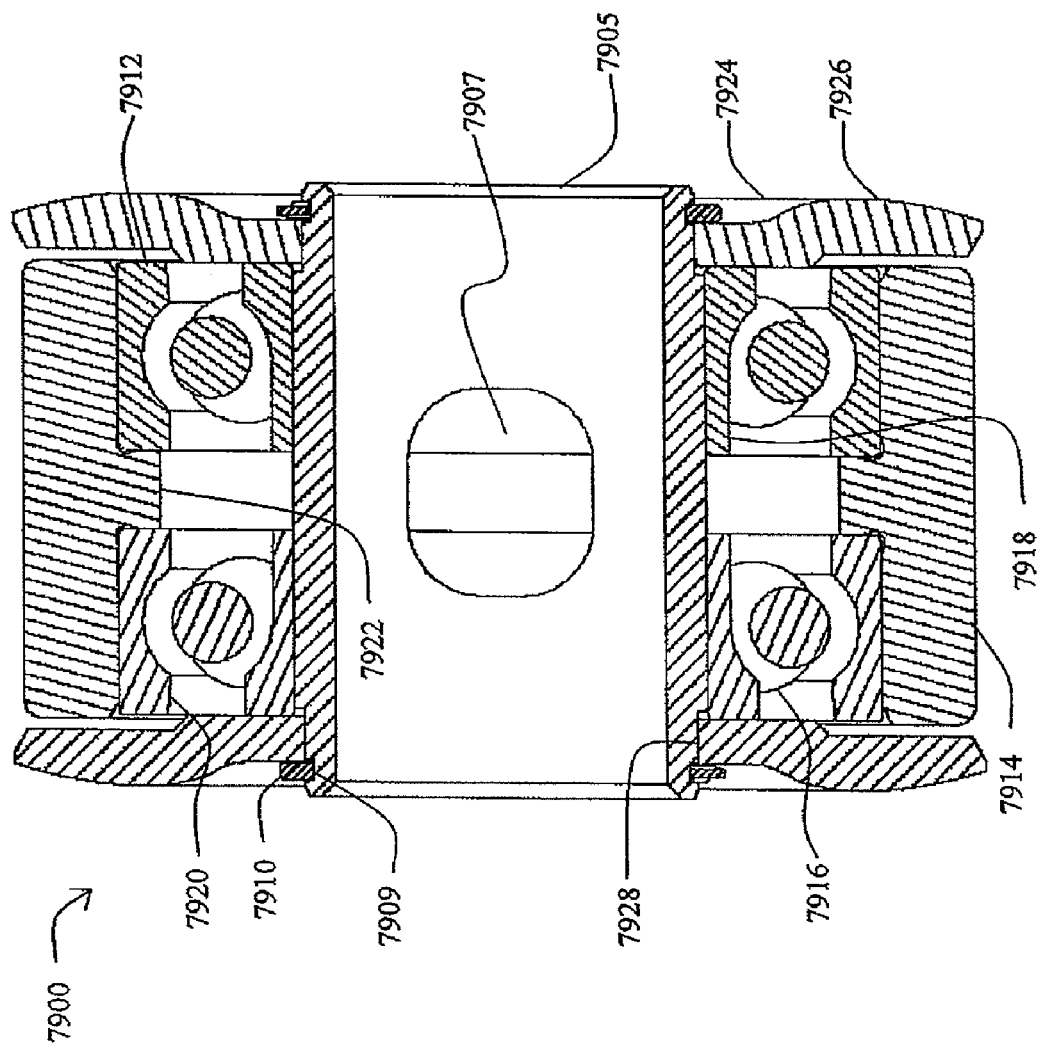

FIG. 79C is a cross-sectional view of the idler and shift cam assembly of FIG. 79B.

Figure 79D:
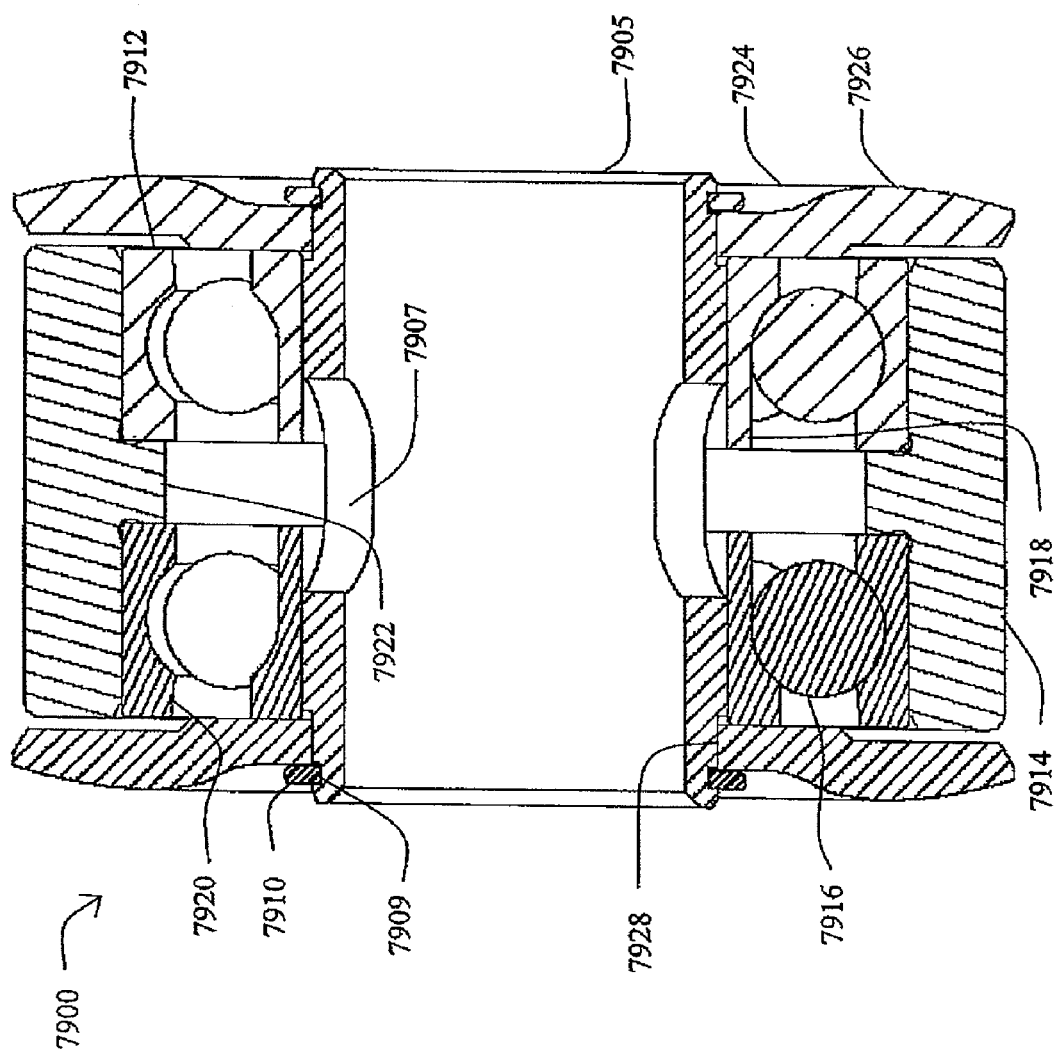

FIG. 79D is a second cross-sectional view of the idler and shift cam assembly of FIG. 3B.

FIG. 80A is a perspective view of an alternative embodiment of an idler and shift cam assembly.

FIG. 80B is an exploded view of the idler and shift cam assembly of FIG. 80A.

Figure 80C:
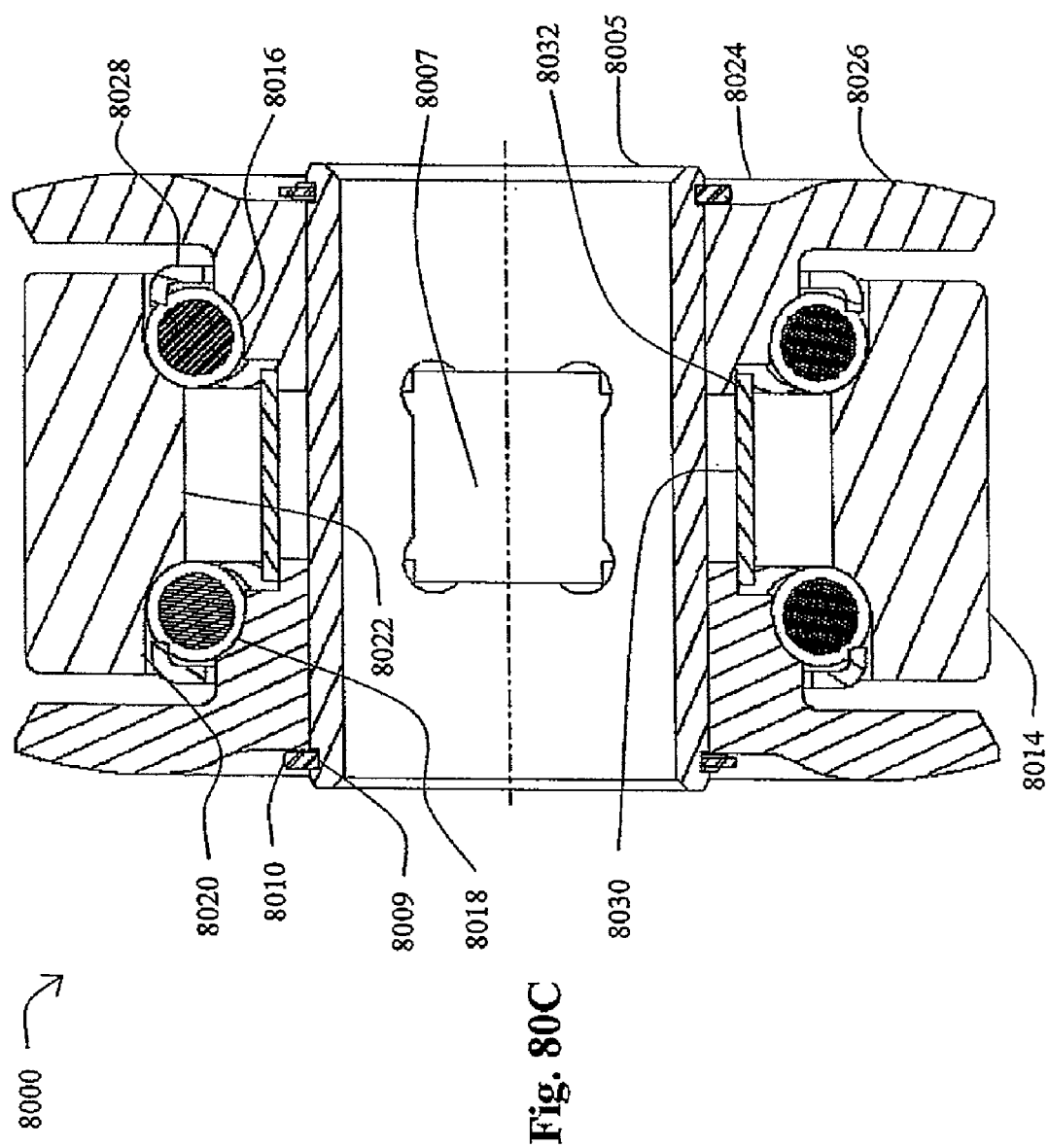

FIG. 80C is a cross-sectional view of the idler and shift cam assembly of FIG. 80B.

Figure 80D:
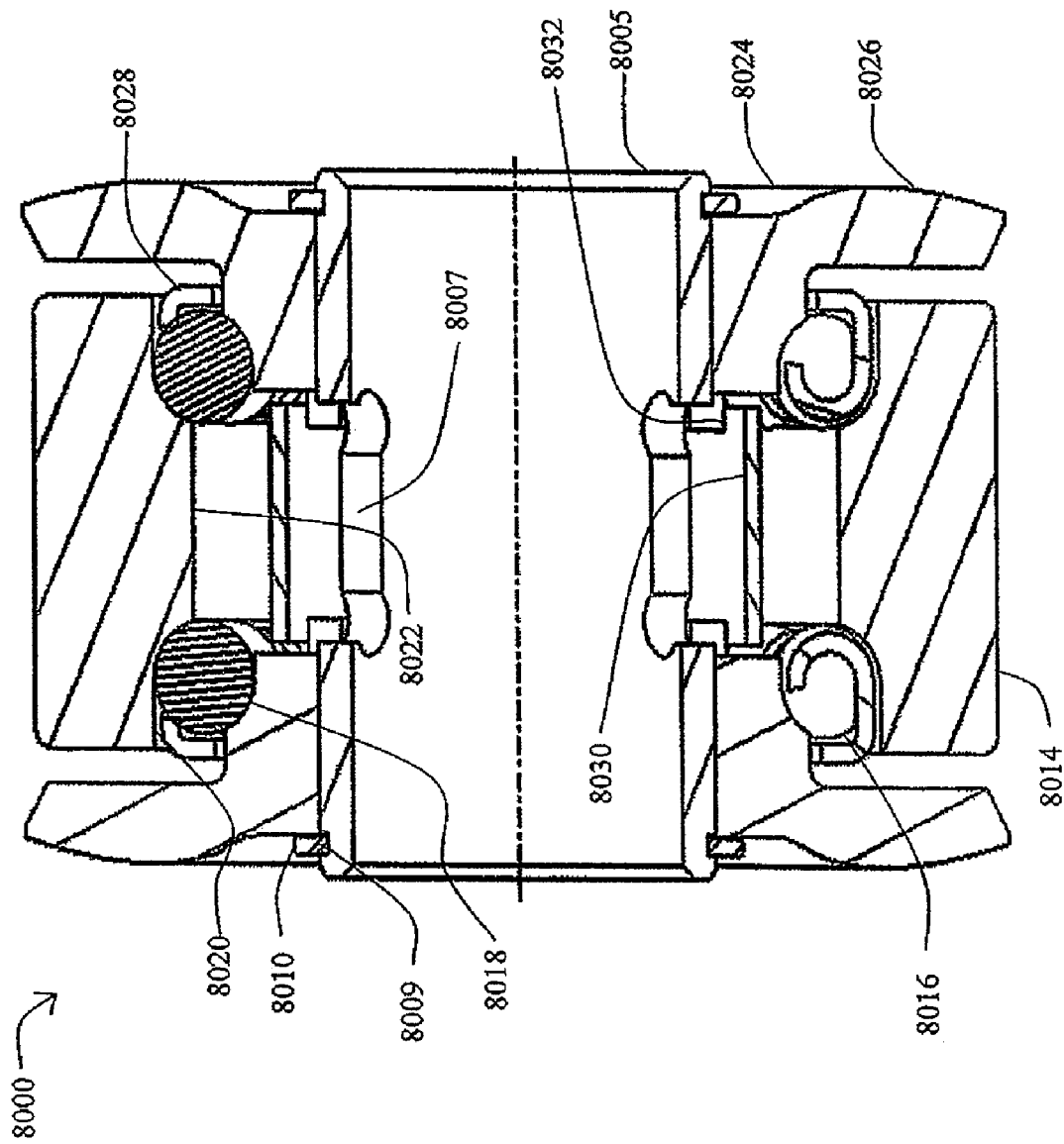

FIG. 80D is a second cross-sectional view of the idler and shift cam assembly of FIG. 80B.

FIG. 81A is a perspective view of yet another embodiment of an idler and shift cam assembly.

FIG. 81B is an exploded view of the idler and shift cam assembly of FIG. 81A.

Figure 81C:
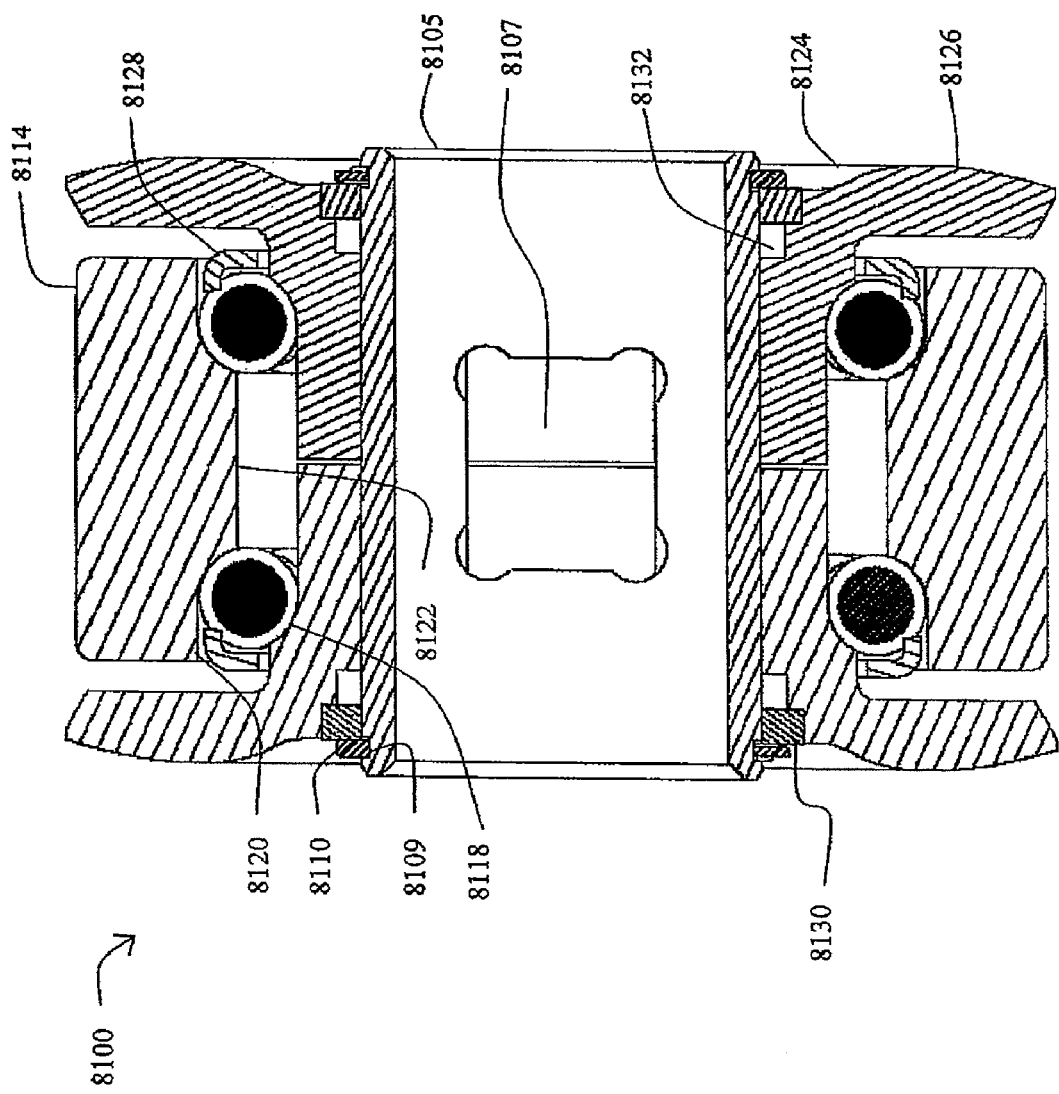

FIG. 81C is a cross-sectional view of the idler and shift cam assembly of FIG. 81B.

Figure 81D:
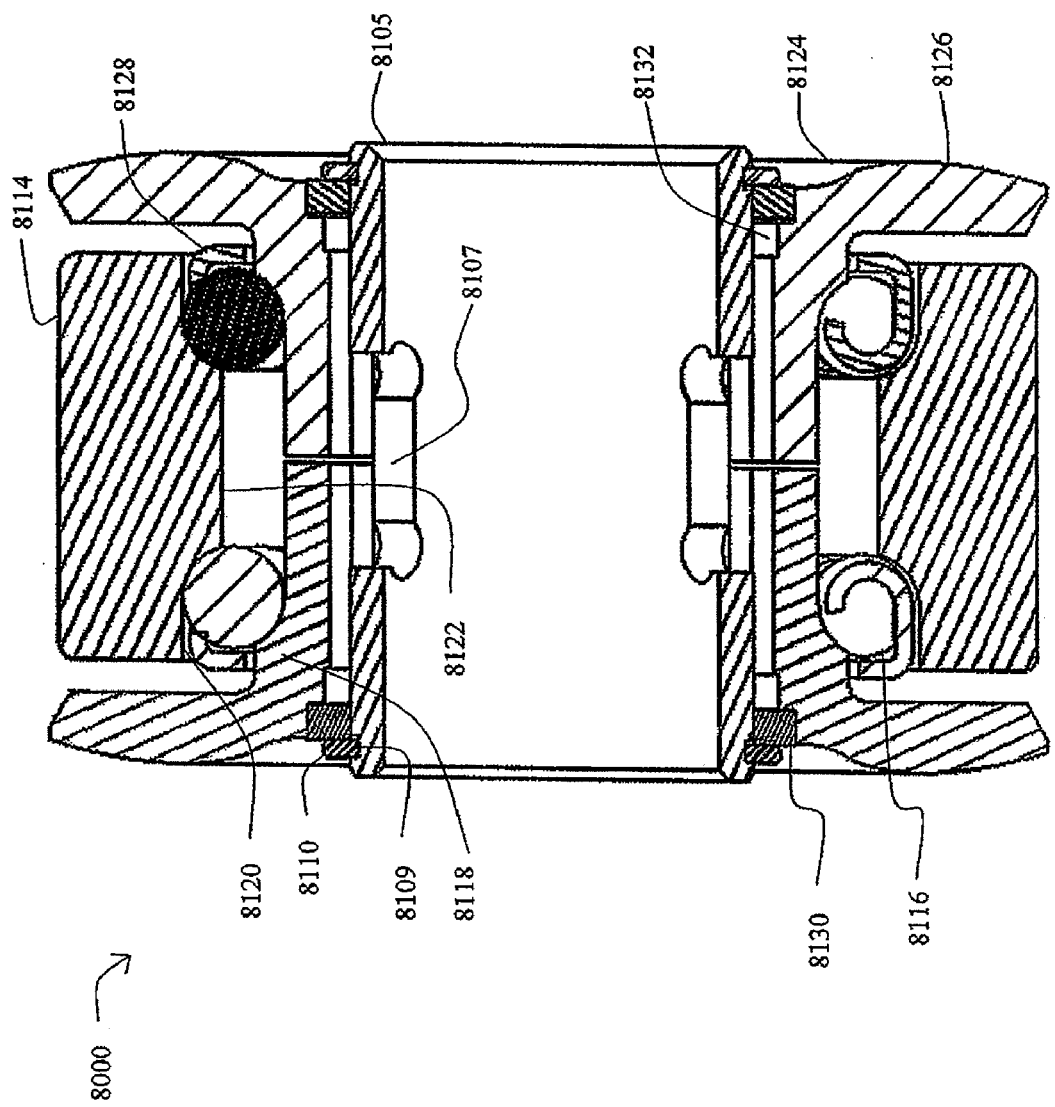

FIG. 81D is a second cross-sectional view of the idler and shift cam assembly of FIG. 81B.

FIG. 82A is a perspective view of another alternative embodiment of an idler and shift cam assembly.

FIG. 82B is an exploded view of the idler and shift cam assembly of FIG. 82A.

Figure 82C:
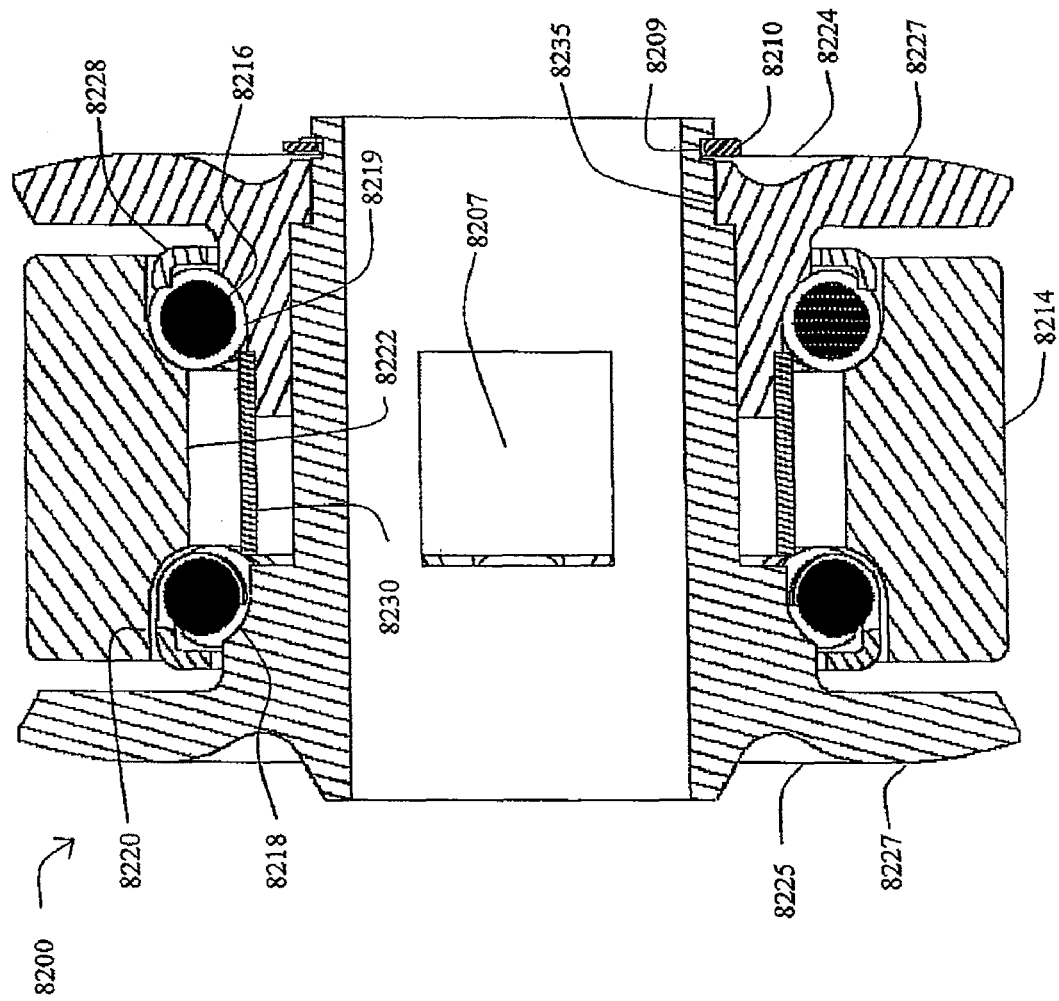

FIG. 82C is a cross-sectional view of the idler and shift cam assembly of FIG. 82B.

Figure 82D:
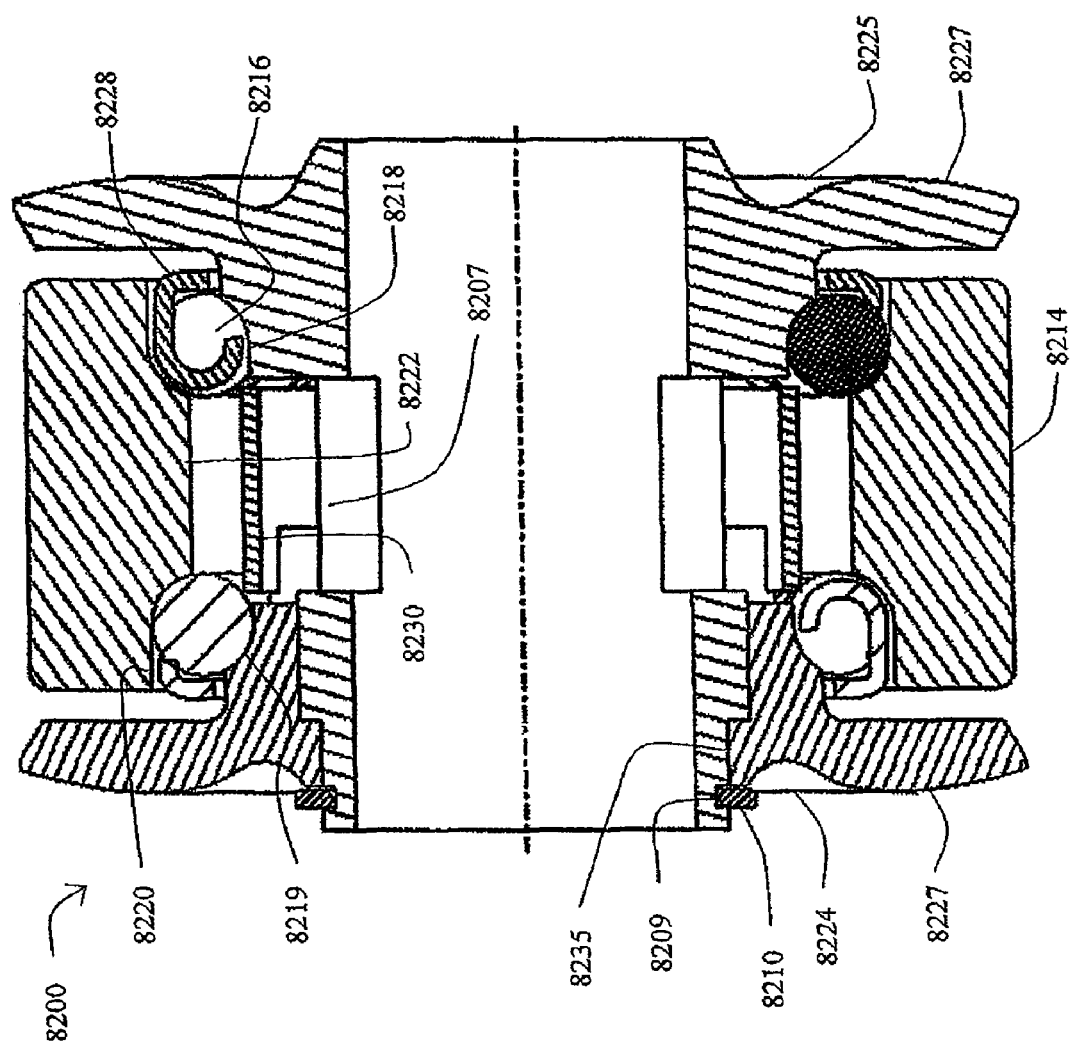

FIG. 82D is a second cross-sectional view of the idler and shift cam assembly of FIG. 82B.

FIG. 83A is a perspective view of a shifter quick release subassembly that can be used with embodiments of the CVTs described here.

FIG. 83B is an exploded, perspective view of the shifter quick release subassembly of FIG. 83A.

FIG. 83C is a plan view of a backing plate as may be used with the shifter quick release subassembly of FIG. 83A.

FIG. 83D is a cross-sectional view, along the section line Q-Q, of the backing plate of FIG. 83C.

FIG. 84A is a cross-sectional view of a shifter interface subassembly that can be used with embodiments of the CVTs described here.

FIG. 84B is a plan view of a pulley that can be used with the shifter interface subassembly of FIG. 84A.

FIG. 84C is a cross-sectional view, along the section line R-R, of the pulley of FIG. 84B.

FIG. 84D is plan view of an indexing plate that can be used with the shifter interface subassembly of FIG. 84A.

FIG. 84E is a plan view of a shift rod nut that can be used with the shifter interface subassembly of FIG. 84A.

FIG. 85A is a perspective view of a power input means subassembly that can be used with embodiments of the CVTs described here.

FIG. 85B is a plan view of the power input means subassembly of FIG. 85A.

FIG. 85C is a perspective view of a torque transfer key that can be used with the power input means subassembly of FIG. 85A.

FIG. 85D is a plan view of the torque transfer key of FIG. 85C.

FIG. 85E is a perspective view of an input driver that can be used with the power input means subassembly of FIG. 85A.

Figure 86:
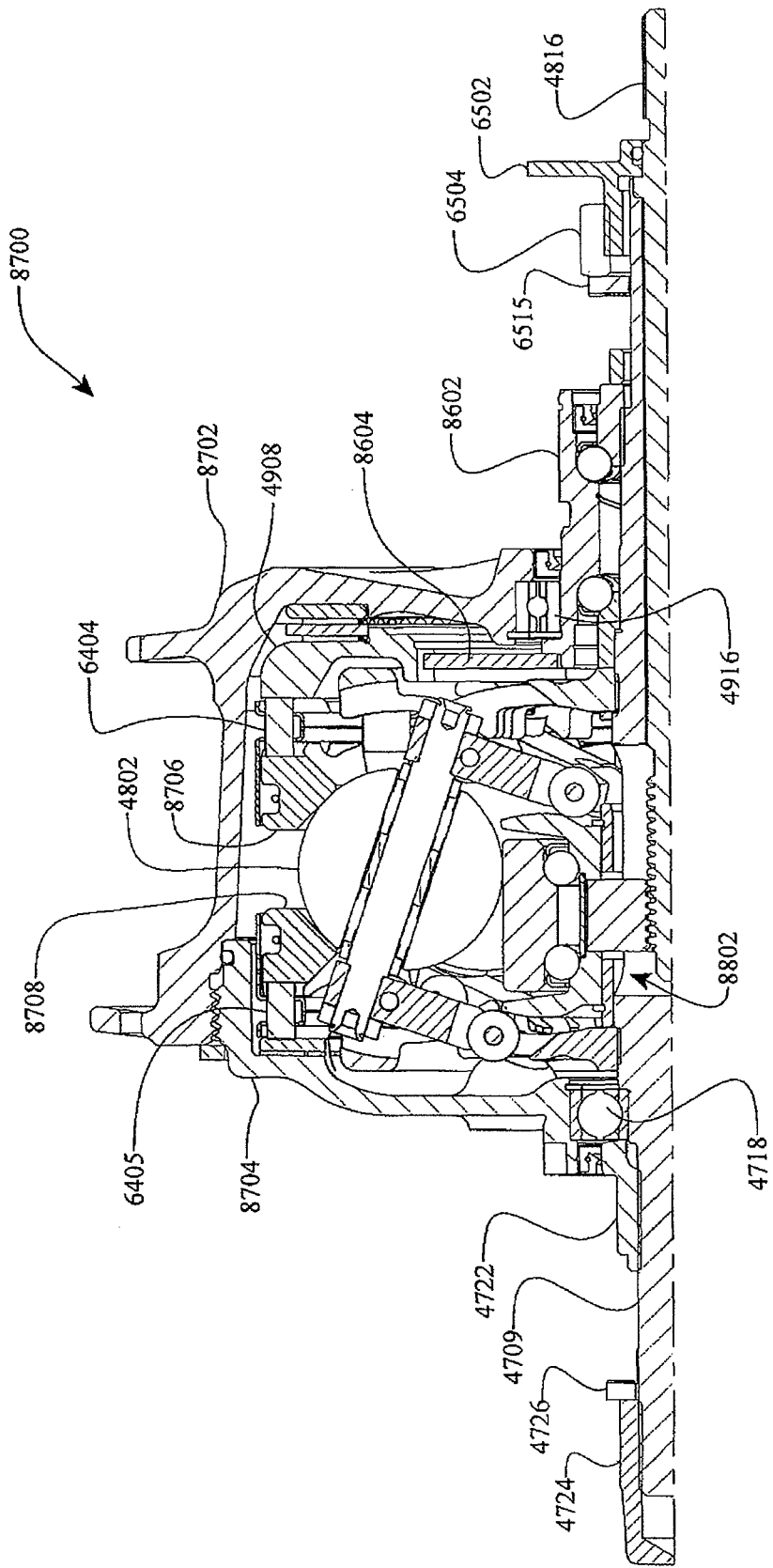

FIG. 86 is a partial cross-sectional view of yet another embodiment of a CVT.

Figure 87:
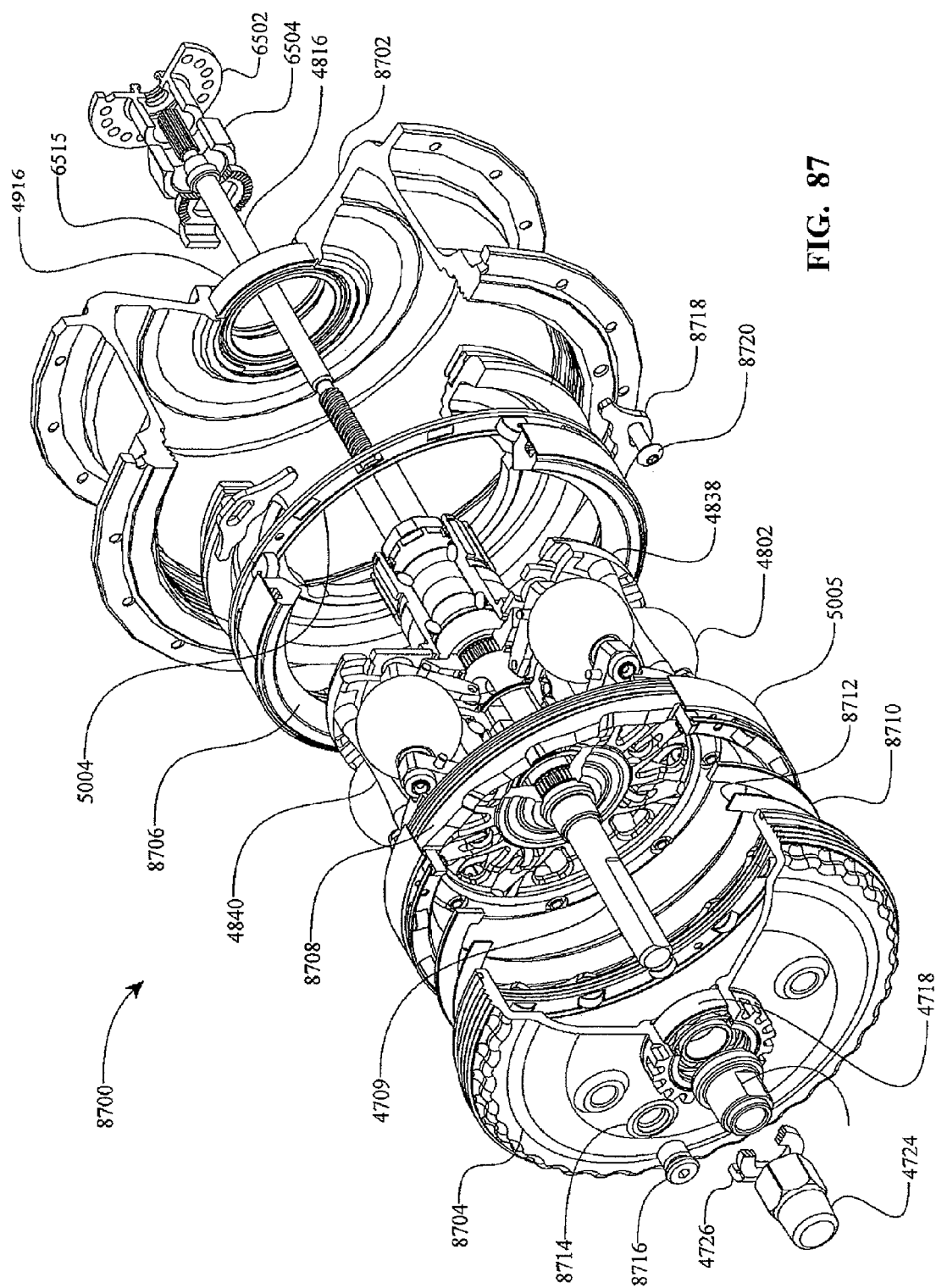

FIG. 87 is an exploded, partial cut-away view of certain components and subassemblies of the CVT of FIG. 86.

Figure 88:
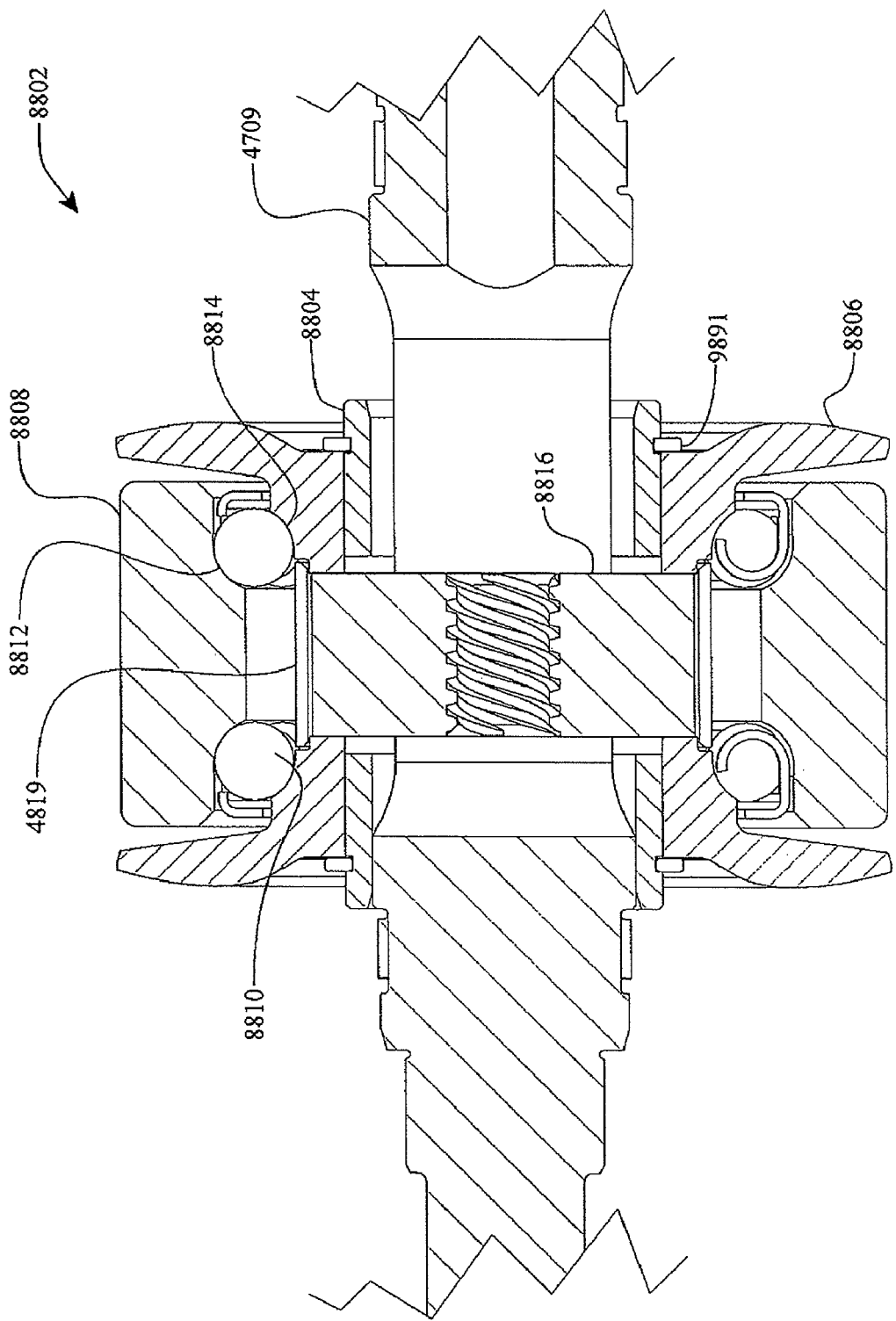

FIG. 88 is a cross-sectional view of an idler subassembly for a CVT.

Figure 89:
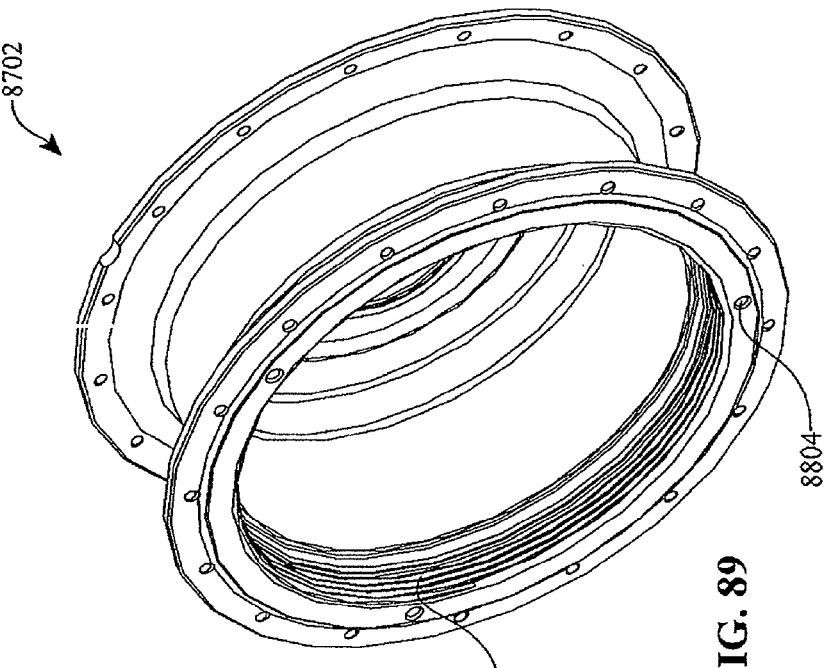

FIG. 89 is a perspective view of a hub shell for a CVT.

Figure 90:
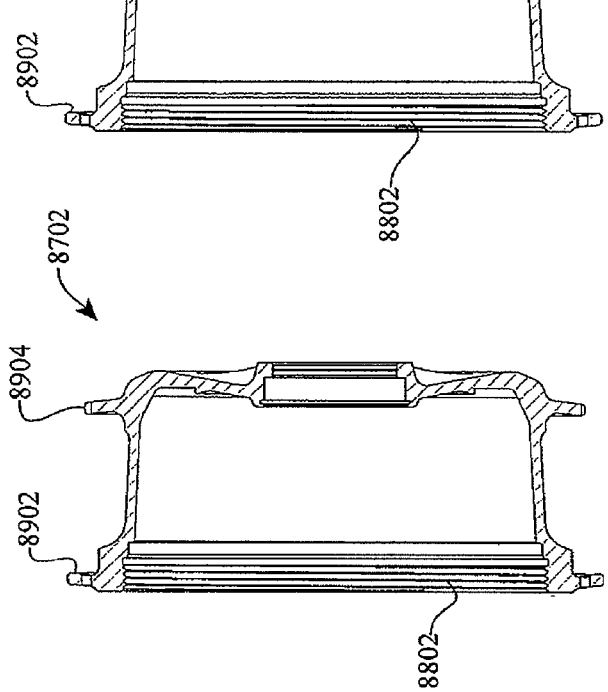

FIG. 90 is a cross-sectional view of the hub shell of FIG. 89.

Figure 91:
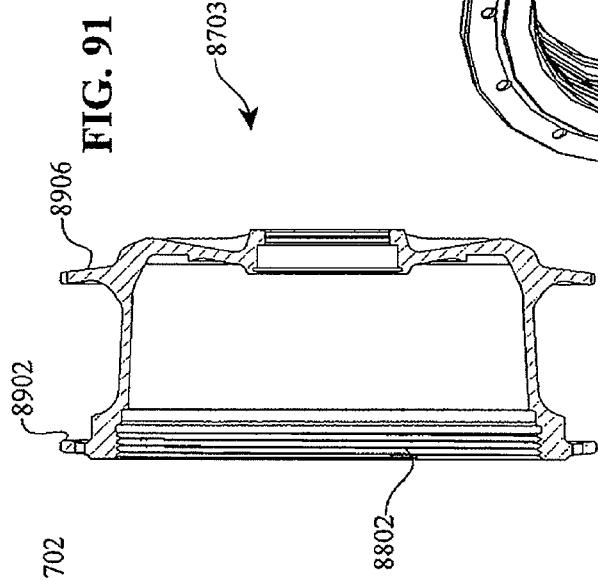

FIG. 91 is a sectional view of yet another embodiment of a hub shell.

FIG. 92 is an exploded view of a hub shell cover for a CVT.

FIG. 93 is a cross-sectional view of the hub shell cover subassembly of FIG. 92.

FIG. 94 is a front side, elevational view of the hub shell cover of FIG. 92.

FIG. 95 is a cross-sectional view along section line AA-AA of the hub shell cover of FIG. 94.

FIG. 96 is a cross-sectional view along section line BB-BB of the hub shell cover of FIG. 94.

FIG. 97 is a detail view A1 of the hub shell cover of FIG. 95.

FIG. 98 is a detail view A2 of the hub shell cover of FIG. 94.

FIG. 99 is a second perspective view of the shell cover of FIG. 94.

FIG. 100 is a perspective view of an output drive ring that can be used with the hub shell cover of FIG. 99.

Figures 101, 102, 102A, 103, 104:
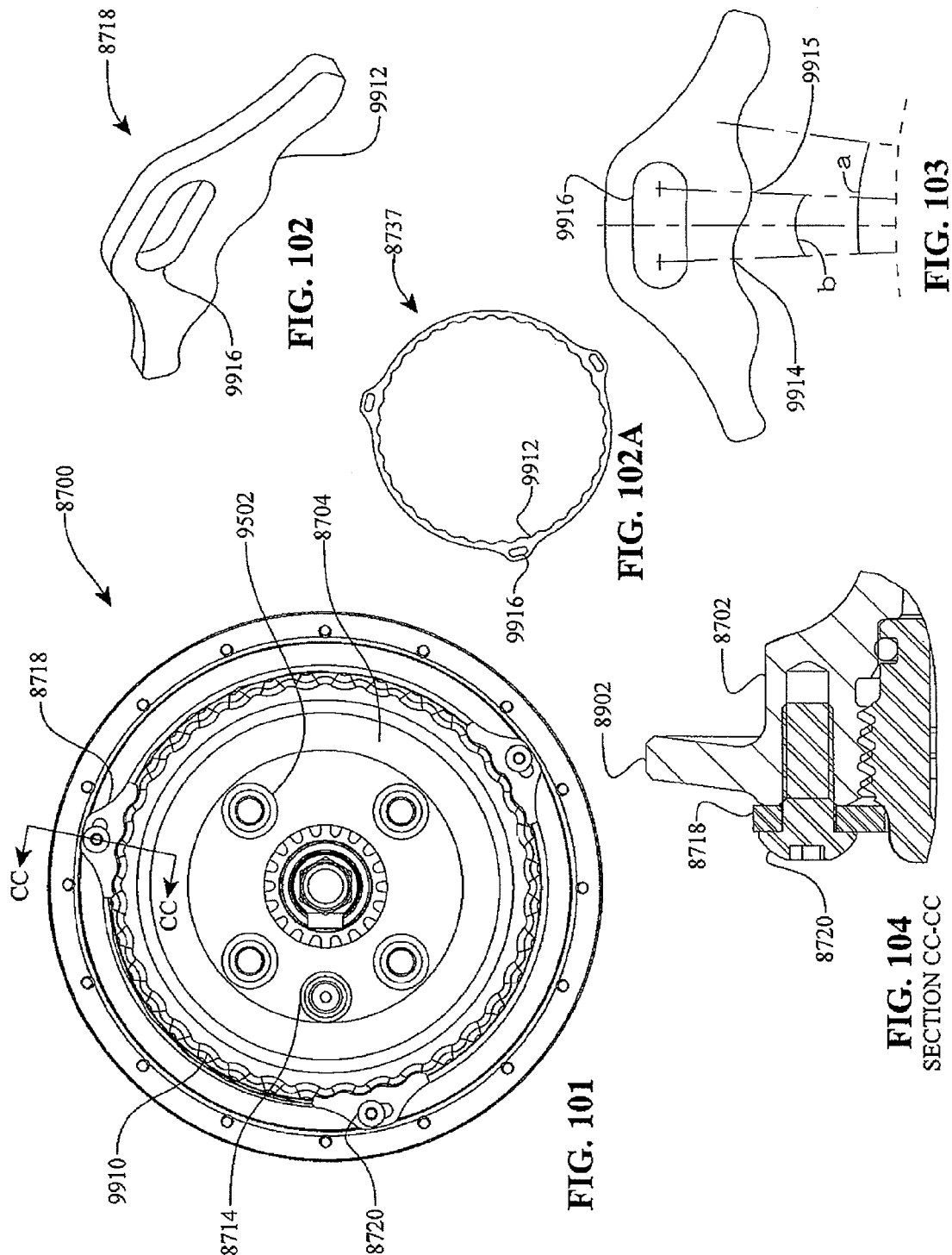

FIG. 101 is an elevational view of a hub shell and a hub shell cover for a CVT.

FIG. 102 is a perspective view of a locking tab that can be used with the hub shell and hub shell cover of FIG. 101.

FIG. 103 is an elevational, front side view of the locking tab of FIG. 102.

FIG. 104 is a cross-sectional view along line CC-CC of the hub shell cover and hub shell of FIG. 101.

FIG. 105 is a perspective view of a CVT having a hub shell cover with a shield.

FIG. 106 is a perspective view of a CVT having a hub shell cover with a disc brake adapter.

Figure 107:
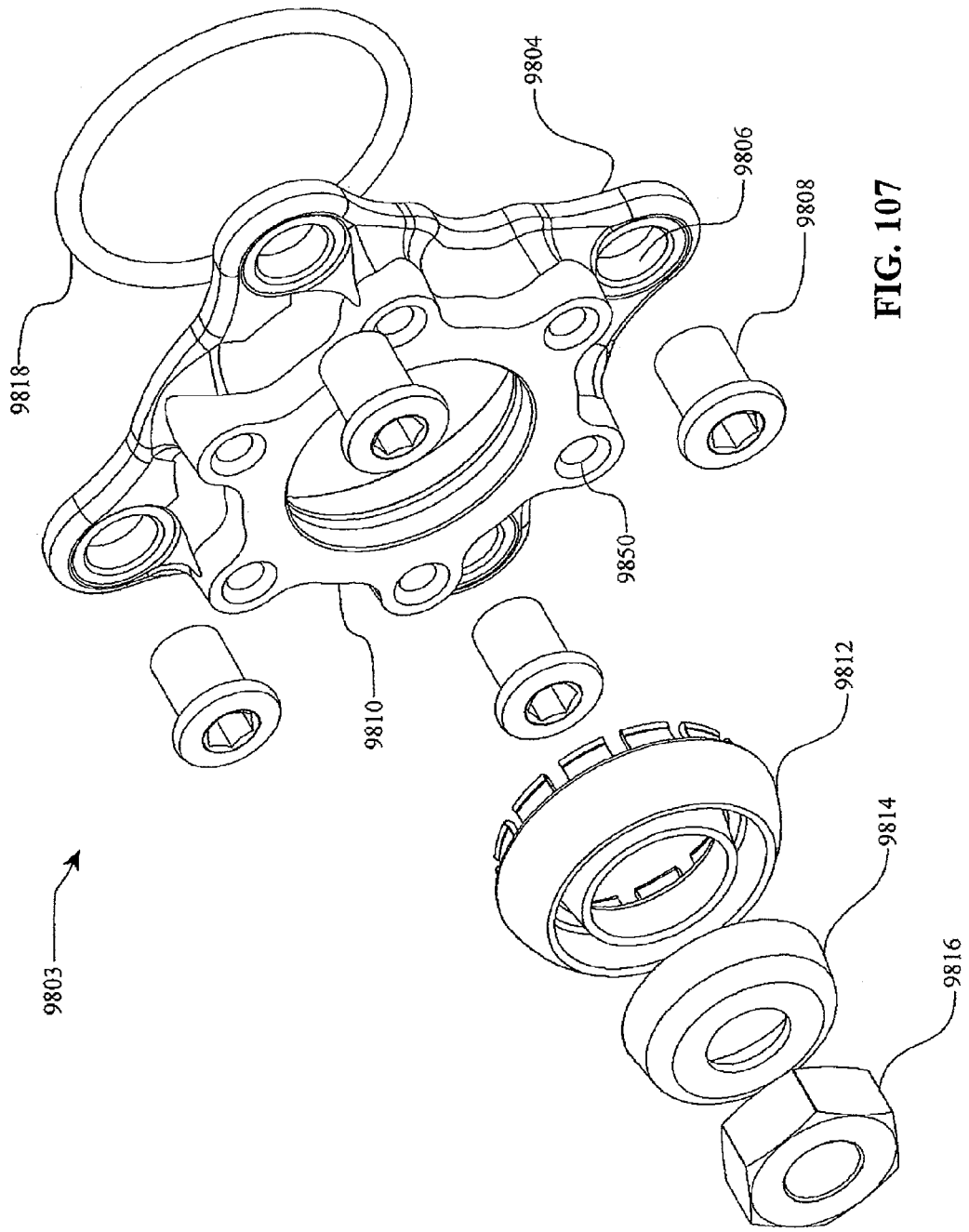

FIG. 107 is a perspective view of a disc brake adapter kit for a CVT.

FIG. 108 is a front, elevational view of a disc brake adapter that can be used with the kit of FIG. 107.

FIG. 109 is a back, elevational view of the disc brake adapter of FIG. 108.

FIG. 110 is a cross-sectional view along line DD-DD of the disc brake adapter of FIG. 109.

FIG. 111 is a perspective view of a shield that can be used with the kit of FIG. 107.

FIG. 112 is a side, elevational view of the shield of FIG. 111.

FIG. 113 is a cross-sectional view of the shield of FIG. 111.

FIG. 114 is a perspective view of a shield that can be used with the hub shell cover of FIG. 105.

FIG. 115 is a cross-sectional view of the shield of FIG. 114.

Figure 116:
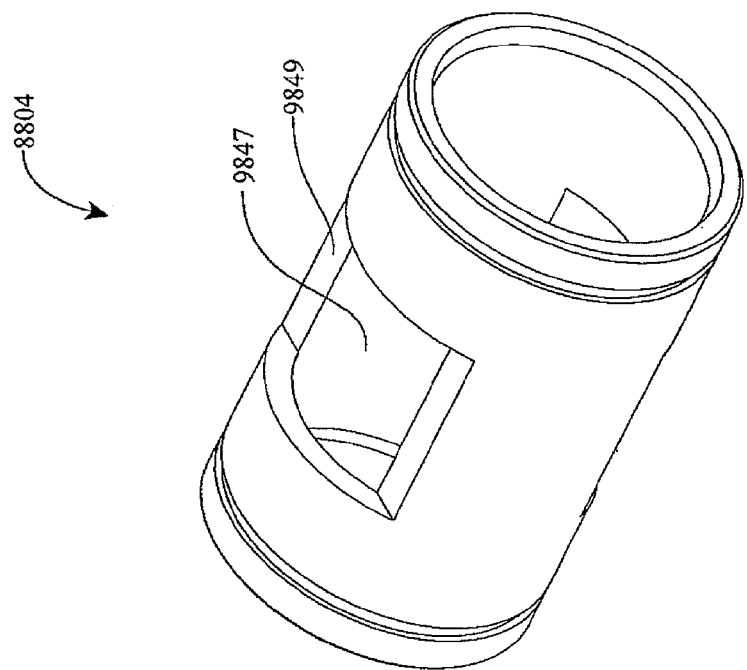

FIG. 116 is a perspective view of an idler bushing that can be used with the idler assembly of a CVT.

Figure 117:
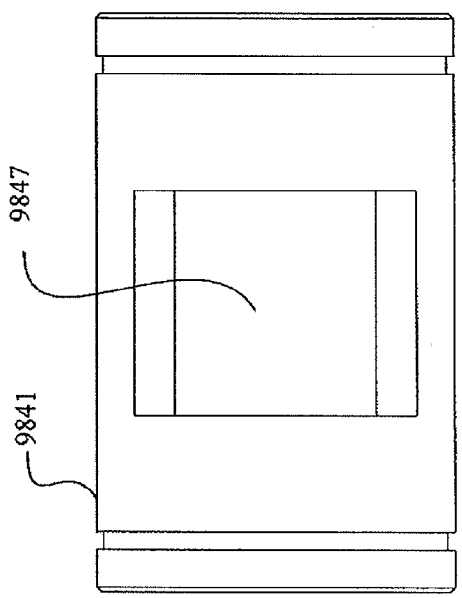

FIG. 117 is an elevational view of the idler bushing of FIG. 116.

Figure 118:
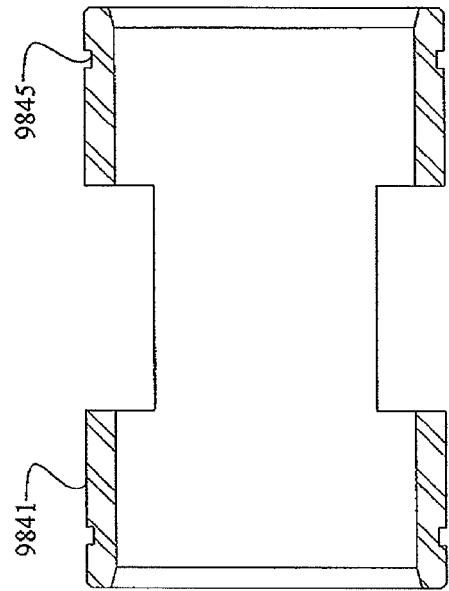

FIG. 118 is a cross-sectional view of the idler busing of FIG. 117.

Figure 119:
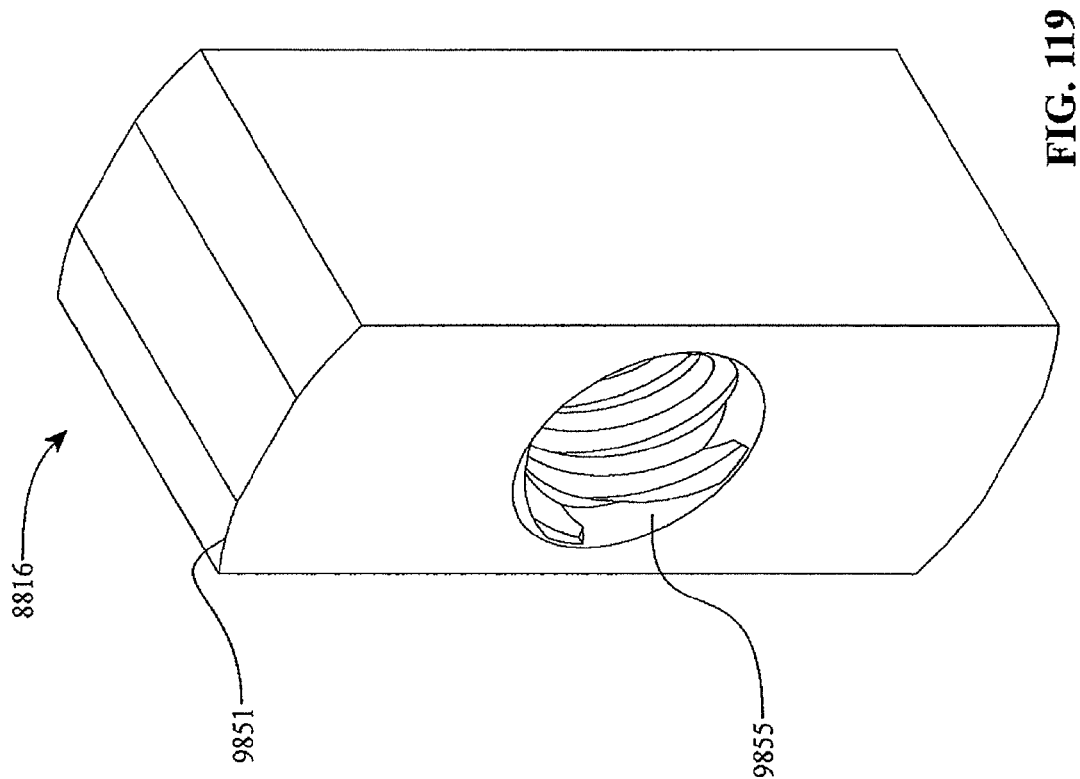

FIG. 119 is a perspective view of a shift rod nut that can be used with the idler assembly of a CVT.

Figure 120:
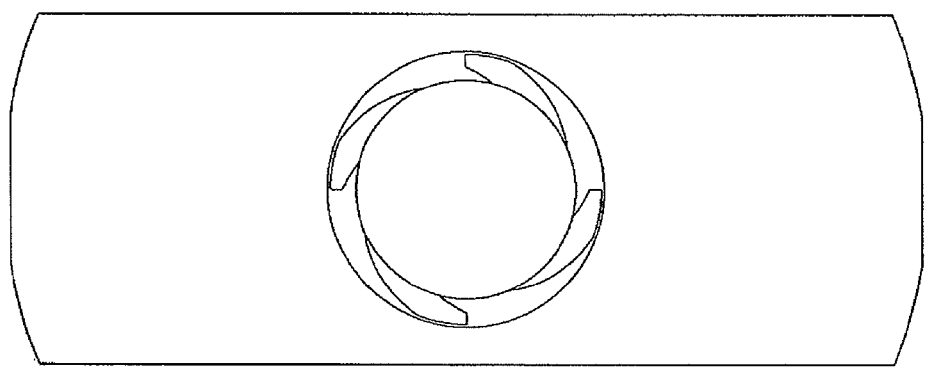

FIG. 120 is an elevational view of the shift rod nut of FIG. 119.

FIG. 121 is a front, elevational view of a shift cam for a CVT.

FIG. 122 is a side, elevational view of the shift cam of FIG. 121.

FIG. 123 is a cross-sectional view along the line EE-EE of the shift cam of FIG. 121.

FIG. 124 is a detail view A3 of the shift cam of FIG. 121.

FIG. 125 is a table of values for a shift cam profile for the shift cam of FIG. 121.

FIG. 126 is a perspective view of a traction ring for a CVT.

FIG. 127 is a front side, elevational view of the ring of FIG. 126.

FIG. 128 is a side, elevational view of the ring of FIG. 126.

FIG. 129 is an exaggerated, detail view A4 of a ramp profile that can be used with the traction ring of FIG. 126.

FIG. 130 is a cross-sectional view of the traction ring of FIG. 126.

FIG. 131 is a view of an uncoiled torsion spring for use with a CVT.

FIG. 132 is a perspective view of the torsion spring of FIG. 131.

FIG. 133 is a detail view A5 of the torsion spring of FIG. 132.

FIG. 134 is a detail view A6 of the torsion spring of FIG. 132.

Figure 135:
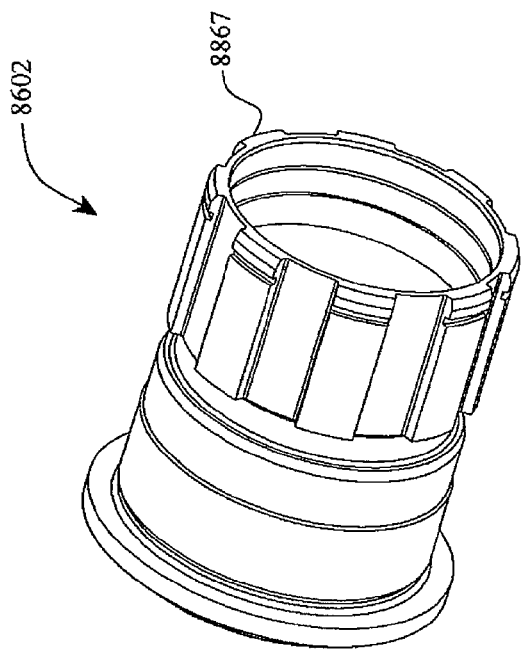

FIG. 135 is a perspective view of an input driver for use with a CVT.

Figure 136:
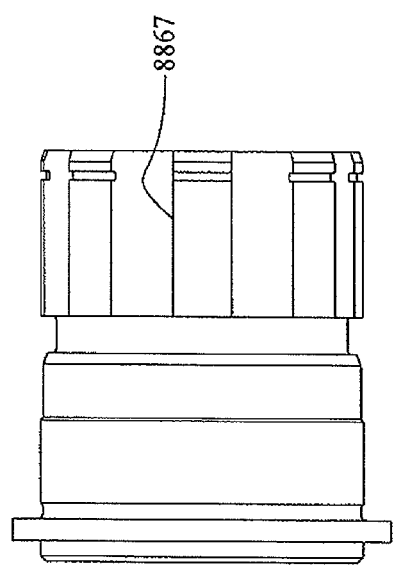

FIG. 136 is a side view of the input driver of FIG. 135.

Figure 137:
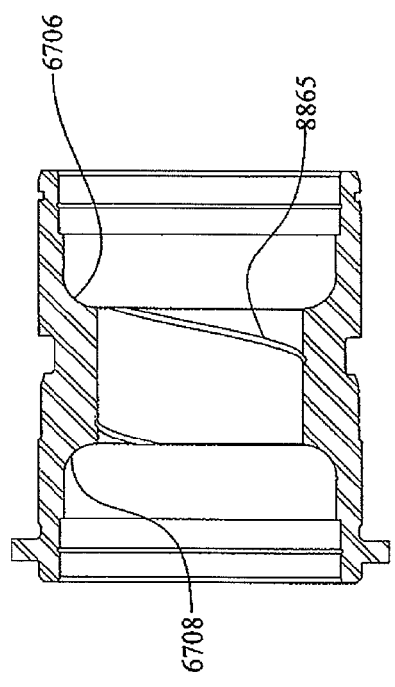

FIG. 137 is a cross-sectional view of the input driver of FIG. 135.

Figure 138:
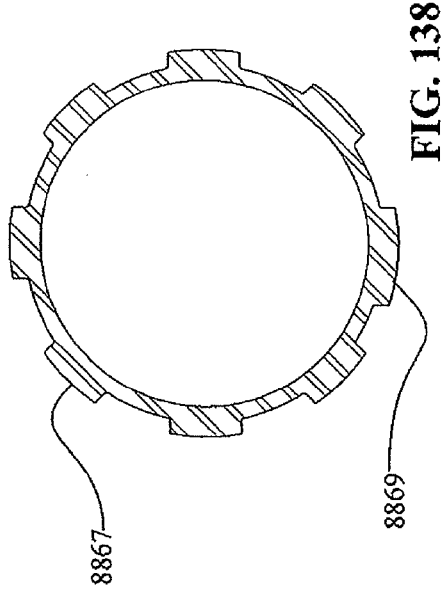

FIG. 138 is a second sectional view of the input driver of FIG. 135.

Figure 139:
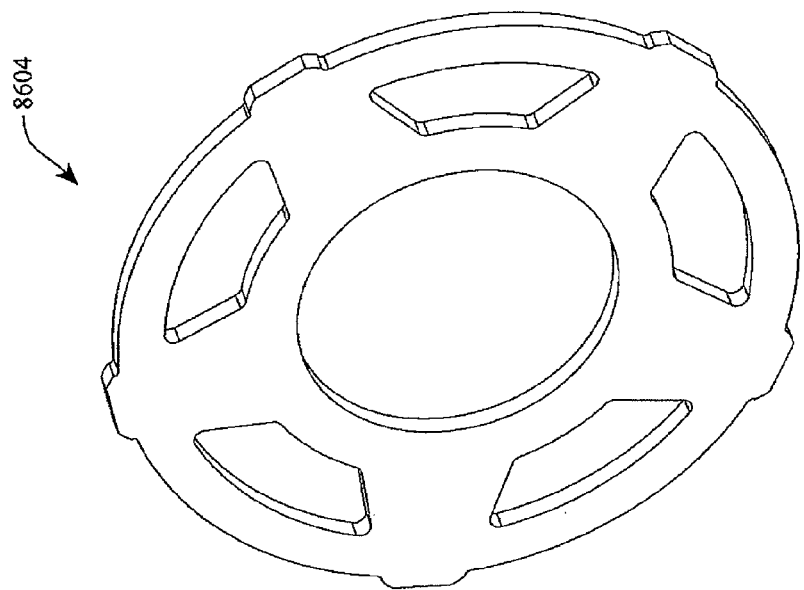

FIG. 139 is a perspective view of a torsion plate for use with a CVT.

Figure 140:
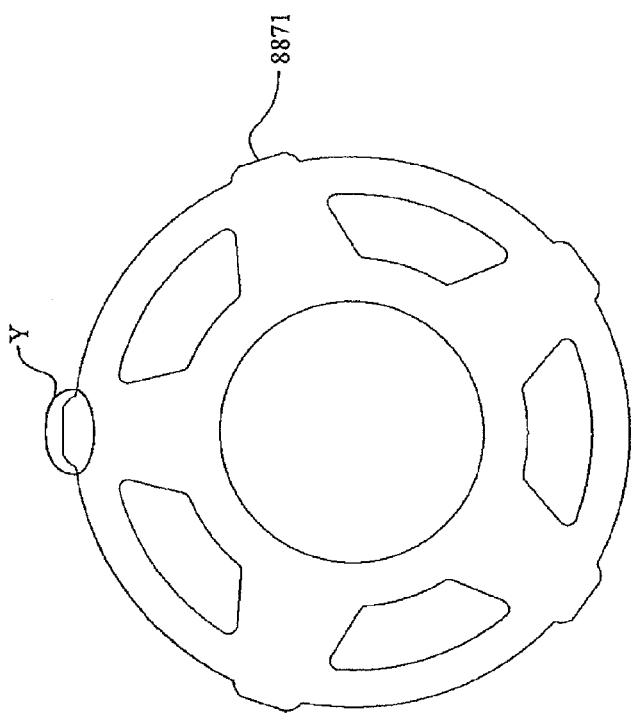

FIG. 140 is a front view of the torsion plate of FIG. 139.

Figure 141:
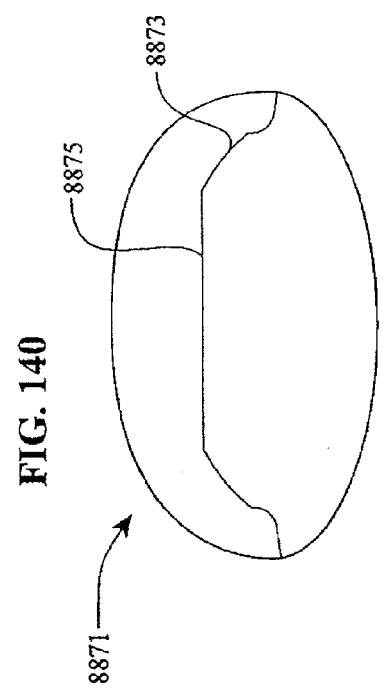

FIG. 141 is a detail view of the torsion plate of FIG. 140.

Figure 142:
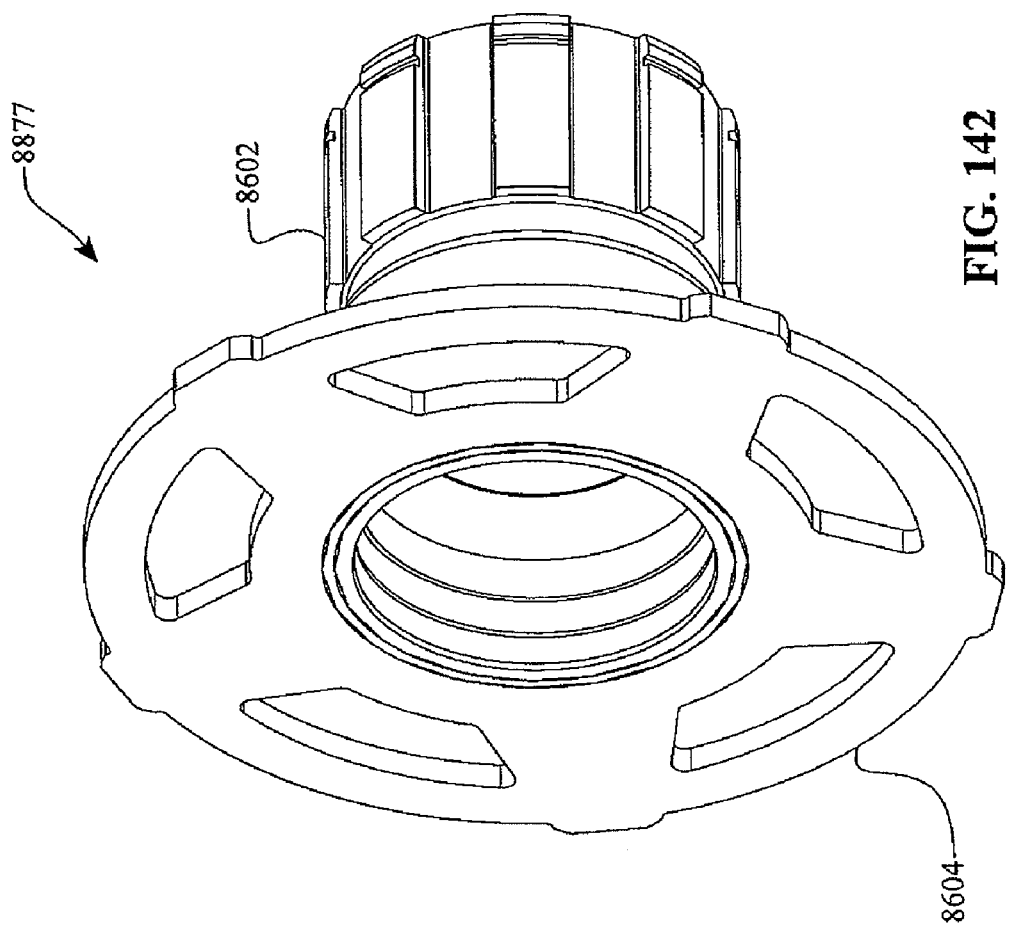

FIG. 142 is perspective view of an input assembly for a CVT.

Figure 143:
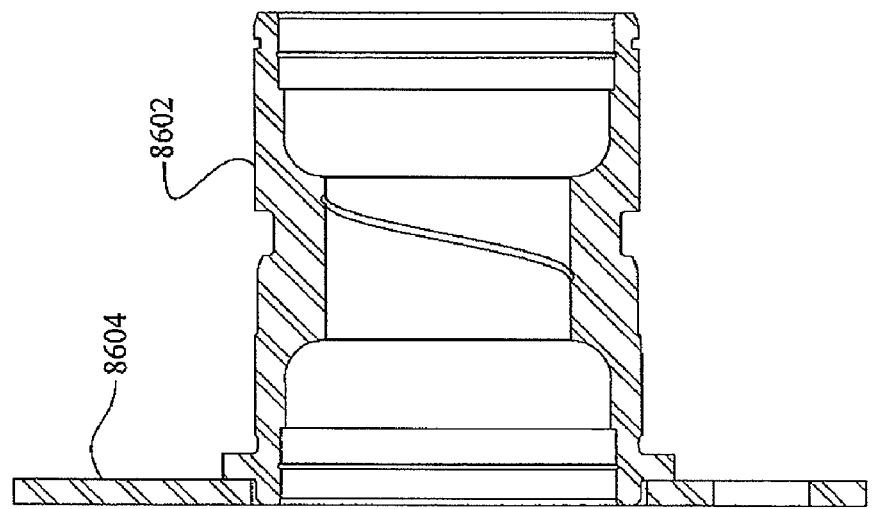

FIG. 143 is a sectional view of the input assembly of FIG. 142.

Figure 144:
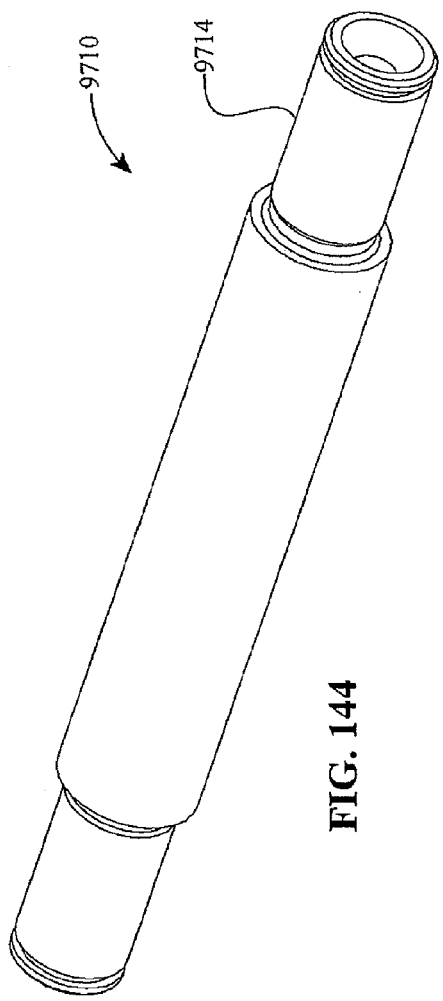

FIG. 144 is a perspective view of a roller axle for use with a CVT.

Figure 145:
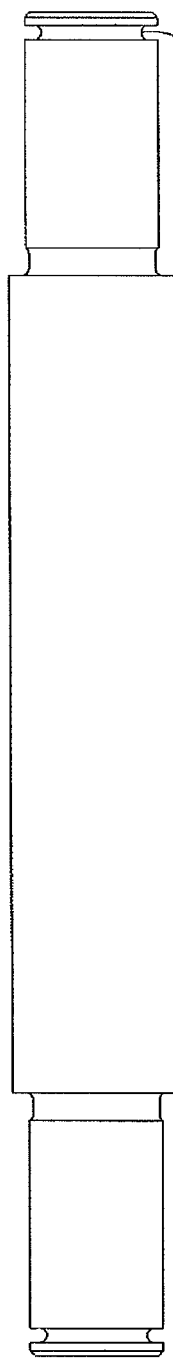

FIG. 145 is an elevational view of the roller axle of FIG. 144.

Figure 146:
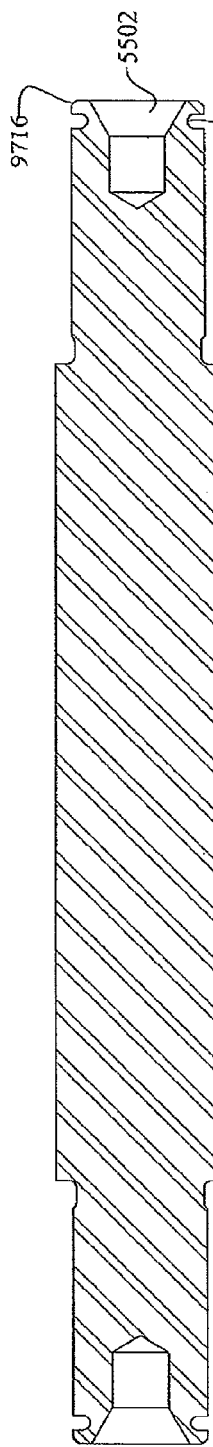

FIG. 146 is a cross-sectional view of the roller axel of FIG. 145.

Figure 147:
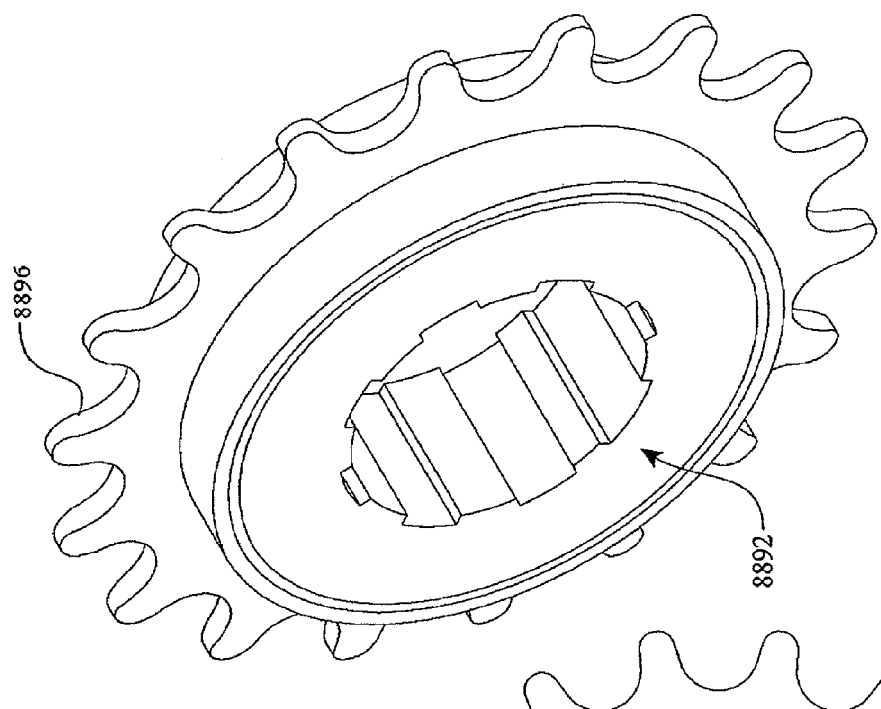

FIG. 147 is a perspective view of a freewheel for use with a CVT.

Figure 148:
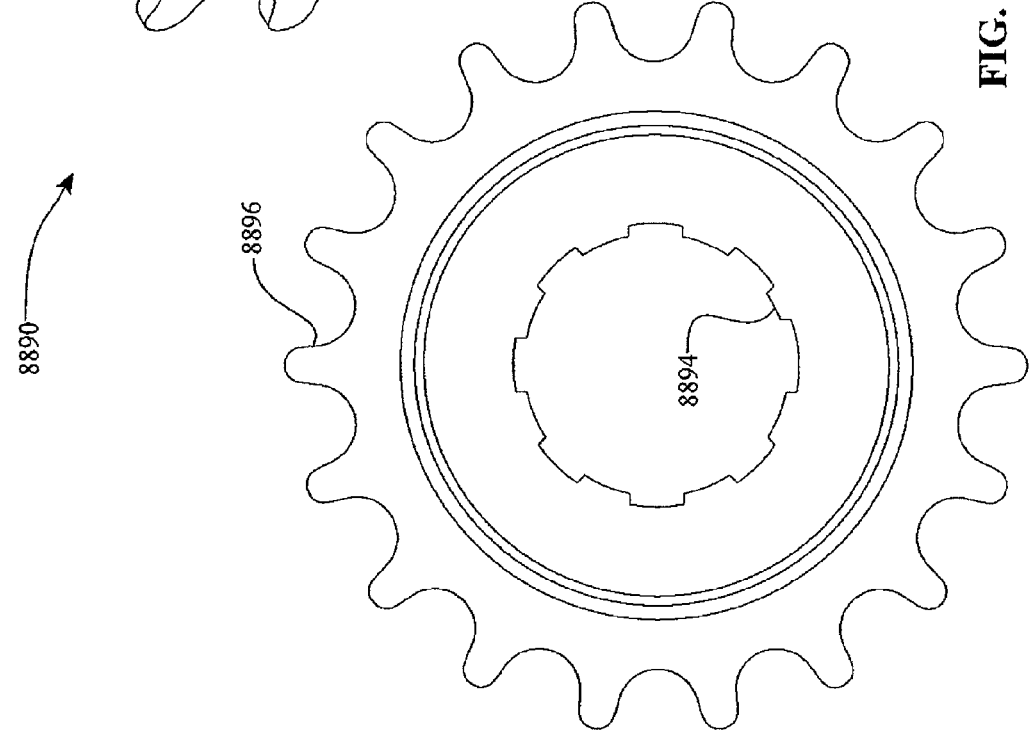

FIG. 148 is a front, elevational view of the freewheel of FIG. 147.

Figure 149:
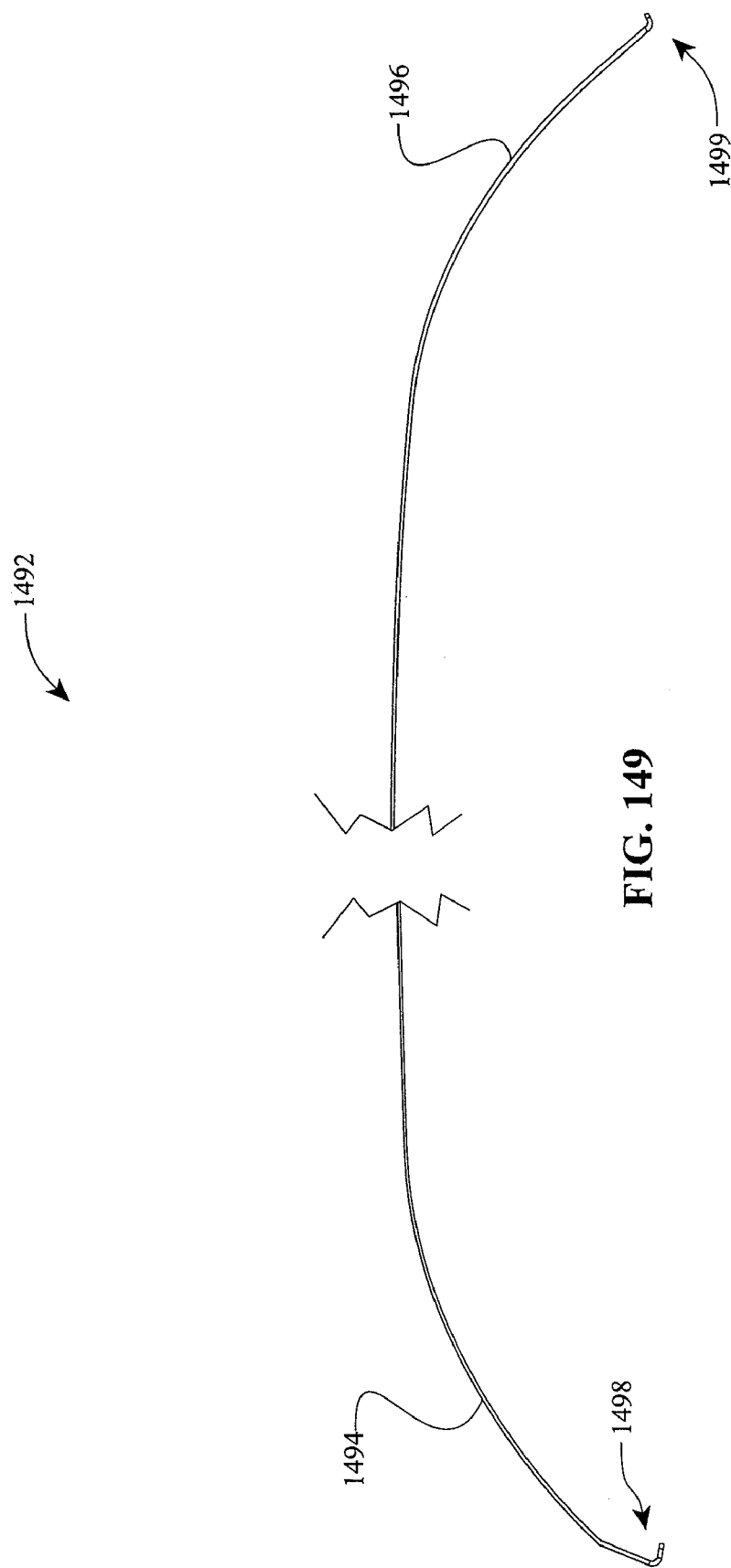

FIG. 149 is plan view of yet another torsion spring for use with a CVT.

Figure 150:
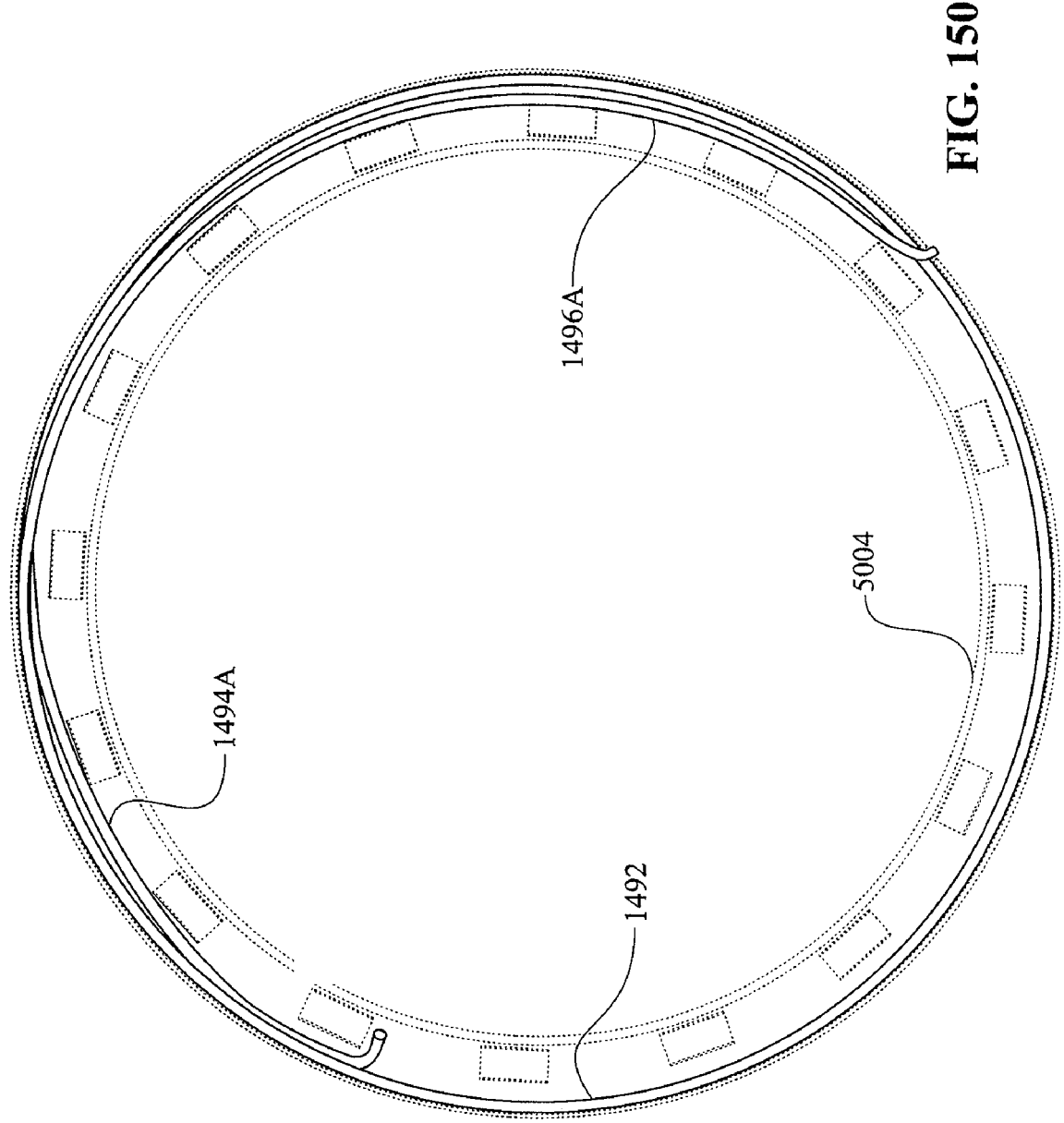

FIG. 150 is a plan view of a torsion spring, in a roller cage retainer, without the conforming bends of the torsion spring of FIG. 149.

Figure 151:
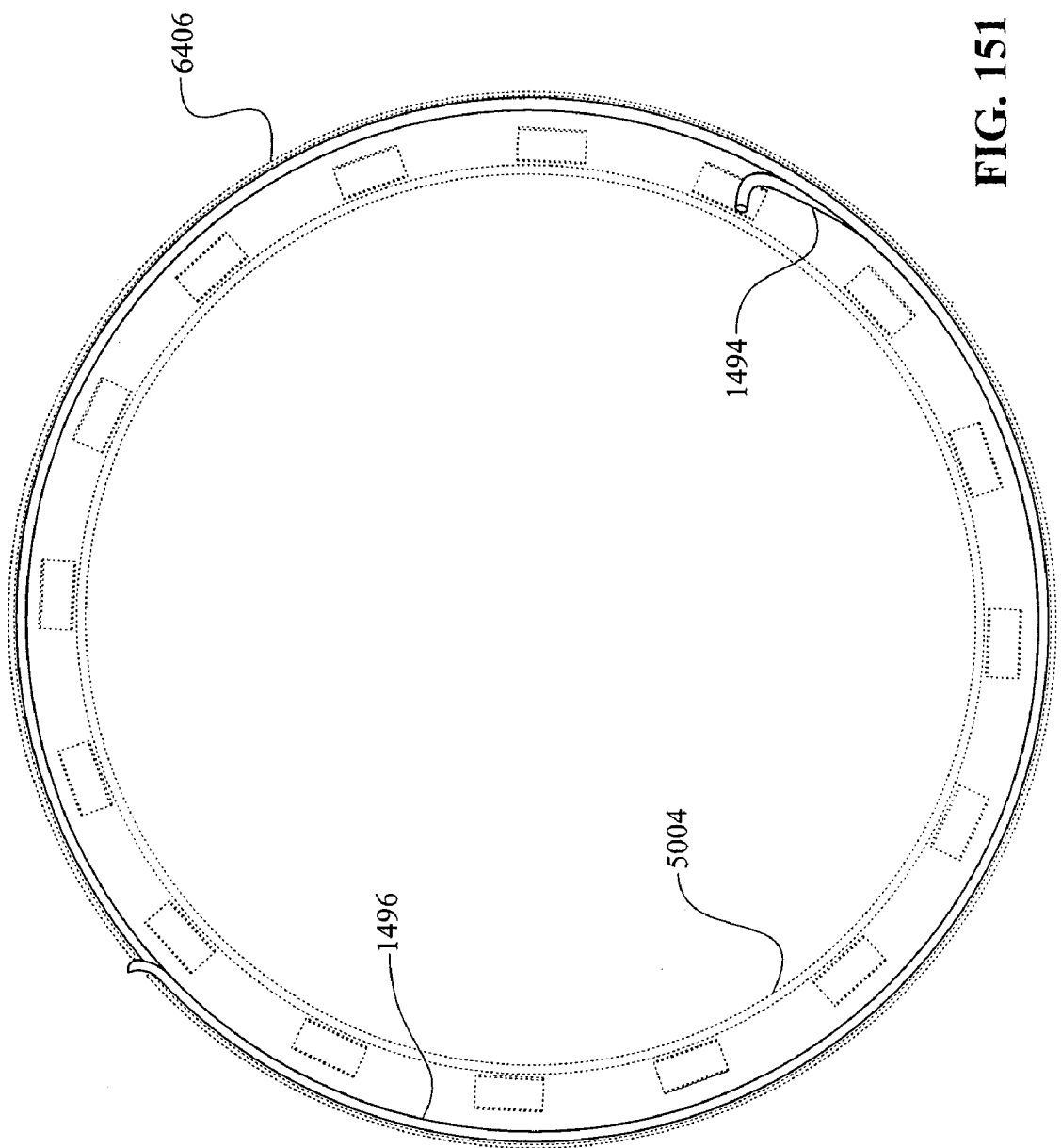

FIG. 151 is a plan view of the torsion spring of FIG. 149 in a roller cage retainer.

DETAILED DESCRIPTION OF CERTAIN INVENTIVE EMBODIMENTS

The preferred embodiments will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described. The CVT embodiments described here are generally of the type disclosed in U.S. Pat. Nos. 6,241,636; 6,419,608; 6,689,012; and 7,011,600. The entire disclosure of each of these patents is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be obvious to a person of ordinary skill in the relevant technology.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components labeled similarly (for example, control piston 582A and control piston 582B) will be referred to collectively by a single label (for example, control pistons 582).

Referencing FIG. 1 now, it illustrates a spherical-type CVT 100 that can change input to output speed ratios. The CVT 100 has a central shaft 105 extending through the center of the CVT 100 and beyond two rear dropouts 10 of the frame of a bicycle. A first cap nut 106 and second cap nut 107, each located at a corresponding end of the central shaft 105, attach the central shaft 105 to the dropouts. Although this embodiment illustrates the CVT 100 for use on a bicycle, the CVT 100 can be implemented on any equipment that makes use of a transmission. For purposes of description, the central shaft 105 defines a longitudinal axis of the CVT that will serve as a reference point for describing the location and or motion of other components of the CVT. As used here, the terms "axial," "axially," "lateral," "laterally," refer to a position or direction that is coaxial or parallel with the longitudinal axis defined by the central shaft 105. The terms "radial" and "radially" refer to locations or directions that extend perpendicularly from the longitudinal axis.

Figure 2:
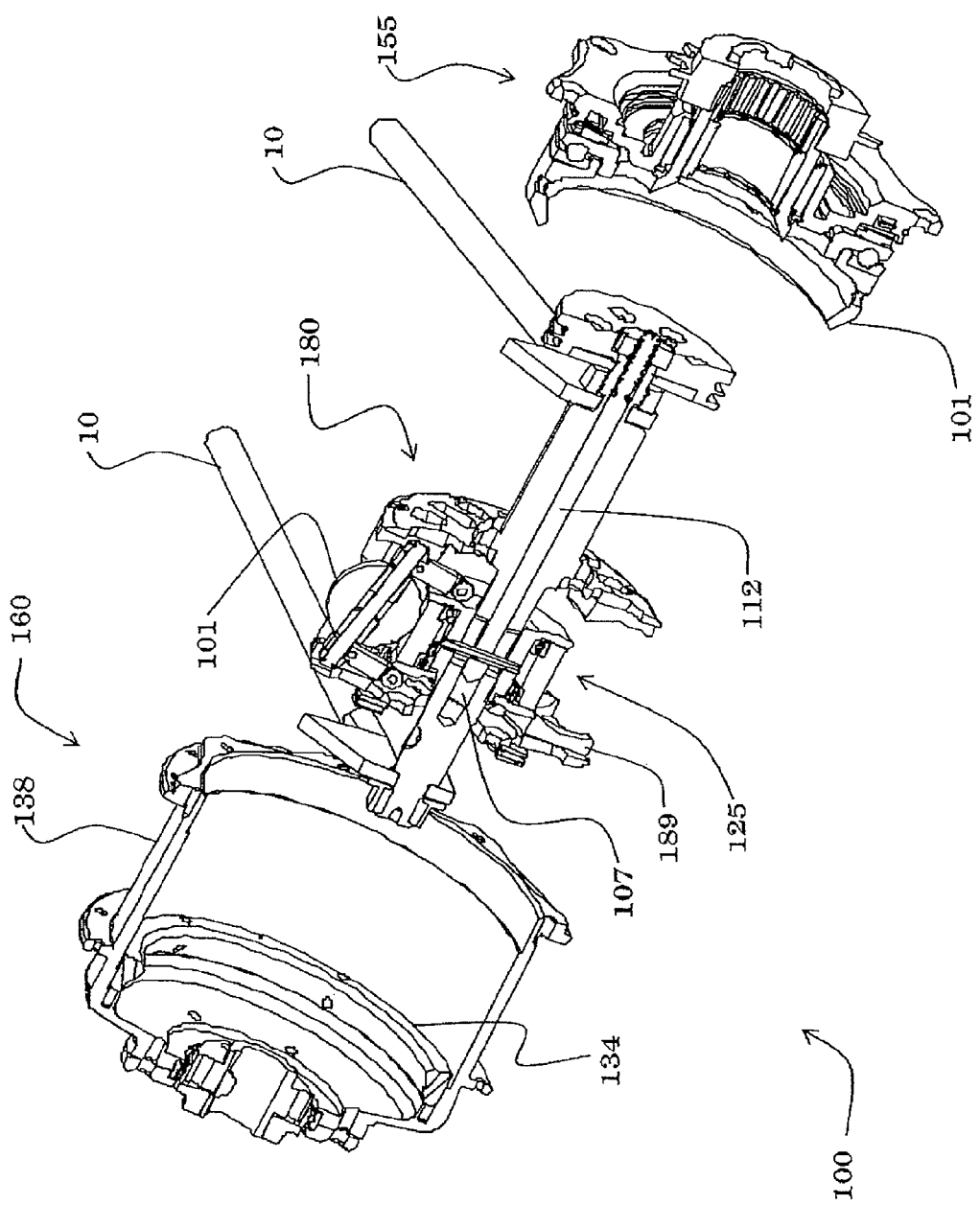
FIG. 2 is a partially exploded cross-sectional view of the CVT of FIG. 1.

Referring to FIGS. 1 and 2, the central shaft 105 provides radial and lateral support for a cage assembly 180, an input assembly 155 and an output assembly 160. In this embodiment, the central shaft 105 includes a bore 199 that houses a shift rod 112. As will be described later, the shift rod 112 actuates a speed ratio shift in the CVT 100.

The CVT 100 includes a variator 140. The variator 140 can be any mechanism adapted to change the ratio of input speed to output speed. In one embodiment, the variator 140 includes an input disc 110, an output disc 134, tiltable ball-leg assemblies 150 and an idler assembly 125. The input disc 110 may be a disc mounted rotatably and coaxially about the central shaft 105. At the radial outer edge of the input disc 110, the disc extends at an angle to a point where it terminates at a contact surface 111. In some embodiments, the contact surface 111 can be a separate structure, for example a ring that attaches to the input disc 110, which would provide support for the contact surface 111. The contact surface 111 may be threaded, or press fit, into the input disc 110 or it can be attached with any suitable fasteners or adhesives.

The output disc 134 can be a ring that attaches, by press fit or otherwise, to an output hub shell 138. In some embodiments, the input disc 110 and the output disc 134 have support structures 113 that extend radially outward from contact surfaces 111 and that provide structural support to increase radial rigidity, to resist compliance of those parts under the axial force of the CVT 100, and to allow axial force mechanisms to move radially outward, thereby reducing the length of the CVT 100. The input disc 110 and the output disc 134 can have oil ports 136, 135 to allow lubricant in the variator 140 to circulate through the CVT 100.

The hub shell 138 in some embodiments is a cylindrical tube rotatable about the central shaft 105. The hub shell 138 has an inside that houses most of the components of the CVT 100 and an outside adapted to connect to whatever component, equipment or vehicle uses the CVT. Here the outside of the hub shell 138 is configured to be implemented on a bicycle. However, the CVT 100 can be used in any machine where it is desirable to adjust rotational input and output speeds.

Referring to FIGS. 1, 2, 10 and 11 a CVT may include a ball-leg assembly 150 for transmitting torque from the input disc 110 to the output disc 134 and varying the ratio of input speed to output speed. In some embodiments, the ball-leg assembly 150 includes a ball 101, a ball axle 102, and legs 103. The axle 102 can be a generally cylindrical shaft that extends through a bore formed through the center of the ball 101. In some embodiments, the axle 102 interfaces with the surface of the bore in the ball 101 via needle or radial bearings that align the ball 101 on the axle 102. The axle 102 extends beyond the sides of the ball 101 where the bore ends so that the legs 103 can actuate a shift in the position of the ball 101. Where the axle 102 extends beyond the edge of the ball 101, it couples to the radial outward end of the legs 103. The legs 103 are radial extensions that tilt the ball axle 102.

The axle 102 passes through a bore formed in the radially outward end of a leg 103. In some embodiments, the leg 103 has chamfers where the bore for the axle 102 passes through the legs 103, which provides for reduced stress concentration at the contact between the side of the leg 103 and the axle 102. This reduced stress increases the capacity of the ball-leg assembly 150 to absorb shifting forces and torque reaction. The leg 103 can be positioned on the axle 102 by clip rings, such as e-rings, or can be press fit onto the axle 102; however, any other type of fixation between the axle 102 and the leg 103 can be utilized. The ball-leg assembly 150 can also include leg rollers 151, which are rolling elements attached to each end of a ball axle 102 and provide for rolling contact of the axle 102 as it is aligned by other parts of the CVT 100. In some embodiments, the leg 103 has a cam wheel 152 at a radially inward end to help control the radial position of the leg 103, which controls the tilt angle of the axle 102. In yet other embodiments, the leg 103 couples to a stator wheel 1105 (see FIG. 11) that allows the leg 103 to be guided and supported in the stators 800 (see FIG. 8). As shown in FIG. 11, the stator wheel 1105 may be angled relative to the longitudinal axis of the leg 103. In some embodiments, the stator wheel 1105 is configured such that its central axis intersects with the center of the ball 101.

Still referring to FIGS. 1, 2, 10 and 11, in various embodiments the interface between the balls 101 and the axles 102 can be any of the bearings described in other embodiments below. However, the balls 101 are fixed to the axles in other embodiments and rotate with the balls 101. In some such embodiments, bearings (not shown) are positioned between the axles 102 and the legs 103 such that the transverse forces acting on the axles 102 are reacted by the legs 103 as well as, or alternatively, the cage (described in various embodiments below). In some such embodiments, the bearing positioned between the axles 102 and the legs 103 are radial bearings (balls or needles), journal bearings or any other type of bearings or suitable mechanism or means.

With reference to FIGS. 1, 2, 3, 4 and 10, the idler assembly 125 will now be described. In some embodiments, the idler assembly 125 includes an idler 126, cam discs 127, and idler bearings 129. The idler 126 is a generally cylindrical tube. The idler 126 has a generally constant outer diameter; however, in other embodiments the outer diameter is not constant. The outer diameter may be smaller at the center portion than at the ends, or may be larger at the center and smaller at the ends. In other embodiments, the outer diameter is larger at one end than at the other and the change between the two ends may be linear or non-linear depending on shift speed and torque requirements.

The cam discs 127 are positioned on either or both ends of the idler 126 and interact with the cam wheels 152 to actuate the legs 103. The cam discs 127 are convex in the illustrated embodiment, but can be of any shape that produces a desired motion of the legs 103. In some embodiments, the cam discs 127 are configured such that their axial position controls the radial position of the legs 103, which governs the angle of tilt of the axles 102.

In some embodiments, the radial inner diameter of the cam discs 127 extends axially toward one another to attach one cam disc 127 to the other cam disc 127. Here, a cam extension 128 forms a cylinder about the central shaft 105. The cam extension 128 extends from one cam disc 127 to the other cam disc 127 and is held in place there by a clip ring, a nut, or some other suitable fastener. In some embodiments, one or both of the cam discs 127 are threaded onto the cam disc extension 128 to fix them in place. In the illustrated embodiment, the convex curve of the cam disc 127 extends axially away from the axial center of the idler assembly 125 to a local maximum, then radially outward, and back axially inward toward the axial center of the idler assembly 125. This cam profile reduces binding that can occur during shifting of the idler assembly 125 at the axial extremes. Other cam shapes can be used as well.

In the embodiment of FIG. 1, a shift rod 112 actuates a transmission ratio shift of the CVT 100. The shift rod 112, coaxially located inside the bore 199 of the central shaft 105, is an elongated rod having a threaded end 109 that extends out one side of the central shaft 105 and beyond the cap nut 107. The other end of the shift rod 112 extends into the idler assembly 125 where it contains a shift pin 114, which mounts generally transversely in the shift rod 112. The shift pin 114 engages the idler assembly 125 so that the shift rod 112 can control the axial position of the idler assembly 125. A lead screw assembly 115 controls the axial position of the shift rod 112 within the central shaft 105. In some embodiments, the lead screw assembly 125 includes a shift actuator 117, which may be a pulley having a set of tether threads 118 on its outer diameter with threads on a portion of its inner diameter to engage the shift rod 112. The lead screw assembly 115 may be held in its axial position on the central shaft 105 by any means, and here is held in place by a pulley snap ring 116. The tether threads 118 engage a shift tether (not shown). In some embodiments, the shift tether is a standard shift cable, while in other embodiments the shift tether can be any tether capable of supporting tension and thereby rotating the shift pulley 117.

Referring to FIGS. 1 and 2, the input assembly 155 allows torque transfer into the variator 140. The input assembly 155 has a sprocket 156 that converts linear motion from a chain (not shown) into rotational motion. Although a sprocket is used here, other embodiments of the CVT 100 may use a pulley that accepts motion from a belt, for example. The sprocket 156 transmits torque to an axial force generating mechanism, which in the illustrated embodiment is a cam loader 154 that transmits the torque to the input disc 110. The cam loader 154 includes a cam disc 157, a load disc 158 and a set of cam rollers 159. The cam loader 154 transmits torque from the sprocket 156 to the input disc 110 and generates an axial force that resolves into the contact force for the input disc 110, the balls 101, the idler 126 and the output disc 134. The axial force is generally proportional to the amount of torque applied to the cam loader 154. In some embodiments, the sprocket 156 applies torque to the cam disc 157 via a one-way clutch (detail not shown) that acts as a coasting mechanism when the hub 138 spins but the sprocket 156 is not supplying torque. In some embodiments, the load disc 158 may be integral as a single piece with the input disc 157. In other embodiments, the cam loader 154 may be integral with the output disc 134.

In FIGS. 1 and 2, the internal components of the CVT 100 are contained within the hub shell 138 by an end cap 160. The end cap 160 is a generally flat disc that attaches to the open end of the hub shell 138 and has a bore through the center to allow passage of the cam disc 157, the central shaft 105 and the shift rod 112. The end cap 160 attaches to the hub shell 138 and serves to react the axial force created by the cam loader 154. The end cap 160 can be made of any material capable of reacting the axial force such as for example, aluminum, titanium, steel, or high strength thermoplastics or thermoset plastics. The end cap 160 fastens to the hub shell 138 by fasteners (not shown); however, the end cap 160 can also thread into, or can otherwise be attached to, the hub shell 138. The end cap 160 has a groove formed about a radius on its side facing the cam loader 154 that houses a preloader 161.

The preloader 161 can be a spring that provides and an initial clamp force at very low torque levels. The preloader 161 can be any device capable of supplying an initial force to the cam loader 154, and thereby to the input disc 134, such as a spring, or a resilient material like an o-ring. The preloader 161 can be a wave-spring as such springs can have high spring constants and maintain a high level of resiliency over their lifetimes. Here the preloader 161 is loaded by a thrust washer 162 and a thrust bearing 163 directly to the end cap 160. In this embodiment, the thrust washer 162 is a typical ring washer that covers the groove of the preloader 161 and provides a thrust race for the thrust bearing 163. The thrust bearing 163 may be a needle thrust bearing that has a high level of thrust capacity, improves structural rigidity, and reduces tolerance requirements and cost when compared to combination thrust radial bearings; however, any other type of thrust bearing or combination bearing can be used. In certain embodiments, the thrust bearing 163 is a ball thrust bearing. The axial force developed by the cam loader 154 is reacted through the thrust bearing 163 and the thrust washer 162 to the end cap 160. The end cap 160 attaches to the hub shell 138 to complete the structure of the CVT 100.

In FIGS. 1 and 2, a cam disc bearing 172 holds the cam disc 157 in radial position with respect to the central shaft 105, while an end cap bearing 173 maintains the radial alignment between the cam disc 157 and the inner diameter of the end cap 160. Here the cam disc bearing 172 and the end cap bearing 173 are needle roller bearings; however, other types of radial bearings can be used as well. The use of needle roller bearings allow increased axial float and accommodates binding moments developed by the rider and the sprocket 156. In other embodiments of the CVT 100 or any other embodiment described herein, each of or either of the can disc bearing 172 and the end cap bearing 173 can also be replaced by a complimentary pair of combination radial-thrust bearings. In such embodiments, the radial thrust bearings provide not only the radial support but also are capable of absorbing thrust, which can aid and at least partially unload the thrust bearing 163.

Still referring to FIGS. 1 and 2, an axle 142, being a support member mounted coaxially about the central shaft 105 and held between the central shaft 105 and the inner diameter of the closed end of the hub shell 138, holds the hub shell 138 in radial alignment with respect to the central shaft 105. The axle 142 is fixed in its angular alignment with the central shaft 105. Here a key 144 fixes the axle 142 in its angular alignment, but the fixation can be by any means known to those of skill in the relevant technology. A radial hub bearing 145 fits between the axle 142 and the inner diameter of the hub shell 138 to maintain the radial position and axial alignment of the hub shell 138. The hub bearing 145 is held in place by an encapsulating axle cap 143. The axle cap 143 is a disc having a central bore that fits around central shaft 105 and here attaches to the hub shell 138 with fasteners 147. A hub thrust bearing 146 fits between the hub shell 138 and the cage 189 to maintain the axial positioning of the cage 189 and the hub shell 138.

Figure 3:
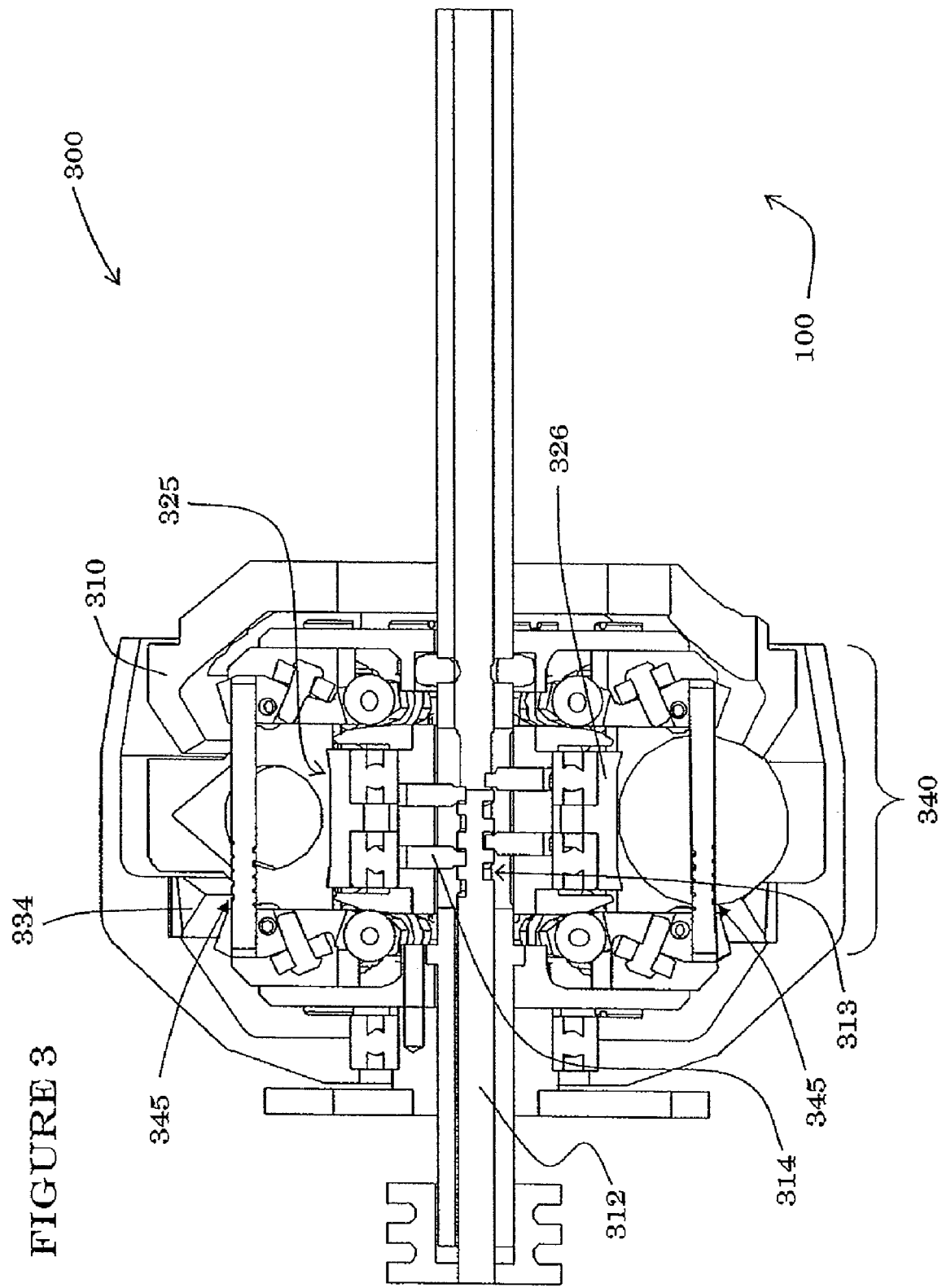
FIG. 3 is a cross-sectional view of a second embodiment of a CVT.
Figure 4:
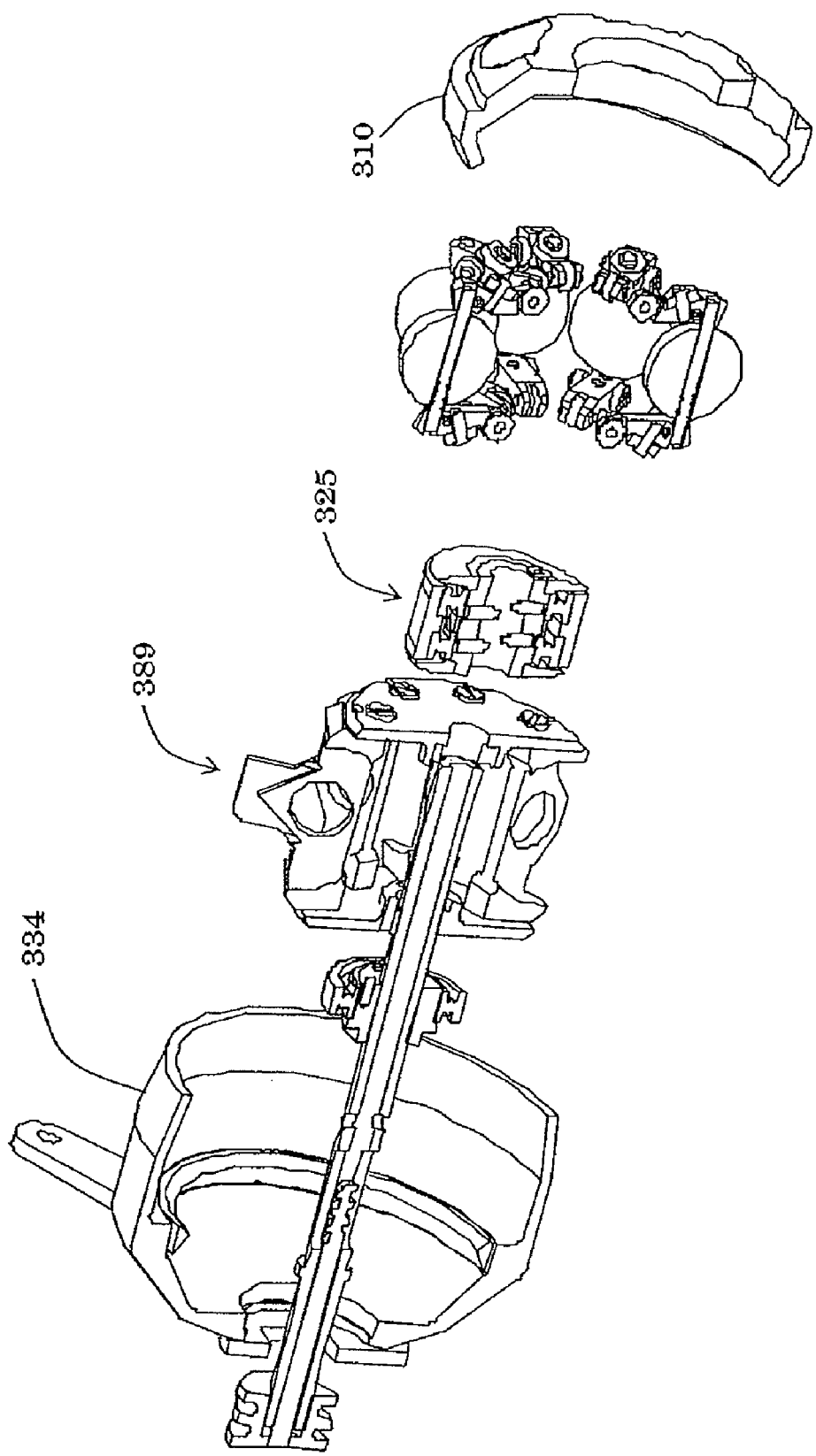
FIG. 4 is a partially exploded cross-sectional view of the CVT of FIG. 3.
Figures 5A, 5B, 6A, 6B:
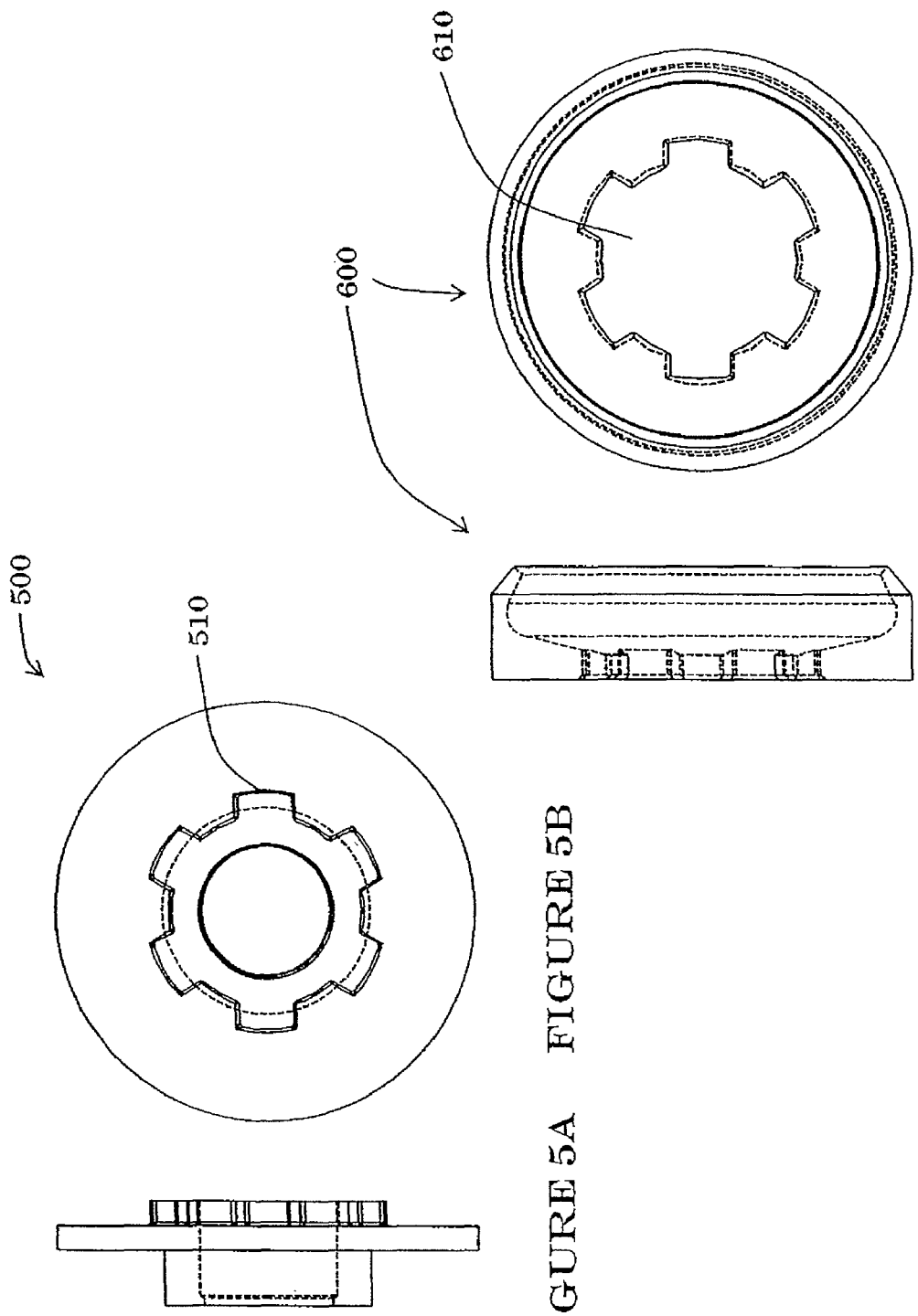
FIG. 5*a* is a side view of a splined input disc driver that can be used in a CVT.
FIG. 5*b* is a front view of the disc driver of FIG. 5*a*.
FIG. 6*a* is a side view of a splined input disc that can be used in a CVT.
FIG. 6*b* is a front view of the splined input disc of FIG. 6*a*.
Figure 10:
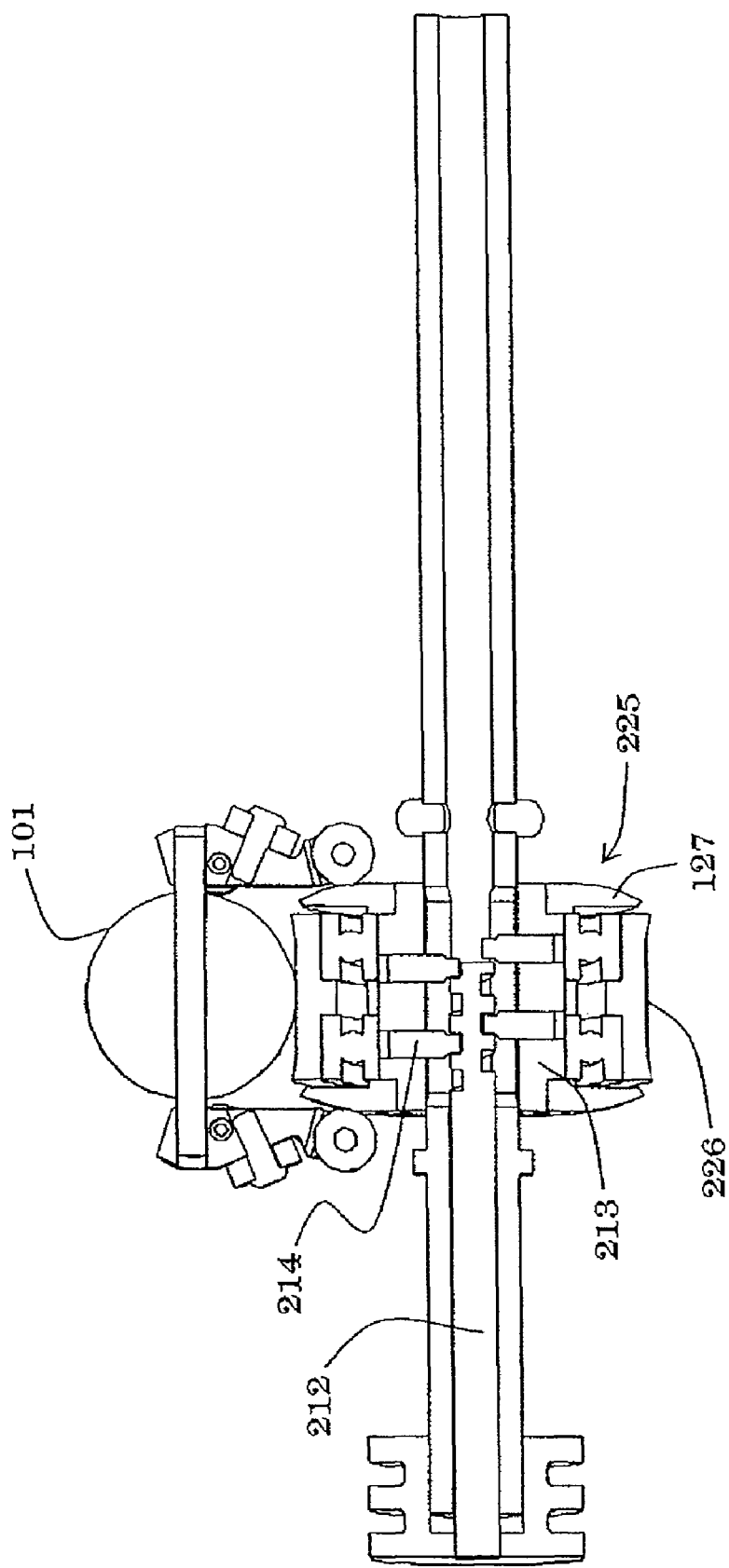
FIG. 10 is a sectional view of a shifter assembly that can be used in a CVT.

FIGS. 3, 4 and 10 illustrate a CVT 300, which is an alternative embodiment of the CVT 100 described above. Many of the components are similar between the CVT 100 embodiments described above and that of the present figures. Here, the angles of the input and output discs 310, 334 respectively are decreased to allow for greater strength to withstand axial forces and to reduce the overall radial diameter of the CVT 300. This embodiment shows an alternate shifting mechanism, where the lead screw mechanism to actuate axial movement of the idler assembly 325 is formed on the shift rod 312. The lead screw assembly is a set of lead threads 313 formed on the end of the shift rod 312 that is within or near the idler assembly 325. One or more idler assembly pins 314 extend radially from the cam disc extensions 328 into the lead threads 313 and move axially as the shift rod 312 rotates.

In the illustrated embodiment, the idler 326 does not have a constant outer diameter, but rather has an outer diameter that increases at the ends of the idler 326. This allows the idler 326 to resist forces of the idler 326 that are developed through the dynamic contact forces and spinning contact that tend to drive the idler 326 axially away from a center position. However, this is merely an example and the outer diameter of the idler 326 can be varied in any manner a designer desires in order to react the spin forces felt by the idler 326 and to aid in shifting of the CVT 300.

Referring now to FIGS. 5a, 5b, 6a, and 6b, a two part disc is made up of a splined disc 600 and a disc driver 500. The disc driver 500 and the splined disc 600 fit together through splines 510 formed on the disc driver 500 and a splined bore 610 formed in the splined disc 600. The splines 510 fit within the splined bore 610 so that the disc driver 500 and the splined disc 600 form a disc for use in the CVT 100, CVT 300, or any other spherical CVT. The splined disc 600 provides for compliance in the system to allow the variator 140, 340 to find a radial equilibrium position to reduce sensitivity to manufacturing tolerances of the components of a variator 140, 340.

Figure 7:
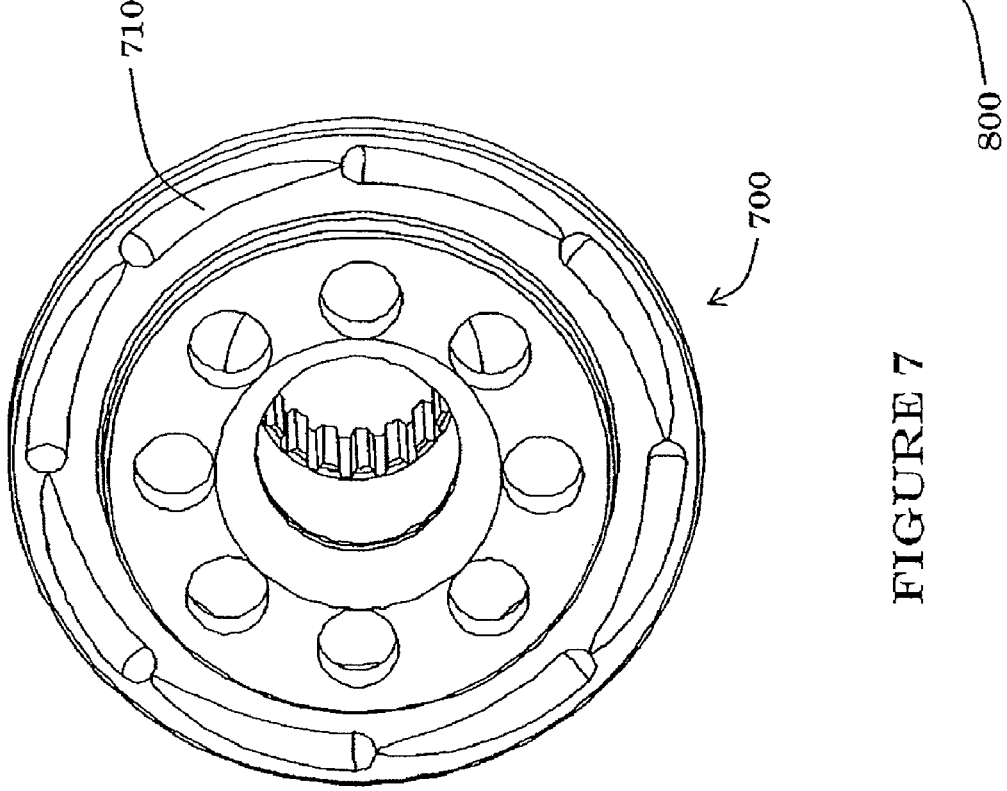
FIG. 7 is a cam roller disc that can be used with a CVT.

FIG. 7 illustrates a cam disc 700 that can be used in the CVT 100, CVT 300, other spherical CVTs or any other type of CVT. The cam disc 700 has cam channels 710 formed in its radial outer edge. The cam channels 710 house a set of cam rollers (not shown) which in this embodiment are spheres (such as bearing balls) but can be any other shape that combines with the shape of the cam channel 710 to convert torque into torque and axial force components to moderate the axial force applied to the variator 140, 340 in an amount proportional to the torque applied to the CVT. Other such shapes include cylindrical rollers, barreled rollers, asymmetrical rollers or any other shape. The material used for the cam disc channels 710 in many embodiments is preferably strong enough to resist excessive or permanent deformation at the loads that the cam disc 700 will experience. Special hardening may be needed in high torque applications. In some embodiments, the cam disc channels 710 are made of carbon steel hardened to Rockwell hardness values above 40 HRC. The efficiency of the operation of the cam loader (154 of FIG. 1, or any other type of cam loader) can be affected by the hardness value, typically by increasing the hardness to increase the efficiency; however, high hardening can lead to brittleness in the cam loading components and can incur higher cost as well. In some embodiments, the hardness is above 50 HRC, while in other embodiments the hardness is above 55 HRC, above 60 HRC and above 65 HRC.

FIG. 7 shows an embodiment of a conformal cam. That is, the shape of the cam channel 710 conforms to the shape of the cam rollers. Since the channel 710 conforms to the roller, the channel 710 functions as a bearing roller retainer and the requirement of a cage element is removed. The embodiment of FIG. 7 is a single direction cam disc 700; however, the cam disc can be a bidirectional cam as in the CVT 1300 (see FIG. 13). Eliminating the need for a bearing roller retainer simplifies the design of the CVT. A conformal cam channel 710 also allows the contact stress between the bearing roller and the channel 710 to be reduced, allowing for reduced bearing roller size and/or count, or for greater material choice flexibility.

Figure 8:
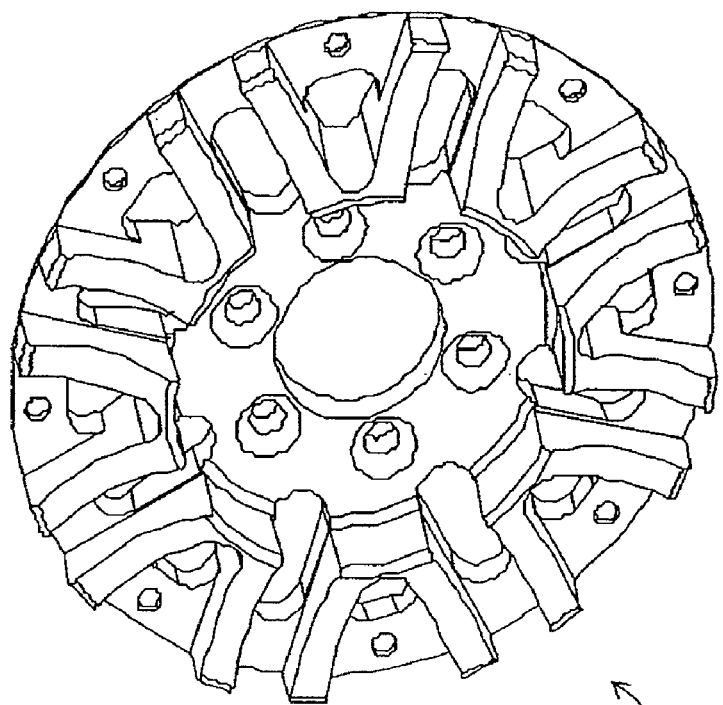
FIG. 8 is a stator that can be used with a CVT.

FIG. 8 illustrates a cage disc 800 used to form the rigid support structure of the cage 189 of the variators 140, 340 in spherical CVTs 100, 300 (and other types). The cage disc 800 is shaped to guide the legs 103 as they move radially inward and outward during shifting. The cage disc 800 also provides the angular alignment of the axles 102. In some embodiments, the corresponding grooves of two cage discs 800 for a respective axle 102 are offset slightly in the angular direction to reduce shift forces in the variators 140 and 340.

Legs 103 are guided by slots in the stators. Leg rollers 151 on the legs 103 follow a circular profile in the stators. The leg rollers 151 generally provide a translational reaction point to counteract translational forces imposed by shift forces or traction contact spin forces. The legs 103 as well as its respective leg rollers 151 move in planar motion when the CVT ratio is changed and thus trace out a circular envelope which is centered about the ball 101. Since the leg rollers 151 are offset from the center of the leg 103, the leg rollers 151 trace out an envelope that is similarly offset. To create a compatible profile on each stator to match the planar motion of the leg rollers 151, a circular cut is required that is offset from the groove center by the same amount that the roller is offset in each leg 103. This circular cut can be done with a rotary saw cutter; however, it requires an individual cut at each groove. Since the cuts are independent, there is a probability of tolerance variation from one groove to the next in a single stator, in addition to variation between stators. A method to eliminate this extra machining step is to provide a single profile that can be generated by a lath turning operation. A toroidal-shaped lathe cut can produce this single profile in one turning operation. The center of the toroidal cut is adjusted away from the center of the ball 101 position in a radial direction to compensate for offset of the leg rollers 103.

Figure 9:
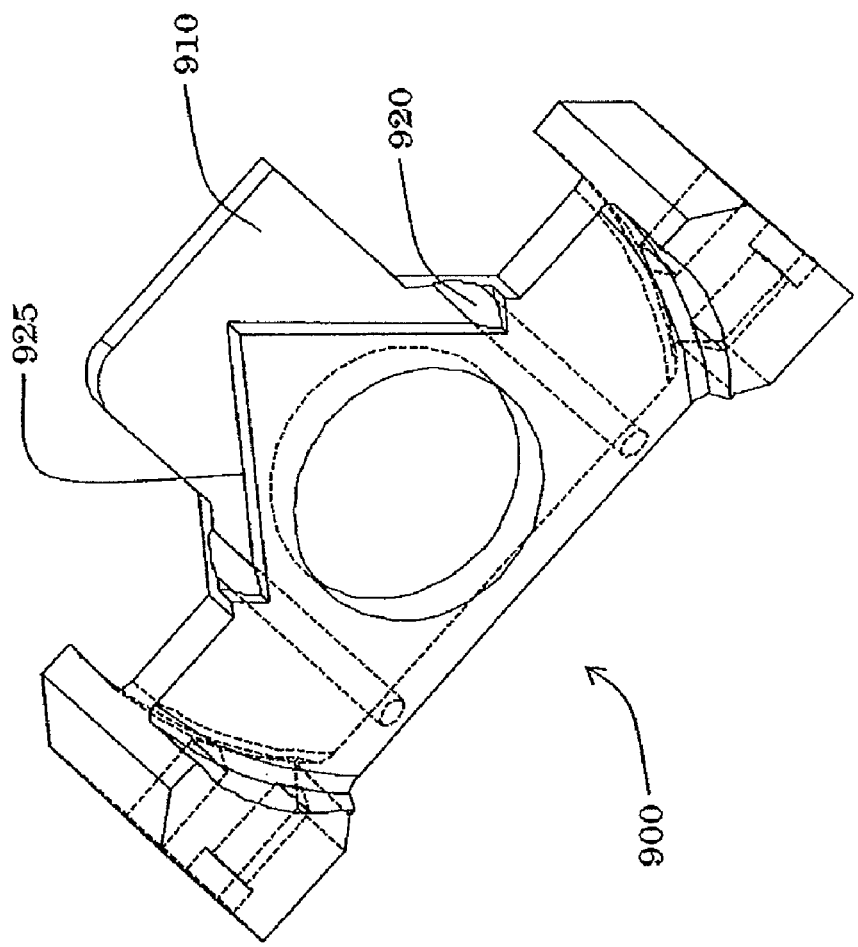
FIG. 9 is a perspective view of a scraping spacer that can be used with a CVT.

Referring now to FIGS. 1, 9 and 12, an alternative embodiment of a cage assembly 1200 is illustrated implementing a lubrication enhancing lubricating spacer 900 for use with some CVTs where spacers 1210 support and space apart two cage discs 1220. In the illustrated embodiment, the support structure for the power transmission elements, in this case the cage 389, is formed by attaching input and output side cage discs 1220 to a plurality of spacers 1210, including one or more lubricating spacers 900 with cage fasteners 1230. In this embodiment, the cage fasteners 1230 are screws but they can be any type of fastener or fastening method. The lubricating spacer 900 has a scraper 910 for scraping lubricant from the surface of the hub shell 138 and directing that lubricant back toward the center elements of the variator 140 or 340. The lubricating spacer 900 of some embodiments also has passages 920 to help direct the flow of lubricant to the areas that most utilize it. In some embodiments, a portion of the spacer 900 between the passages 920 forms a raised wedge 925 that directs the flow of lubricant towards the passages 920. The scraper 910 may be integral with the spacer 900 or may be separate and made of a material different from the material of the scraper 910, including but not limited to rubber to enhance scraping of lubricant from the hub shell 138. The ends of the spacers 1210 and the lubricating spacers 900 terminate in flange-like bases 1240 that extend perpendicularly to form a surface for mating with the cage discs 1220. The bases 1240 of the illustrated embodiment are generally flat on the side facing the cage discs 1240 but are rounded on the side facing the balls 101 so as to form the curved surface described above that the leg rollers 151 ride on. The bases 1240 also form the channel in which the legs 103 ride throughout their travel.

An embodiment of a lubrication system and method will now be described with reference to FIGS. 3, 9, and 10. As the balls 101 spin, lubricant tends to flow toward the equators of the balls 101, and the lubricant is then sprayed out against the hub shell 138. Some lubricant does not fall on the internal wall of the hub shell 138 having the largest diameter; however, centrifugal force makes this lubricant flow toward the largest inside diameter of the hub shell 138. The scraper 910 is positioned vertically so that it removes lubricant that accumulates on the inside of the hub shell 138. Gravity pulls the lubricant down each side of V-shaped wedge 925 and into the passages 920. The spacer 900 is placed such that the inner radial end of the passages 920 end in the vicinity of the cam discs 127 and the idler 126. In this manner, the idler 126 and the cam discs 127 receive lubrication circulating in the hub shell 138. In one embodiment, the scraper 910 is sized to clear the hub shell 138 by about 30 thousandths of an inch. Of course, depending on different applications, the clearance could be greater or smaller.

As shown in FIGS. 3 and 10, a cam disc 127 can be configured so that its side facing the idler 226 is angled in order to receive lubricant falling from the passages 920 and direct the lubricant toward the space between the cam disc 127 and the idler 226. After lubricant flows onto the idler 226, the lubricant flows toward the largest diameter of the idler 226, where some of the lubricant is sprayed at the axles 102. Some of the lubricant falls from the passages 920 onto the idler 226. This lubricant lubricates the idler 226 as well as the contact patch between the balls 101 and the idler 226. Due to the inclines on each side of the idler 226, some of the lubricant flows centrifugally out toward the edges of the idler 226, where it then sprays out radially.

Referring to FIGS. 1, 3 and 10, in some embodiments, lubricant sprayed from the idler 126, 226 towards the axle 102 falls on grooves 345, which receive the lubricant and pump it inside the ball 101. Some of the lubricant also falls on the contact surface 111 where the input disc 110 and output disc 134 contact the balls 101. As the lubricant exits on one side of the ball 101, the lubricant flows toward the equator of the balls 101 under centrifugal force. Some of this lubricant contacts the input disc 110 and ball 101 contact surface 111 and then flows toward the equator of the ball 101. Some of the lubricant flows out radially along a side of the output disc 134 facing away from the balls 101. In some embodiments, the input disc 110 and/or output disc 134 are provided with lubrication ports 136 and 135, respectively. The lubrication ports 135, 136 direct the lubrication toward the largest inside diameter of the hub shell 138.

Figure 13:
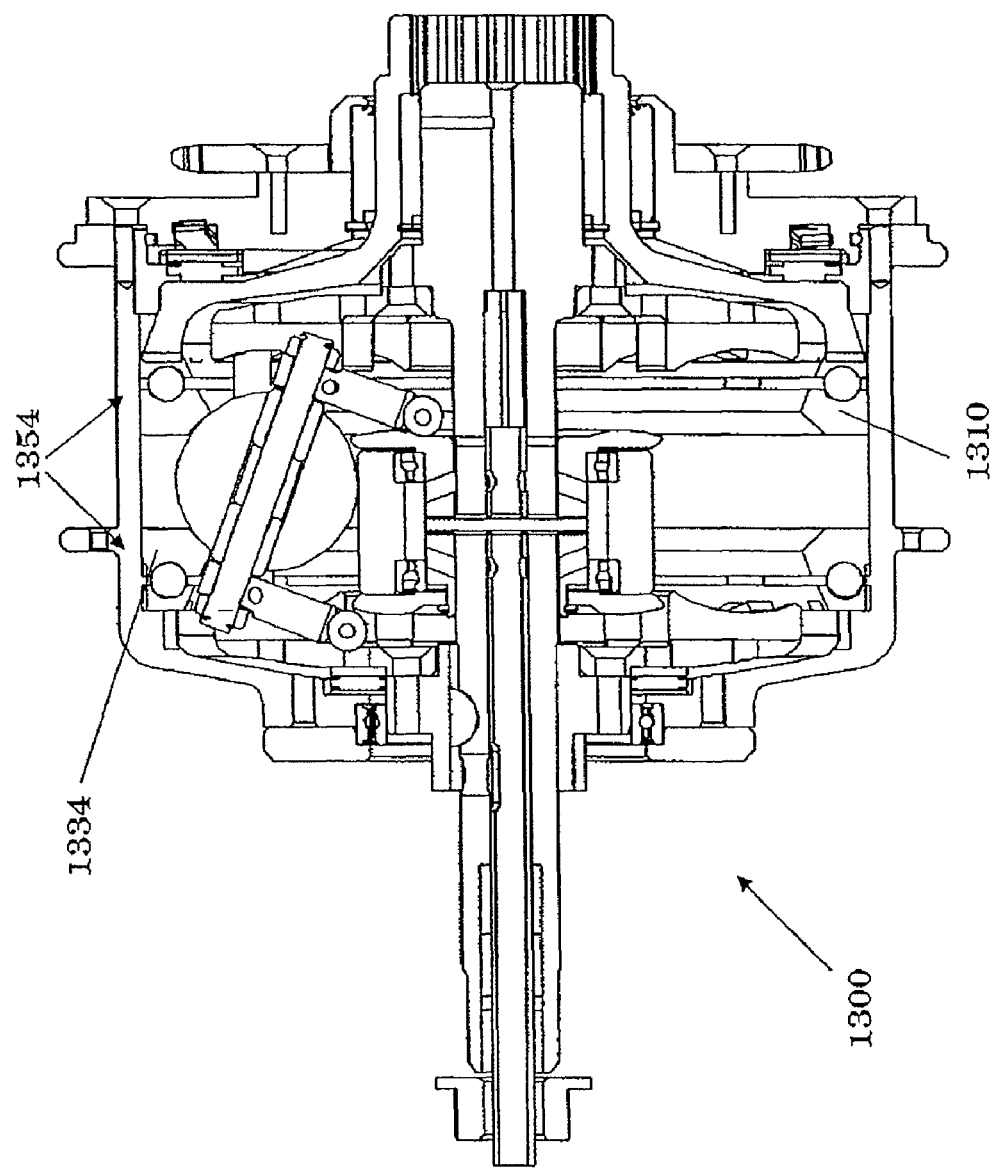
FIG. 13 is a cross-sectional view of another embodiment of a CVT.

FIG. 13 illustrates an embodiment of a CVT 1300 having two cam-loaders 1354 that share the generation and distribution of axial force in the CVT 1300. Here, the cam loaders 1354 are positioned adjacent to the input disc 1310 and the output disc 1334. The CVT 1300 illustrates how torque can be supplied either via the input disc 1310 and out through the output disc 1334 or reversed so that torque is input through the output disc 1334 and output through the input disc 1310.

Figure 14:
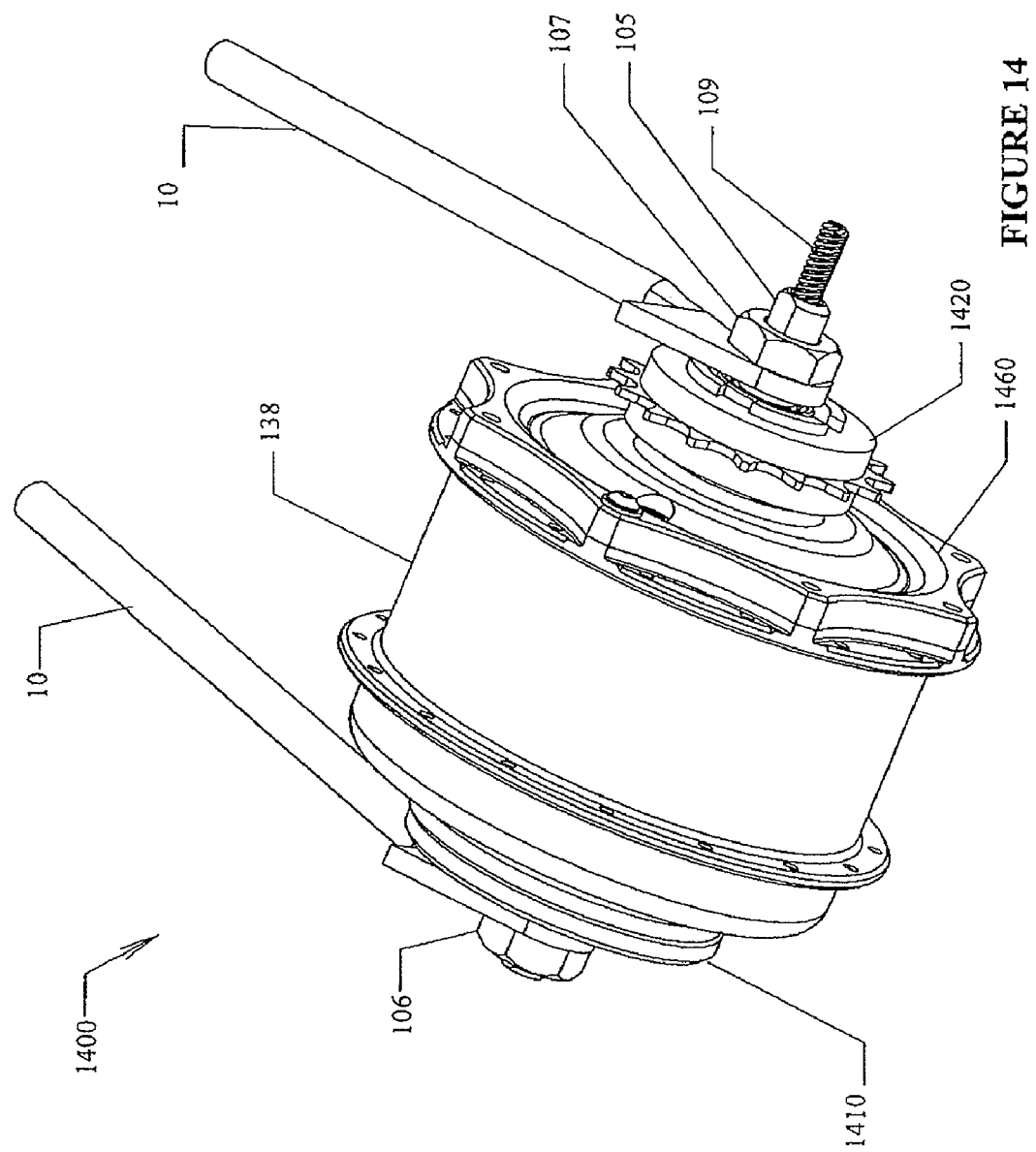
FIG. 14 is a perspective view of a bicycle hub using an embodiment of a CVT.

FIG. 14 depicts a bicycle hub 1400 configured to incorporate inventive features of embodiments of the CVTs described here. Several components of the hub 1400 are the same as components described above; hence, further description of such components will be limited. The hub 1400 includes a hub shell 138 that couples to a hub cap 1460. In some embodiments, the hub 1400 also includes an end cap 1410 that seals the end of the hub shell 138 opposite the hub cap 1460. The hub shell 138, the hub cap 1460, and the end cap 1410 are preferably made of materials that provide structural strength and rigidity. Such materials include, for example, steel, aluminum, magnesium, high-strength plastics, etc. In some embodiments, depending on the specific requirements of a given application of the technology, other materials might be appropriate. For example, the hub shell 138 may be made from composites, thermo plastics, thermoset plastics, etc.

Referring now to FIG. 14, the illustrated hub 1400 houses in its interior embodiments of the CVTs presented herein. A main shaft 105 supports the hub 1400 and provides for attachment to the dropouts 10 of a bicycle or other vehicle or equipment. The main shaft 105 of this embodiment is described in further detail with reference to FIGS. 41-43. In some embodiments, as illustrated in FIGS. 15-18, a CVT 1500 includes a shifting mechanism that incorporates a rod 112 with a threaded end 109. Nuts 106 and 107 lock the dropouts 10 to the main shaft 105. In the embodiment of FIG. 14, the hub 1400 includes a freewheel 1420 that is operationally coupled to an input shaft (see FIG. 33 and FIG. 40) for transferring a torque input into the CVT 1500. It should be noted that although various embodiments and features of the CVTs described here are discussed with reference to a bicycle application, through readily recognizable modifications the CVTs and features thereof can be used in any vehicle, machine or device that uses a transmission.

Figure 15:
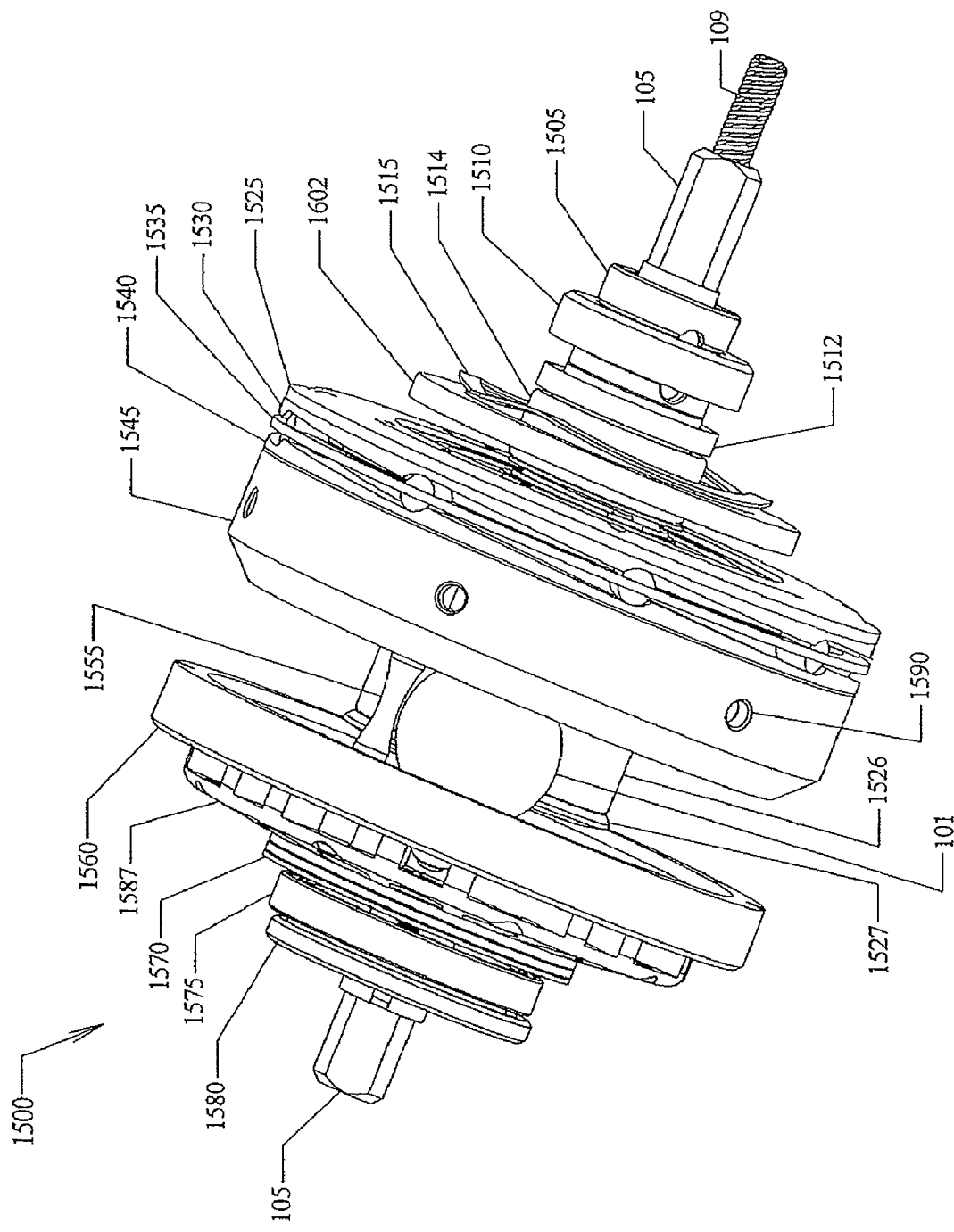
FIG. 15 is a top elevational view of various assemblies of an embodiment of a CVT incorporated in the bicycle hub of FIG. 14.
Figure 16:
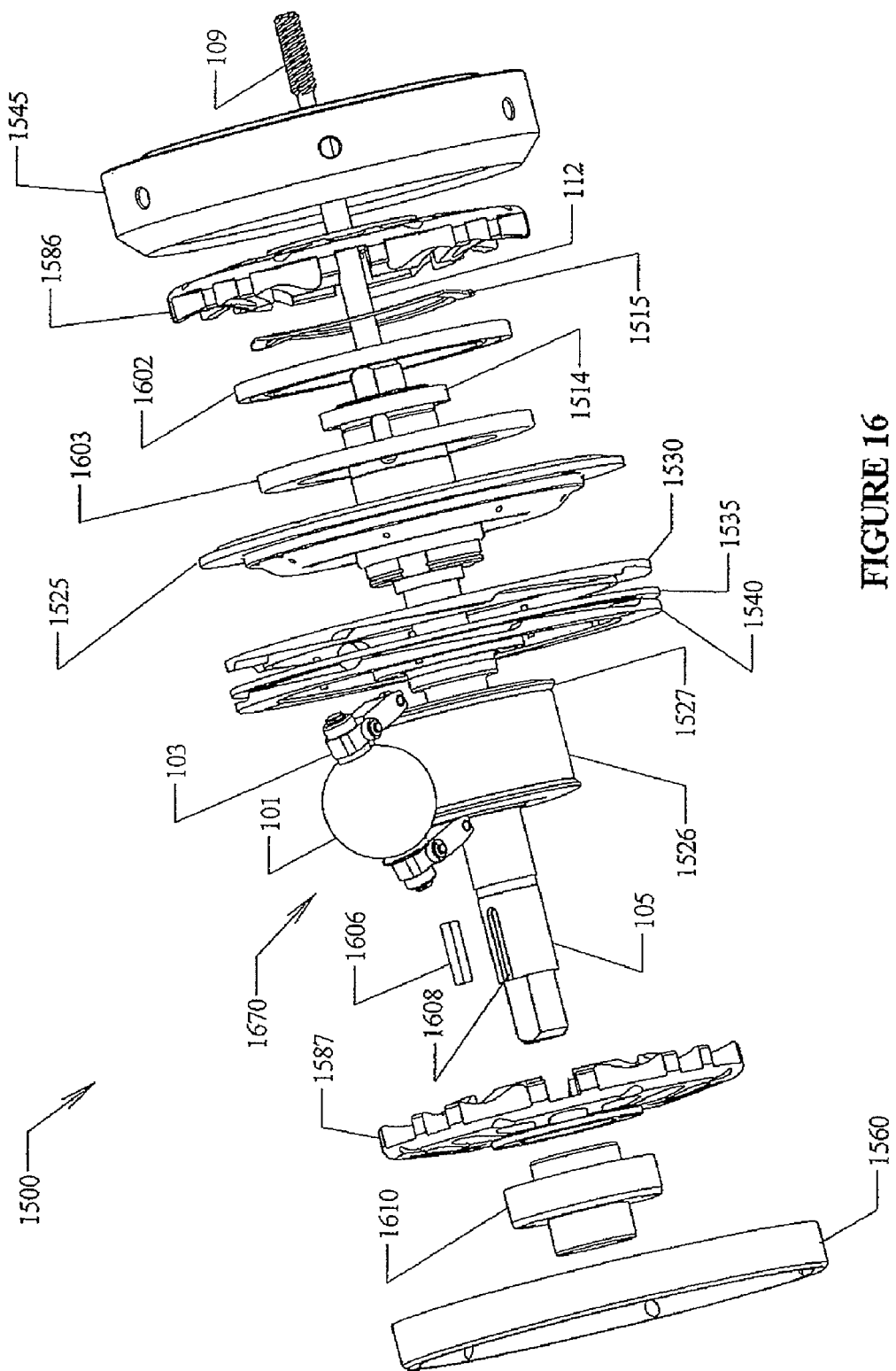
FIG. 16 is a partially exploded, perspective view of certain assemblies of the CVT of FIG. 15.

With reference to FIGS. 15 and 16, in one embodiment the CVT 1500 has an input disc 1545 for transferring torque to a set of spherical traction rollers (here shown as balls 101). FIG. 16 is a partially exploded view of the CVT 1500. The balls 101 transfer the torque to an output disc 1560. One ball 101 is illustrated in this embodiment to provide clarity in illustrating the various features of the CVT 1500, however, various embodiments of the CVT employ anywhere from 2 to 16 balls 101 or more depending on the torque, weight and size requirements of each particular application. Different embodiments use either 2, 3, 4, 5, 6, 7, 8, 9, 10, 11, 12, 13, 14, 15, 16 or more balls 101. An idler 1526, mounted coaxially about the main shaft 105, contacts and provides support for the balls 101 and maintains their radial position about the main shaft 105. The input disc 1545 of some embodiments has lubrication ports 1590 to facilitate circulation of lubricant in the CVT 1500.

Referring additionally to FIGS. 37-38, the ball 101 spins on an axle 3702. Legs 103 and shift cams 1527 cooperate to function as levers that actuate a shift in the position of the axle 3702, which shift results in a tilting of the ball 101 and, thereby, a shift in the transmission ratio as already explained above. A cage 1589 (see FIGS. 22-24) provides for support and alignment of the legs 103 as the shift cams 1527 actuate a radial motion of the legs 103. In one embodiment, the cage includes stators 1586 and 1587 that are coupled by stator spacers 1555. In other embodiments, other cages 180, 389, 1200 are employed.

Figure 41:
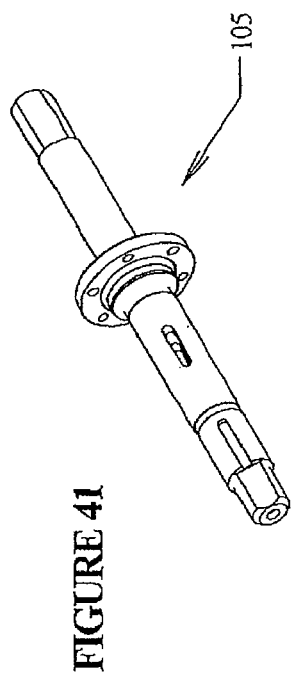
FIG. 41 is a perspective view of a main shaft that can be used with the CVT of FIG. 15.
Figure 42:
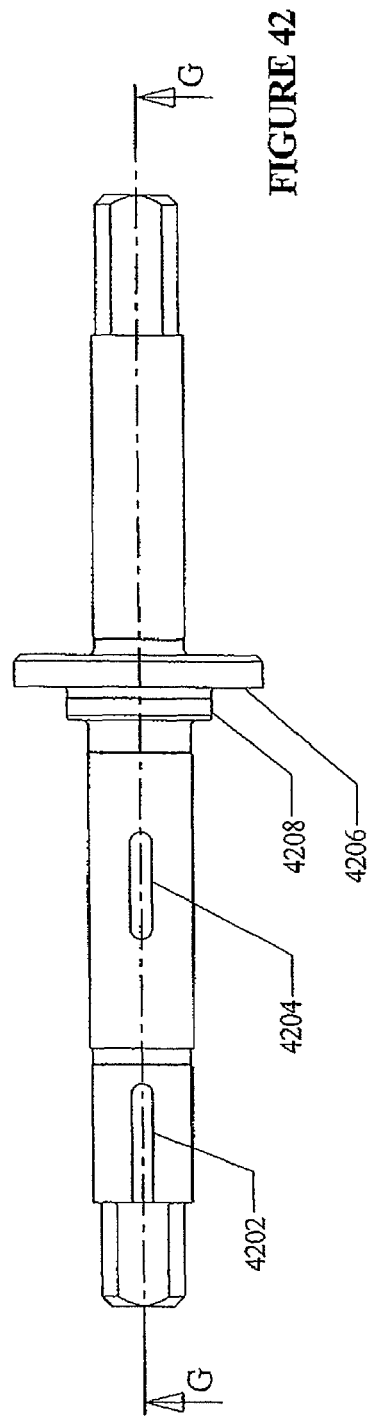
FIG. 42 is a top side elevational view of the main shaft of FIG. 41.
Figure 43:
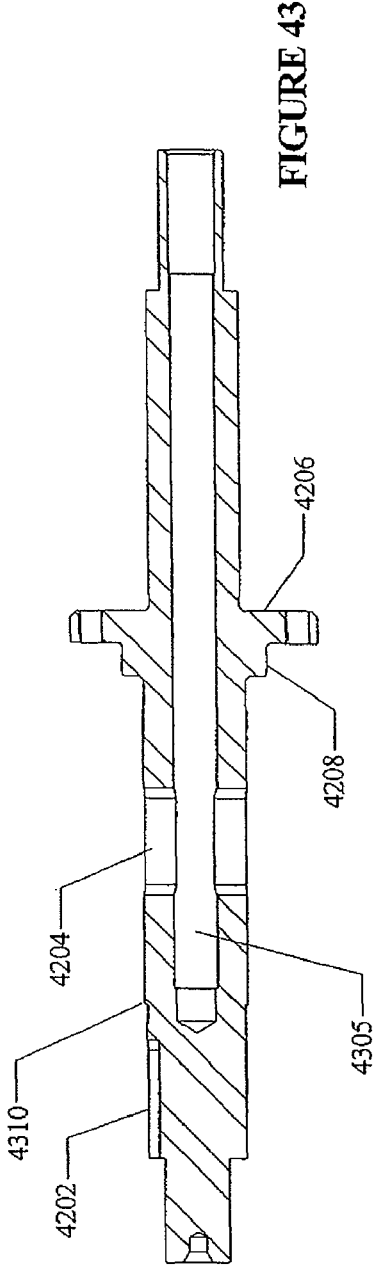
FIG. 43 is a section view along section G-G of the main shaft of FIG. 42.

Referring additionally to FIGS. 41-43, in the illustrated embodiment, the cage 1589 mounts coaxially and nonrotatably about the main shaft 105. The stator 1586 rigidly attaches to a flange 4206 of the main shaft 105 in this embodiment. An additional flange 1610 holds the stator 1587 in place. A key 1606 couples the flange 1610 to the main shaft 105, which has a key seat 1608 for receiving the key 1606. Of course, the person of ordinary skill in the relevant technology will readily recognize that there are many equivalent and alternative methods for coupling the main shaft 105 to the flange 1610, or coupling the stators 1586, 1587 to the flanges 1620, 4206. In certain embodiments, the main shaft 105 includes a shoulder 4310 that serves to axially position and constrain the flange 1610.

The end cap 1410 mounts on a radial bearing 1575, which itself mounts over the flange 1610. In one embodiment, the radial bearing 1575 is an angular contact bearing that supports loads from ground reaction and radially aligns the hub shell 138 to the main shaft 105. In some embodiments, the hub 1400 includes seals at one or both ends of the main shaft 105. For example, here the hub 1400 has a seal 1580 at the end where the hub shell 138 and end cap 1410 couple together.

Additionally, in order to provide an axial force preload on the output side and to maintain axial position of the hub shell 138, the hub 1400 may include spacers 1570 and a needle thrust bearing (not shown) between the stator 1587 and the radial bearing 1575. The spacers 1570 mount coaxially about the flange 1610. In some embodiments, the needle thrust bearing may not used, and in such cases the radial bearing 1575 may be an angular contact bearing adapted to handle thrust loads. The person of ordinary skill in the relevant technology will readily recognize alternative means to provide the function of carrying radial and thrust loads that the spacers 1570, needle thrust bearing, and radial bearing provide.

Still referring to FIGS. 14, 15 and 16, in the embodiment illustrated, a variator 1500 for the hub 1400 includes an input shaft 1505 that operationally couples at one end to a torsion disc 1525. The other end of the input shaft 1505 operationally couples to the freewheel 1420 via a freewheel carrier 1510. The torsion disc 1525 is configured to transfer torque to a load cam disc 1530 having ramps 3610 (see FIG. 36). The load cam disc 1530 transfers torque and axial force to a set of rollers 2504 (see FIG. 25), which act upon a second load cam disc 1540. The input disc 1545 couples to the second load cam disc 1540 to receive torque and axial force inputs. In some embodiments, the rollers 2504 are held in place by a roller cage 1535.

As is well known, many traction-type CVTs utilize a clamping mechanism to prevent slippage between the balls 101 and the input disc 1545 and/or output disc 1560 when transmitting certain levels of torque. Provision of a clamping mechanism is sometimes referred to here as generating an axial force, or providing an axial force generator. The configuration described above of the load cam disc 1530 acting in concert with the load cam 1540 through the rollers 2504 is one such axial force generating mechanism. However, as the axial force generating device or sub-assembly generates axial force in a CVT, reaction forces are also produced that are reacted in the CVT itself in some embodiments. Referring additionally to FIGS. 25 and 26, in the embodiment illustrated of the CVT 1500, the reaction forces are reacted at least in part by a thrust bearing having first and second races 1602 and 1603, respectively. In the illustrated embodiment, the bearing elements are not shown but may be balls, rollers, barreled rollers, asymmetrical rollers or any other type of rollers. Additionally, in some embodiments, one or both of the races 1602 are made of various bearing race materials such as steel, bearing steel, ceramic or any other material used for bearing races. The first race 1602 butts up against the torsion disc 1525, and the second race 1603 butts up against the hub cap 1460. The hub cap 1460 of the illustrated embodiment helps to absorb the reaction forces that the axial force mechanism generates. In some embodiments, axial force generation involves additionally providing preloaders, such as one or more of an axial spring such as a wave spring 1515 or a torsion spring 2502 (see description below for FIG. 25).

Referring to FIGS. 15-18, 22-24 and 43, certain subassemblies of the CVT 1500 are illustrated. The stator 1586 mounts on a shoulder 4208 of the main shaft 105 and butts up against the flange 4206 of the main shaft 105. The stator 1587 mounts on a shoulder 1810 of the flange 1610. Here, screws (not shown) attach the flange 4206 to the stator 1586 and attach the flange 1610 to the stator 1587, however, in other embodiments the stator 1587 threads onto the shoulder 1810, although the stator 1587 can be attached by any method or means to the shoulder 1810. Because the flanges 1610 and 4206 are nonrotatably fixed to main shaft 105, the cage 1589 made of the stators 1586 and 1587, among other things, attaches nonrotatably in this embodiment to the main shaft 105. The stator spacers 1555 provide additional structural strength and rigidity to the cage 1589. Additionally, the stator spacers 1555 aid in implementing the accurate axial spacing between stators 1586 and 1587. The stators 1586 and 1587 guide and support the legs 103 and axles 3702 through guide grooves 2202.

Referring now to FIGS. 15-21, 37, 38, the ball 101 spins about the axle 3702 and is in contact with an idler 1526. Bearings 1829, mounted coaxially about the main shaft 105, support the idler 1526 in its radial position, which bearings 1829 may be separate from or integral with the idler 1526. A shift pin 114, controlled by the shift rod 112, actuates an axial movement of the shift cams 1527. The shift cams 1527 in turn actuate legs 103, functionally resulting in the application of a lever or pivoting action upon the axle 3702 of the ball 101. In some embodiments, the CVT 1500 includes a retainer 1804 that keeps the shift pin 114 from interfering with the idler 1526. The retainer 1804 can be a ring made of plastic, metal, or other suitable material. The retainer 1804 fits between the bearings 1829 and mounts coaxially about a shift cam extension 1528.

Figure 20:
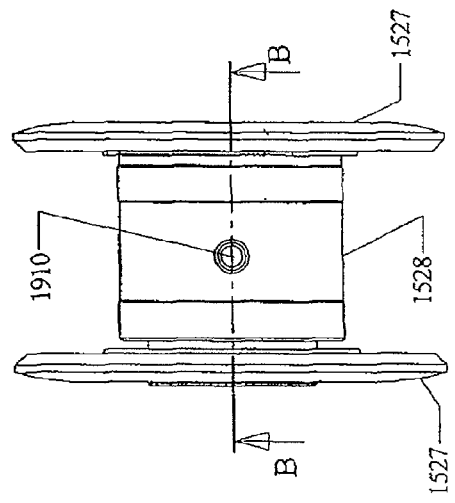
FIG. 20 is a top elevational view of the shift cam assembly of FIG. 19.
Figure 21:
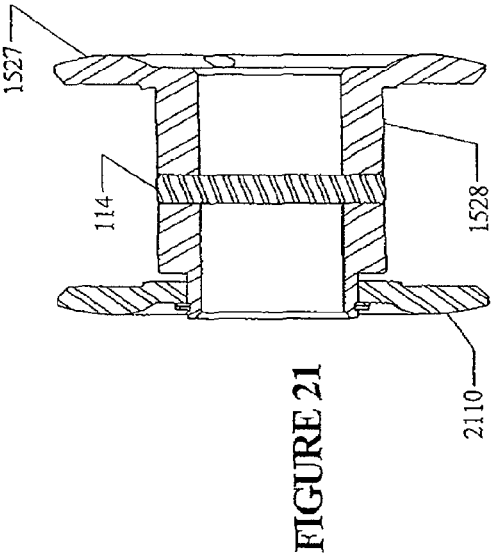
FIG. 21 is a sectional view B-B of the shift cam assembly of FIG. 20.
Figure 19:
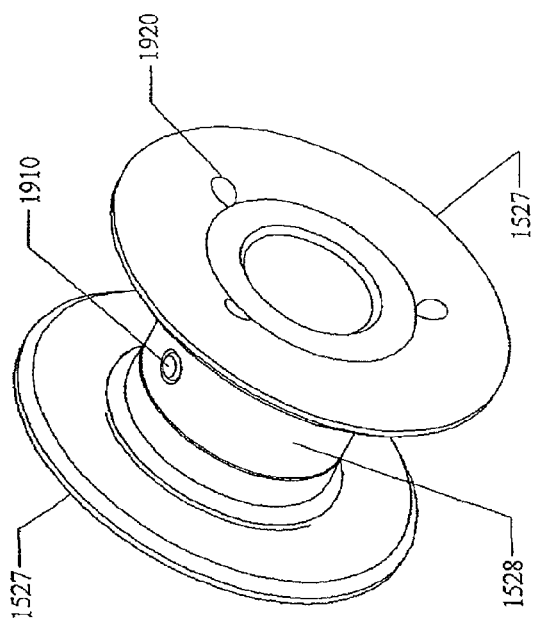
FIG. 19 is a perspective view of one embodiment of a shift cam assembly that can be used with the CVT of FIG. 15.
Figure 27:
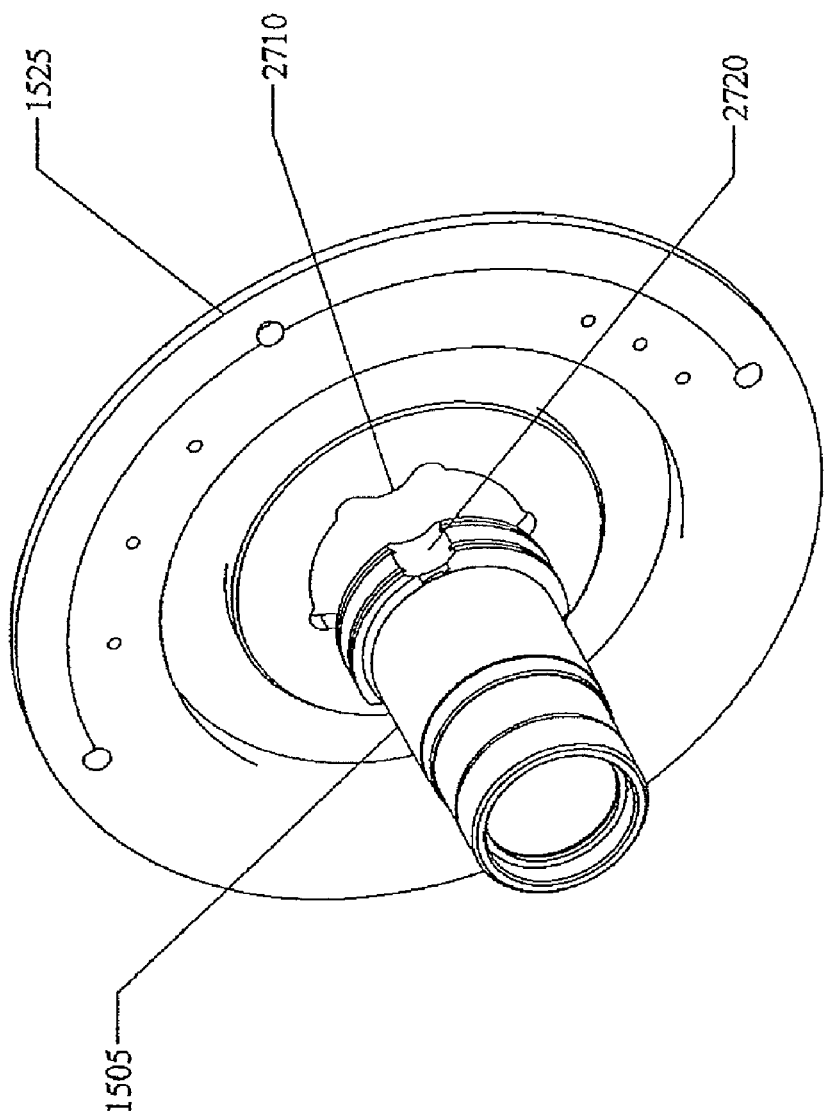
FIG. 27 is an exploded perspective view of a mating input shaft and torsion disc that can be used with the CVT of FIG. 15.

FIGS. 19-21 show one embodiment of the shift cams 1527 for the illustrated CVT 1500. Each shift cam disc 1572 has a profile 2110 along which the legs 103 ride. Here the profile 2110 has a generally convex shape. Usually the shape of the profile 2110 is determined by the desired motion of the legs 103, which ultimately affects the shift performance of the CVT 1500. Further discussion of shift cam profiles is provided below. As shown, one of the shift cam discs 1527 has an extension 1528 that mounts about the main shaft 105. The extension 1528 of the illustrated embodiment is sufficiently long to extend beyond the idler 1526 and couple to the other shift cam disc 1527. Coupling here is provided by a slip-fit and a clip. However, in other embodiments, the shift cams 1527 can be fastened to each other by threads, screws, interference fit, or any other connection method. In some embodiments, the extension 1528 is provided as an extension from each shift cam 1527. The shift pin 114 fits in a hole 1910 that goes through the extension 1528. In some embodiments, the shift cams 1527 have orifices 1920 to improve lubrication flow through the idler bearings 1829. In some embodiments, the idler bearings 1829 are press fit onto the extension 1528. In such embodiments, the orifices 1920 aid in removing the idler bearings 1829 from the extension 1528 by allowing a tool to pass through the shift cams 1527 and push the idler bearings 1829 off the extension 1528. In certain embodiments, the idler bearings 1829 are angle contact bearings, while in other embodiments they are radial bearings or thrust bearings or any other type of bearing. Many materials are suitable for making the shift cams 1527. For example, some embodiments utilize metals such as steel, aluminum, and magnesium, while other embodiments utilize other materials, such as composites, plastics, and ceramics, which depend on the conditions of each specific application.

The illustrated shift cams 1527 are one embodiment of a shift cam profile 2110 having a generally convex shape. Shift cam profiles usually vary according to the location of the contact point between the idler 1526 and the ball-leg assembly 1670 (see FIG. 16) as well as the amount of relative axial motion between the ball 101 and the idler 1526.

Referring now to the embodiment illustrated in FIGS. 16, and 18-21, the profile of shift cams 1527 is such that axial translation of the idler 1526 relative to the ball 101 is proportional to the change of the angle of the axis of the ball 101. The angle of the axis of the ball 101 is referred to herein as "gamma." The applicant has discovered that controlling the axial translation of the idler 1526 relative to the change in gamma influences CVT ratio control forces. For example, in the illustrated CVT 1500, if the axial translation of the idler 1526 is linearly proportional to a change in gamma, the normal force at the shift cams 1527 and ball-leg interface is generally parallel to the axle 3702. This enables an efficient transfer of horizontal shift forces to a shift moment about the ball-leg assembly 1670.

A linear relation between idler translation and gamma is given as idler translation is the mathematical product of the radius of the balls 101, the gamma angle and RSF (i.e., idler translation=ball radius*gamma angle*RSF), where RSF is a roll-slide factor. RSF describes the transverse creep rate between the ball 101 and the idler 126. As used here, "creep" is the discrete local motion of a body relative to another. In traction drives, the transfer of power from a driving element to a driven element via a traction interface requires creep. Usually, creep in the direction of power transfer is referred to as "creep in the rolling direction." Sometimes the driving and driven elements experience creep in a direction orthogonal to the power transfer direction, in such a case this component of creep is referred to as "transverse creep." During CVT operation, the ball 101 and idler 1526 roll on each other. When the idler is shifted axially (i.e., orthogonal to the rolling direction), transverse creep is imposed between the idler 1526 and the ball 101. An RSF equal to 1.0 indicates pure rolling. At RSF values less than 1.0, the idler 1526 translates slower than the ball 101 rotates. At RSF values greater than 1.0, the idler 1526 translates faster than the ball 101 rotates.

Still referring to the embodiments illustrated in FIGS. 16, and 18-21, the applicant has devised a process for layout of the cam profile for any variation of transverse creep and/or location of the interface between the idler 1526 and the ball-leg assembly 1570. This process generates different cam profiles and aids in determining the effects on shift forces and shifter displacement. In one embodiment, the process involves the use of parametric equations to define a two-dimensional datum curve that has the desired cam profile. The curve is then used to generate models of the shift cams 127. In one embodiment of the process, the parametric equations of the datum curve are as follows:

$$theta = 2*GAMMA\_MAX*t - GAMMA\_MAX$$

$$x = LEG*\sin(theta) - 0.5*BALL\_DIA*RSF*theta*pi/180 + 0.5*ARM*\cos(theta)$$

$$y = LEG*\cos(theta) - 0.5*ARM*\sin(theta)$$

$$z = 0$$

The angle theta varies from minimum gamma (which in some embodiments is −20 degrees) to maximum gamma (which in some embodiments is +20 degrees). GAMMA_MAX is the maximum gamma. The parametric range variable "t" varies from 0 to 1. Here "x" and "y" are the center point of the cam wheel 152 (see FIG. 1). The equations for x and y are parametric. "LEG" and "ARM" define the position of the interface between the ball-leg assembly 1670 and the idler 1526 and shift cams 1527. More specifically, LEG is the perpendicular distance between the axis of the ball axle 3702 of a ball-leg assembly 1670 to a line that passes through the centers of the two corresponding cam wheels 152 of that ball-leg assembly 1570, which is parallel to the ball axle 3702. ARM is the distance between centers of the cam wheels 152 of a ball-leg-assembly 1670.

RSF values above zero are preferred. The CVT 100 demonstrates an application of RSF equal to about 1.4. Applicant discovered that an RSF of zero dramatically increases the force required to shift the CVT. Usually, RSF values above 1.0 and less than 2.5 are preferred.

Still referring to the embodiments illustrated in FIGS. 16, and 18-21, in the illustrated embodiment of a CVT 100, there is a maximum RSF for a maximum gamma angle. For example, for gamma equals to +20 degrees an RSF of about 1.6 is the maximum. RSF further depends on the size of the ball 101 and the size of the idler 1526, as well as the location of the cam wheel 152.

In terms of energy input to shift the CVT, the energy can be input as a large displacement and a small force (giving a large RSF) or a small displacement and a large force (giving a small RSF). For a given CVT there is a maximum allowable shift force and there is a maximum allowable displacement. Hence, a trade off offers designers various design options to be made for any particular application. An RSF greater than zero reduces the required shift force by increasing the axial displacement necessary to achieve a desired shift ratio. A maximum displacement is determined by limits of the particular shifting mechanism, such as a grip or trigger shift in some embodiments, which in some embodiments can also be affected or alternatively affected by the package limits for the CVT 100.

Energy per time is another factor. Shift rates for a given application may require a certain level of force or displacement to achieve a shift rate depending on the power source utilized to actuate the shift mechanism. For example, in certain applications using an electric motor to shift the CVT, a motor having a high speed at low torque would be preferred in some instances. Since the power source is biased toward speed, the RSF bias would be toward displacement. In other applications using hydraulic shifting, high pressure at low flow may be more suitable than low pressure at high flow. Hence, one would choose a lower RSF to suit the power source depending on the application.

Idler translation being linearly related to gamma is not the only desired relation. Hence, for example, if it is desired that the idler translation be linearly proportional to CVT ratio, then the RSF factor is made a function of gamma angle or CVT ratio so that the relation between idler position and CVT ratio is linearly proportional. This is a desirable feature for some types of control schemes.

FIGS. 22-24 show one example of a cage 1589 that can be used in the CVT 1500. The illustrated cage 1589 has two stators 1586 and 1587 coupled to each other by a set of stator spacers 1555 (only one is shown for clarity). The stator spacers 1555 in this embodiment fasten to the outer periphery of the stators 1586 and 1587. Here screws attach the spacers 1555 to the stators 1586 and 1587. However, the stators 1586 and 1587 and the spacers 1555 can be configured for other means of attachment, such as press fitting, threading, or any other method or means. In some embodiments, one end of the spacers 1555 is permanently affixed to one of the stators 1586 or 1587. In some embodiments, the spacers 1555 are made of a material that provides structural rigidity. The stators 1586 and 1587 have grooves 2202 that guide and support the legs 103 and/or the axles 3702. In certain embodiments, the legs 103 and/or axles 3702 have wheels (item 151 of FIG. 11 or equivalent of other embodiments) that ride on the grooves 2202.

FIG. 24 shows a side of the stator 1586 opposite to the grooves 2202 of the stator 1586. In this embodiment, holes 2204 receive the screws that attach the stator spacers 1555 to the stator 1586. Inner holes 2210 receive the screws that attach the stator 1586 to the flange 4206 of the main shaft 105. To make some embodiments of the stator 1586 lighter, material is removed from it as shown as cutouts 2206 in this embodiment. For weight considerations as well as clearance of elements of the ball-leg assembly 1670, the stator 1586 may also include additional cutouts 2208 as in this embodiment.

Figure 36:
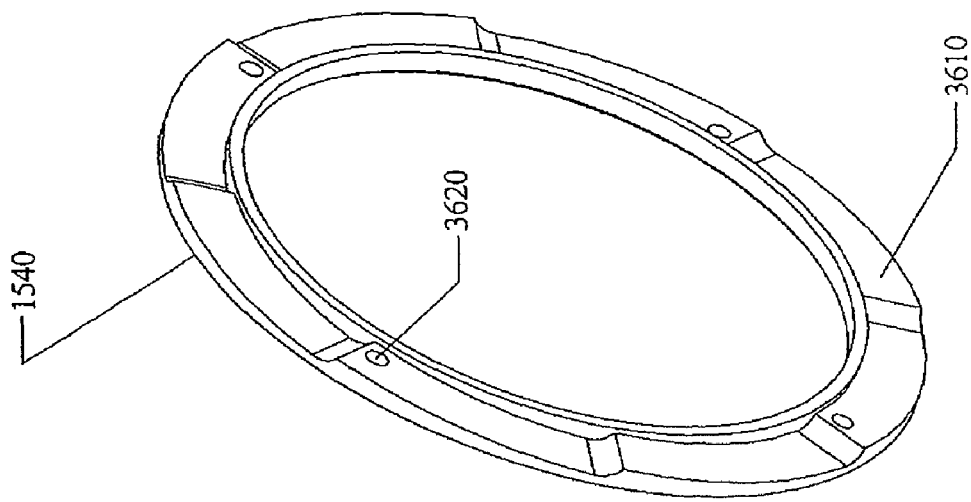
FIG. 36 is a perspective view of a load cam disc that can be used with the CVT of FIG. 15.

The embodiments of FIGS. 25, 26 and 36 will now be referenced to describe one embodiment of an axial force generation mechanism that can be used with the CVT 1500 of FIG. 15. FIGS. 25 and 26 are partially exploded views. The input shaft 1505 imparts a torque input to the torsion disc 1525. The torsion disc 1525 couples to a load cam disc 1530 that has ramps 3610. As the load cam disc 1530 rotates, the ramps 3610 activate the rollers 2504, which ride up the ramps 3610 of the second load cam disc 1540. The rollers 2504 then wedge in place, pressed between the ramps of the load cam discs 1530 and 1540, and transmit both torque and axial force from the load cam disc 1530 to the load cam disc 1540. In some embodiments, the CVT 1500 includes a roller retainer 1535 to ensure proper alignment of the rollers 2504. The rollers 2504 may be spherical, cylindrical, barreled, asymmetrical or other shape suitable for a given application. In some embodiments, the rollers 2504 each have individual springs (not shown) attached to the roller retainer 1535 or other structure that bias the rollers 2504 up or down the ramps 3610 as may be desired in some applications. The input disc 1545 in the illustrated embodiment is configured to couple to the load cam disc 1540 and receive both the input torque and the axial force. The axial force then clamps the balls 101 between the input disc 1545, the output disc 1560, and the idler 1526.

In the illustrated embodiment, the load cam disc 1530 is fastened to the torsion disc 1525 with dowel pins. However, other methods of fastening the load cam disc 1530 to the torsion disc 1525 can be used. Moreover, in some embodiments, the load cam disc 1530 is integral with the torsion disc 1525. In other embodiments, the torsion disc 1525 has the ramps 3610 machined into it to make a single unit for transferring torque and axial force. In the embodiment illustrated, the load cam disc 1540 couples to the input disc 1545 with dowel pins. Again, any other suitable fastening method can be used to couple the input disc 1545 to the load cam disc 1540. In some embodiments, the input disc 1545 and the load cam disc 1540 are an integral unit, effectively as if the ramps 3610 were built into the input disc 1545. In yet other embodiments, the axial force generating mechanism may include only one set of ramps 3610. That is, one of the load cam discs 1530 or 1540 does not have the ramps 3610, but rather provides a flat surface for contacting the rollers 2504. Similarly, where the ramps are built into the torsion disc 1525 or the input disc 1545, one of them may not include the ramps 3610. In load cam discs 1530, 1540 in both embodiments having ramps on both or on only one disc, the ramps 3610 and the flat surface on discs without ramps can be formed with a conformal shape conforming to the rollers 2504 surface shape to partially capture the rollers 2504 and to reduce the surface stress levels.

In some embodiments, under certain conditions of operation, a preload axial force to the CVT 1500 is desired. By way of example, at low torque input it is possible for the input disc 1545 to slip on the balls 101, rather than to achieve frictional traction. In the embodiment illustrated in FIGS. 25 and 26, axial preload is accomplished in part by coupling a torsion spring 2502 to the torsion disc 1525 and the input disc 1545. One end of the torsion spring 2502 fits into a hole 2930 (see FIG. 29) of the torsion disc 1545, while the other end of the torsion spring 2502 fits into a hole of the input disc 1545. Of course, the person of ordinary skill in the relevant technology will readily appreciate numerous alternative ways to couple the torsion spring 2502 to the input disc 1545 and the torsion disc 1525. In other embodiments, the torsion spring 2502 may couple to the roller retainer 1535 and the torsion disc 1525 or the input disc 1545. In some embodiments where only one of the torsion disc 1525 or input disc 1545 has ramps 3610, the torsion spring 2502 couples the roller retainer 1535 to the disc with the ramps.

Still referring to the embodiments illustrated in FIGS. 15 25 and 26, as mentioned before, in some embodiments the application of axial forces generates reaction forces that are reacted in the CVT 1500. In this embodiment of the CVT 1500, a ball thrust bearing aids in managing the reaction forces by transmitting thrust between the hub cap 1460 and the torsion disc 1525. The thrust bearing has a race 1602 that butts against the hub cap 1460, which in this embodiment has a recess near its inner bore for receiving the race 1602. The second race 1603 of the thrust bearing nests in a recess of the torsion disc 1525. In some embodiments, a wave spring 1515 is incorporated between the race 1602 and the hub 1460 to provide axial preload. In the illustrated embodiment, a bearing 2610 radially supports the hub cap 1460.

The applicant has discovered that certain configurations of the CVT 1500 are better suited than others to handle a reduction in efficiency of the CVT 1500 due to a phenomenon referred to herein as bearing drag recirculation. This phenomenon arises when a bearing is placed between the torsion disc 1525 and the hub cap 1460 to handle the reaction forces from axial force generation.

In some embodiments as illustrated in FIG. 1, a needle roller bearing having a diameter about equal to the diameter of the load cam disc 1530 is used to minimize the deflection of the end cap 160. In underdrive the speed of the torsion disc 157 (input speed) is greater than the speed of the end cap 160 (output speed). In underdrive, the needle roller bearing (thrust bearing 163 in that embodiment) generates a drag torque opposite the direction of rotation of the torsion disc 1525. This drag torque acts on the torsion disc 1525 in the direction counter to the axial loading by the load cam disc 1530, and acts on the end cap 160 and thus the hub shell 138 and output disc 134 in the direction of the output tending to speed up the rotation of those components, these effects combining to unload the cam loader 154 thereby reduce the amount of axial force in the CVT 1500. This situation could lead to slip between or among the input disc 110, balls 101, and/or output disc 134.

In overdrive the speed of the torsion disc 1525 is greater than the speed of the end cap 160 and the needle bearing generates a drag torque acting on the torsion disc 1525 in the direction of the rotation of the torsion disc 1525 and acting on the end cap 160 against the output rotation of the end cap 160. This results in an increase in the axial force being generated in the CVT 1500. The increase in axial force then causes the system to generate even more drag torque. This feedback phenomenon between axial force and drag torque is what is referred to here as bearing drag recirculation, which ultimately results in reducing the efficiency of the CVT 100. Additionally, the drag torque acting against the end cap 160 acts as an additional drag on the output of the CVT 100, thereby further reducing its efficiency.

Figure 40:
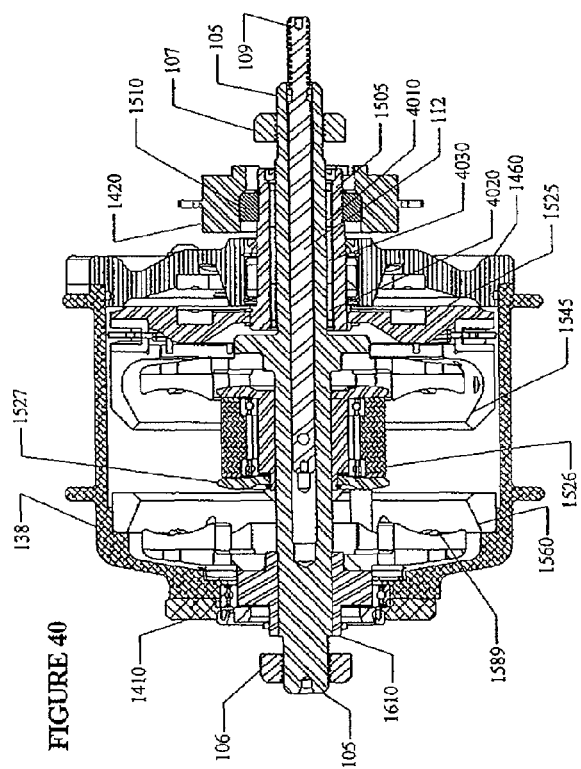
FIG. 40 is a cross-sectional view along section F-F of the hub of FIG. 39 showing certain components of the bicycle hub of FIG. 14 and the CVT of FIG. 15.

The applicant has discovered various systems and methods for minimizing efficiency losses due to bearing drag recirculation. As shown in FIGS. 25, 26, and 40, instead of using a needle roller bearing configured as described above, some embodiments the CVT 1500 employ a roller thrust bearing having races 1602 and 1603. Because the amount of drag torque increases with the diameter of the bearing used, the diameter of the races 1602 and 1603 is less than the diameter of the axial force generating load cam disc 1530 and in some embodiments is as small as possible. The diameter of the races 1602 and 1603 could be 10, 20, 30, 40, 50, 60, 70, 80, or 90 percent of the diameter of the load cam disc 1530. In some embodiments, the diameter of the races 1602 and 1603 is between 30 and 70 percent of the diameter of the load cam disc 1530. In still other embodiments, the diameter of the races 1602 and 1603 is between 40 and 60 percent of the diameter of the load cam disc 1530.

When a ball thrust bearing is used, in some embodiments the rollers and/or races are made of ceramic, the races are lubricated and/or superfinished, and/or the number of rollers is minimized while maintaining the desired load capacity. In some embodiments, deep groove radial ball bearings or angular contact bearings may be used. For certain applications, the CVT 1500 may employ magnetic or air bearings as means to minimize bearing drag recirculation. Other approaches to reducing the effects of bearing drag recirculation are discussed below, referencing FIG. 46, in connection with alternative embodiments of the input shaft 1505 and the main shaft 105.

FIGS. 27-35 depict examples of certain embodiments of a torque input shaft 1505 and a torsion disc 1525 that can be used with the CVT 1500 of FIG. 15. The input shaft 1505 and the torsion disc 1525 couple via a splined bore 2710 on the torsion disc 1525 and a splined flange 2720 on the input shaft 1525. In some embodiments, the input shaft 1505 and the torsion plate 1525 are one piece, made either as a single unit (as illustrated in FIG. 1) or wherein the input shaft 1505 and the torsion disc 1525 are coupled together by permanent attachment means, such as welding or any other suitable adhesion process. In yet other embodiments, the input shaft 1505 and the torsion disc 1525 are operationally coupled through fasteners such as screws, dowel pins, clips or any other means or method. The particular configuration shown here is preferable in circumstances where it is desired that the input shaft 1505 and the torsion disc 1525 be separate parts, which can handle misalignments and axial displacement due to load cam disc 1530 growth under load, as well as uncouple twisting moments via the splined bore 2710 and the splined shaft 2720. This configuration is also preferable in certain embodiments because it allows for lower manufacturing tolerances and, consequently, reduced manufacturing costs for a CVT.

Referencing FIGS. 16, 28-32, in the illustrated embodiment, the torsion disc 1525 is generally a circular disc having an outer periphery 3110 and a splined inner bore 2710. One side of the torsion disc 1525 has a recess 3205 that receives the race 1603 of a thrust bearing. The other side of the torsion disc 1525 includes a seat 3210 and a shoulder 3220 for receiving and coupling to the load cam disc 1530. The torsion disc 1525 includes a raised surface 3230 that rises from the shoulder 3220, reaches a maximum height in a convex shape, and then falls toward the inner bore 2710. In one embodiment of the CVT 1500, the raised surface 3230 partially supports and constrains the torsion spring 2502, while a set of dowel pins (not shown) helps to retain the torsion spring 2502 in place. In such embodiments, the dowel pins are placed in holes 2920. The torsion disc 1525 shown here has three splines on its splined bore 2710. However, in other embodiments the splines can be 1, 2, 3, 4, 5, 6, 7, 8, 9, 10, or more. In some embodiments, the number of splines is 2 to 7, and in others the number of splines is 3, 4, or 5.

In some embodiments, the torsion disc 1525 includes orifices 2910 for receiving dowels that couple the torsion disc 1525 to the load cam disc 1530. The torsion disc 1525 may also have orifices 2930 for receiving one end of the torsion spring 2502. In the illustrated embodiment, several orifices 2930 are present in order to accommodate different possible configurations of the torsion spring 2502 as well as to provide for adjustment of preload levels.

The torsion disc 1525 can be of any material of sufficient rigidity and strength to transmit the torques and axial loads expected in a given application. In some embodiments, the material choice is designed to aid in reacting the reaction forces that are generated. For example, hardened steels, steel, aluminum, magnesium, or other metals can be suitable depending on the application while in other applications plastics are suitable.

Figure 33:
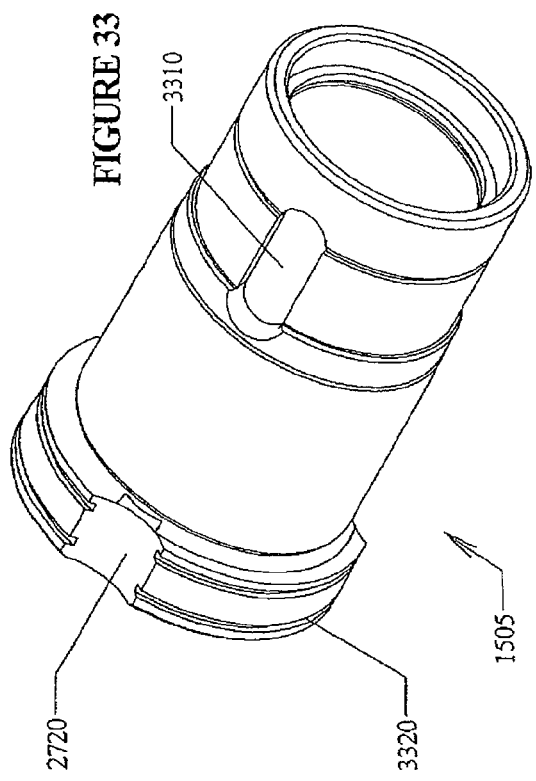
FIG. 33 is a perspective view of the input shaft of FIG. 27.
Figure 35:
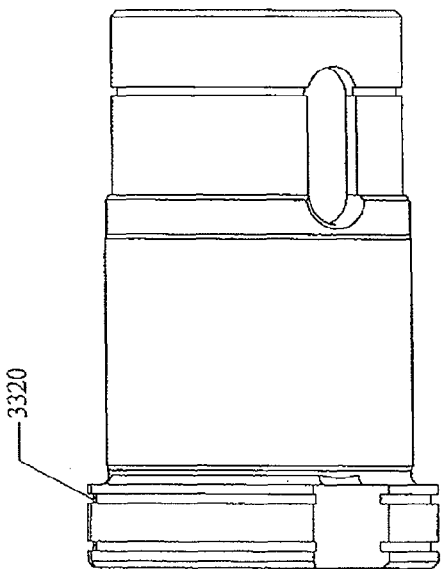
FIG. 35 is a top side elevational view of the input shaft of FIG. 33.
Figure 34:
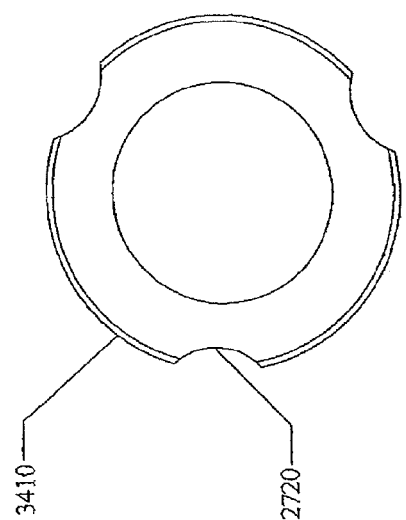
FIG. 34 is a left side elevational view of the input shaft of FIG. 33.

FIGS. 33-35 show an embodiment of an input torque shaft 1505 for use with the CVT 1500. The torque input shaft 1505 consists of a hollow, cylindrical body having a splined flange 2720 at one end and a key seat 3310 at the other end. In this embodiment, the key seat 3310 receives a key (not shown) that operationally couples the input shaft 1505 to a freewheel carrier 1510 (see FIGS. 14, 15), which itself couples to the freewheel 1420. The surfaces 2720 and 3410 are shaped to mate with the splined bore 2710 of the torsion disc 1525. Thus, concave surfaces 2720 of some embodiments will preferably be equal in number to the splines in the splined bore 2710. In some embodiments, the concave surfaces 2720 may number 1, 2, 3, 4, 5, 6, 7, 8, 9, 10 or more. In some embodiments, the concave surfaces 2720 number 2 to 7, and in others there are 3, 4, or 5 concave surfaces 2720.

As shown, the input shaft 1505 has several clip grooves that help in retaining various components, such as bearings, spacers, etc., in place axially. The input shaft 1505 is made of a material that can transfer the torques expected in a given application. In some instances, the input shaft 1505 is made of hardened steel, steel, or alloys of other metals while in other embodiments it is made of aluminum, magnesium or any plastic or composite or other suitable material.

FIG. 36 shows an embodiment of a load cam disc 1540 (alternately 1530) that can be used with the CVT 1500. The disc 1540 is generally a circular ring having a band at its outer periphery. The band is made of ramps 3610. Some of the ramps 3610 have holes 3620 that receive dowel pins (not shown) for coupling the load cam disc 1530 to the torsion disc 1525 or the load cam disc 1540 to the input disc 1545. In some embodiments, the ramps 3610 are machined as a single unit with the load cam discs 1530, 1540. In other embodiments, the ramps 3610 may be separate from a ring substrate (not shown) and are coupled to it via any known fixation method. In the latter instance, the ramps 3610 and the ring substrate can be made of different materials and by different machining or forging methods. The load cam disc 1540 can be made, for example, of metals or composites.

Referencing FIG. 37 and FIG. 38, an embodiment of an axle 3702 consists of an elongated cylindrical body having two shoulders 3704 and a waist 3806. The shoulders 3704 begin at a point beyond the midpoint of the cylindrical body and extend beyond the bore of the ball 101. The shoulders 3704 of the illustrated embodiment are chamfered, which helps in preventing excessive wear of the bushing 3802 and reduces stress concentration. The ends of the axle 3702 are configured to couple to bearings or other means for interfacing with the legs 103. In some embodiments, the shoulders 3704 improve assembly of the ball-leg assembly 1670 by providing a support, stop, and/or tolerance reference point for the leg 103. The waist 3806 in certain embodiments serves as an oil reservoir. In this embodiment, a bushing 3802 envelops the axle 3702 inside the bore of the ball 101. In other embodiments, bearings are used instead of the bushing 3802. In those embodiments, the waist 3806 ends where the bearings fit inside the ball 101. The bearings can be roller bearings, drawn cup needle rollers, caged needle rollers, journal bearings, or bushings. In some embodiments, it is preferred that the bearings are caged needle bearings or other retained bearings. In attempting to utilize general friction bearings, the CVT 100, 1500 often fails or seizes due to a migration of the bearings or rolling elements of the bearings along the axles 3702, 102 out of the balls 101 to a point where they interfere with the legs 103 and seize the balls 101. It is believed that this migration is caused by force or strain waves distributed through the balls 101 during operation. Extensive testing and design has lead to this understanding and the Applicant's believe that the use of caged needle rollers or other retained bearings significantly and unexpectedly lead to longer life and improved durability of certain embodiments of the CVT 100, 1500. Embodiments utilizing bushings and journal material also aid in the reduction of failures due to this phenomenon. The bushing 3802 can be replaced by, for example, a babbitt lining that coats either or both of the ball 101 or axle 3702. In yet other embodiments, the axle 3702 is made of bronze and provides a bearing surface for the ball 101 without the need for bearings, bushing, or other linings. In some embodiments, the ball 101 is supported by caged needle bearings separated by a spacer (not shown) located in the middle portion of the bore of the ball 101. Additionally, in other embodiments, spacers mount on the shoulders 3704 and separate the caged needle bearings from components of the leg 103. The axle 3702 can be made of steel, aluminum, magnesium, bronze, or any other metal or alloy. In certain embodiments, the axle 3702 is made of plastic or ceramic materials.

One embodiment of the main shaft 105 is depicted in FIGS. 41-43. The main shaft 105 is an elongated body having an inner bore 4305 for receiving a shift rod 112 (see FIGS. 16 and 40). As implemented in the CVT 1500, the main shaft 105 is a single piece axle that provides support for many of the components of the CVT 1500. In embodiments where a single piece axle is utilized for the main shaft 105, the main shaft 105 reduces or eliminates tolerance stacks in certain embodiments of the CVT 1500. Furthermore, as compared with multiple piece axles, the single piece main shaft 105 provides greater rigidity and stability to the CVT 1500.

The main shaft 105 also includes a through slot 4204 that receives and allows the shift pin 114 to move axially, that is, along the longitudinal axis of the main shaft 105. The size of the slots 4204 can be chosen to provide shift stops for selectively determining a ratio range for a given application of the CVT 1500. For example, a CVT 1500 can be configured to have a greater underdrive range than overdrive range, or vice-versa, by choosing the appropriate dimension and/or location of the slots 4204. By way of example, if the slot 4204 shown in FIG. 42 is assumed to provide for the full shift range that the CVT 1500 is capable of, a slot shorter than the slot 4204 would reduce the ratio range. If the slot 4204 were to be shortened on the right side of FIG. 42, the underdrive range would be reduced. Conversely, if the slot 4204 were to be shortened on the left side of FIG. 42, the overdrive range would be reduced.

In this embodiment, a flange 4206 and a shoulder 4208 extend from the main shaft 105 in the radial direction. As already described, the flange 4206 and the shoulder 4208 facilitate the fixation of the stator 1586 to the main shaft 105. In some embodiments, the bore of the stator 1586 is sized to mount to the main shaft 105 such that the shoulder 4208 can be dispensed with. In other embodiments, the shoulder 4208 and/or the flange 4206 can be a separate part from the main shaft 105. In those instances, the shoulder 4208 and/or flange 4206 mount coaxially about the main shaft 105 and affix to it by any well known means in the relevant technology. In the embodiment depicted, the main shaft 105 includes a key seat 4202 for receiving a key 1606 that rotationally fixes the flange 1610 (see FIG. 16). The key 1606 may be a woodruff key. The main shaft 105 of some embodiments is made of a metal suitable in terms of manufacturability, cost, strength, and rigidity. For example, the main shaft can be made of steel, magnesium, aluminum or other metals or alloys.

The operation of the hub 1400 having one embodiment of the CVT 1500 described above will now be described with particular reference to FIGS. 39 and 40. The freewheel 1420 receives torque from a bicycle chain (not shown). Since the freewheel 1420 is fixed to the freewheel carrier 1510, the freewheel 1420 imparts the torque to the freewheel carrier 1510, which in turns transmits the torque to the input shaft 1505 via a key coupling (not shown). The input shaft 1505, riding on needle bearings 4010 and 4020 mounted on the main shaft 105, inputs the torque to the torsion disc 1525 via the splined bore 2710 and splined surfaces 2720 and 3410 of the input shaft 1505. Needle bearing 4010 is preferably placed near or underneath the freewheel carrier 1510 and/or freewheel 1420. This placement provides appropriate support to the input shaft 1505 to prevent transmission of radial loading from the freewheel carrier 1510 as a bending load through the CVT 1400. Additionally, in some embodiments a spacer 4030 is provided between the needle bearings 4010 and 4020. The spacer 4030 may be made of, for example, Teflon.

As the torsion disc 1525 rotates, the load cam disc 1530 coupled to the torsion disc 1525 follows the rotation and, consequently, the ramps 3610 energize the rollers 2504. The rollers 2504 ride up the ramps 3610 of the load cam disc 1540 and become wedged between the load cam disc 1530 and the load cam disc 1540. The wedging of the rollers 2504 results in a transfer of both torque and axial force from the load cam disc 1530 to the load cam disc 1540. The roller cage 1535 serves to retain the rollers 2504 in proper alignment.

Because the load cam disc 1540 is rigidly coupled to the input disc 1545, the load cam disc 1540 transfers both axial force and torque to the input disc 1545, which then imparts the axial force and torque to the balls 101 via frictional contact. As the input disc 1545 rotates under the torque it receives from the load cam disc 1540, the frictional contact between the input disc 1545 and the balls 101 forces the balls 101 to spin about the axles 3702. In this embodiment, the axles 3702 are constrained from rotating with the balls 101 about their own longitudinal axis; however, the axles 3702 can pivot or tilt about the center of the balls 101, as in during shifting.

The input disc 1545, output disc 1560, and idler 1526 are in frictional contact with the balls 101. As the balls 101 spin on the axles 3702, the balls 101 impart a torque to the output disc 1560, forcing the output disc 1560 to rotate about the shaft 105. Because the output disc 1560 is coupled rigidly to the hub shell 138, the output disc 1560 imparts the output torque to the hub shell 138. The hub shell 138 is mounted coaxially and rotatably about the main shaft 105. The hub shell 138 then transmits the output torque to the wheel of the bicycle via well known methods such as spokes.

Figure 39:
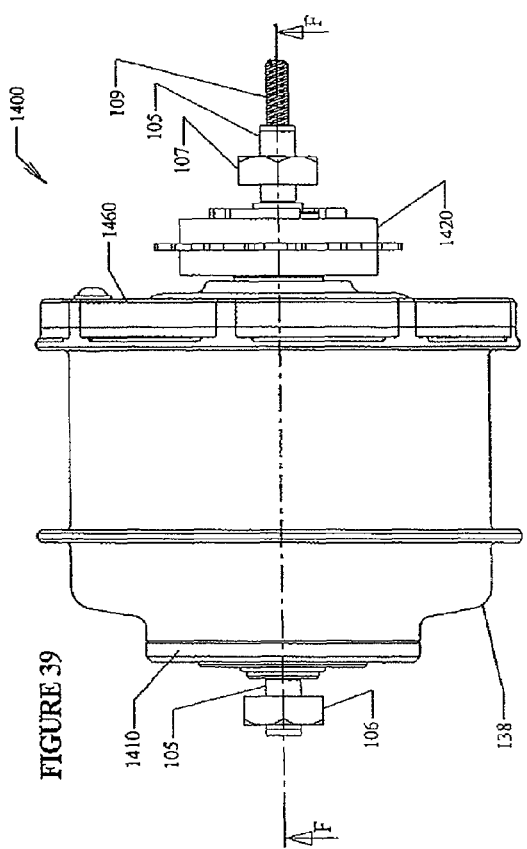
FIG. 39 is a top elevational view of the bicycle hub of FIG. 14.

Still referring to FIGS. 39 and 40, shifting of the ratio of input speed to output speed, and consequently a shift in the ratio of input torque to output torque, is accomplished by tilting the rotational axis of the balls 101, which requires actuating a shift in the angle of the axles 3702. A shift in the transmission ratio involves actuating an axial movement of the shift rod 112 in the main shaft 105, or in rotation of the shift rod 312 of FIG. 3. The shift rod 112 translates axially the pin 114, which is in contact with the shift cams 1527 via the bore 1910 in the extension 1528. The axial movement of the shift pin 114 causes a corresponding axial movement of the shift cams 1527. Because the shift cams 1527 engage the legs 103 (via cam wheels 152, for example), the legs 103 move radially as the legs 103 move along the shift cam profile 2110. Since the legs 103 are connected to the axles 3702, the legs 103 act as levers that pivot the axles 3702 about the center of the balls 101. The pivoting of the axles 3702 causes the balls 101 to change axis of rotation and, consequently, produce a ratio shift in the transmission.

FIG. 44 and FIG. 45 show an embodiment of a CVT 4400 having an axial force generating mechanism that includes one load cam disc 4440 acting on the input disc 1545 and another load cam disc 4420 acting on the output disc 1560. In this embodiment, the load cam discs 4440 and 4420 incorporate ramps such as ramps 3610 of the load cam discs 1530 and 1540. In this embodiment, neither of the input disc 1545 or the output disc 1560 has ramps or is coupled to discs with ramps. However, in other embodiments, it may be desirable to provide one or both of the input disc 1545 or output disc 1560 with discs having ramps, or building the ramps into the input disc 1545 and/or output disc 1560 to cooperate with the load cam discs 4420, 4440. The CVT 4400 of some embodiments further includes a roller retainer 4430 to house and align a set of rollers (not shown) that is between the load cam disc 4420 and the output disc 1560. In the embodiment shown, the roller retainer 4430 radially pilots on the output disc 1560. Similarly, there is a roller retainer 4410 between the load cam disc 4440 and the input disc 1545. The rollers and discs described with reference to these embodiments can be of any type or shape as described above for previous axial force generating devices. In some embodiments the angles of the ramps incline from the surface of the disc at an angle that is (or is between) 1, 2, 3, 4, 5, 6, 7, 8, 9, 10, 11, 12, 13, 14, 15 degrees or more or any portion between any of these.

Figure 46:
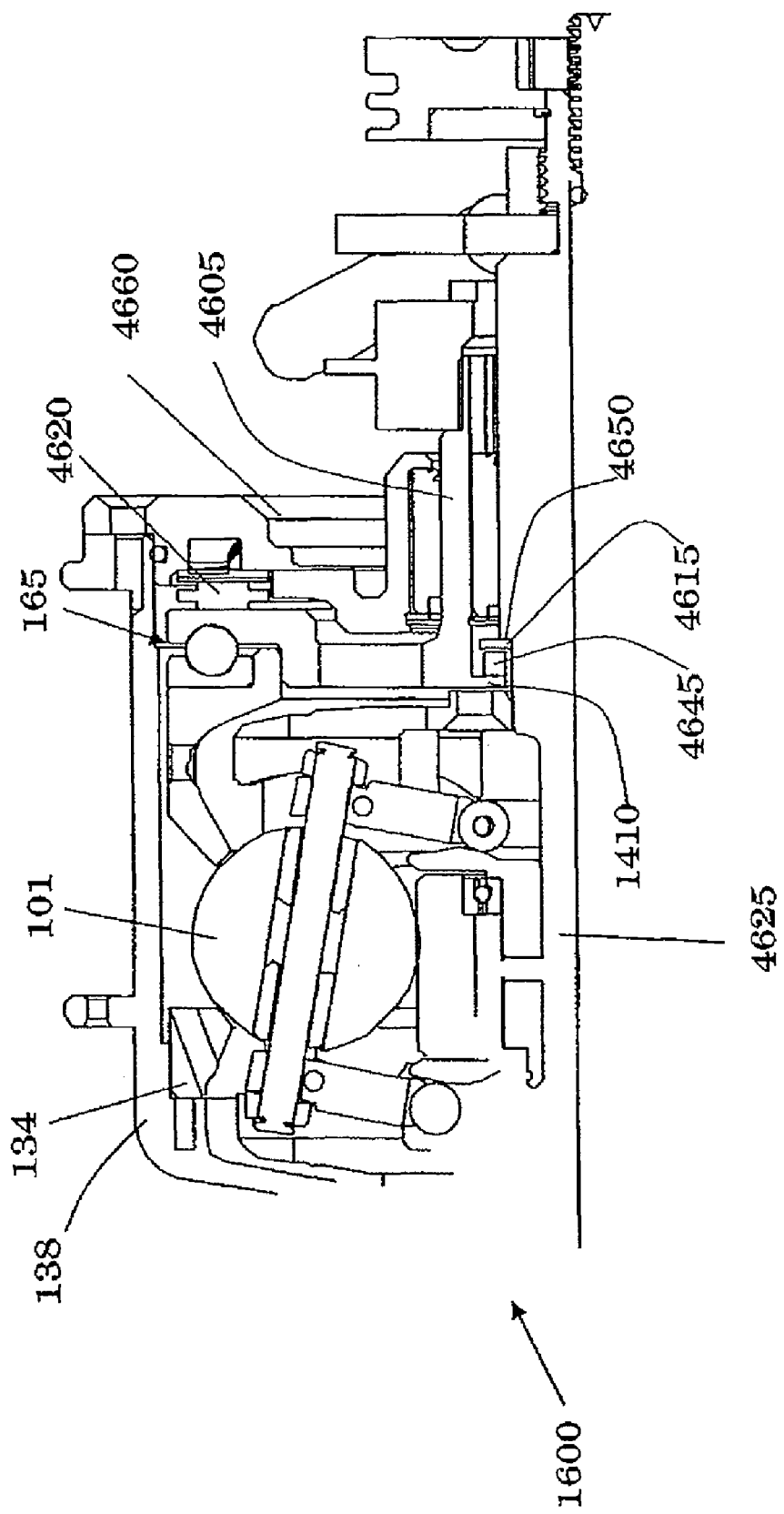
FIG. 46 is a sectional view of a CVT that can be used with the bicycle hub of FIG. 14.

FIG. 46 illustrates an embodiment of a CVT 1600 having an input shaft 4605 and a main shaft 4625 adapted to decrease bearing drag recirculation effects. The CVT 100 includes an axial force generator 165 which generates an axial force that is reacted in part by a needle roller bearing 4620. A hub cap 4660 reacts drag torque and axial forces from the needle roller bearing 4620. In other embodiments, the needle roller bearing 4620 is replaced by a ball thrust bearing and in other embodiments the ball thrust bearing has a diameter smaller than the diameter of the needle roller bearing 4620.

In this embodiment, the main shaft 4625 has a shoulder 4650 that provides a reaction surface for a washer 4615, which can also be a clip, for example (all of which are integral in some embodiments). The input shaft 4605 is fitted with an extension 1410 that reacts against a bearing 4645. The bearing 4645 can be a thrust bearing. As shown, the input shaft 4605 and driver disc (similar to the torsion disc 1525) are a single piece. However, in other embodiments the input shaft 4605 may be coupled to a torsion disc 1525, for example, by threading, keying, or other fastening means. In the illustrated embodiment, some of the reaction force arising from the generation of axial force is reacted to the main shaft 4625, thereby reducing bearing drag recirculation. In yet another embodiment (not shown), the extension 1410 is reacted against angular thrust bearings that also support the input shaft 4605 on the main shaft 4625. In this latter embodiment, the shoulder 4650 and washer 4615 are not required. Rather, the main shaft 4625 would be adapted to support and retain the angular thrust bearings.

In many embodiments described herein, lubricating fluids are utilized to reduce friction of the bearings supporting many of the elements described. Furthermore, some embodiments benefit from fluids that provide a higher coefficient of traction to the traction components transmitting torque through the transmissions. Such fluids, referred to as "traction fluids" suitable for use in certain embodiments include commercially available Santotrac 50, 5CST AF from Ashland oil, OS#155378 from Lubrizol, IVT Fluid #SL-2003B21-A from Exxon Mobile as well as any other suitable lubricant. In some embodiments, the traction fluid for the torque transmitting components is separate from the lubricant that lubricates the bearings.

Additional embodiments of a continuously variable transmission, and components and subassemblies therefor, will be described with reference to FIGS. 47-85E. FIG. 47 shows a cross-section view of bicycle rear wheel hub that incorporates a continuously variable transmission (CVT) 4700. As previously stated, a CVT 4700 and equivalent variants thereof may be used in many applications other than bicycles, including but not limited to, other human powered vehicles, light electrical vehicles, hybrid human-, electric-, or internal combustion powered vehicles, industrial equipment, wind turbines, etc. Any technical application that requires modulation of mechanical power transfer between an input source and an output load can implement embodiments of a CVT 4700 in its power train.

It should be noted that reference herein to "traction" does not exclude applications where the dominant or exclusive mode of power transfer is through "friction." Without attempting to establish a categorical difference between traction and friction drives here, generally these may be understood as different regimes of power transfer. Traction drives usually involve the transfer of power between two elements by shear forces in a thin fluid layer trapped between the elements. Typically, friction drives generally relate to transferring power between two elements by frictional forces between the elements. For the purposes of this disclosure, it should be understood that the CVT 4700 may operate in both tractive and frictional applications. For example, in the embodiment where the CVT 4700 is used for a bicycle application, the CVT 4700 may operate at times as a friction drive and at other times as a traction drive, depending on the torque and speed conditions present during operation.

As illustrated in FIG. 47, the CVT 4700 includes a shell or hub shell 4702 that couples to a cover or hub cover 4704. The hub shell 4702 and the hub cover 4704 form a housing that, among other things, functions to enclose most of the components of the CVT 4700. A main shaft or main axle 4706 provides axial and radial positioning and support for other components of the CVT 4700. For descriptive purposes only, the CVT 4700 can be seen as having a variator subassembly 4708 as shown in detail view C, an input means subassembly 4710 as shown in detail view D, an input-side axial force generation means subassembly 4712 as shown in detail view E, an output-side axial force generation means subassembly 4714 as shown in detail view F, and a shift rod and/or shifter interface subassembly 4716 as shown in detail view G. These subassemblies will now be described in further detail.

Referring now to FIGS. 48A-48G, in one embodiment the variator subassembly 4708 includes a number of traction power rollers 4802 placed in contact with an input traction ring 4810, and output traction ring 4812, and a support member or idler 4814. A shift rod 4816 threads into a shift rod nut 4818, which is located between and is adapted to interact with shift cams 4820. An idler bushing 4832 is piloted by the main axle 4706 and interfaces with the shift rod nut 4818. A shift rod nut collar 4819 is mounted coaxially about the main axle 4706 and is positioned between the shift cams 4820. The shift cams 4820 contact the cam rollers 4822. Each of several legs 4824 couples on one end to a cam roller 4822. Another end of each leg 4824 couples to a power roller axle 4826, which provides a tiltable axis of rotation for the power roller 4802. In some embodiments, the power roller axles 4826 rotate freely with respect to the legs 4824, by the use of bearings for example, but in other embodiments the power roller axles 4826 are fixed rotationally with respect to the legs 4824. In the embodiment shown in FIG. 48A, the idler 4814 rides on bearing balls 4828 that are positioned between the idler 4814 and the shift cams 4820.

Figure 48B:
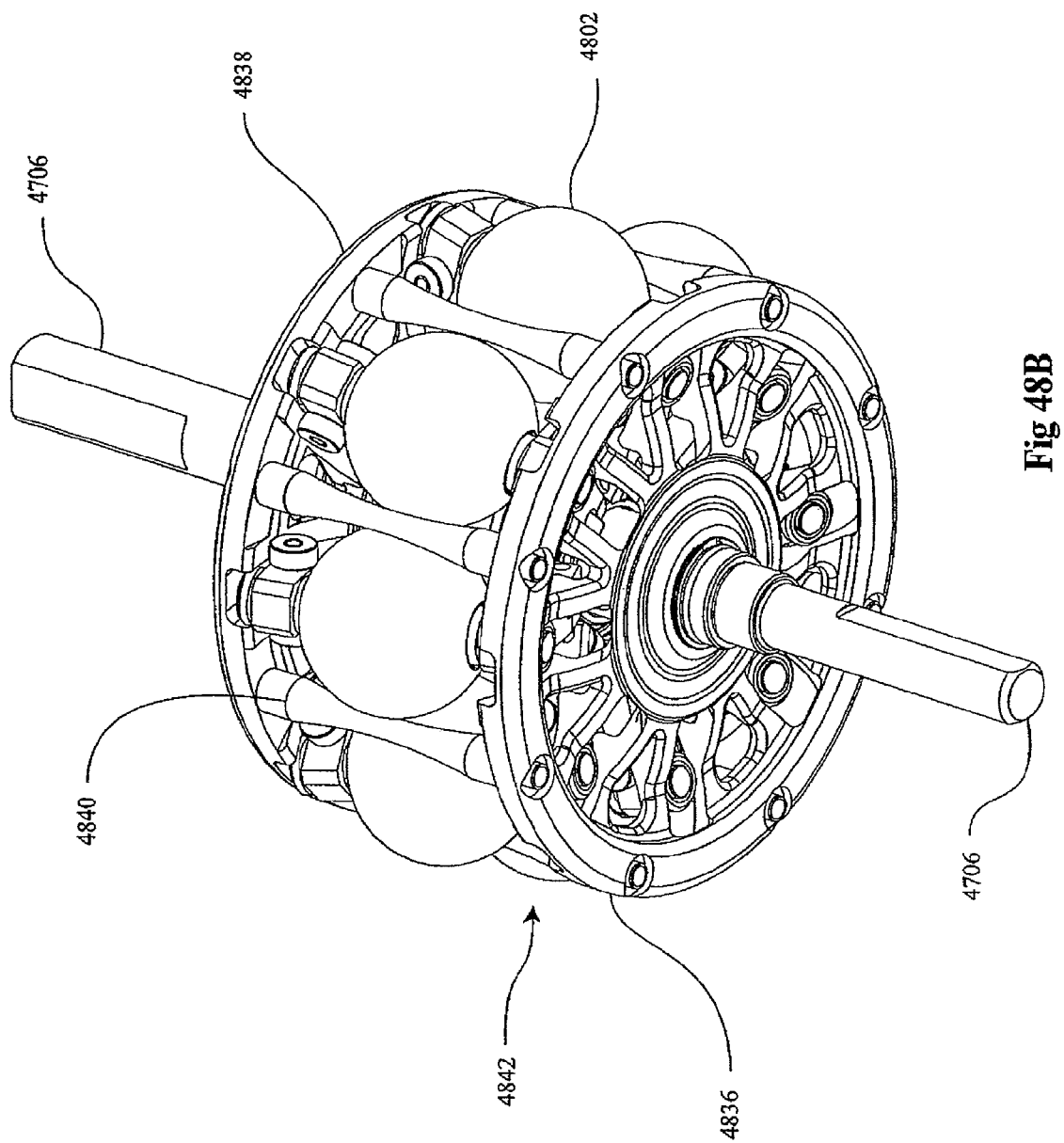
FIG. 48B is a perspective view of certain components of the CVT, shown in FIG. 47, generally illustrating a cage subassembly of the variator subassembly.
Figure 48C:
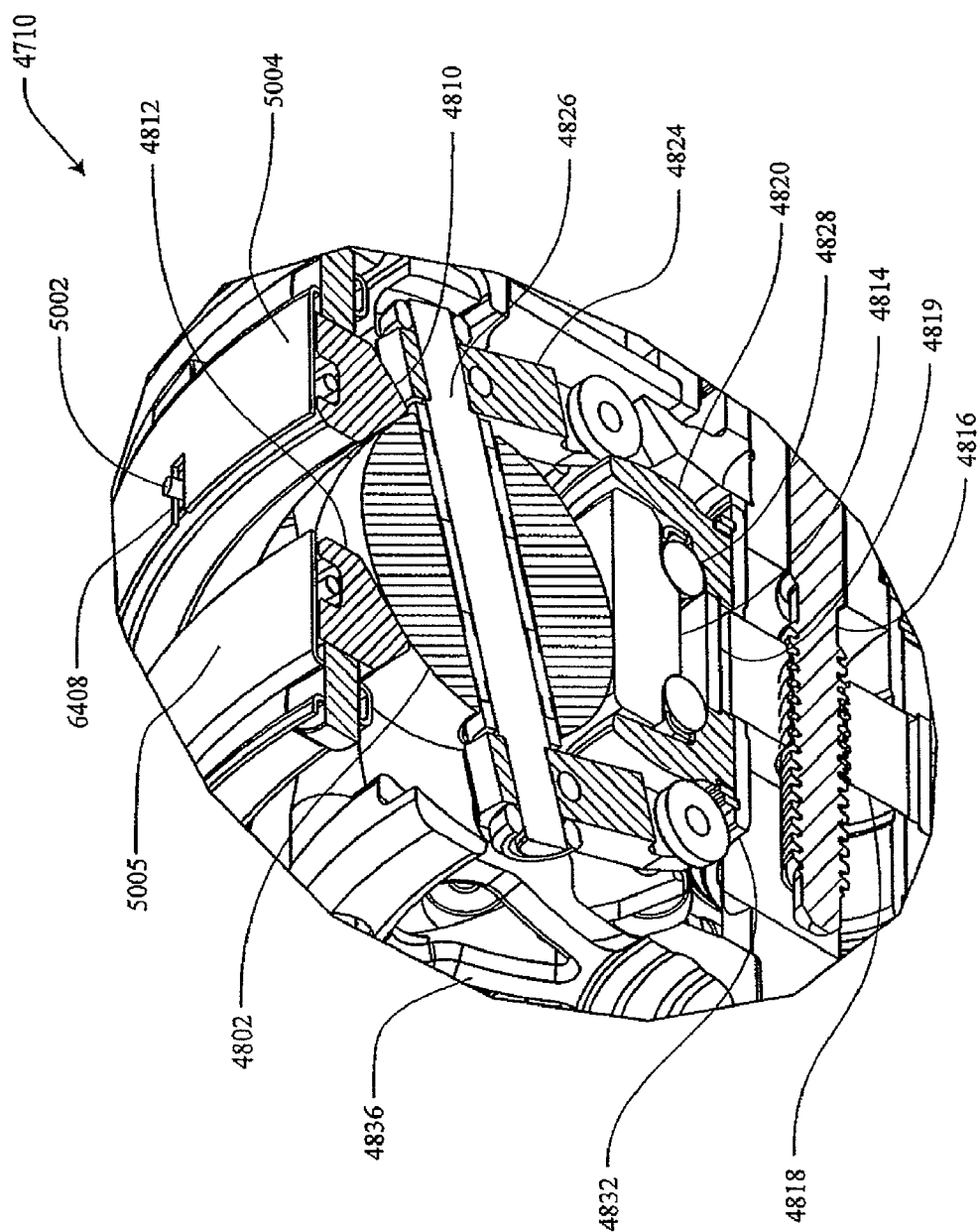
FIG. 48C is a perspective, cross-sectional view of certain components of the variator subassembly shown in FIG. 48A.

In some instances, for description purposes only, the power roller 4802, power roller axle 4826, leg 4824, and cam roller 4822 are referred to collectively as the power roller-leg assembly 4830. Similarly, at times, the idler 4814, shift cams 4820, idler bushing 4832, shift rod nut collar 4819, and other components related thereto, are referred to collectively as the idler assembly 4834. As best seen in FIG. 48B, a stator plate 4836 and a stator plate 4838 couple to a number of stator rods 4840 to form a cage or carrier 4842.

Figure 48F:
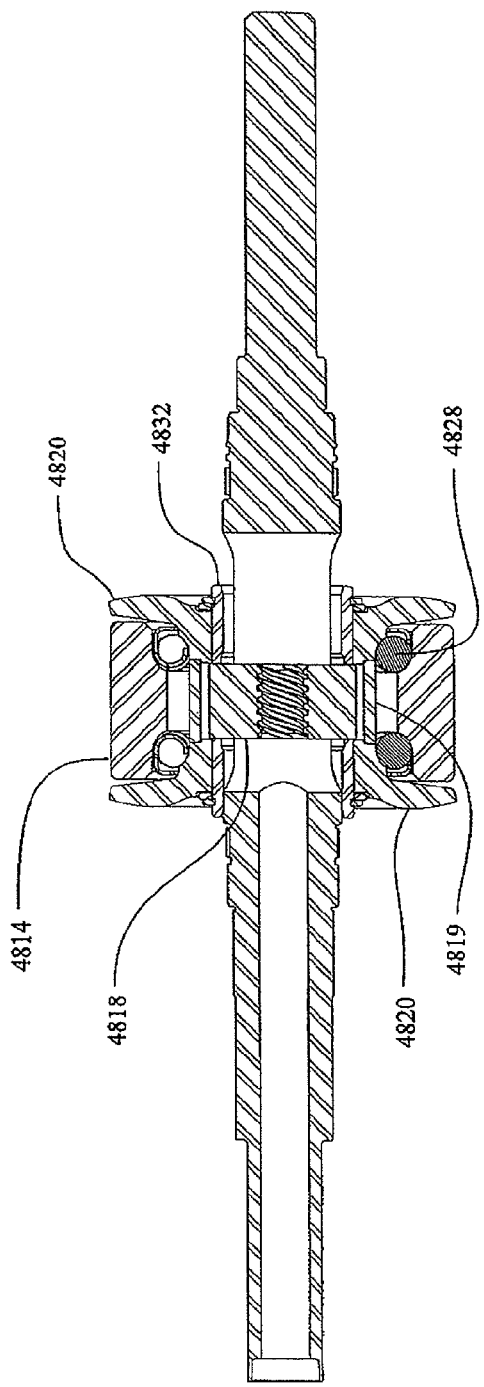
FIG. 48F is a cross-section of one embodiment of the idler subassembly of FIG. 48D as implemented with other components of the CVT shown in FIG. 47.
Figure 48G:
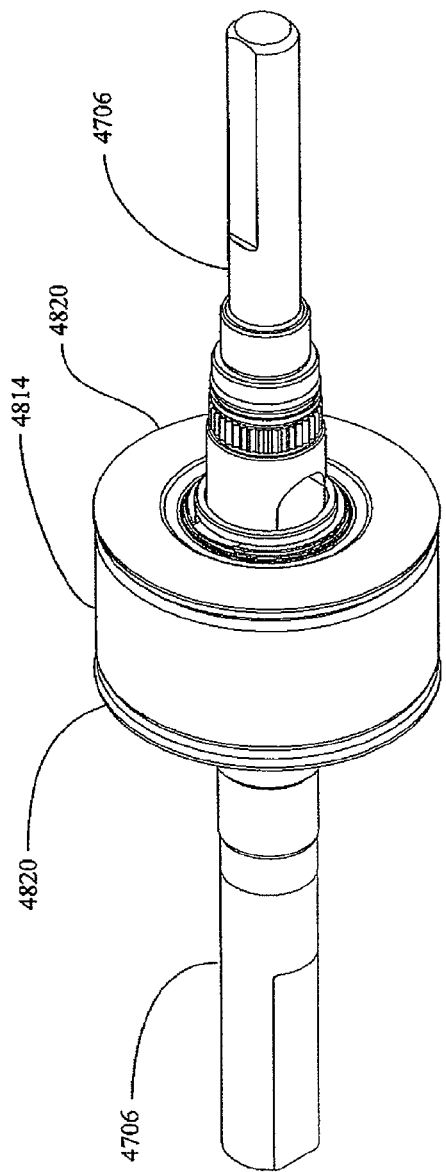
FIG. 48G is a perspective view of the CVT components shown in FIG. 48F.

FIGS. 48D-48E show one embodiment of the idler assembly 4834. In addition to components already mentioned above, the idler assembly 4834 in some embodiments includes retaining rings 4844 and thrust washers 4846. The retaining rings 4844 fit in snap ring grooves of the idler bushing 4832, and the thrust washers 4846 are positioned between the retaining rings 4844 and the shift cams 4820. In some embodiments, as shown in FIG. 48E, the ball bearings 4828 may be encased in bearing cages 4848. FIGS. 48F-48G show the idler assembly assembled on the main axle 4706.

Turning now to FIGS. 49A-49F, one embodiment of a power input means assembly 4710 is depicted and will now be described. In one embodiment, the input means assembly 4710 includes a freewheel 4902 that couples to one end of an input driver 4904. In some embodiments, the freewheel 4902 may be a one-way clutch, for example. A torsion plate 4906 couples to another end of the input driver 4904. A cam driver 4908 couples to the torsion plate 4906. In the embodiment shown, the cam driver 4908 and the torsion plate 4906 have mating splines and the cam driver 4908 mounts coaxially with the torsion plate 4906.

Figure 49A:
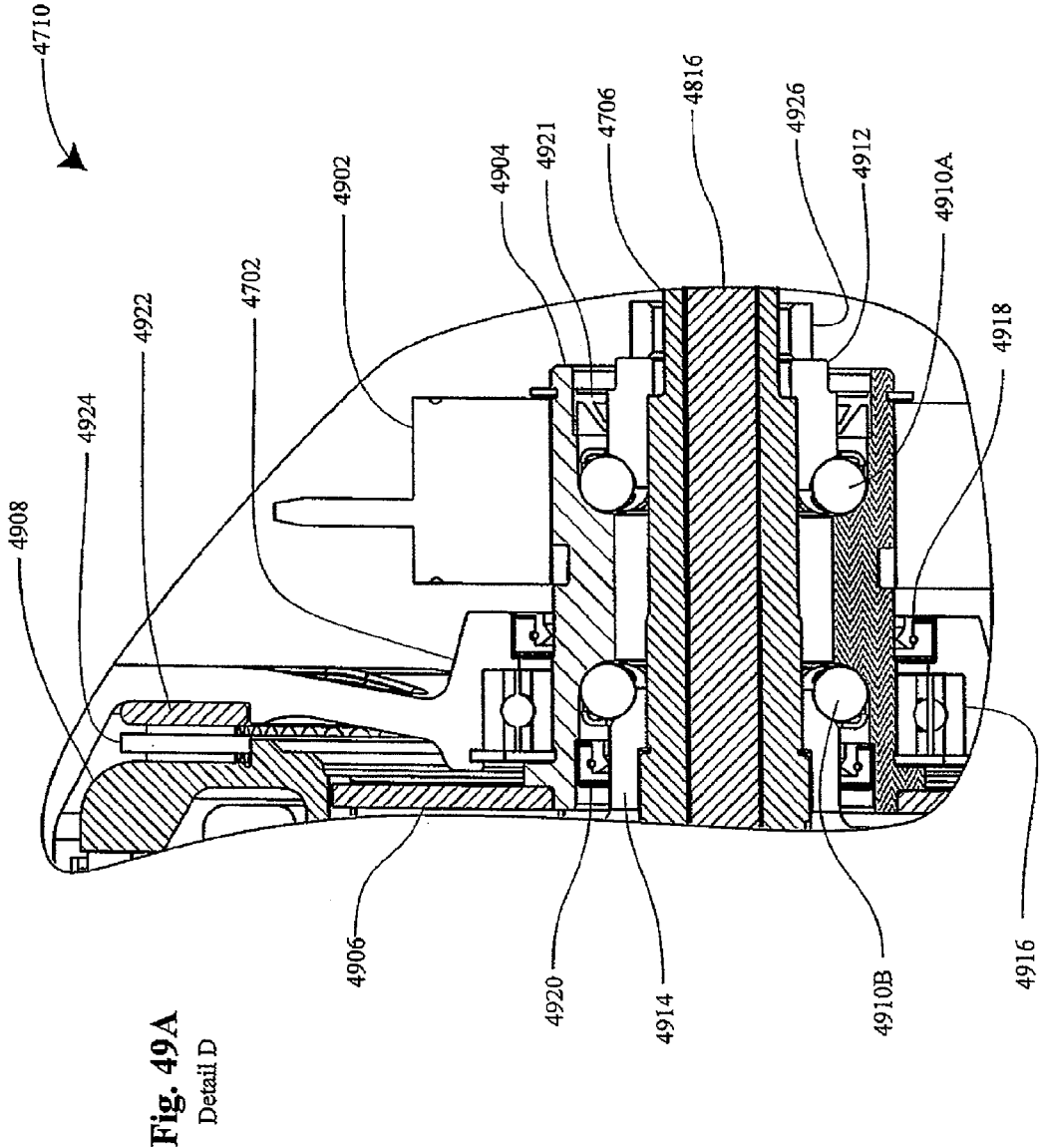
FIG. 49A is a detail view D, of the cross-section shown in FIG. 47, generally illustrating a power input means subassembly.
Figure 49B:
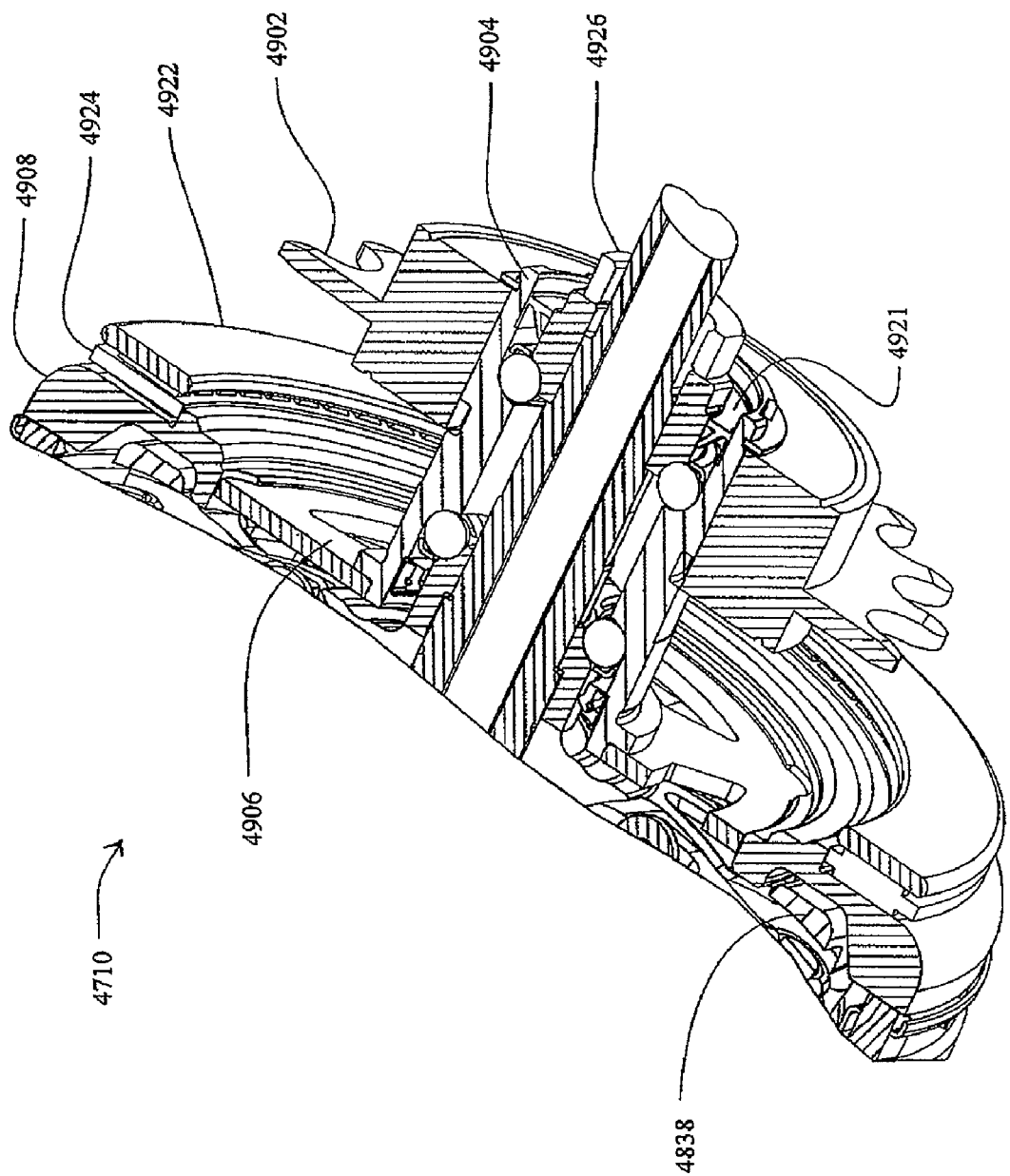
FIG. 49B is a perspective, cross-sectional view of certain CVT components shown in FIG. 49A.
Figure 49E:
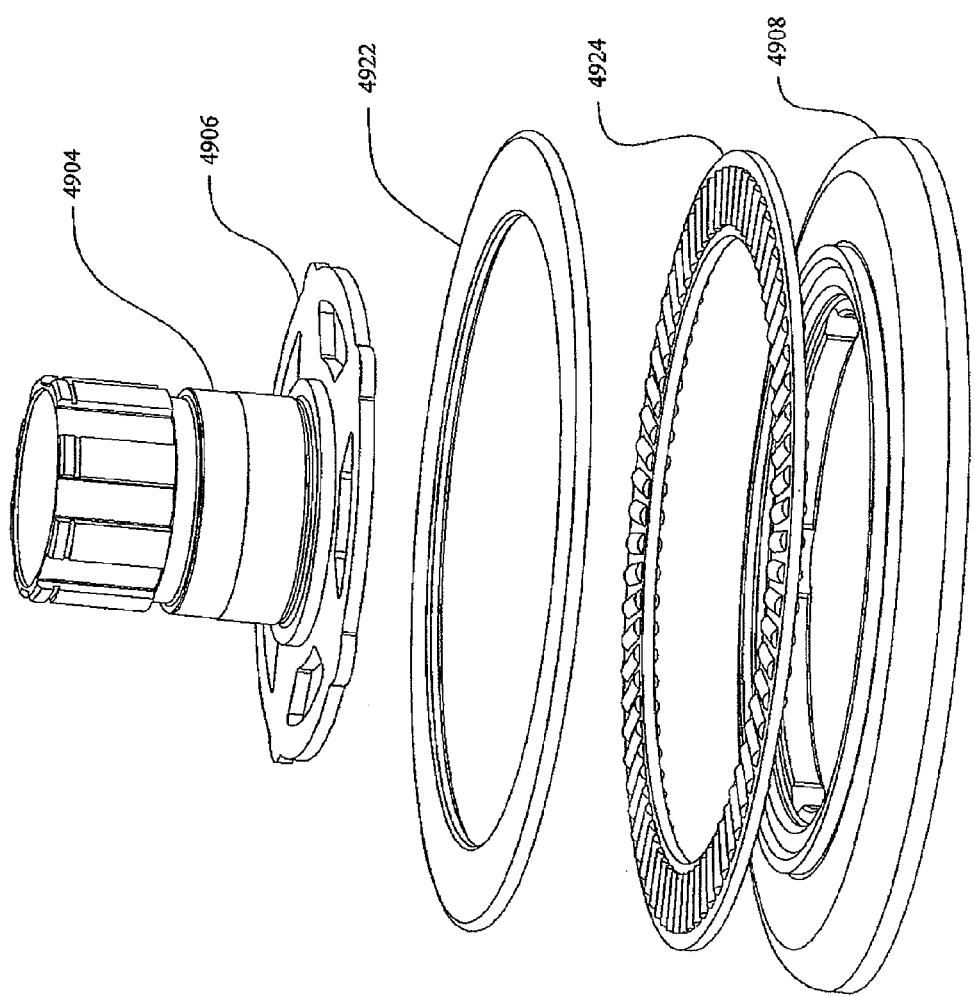
FIG. 49E is a perspective, exploded view of certain components of the power input means subassembly shown in FIG. 49A.

In the embodiment illustrated, the input driver 4904 rides on ball bearings 4910A, 4910B. One set of ball bearings 4910A rides on a race provided by a bearing nut 4912. A second set of ball bearings 4910B rides on a race provided by a bearing race 4914. The bearing nut 4912 and the bearing race 4914 fit over the main axle 4706. In one embodiment, the bearing nut 4912 threads onto the main axle 4706, while the bearing race 4914 is pressed fit onto the main axle 4706. As shown in FIG. 49A, the input driver 4904, the bearing nut 4912, and the bearing race 4914 are configured to provide the functionality of angular contact bearings.

The hub shell 4702 rides on a radial ball bearing 4916, which is supported on the input driver 4904. A seal 4918 is placed between the hub shell 4702 and the input driver 4904. A seal 4920 is placed between the bearing race 4914 and the input driver 4904. Another seal 4921 is placed between the input driver 4904 and the bearing nut 4912. To react certain axial loads that arise in the CVT 4700, interposed between the cam driver 4908 and the hub shell 4702 there is a thrust washer 4922 and a needle roller bearing 4924. In this embodiment, the hub shell 4702 is adapted to transmit torque into or out of the CVT 4700. Hence, hub shell 4702, in certain embodiments, can be configured to both transfer torque and to react axial loads, since the thrust washer 4922 and/or needle roller bearing 4924 transmit axial force to the hub shell 4702.

Referencing FIGS. 50A-50B now, one embodiment of an input-side axial force generation means subassembly (input AFG) 4712 will be described now. The input AFG 4712 includes a cam driver 4908 in contact with a number of load cam rollers 6404. The load cam rollers 6404 are positioned and supported by a roller cage 5004. The rollers 6404 also contact a set of ramps 6202 that are, in this embodiment, integral with the input traction ring 4810 (see FIG. 62). As the cam driver 4908 rotates about the main axle 4706, the cam driver 4908 causes the rollers 6404 to ride up the ramps 6202. This roll-up action energizes the rollers 6404 and thereby generates an axial force, as the rollers 6404 are compressed between the cam driver 4908 and the ramps 6202. The axial force serves to clamp or urge the input traction ring 4810 against the power rollers 4802. In this embodiment, the axial force generated is reacted to the hub shell 4702 through a needle bearing 4924 and a thrust washer 4922; in some embodiments, however, the thrust washer 4922 is not used, but rather an equivalent bearing race may be provided integral to the hub shell 4702. As illustrated, the needle bearing 4924 is placed between the load cam driver 4908 and the thrust washer 4922.

Figure 51:
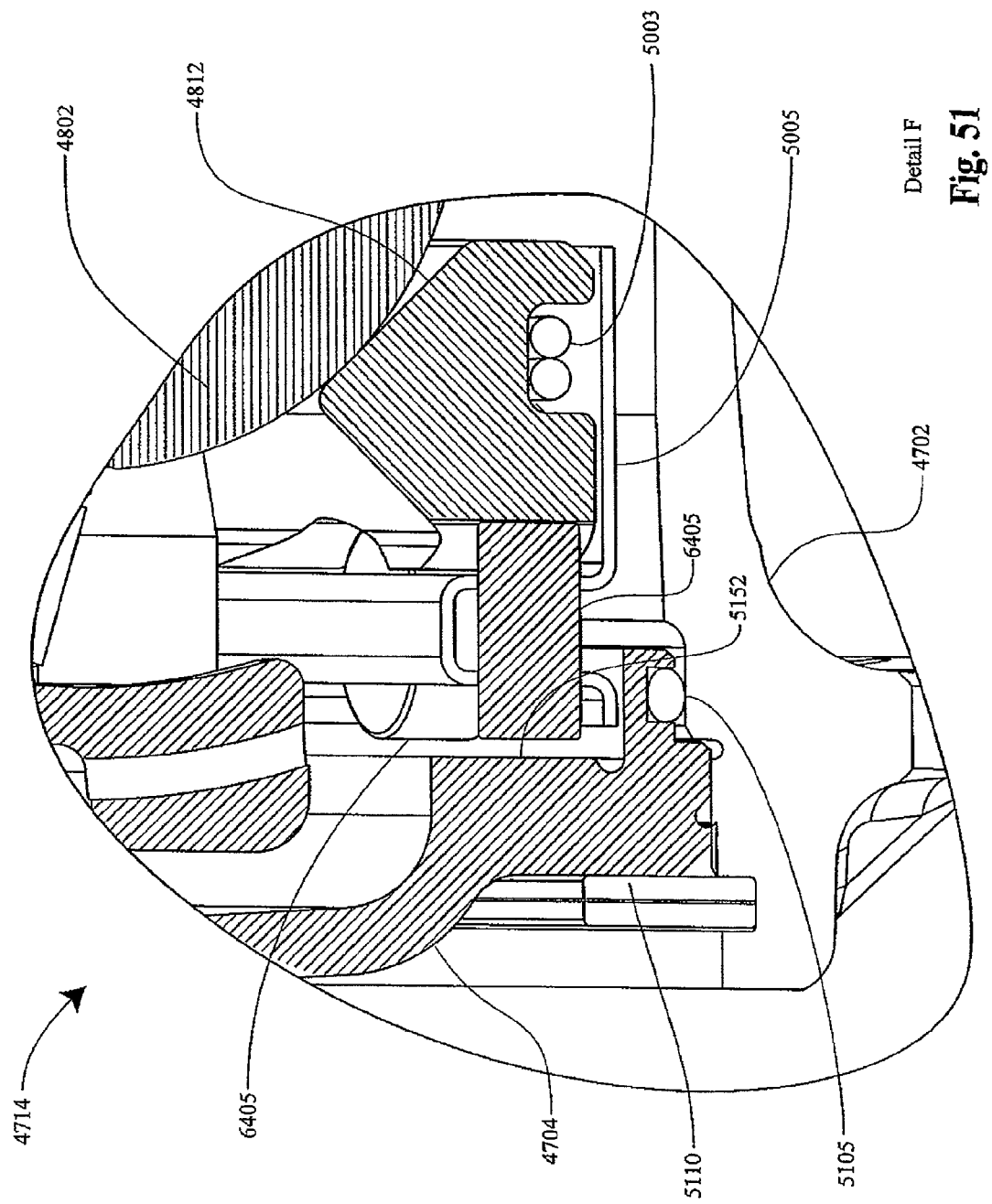
FIG. 51 is a detail view F, of the cross-section shown in FIG. 47, generally showing an output side axial force generation subassembly.
Figure 52:
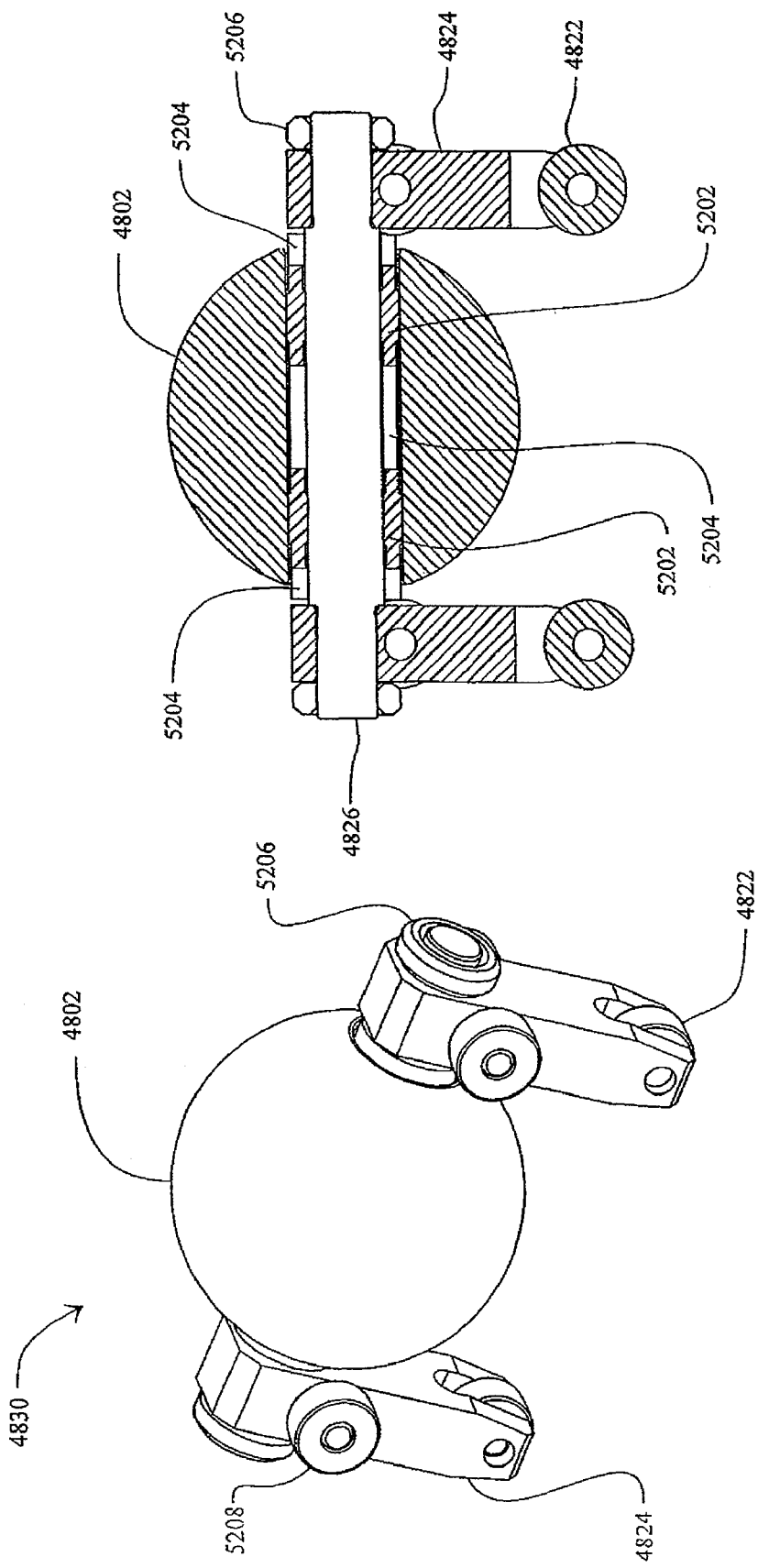
FIG. 52A is a perspective view of a power roller-leg subassembly that may be used with the variator subassembly of FIG. 47.
FIG. 52B is a cross-sectional view of the power roller-leg subassembly shown in FIG. 52A.

Turning to FIG. 51 now, one embodiment of an output-side axial force generation means subassembly (output AFG) 4714 is shown. A set of load cam rollers 6405, similar to the load cam rollers 6404 discussed above, is positioned and supported in a roller cage 5005, which is similar to the roller cage 5004. The rollers 6405 are interposed between the output traction ring 4812 and the hub shell cover 4704. In some embodiments, a surface 5152 of the hub shell cover 4704 is adapted as a reaction surface upon which the roller 6405 can act. In one embodiment, the reaction surface 5152 is flat; however, in other embodiments, the reaction surface 5152 has load cam ramps, such as ramps 6202. FIG. 51 shows a gap between the rollers 6405 and the hub shell cover 4704; however, after assembly of the CVT 4700, the gap closes as the torsion springs 5002, 5003 cause the rollers 6404, 6405 to ride up ramps 6202, 6203 on the input traction ring 4810 and output traction ring 4812, respectively. Once the output traction ring 4812 rotates about the main axle 4706 under torque transfer from the power roller 4802, the rollers 6405 travel further up the ramps 6203, which generates additional axial force as the rollers 6405 are further compressed between the output traction ring 4812 and the hub shell cover 4704.

FIGS. 52A-52B show one embodiment of a power roller-leg assembly 4830. The power roller-leg assembly 4830 includes the power roller 4802 mounted on needle roller bearings 5202. Spacers 5204 are placed on each end of the roller bearings 5202, with one of the spacers 5204 being in between the roller bearings 5202. The bearings mount on the roller axle 4826, the ends of which fit in bores of the legs 4824. The ends of the roller axle 4826 extend beyond the legs 4824 and receive skew rollers 5206. One end of the legs 4824 is adapted to receive cam rollers 4822. To guide the legs 4824 and support reaction forces during shifting of the CVT 4700, the legs 4824 may also be adapted to receive shift guide rollers 5208. As indicated, among other things, the guide rollers 5202 provide a reaction point for shift forces. In one embodiment, the guide rollers 5202 react some of the shift forces to the grounded cage 4842 (see FIG. 48B). Hence, the position of the guide roller 5208 on the leg 4824 is primarily determined such that the guide roller 5208 can move with the leg 4824 and simultaneously contact the reaction surfaces 5708 (see FIG. 57B) of the stators plates 4836, 4838 for all tilt angles of the power roller axle 4826.

Figure 53:
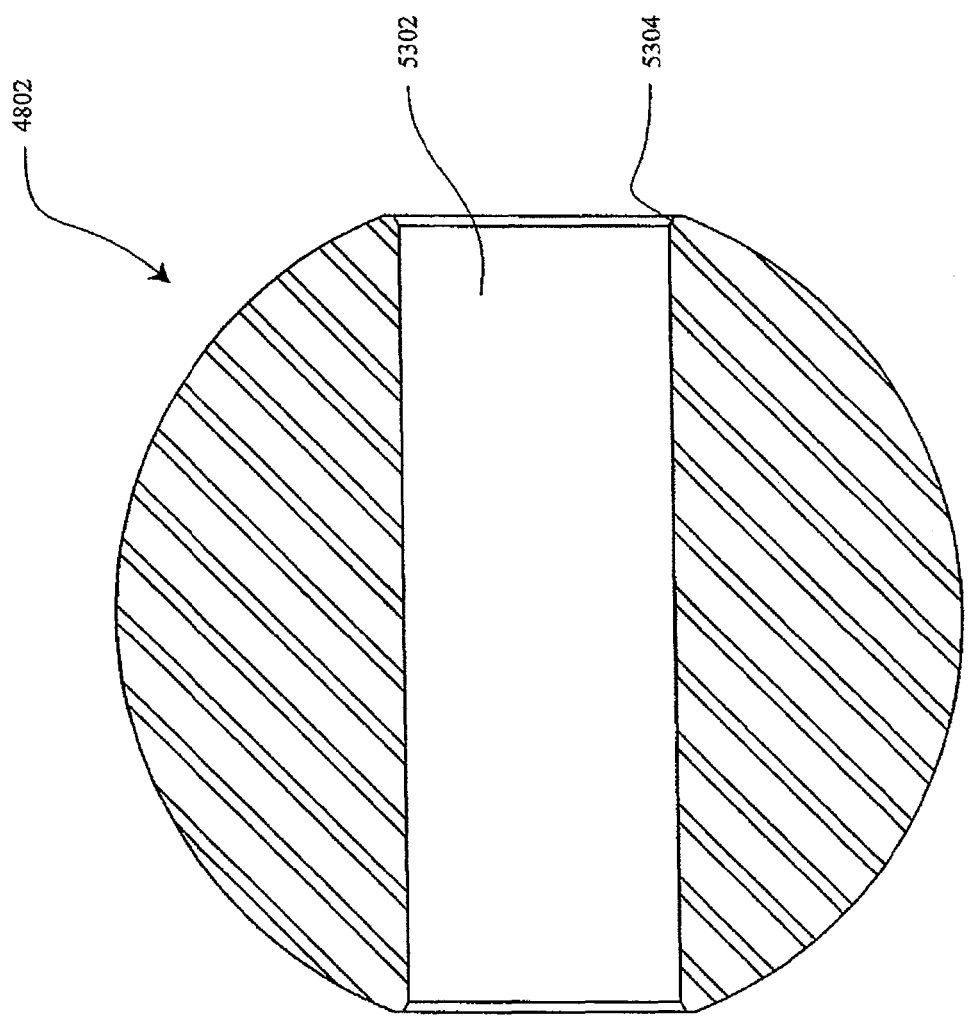
FIG. 53 is a cross-sectional view of a power roller that may be used with the power roller-leg subassembly of FIG. 52A.

FIG. 53 illustrates one embodiment of a power roller 4802. In a bicycle application, one embodiment of a power roller 4802 is a 28 millimeter (mm) in diameter, AFBMA Grade 25, bearing quality SAE 52100, 62-65 HRC through hardened, bearing ball. The central bore 5302 of the power roller 4802 is about 9 mm. In some embodiments, the surface texture of the power roller 4802 is about 1.6 microns maximum. In the embodiment shown, the power roller 4802 includes an angled surface 5304 at the ends of the bore 5302 to aid in assembly, improve fatigue life of the power roller 4802, as well as to reduce damage to the edge of the bore 5302 during handling, shipping, or assembly. In one embodiment, the angled surface 5304 is angled about 30 degrees from the longitudinal edge of the bore 5302. One way to manufacture the power roller 4802 is to form the bore 5302 on a relative soft material such as steel 8260, soft alloy steel 52100, or other bearing steels, then through harden or case harden the power roller 4802 to the desired hardness.

FIGS. 54A-54C depict one embodiment of a roller axle 4826 having a generally cylindrical middle portion 5402 and two generally cylindrical end portions 5404A, 5404B of smaller diameter than the middle portion 5402. In one embodiment, for a bicycle application for example, the roller axle 4826 is about 47-mm long from end to end. The middle portion 5402 may be about 30-mm long, while the end portions 5404A, 5404B may be about 8- or 9-mm long. It should be noted that the lengths of the end portions 5404A and 5404B need not be equal to each other. That is, the roller axle 4826 need not be symmetrical about the middle of the middle portion 5402. In one embodiment, the diameter of the middle portion 5402 is about 6-mm, and the diameter of the end portions 5404A, 5404B is about 5-mm. The roller axle 4826 may be made of alloy steel (for example, AISI 8620, SAE 8620H, SAE 4130, SAE 4340, etc.) having a surface hardness of about 55-62 HRC, with an effective depth of at least 0.5 mm.

FIG. 55 shows a cross section of a power roller axle 4827 similar to the roller axle 4826. The power roller axle 4827 features a countersink drill hole 5502 and a chamfer 5504. During assembly of the power roller axle 4827 and the skew roller 5206, the countersink drill hole 5502 can be radially expanded to provide a retaining feature for the skew roller 5206. This configuration reduces or eliminates the need for retaining rings, or other fastening means, for retaining the skew roller 5206 on the power roller axle 4827.

Figure 56B:
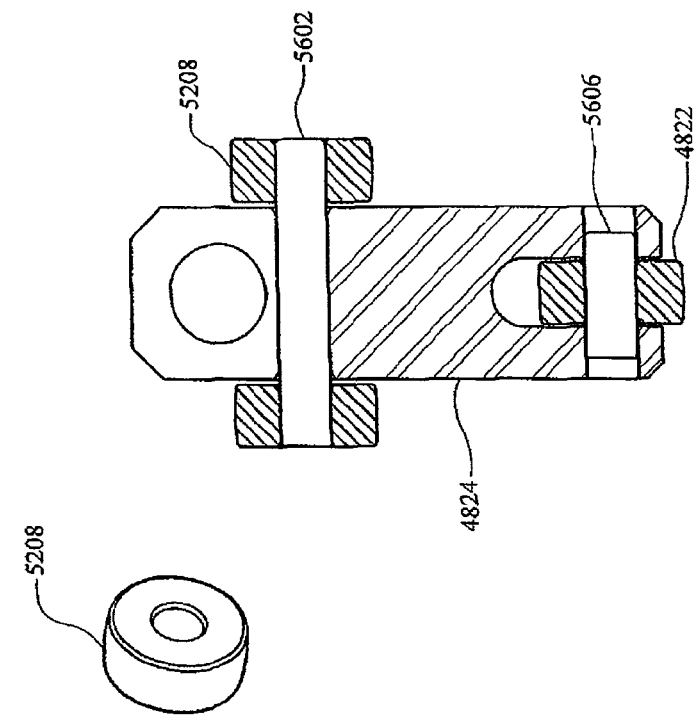
FIG. 56B is a cross-sectional view of the leg subassembly of FIG. 56A.
Figure 56A:
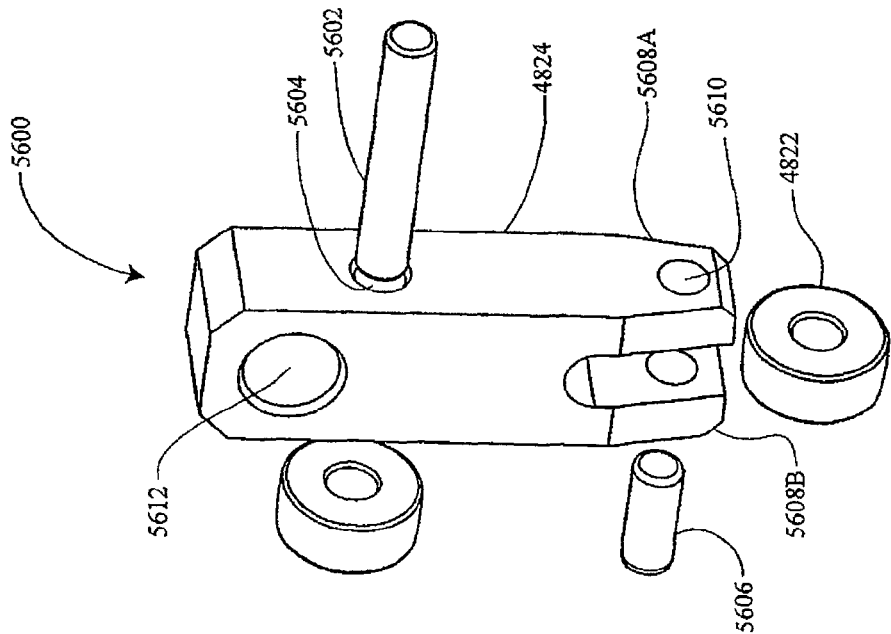
FIG. 56A is an exploded, perspective view of a leg subassembly that may be used with the power roller-leg subassembly of FIG. 52A.

FIGS. 56A-56B shows certain components of a leg assembly 5600. A leg portion 4824 is adapted to receive a guide roller pin or axle 5602 in a bore 5604. The guide roller axle 5602 extends beyond the ends of the bore 5604 and provides support for the shift guide rollers 5208. The leg portion 4824 may be further adapted to receive a cam roller pin or axle 5606 for supporting the cam roller 4822. In the embodiment illustrated, the cam roller axle 5606 does not extend beyond the edges of the leg portion 4824. The leg portion 4824 has fingers or extension 5608A, 5608B, each of which has a bore 5610 for receiving the cam roller axle 5606. The end of the leg portion 4824 opposite to the leg extensions 5608A, 5608B has a bore 5612 for receiving the roller axle 4826.

In some embodiments, the guide roller axle 5602 and the bore 5604 are sized so that the guide roller axle 5602 is free to roll on the bore 5604, i.e., there is a clearance fit between the guide roller axle 5602 and the bore 5604. In such embodiments, the shift guide rollers 5208 may be press fit onto the guide roller axle 5602. Similarly, in some embodiments, the cam roller axle 5606 and the bore 5610 may be sized relative to one another for a clearance fit. The cam rollers 4822 may be press fit onto the cam roller axle 5606. For certain applications, this arrangement of letting the guide roller axle 5602 and cam roller axle 5606 rotate freely, respectively, in the bores 5604, 5610, enhances the stability of the leg assembly 5600 during operation of the CVT 4700. Additionally, since the shift guide rollers 5208 and the cam roller 4822 are pressed fit, respectively, onto the guide roller axle 5602 and the cam roller axle 5606, it is not necessary to secure the shift guide rollers 5208 and the cam roller 4822 to the their respective axles by, for example, retaining clips.

In one embodiment, the leg portion 4824 is about 26-mm long, about 8-mm wide, and about 6-mm thick, with the thickness being the dimension transverse to the longitudinal axis of the cam roller axle 5602. In some embodiments, the diameter of the bore 5612 is about 4-5 mm, and the diameters of the bores 5604 and 5610 are about 2-3 mm. In one application, the leg portion 4824 can be made of an alloy steel SAE 4140 HT and through hardened to HRC 27-32. In some embodiments, the leg portion 4824 is made of any one of magnesium alloys, aluminum alloys, titanium alloys or other lightweight materials or alloys.

The shift cam roller 4822 can be made, in some embodiments, of prehard, alloy steel AISI 4140 RC 34. In some applications, the shift cam roller 4822 can have an outer diameter of about 7-8 mm, an inner diameter of about 2-3 mm, and a thickness of about 3 mm, for example. The cam roller axle 5606 can be, for example, a dowel having a length of about 6 mm and a diameter of about 2-3 mm. In certain embodiments, the shift cam roller 4822 may have a crown on its functional surface.

The guide roller axle 5602 may be made of, for example, alloy steel SAE 52100 hardened through and tempered to RC 55-60, or alloy steel SAE 1060 hardened through and tempered to RC 55-60, or alloy steel SAE 8620, 8630, or 8640 case hardened to RC 55-60 to an effective depth of 0.2-0.8 mm. In some embodiments, the guide roller axle 5602 is approximately 15 mm long and has a diameter of about 2-3 mm. In certain embodiments, the shift guide rollers 5208 have about the same dimensions and material characteristics as the shift cam rollers 4822.

Referencing FIG. 52A, the skew roller 5206, in some embodiments, can be made of prehard, alloy steel AISI 4140 and hardened to HRC 27-32. The skew roller 5206 can have an outer diameter of about 8-9 mm, an inner diameter of about 4-5 mm, and a thickness of about 2-3 mm, for example.

Turning now to FIGS. 57A-57E, one embodiment of the stator plates 4836, 4838 will now be described. In certain embodiments, the stator plates 4836, 4838 are the same; hence, for purposes of description here only one stator plate will be considered. The stator plate 4836 is generally a plate or frame for supporting and guiding the skew rollers 5206 and the shift guide rollers 5208. The stator plate 4836 includes an outer ring 5702 having a number of through holes 5704 for receiving the stator spacers or rods 4840 (see FIG. 48B). The stator plate 4836 includes a central bore 5706 for mounting coaxially with the main axle 4706. In some embodiments, the central bore 5706 is adapted to be broached and retained in place by broaching surfaces on the main axle 4706 (see FIGS. 66A-66D, for example). The stator plate 4836 includes surfaces 5708 that are generally concave and are adapted to support the shift guide rollers 5208 as the CVT 4700 is shifted. Additionally, the stator plate 4836 is provided with reaction surfaces 5710, radially arranged about the central bore 5706, for reacting forces transmitted through the skew rollers 5206 as the CVT 4700 is in operation.

Figure 57A:
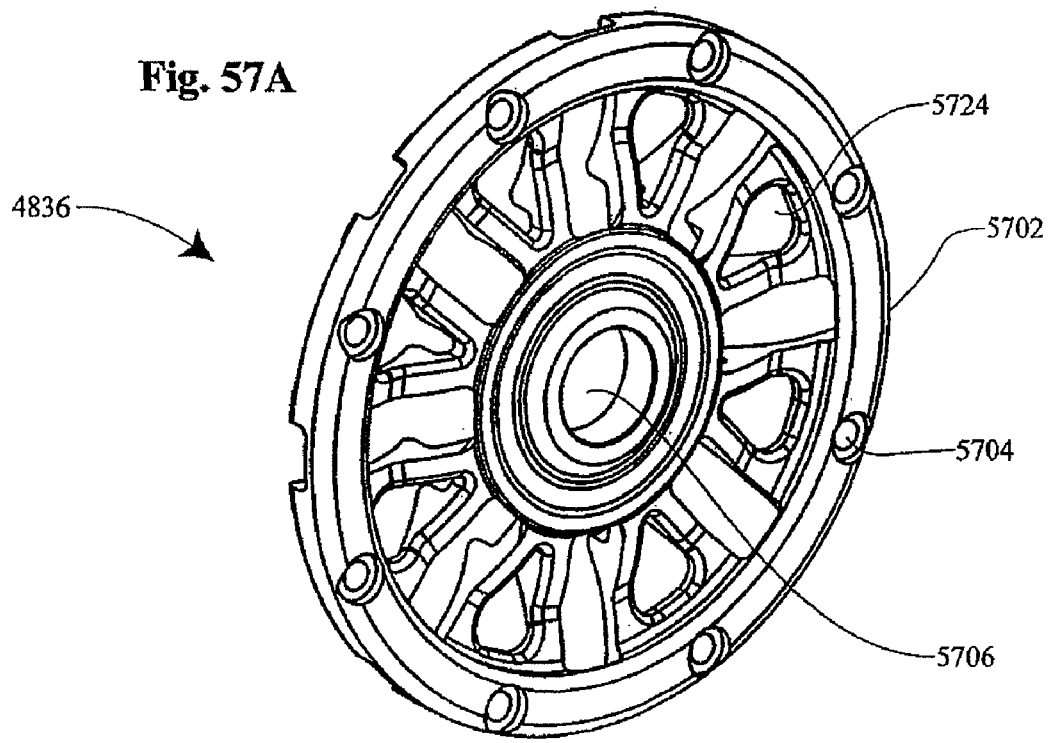
FIG. 57A is a perspective view of the right side of a stator plate that can be used with the cage subassembly of FIG. 48B.
Figure 57B:
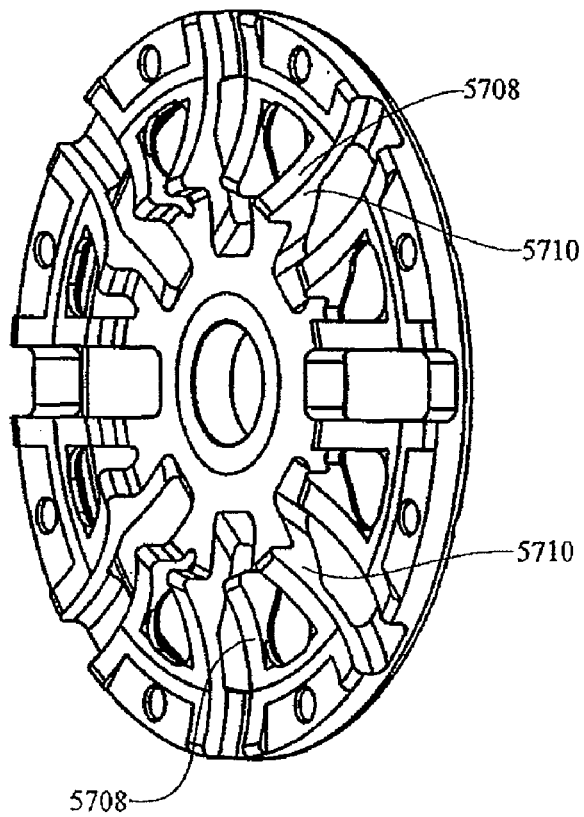
FIG. 57B is a perspective view of the left side of the stator plate of FIG. 57A.
Figure 57D:
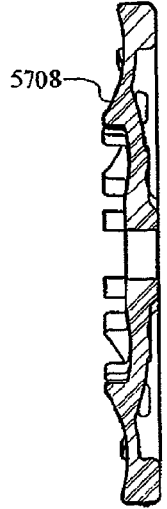
FIG. 57D is a cross-sectional view, along the section line I-I, of the stator plate of FIG. 57C.
Figure 57C:
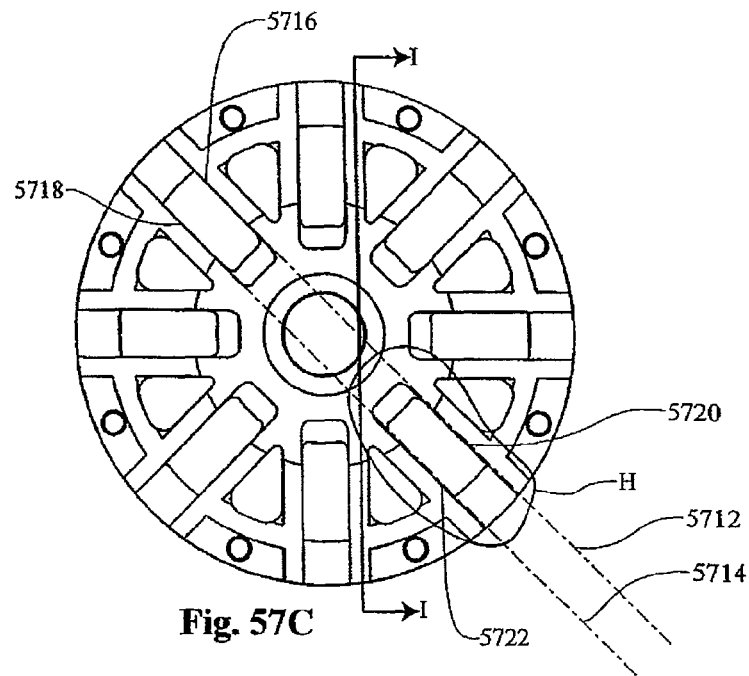
FIG. 57C is a plan view of the left side of the stator plate of FIG. 57A.
Figure 57E:
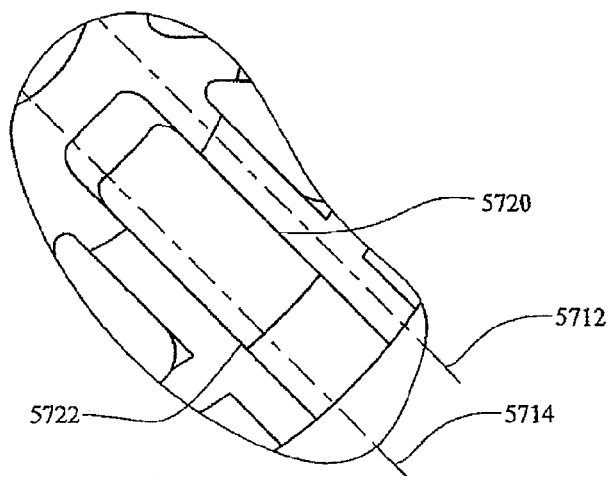
FIG. 57E is a detail view H, of the plan view shown in FIG. 57C, generally showing a stator plate slot offset.
Figure 58A:
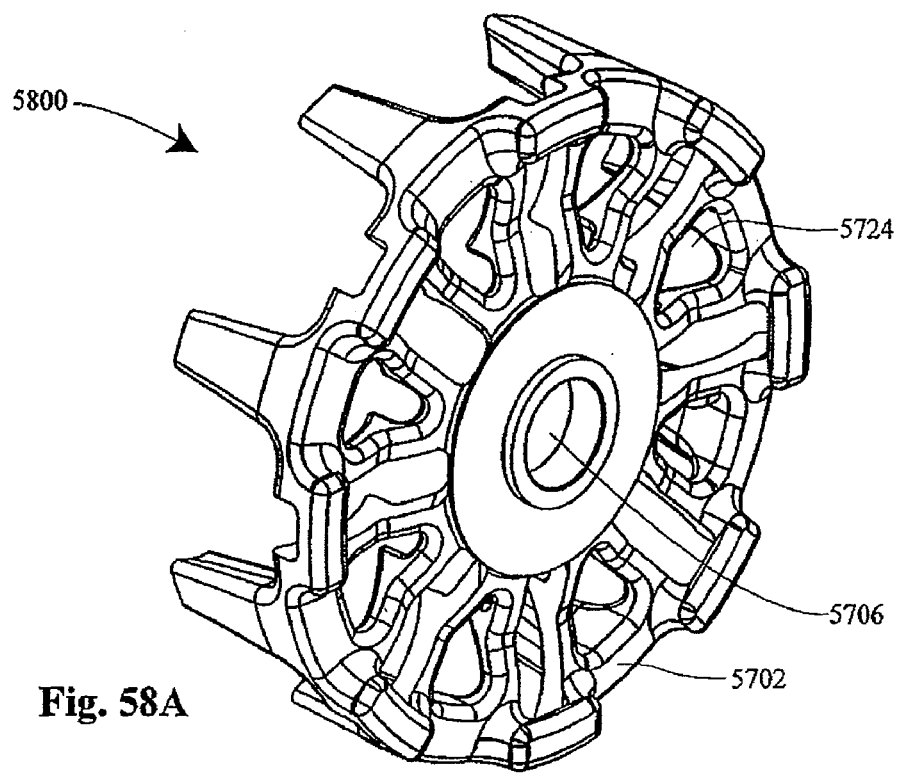
FIG. 58A is a perspective view of the right side of an alternative stator plate.
Figure 58B:
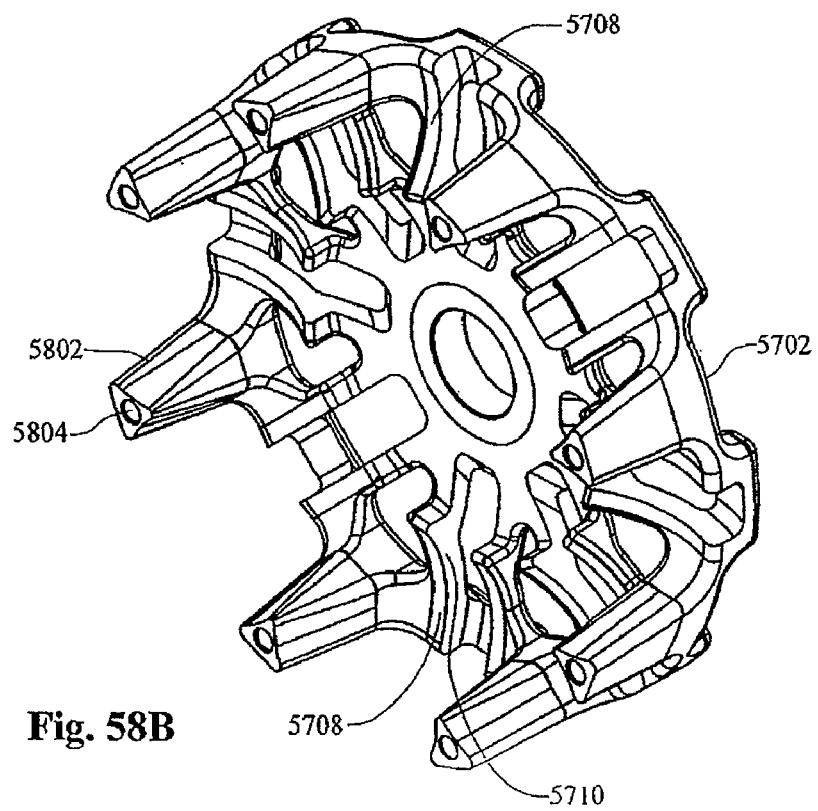
FIG. 58B is a perspective view of the left side of the stator plate of FIG. 58A.

Due to torque and reaction force dynamics that arise at the power roller-leg assembly 4830 during operation of the CVT 4700, in certain embodiments it is preferable that the reaction surfaces 5710 have a certain amount of offset in their layout about the circumferential direction of the stator plate 4836. In other words, referencing FIGS. 57C and 57E, the straight lines 5712, 5714 that project from the edges 5716, 5718 of the reaction surfaces 5710 on one side of the stator plate 4836 do not coincide (that is, are offset) with the edges 5720, 5722 of the surfaces 5710 on the opposite side of the stator plate 4836. The amount of offset shown in FIG. 57E is exaggerated for clarity of description. In some embodiments, the amount of offset is about 0.05-0.6 mm, preferably about 0.10-0.40 mm, and more preferably about 0.15, 0.17, 0.20, 0.23, 0.25, 0.28, 0.30, 0.33, or 0.36 mm. In yet other embodiments, stator offset can be accomplished by positioning the individual stator plates 4836, 4838 angularly offset relative to one another. In other words, stator offset can be introduced by offsetting the edges 5716 and 5718 of each stator plate 4836, 4838 relative to the corresponding edges on the other stator plate 4836, 4838 by angular misalignment of the stator plates 4836, 4838 relative to one another at the time of assembly. In this latter approach to stator offset, it is not necessary for either of the stator plates 4836, 4838 to have edges 5716, 5718 that do not align with the edges 5720, 5722. For certain applications, the angular offset between the stator plates 4836, 4838 is about 0.1-05 degrees, or more preferably 0.15 to 0.40 degrees.

In one embodiment, the stator plate 4836 has an outer diameter of about 92 mm and a central bore 5706 diameter of about 14-15 mm. The surfaces 5708 have a torus pitch radius of about 37 mm with respect to a central axis of the stator plate 4836. The stator plate 4836 can be made of, for example, alloy steel AISI 4130H, 20 RC. In some embodiments, the stator plate 4836 is made of magnesium alloys, aluminum alloys, titanium alloys or other lightweight material. For weight reduction and lubrication flow purposes, cutouts 5724 are formed to remove material from the stator plate 4836. In some embodiments, the stator plate 4836 may be made of a hardenable alloy, such as AISI 8260, so that surfaces 5708 and surfaces 5710 may be selectively hardened, for example, to 45 RC.

Shown in FIGS. 58A-58D is yet another embodiment of a stator plate 5800. Because the stator plate 5800 and the stator plate 4836 have common design features, those features will not be described again with respect to the stator plate 5800 but will be referenced by the same labels. The stator plate 5800 includes shift guide surfaces 5708, skew rollers reaction surfaces 5710, central bore 5706, and material cut outs 5724. Additionally, the stator plate 5800 includes connecting extensions 5802 that are formed integral with the outer ring 5702 and extend substantially perpendicularly from the outer ring 5702. During assembly, the connection extensions 5802 of the stator plate 5800 mate with corresponding extensions of a matching stator plate 5800 to form a cage similar to the cage 4842 shown in FIG. 48B. The mating connection extensions 5802, in one embodiment, are coupled by suitable fastening features or means, such as with dowel pins (not shown) appropriately sized. The dowel pins fit in holes 5804 of the connecting extensions 5802. In other embodiments, the connecting extensions 5802 extend from the stator plate 5800, for example, to a stator frame (not shown) similar to the stator plate 5800 but which has no connecting extensions 5802. Rather, said stator frame is adapted to couple to the connecting extensions 5802 via suitable fastening means, for example, screws, bolts, welds, etc. In some embodiments, the stator plate 5800 has offset surfaces 5710, as discussed above with respect to stator plate 4836 and shown in FIG. 58C by lines 5806 and 5808.

Figure 59:
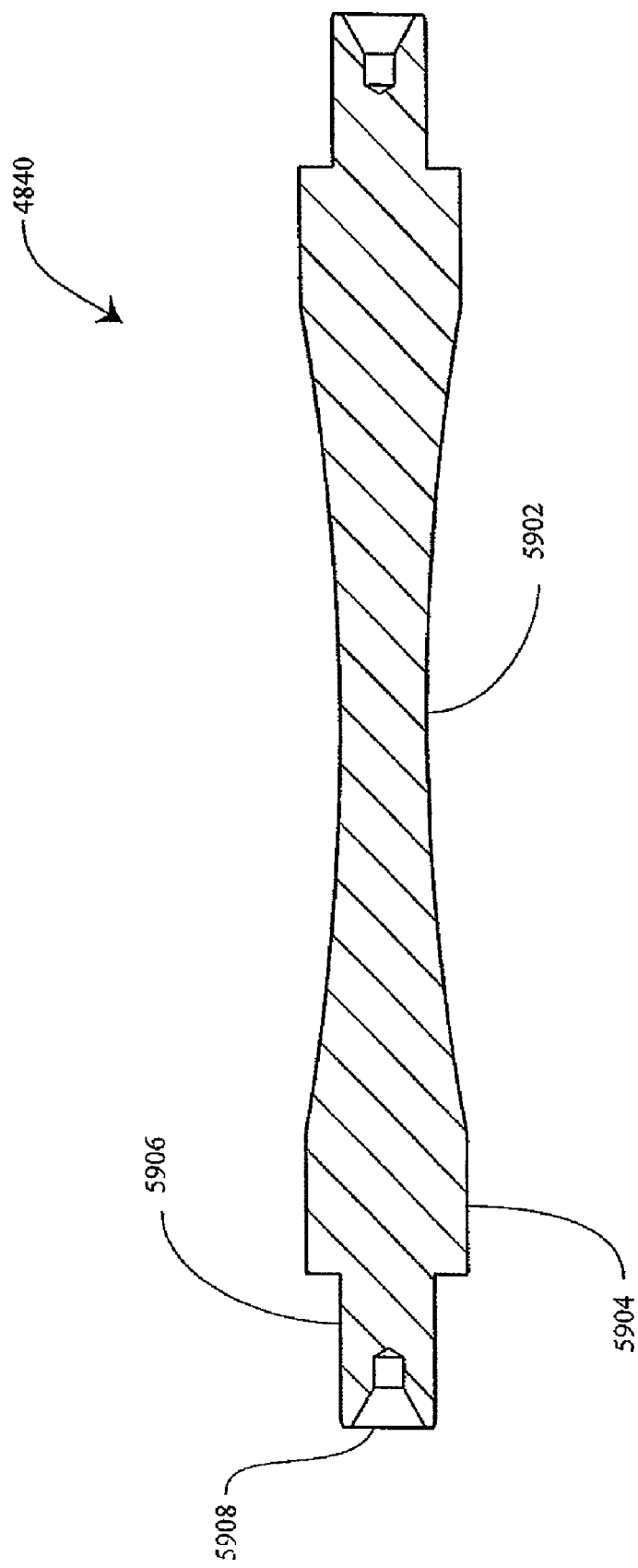
FIG. 59 is a cross-sectional view of a stator rod as may be used with the cage subassembly of FIG. 48B.

FIG. 59 shows one embodiment of a stator rod 4840 as may be used with the stator plates 4836 and 4838 to form the carrier 4842 (see FIG. 48B). The stator rod 4840 includes a waist portion 5902 that transitions into shoulder portions 5904, which transition into generally cylindrical end portions 5908 that have an outer diameter that is smaller than the outer diameter of the shoulder portions 5904. In some embodiments, the end portions 5908 are provided with a countersink hole 5908 that during assembly can be expanded to retain the stator rods 4840 in the stators 4836, 4838. In certain embodiments, the end portions 5908 are adapted to fit in the stator plate connecting holes 5704 (see FIG. 57A).

In certain applications, the stator rod 4840 can be made of alloy steel SAE 1137 with a 20 RC surface. In some embodiments, the stator rod 4840 is made of magnesium alloys, aluminum alloys, titanium alloys or other lightweight material. In some embodiments, the stator rod is approximately 55-56 mm long, with the end portions 5908 being about 5-7 mm long, and the shoulder portions 5904 being about 6-8 mm long. The diameter of the end portions 5908 may be approximately 4.5-6.5 mm, the diameter of the shoulder portions 5908 may be about 6.5-7.5 mm, and the diameter of the waist portion 5902 may be about 3-4 mm at its narrow point.

Figure 60A:
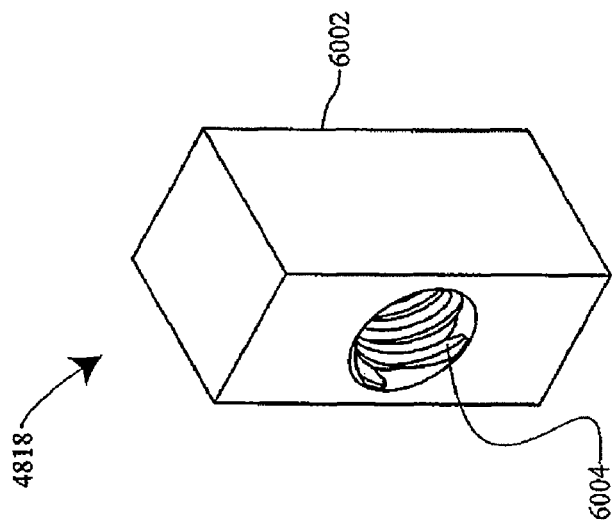
FIGS. 60A-60C are perspective, cross-sectional, and plan views of a shift rod nut as may be used with the variator subassembly of FIG. 48A.
Figure 60B:
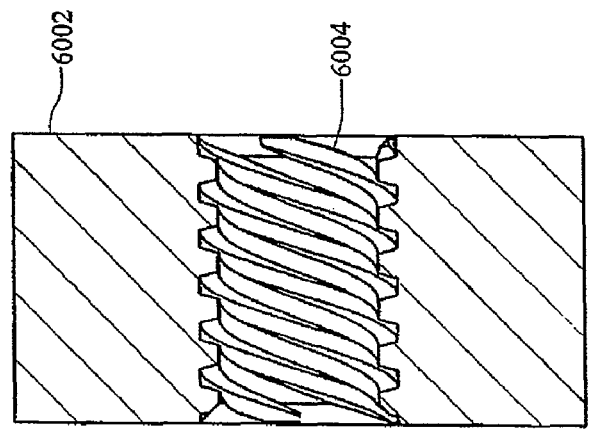
Figure 60C:
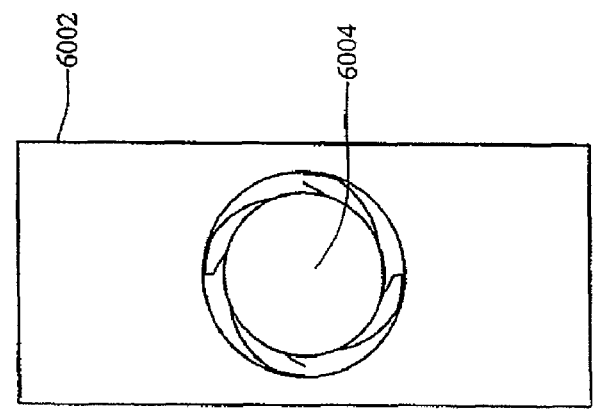
Figure 61A:
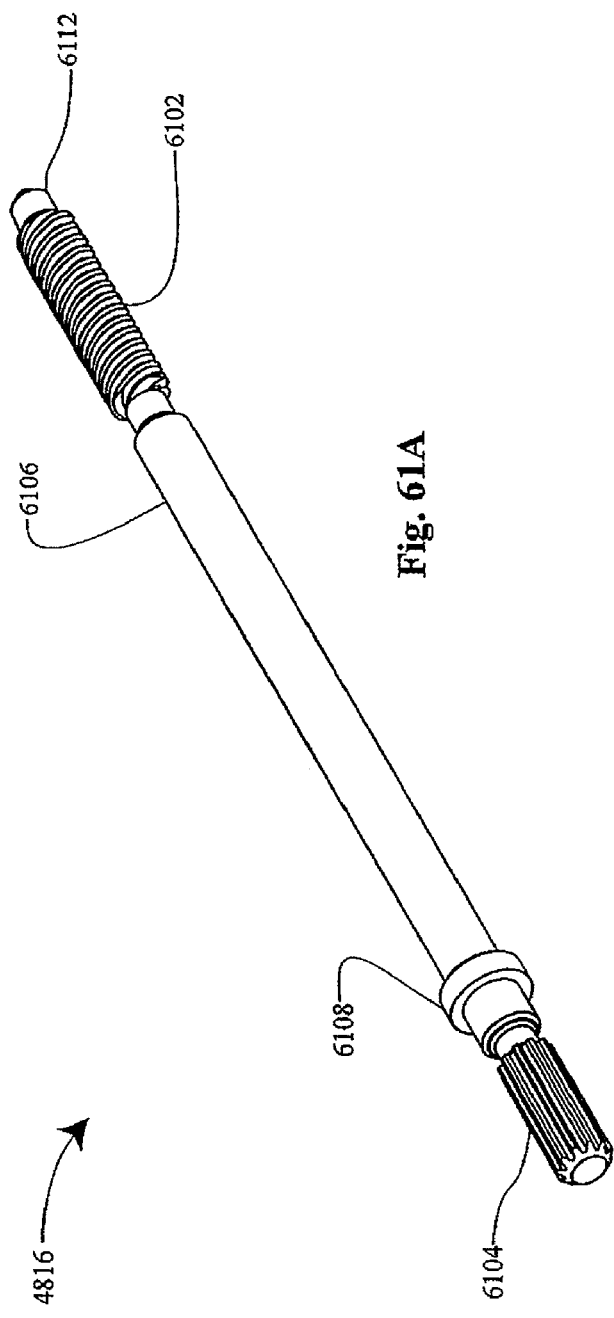
FIGS. 61A-61B are perspective and plan views of a shift rod as may be used with the variator subassembly of FIG. 48A.
Figure 61B:
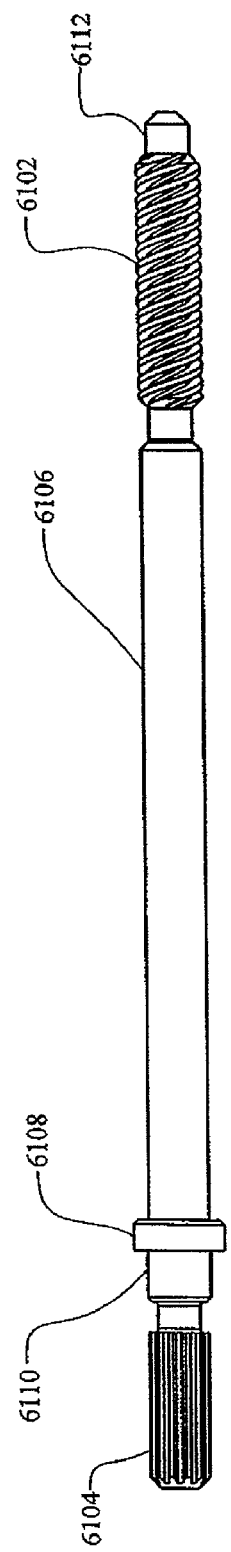
Figure 64C:
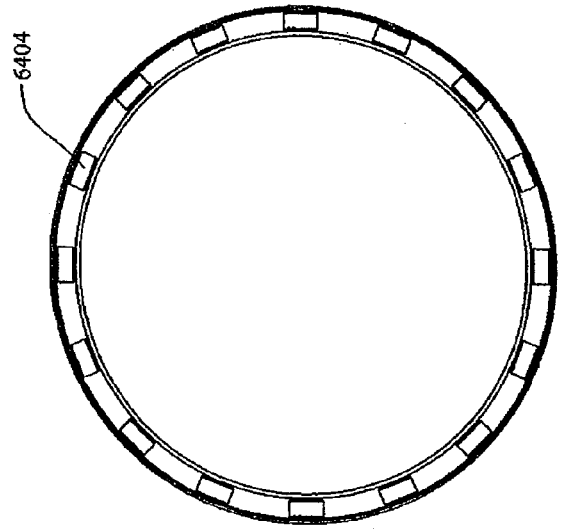
FIG. 64C is a plan view of the roller cage of FIG. 64A.
Figure 64B:
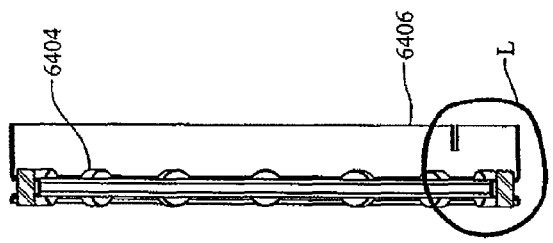
FIG. 64B is a cross-sectional view of the roller cage of FIG. 64A.
Figure 64A:
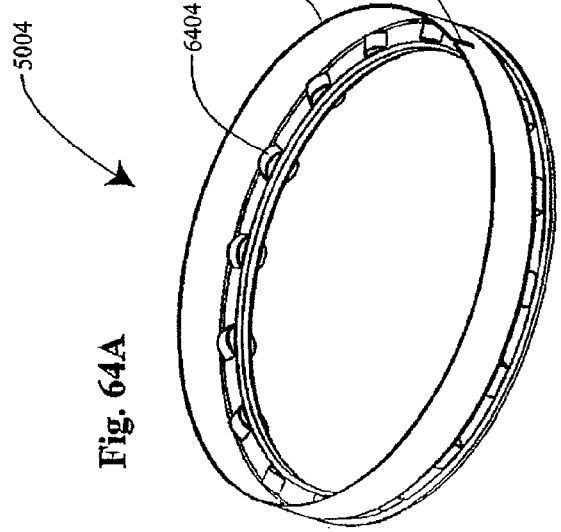
FIG. 64A is perspective view of a roller cage as may be used with the axial force generation subassemblies of FIG. 50A or FIG. 51.
Figure 64D:
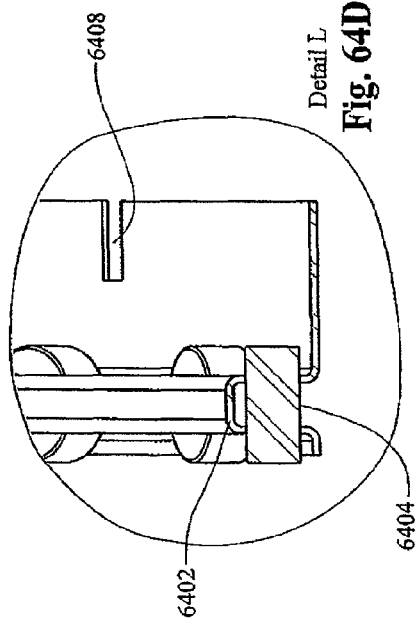
FIG. 64D is a detail view L of the cross-section of the roller cage shown in FIG. 64B.

FIG. 60 illustrates one embodiment of a shift rod nut 4818 that can be used with a shift rod 4816 like the one shown in FIGS. 61A-61B. In the embodiment shown, the shift rod nut 4818 is generally a rectangular prism body 6002 having a threaded bore 6004. It should be noted that the shift rod nut 4818 need not have a generally rectangular prism shape as shown, but instead can be non-symmetrical, have rounded edges, be cylindrical, etc. The shift rod nut 4818 is adapted to cooperate with the idler bushing 4832 in actuating an axial movement of the shift cams 4820 (see FIG. 48A). In one embodiment, the shift rod nut 4818 is approximately 19-20 mm long, 8-10 mm thick, and 8-10 mm wide. The threaded bore is about 6-8 mm in diameter, having a ¼-16 4 start acme thread, for example. In certain applications, the shift rod nut 4818 can be made of, for example, bronze.

Referring specifically to FIGS. 61A-61B now, the shift rod 4816, in one embodiment, is generally an elongated, cylindrical rod having one threaded end 6102 and a splined end 6104. The threaded end 6102 is adapted to cooperate with a shift rod nut, such as for example, the shift rod nut 4818 described above. The splined end 6104 is adapted to cooperate with a shifting mechanism (not shown), such as a pulley for example, that causes the shift rod 4816 to rotate. The shift rod 4816 also includes a cylindrical middle portion 6106, a shift rod flange 6108, and a shift rod neck 6110. The shift rod flange 6108 engages the main axle 4706 and a shift rod retainer nut 6502 (see FIG. 65A). The shift rod neck 6110 is adapted to receive and support the shift rod retainer nut 6502 (see FIGS. 47 and 65A). It should be noted that the middle portion 6106 can have shapes other than cylindrical, for example, rectangular, hexagonal, etc. In some embodiments, the shift rod 4816 may be substantially hollow and/or be made of multiple sections suitably fastened to one another. As shown in FIGS. 61A-61B, the shift rod 4816 may be provided with a piloting tip 6112 that is adapted to, among other things, facilitate the engagement of the shift rod 4816 into the shift rod nut 4818. During assembly, the piloting tip 6112 guides the threaded end 6102 of the shift rod 4816 into the bore 6004 of the shift rod nut 4818.

For some applications, the shift rod 4816 is about 130 mm long, with the threaded end 6102 being about 24-26 mm long, and the splined end being about 9-11 mm long. The diameter of the shift rod 4816 may be about 6-8 mm. The shift rod flange 6108 of some embodiments is about 8-9 mm in diameter and about 3-4 mm thick. In some embodiments, the shift rod 4816 may be made of, for example, alloy steel AISI 1137 with an HRC of 20. In some embodiments, the stator rod 4840 is made of magnesium alloys, aluminum alloys, titanium alloys or other lightweight material.

Referencing FIGS. 62A-62E now, one embodiment of the traction rings 4810, 4812 (see FIG. 48A) is shown. In the embodiment of the CVT 4700 shown in FIG. 47, the input traction ring 4810 and the output traction ring 4812 are substantially similar to one another. Therefore, the following description will be directed generally to a traction ring 6200, which can be either or both the input traction ring 4810 and the output traction ring 4812. The traction ring 6200 is a generally annular ring having a set of ramps 6202 on one side of the ring. In certain embodiments, the ramps 6202 may be unidirectional; however, in other embodiments, the ramps 6202 may be bidirectional. Unidirectional ramps facilitate the transfer of torque and generation of axial force only in one direction of torque input. Bidirectional ramps facilitate the transfer of torque and generation of axial force in forward or reverse directions of torque input. The side of the ring opposite to the ramps 6202 includes a conical, traction or friction surface 6204 for transmitting or receiving power from the power roller 4802. In this embodiment, the traction ring 6200 includes a recess or groove 6206 for receiving and supporting the torsion spring 5002. In certain embodiments, the groove 6206 includes a hole 6213 (see FIG. 62E) for receiving and retaining a first torsion spring end 6302 (see FIG. 63C).

In one embodiment, the traction ring 6200 has an outer diameter of about 97-100 mm and inner diameter of approximately 90-92 mm. In some embodiments, a traction ring 6200 includes about 16 ramps, with each ramp having about a 10 degree incline. In certain embodiments, the ramps are helical and have a lead equivalent to about 55-66 mm over a 360 degrees span. In this embodiment, the size of the groove 6206 is approximately 3.5-4.5 mm wide and 2-3 mm deep. The traction surface 6204 may be inclined about 45 degrees from vertical, which in this case refers to a plane surface extending radially from the longitudinal axis of the CVT 4700. In some embodiments, the traction ring 6200 can be made of, for example, an alloy steel AISI 52100 bearing steel heated to HRC 58-62, while in other embodiments the hardness of at least the traction surface 6204 is HRC 58, 59, 60, 61, 62, 63, 64, 65 or higher.

Turning to FIGS. 63A-63F, a torsion spring 5002 will now be described. The torsion spring 5002 is generally a torsional spring having about 2 turns; however, in other applications, the torsion spring 5002 may have more or less than 2 turns. A first torsion spring end 6302 is adapted to engage a retaining feature in the traction ring 6200. A second torsion spring end 6304 is adapted to engage a retaining slit 6408 in the load cam roller cage 5004 (see FIG. 48C). As best seen in FIG. 63E, the second torsion spring end 6304 includes an auxiliary retaining bend 6306 adapted to ensure that the second torsion spring end 6304 does not easily disengage from the roller cage 5004. FIG. 63B shows the torsion spring 5002 in a relaxed or free state, FIG. 63D shows the torsion spring 5002 partially energized, and FIG. 63F shows the torsion spring 5002 in its fully energized state.

In one embodiment, the torsion spring 5002 has a pitch diameter of about 110-115 mm in its relaxed or free state, and a corresponding pitch diameter of about 107-110 in its fully energized state. The torsion spring 5002 of some embodiments is a wire having a diameter of about 1-2 mm. The first torsion spring end 6302 has a straight portion 6303 that is about 12 mm long, and a bend portion 6305 at 95 degrees to the straight portion 6303 and having a length of about 4 mm. The auxiliary retaining bend 6306 bends towards the center of the torsion spring 5002 at about 160 degrees relative to a tangent line to the torsion spring 5002. In some embodiments the auxiliary retaining bend 6306 is about 5.5-6.5 mm long. The auxiliary retaining bend 6306 then transitions into a second bend 6307 that is approximately 6 mm long and at about 75-80 degrees relative to a parallel line to the auxiliary retaining bend 6306. While the torsion spring 5002 of some embodiments is made of any resilient material capable of being formed into a spring, in certain applications, the torsion spring 5002 is made of, for example, an alloy steel ASTM A228, XLS C wire, or SS wire.

Turning now to FIGS. 64A-64D, a roller cage assembly 5004 will now be described. The roller cage assembly 5004 includes a roller retainer ring 6402 adapted to receive and retain a number of load cam rollers 6404. The roller retainer ring 6402 transitions into a retainer extension 6406 that is generally an annular ring extending from the roller retaining ring 6402 at an angle of about 90 degrees. The retainer extension 6406, in some embodiments, is adapted to mount over the traction rings 6200, 4810, 4812 (see FIG. 48A) to in part aid in retaining the torsion spring 5002 in the recess 6206 (see FIG. 62E). In the embodiment depicted, the retainer extension 6406 includes a retaining slit 6408 for receiving and retaining the second torsion spring end 6304 (see FIG. 50B).

To ensure appropriate preloading of the CVT 4700, and initial staging of the rollers 6404 for axial force generation during operation, in some embodiments, the roller cage 5004, rollers 6404, torsion spring 5002, and an input traction ring 4810 are configured as follows. With reference to FIGS. 64E-64H, the depth of the groove 6206 of the traction ring 6200, the diameter of the torsion spring 5002 in its free state, the length and wire diameter of the torsion spring 5002, and the diameter of the retainer extension 6406 are selected such that expansion of the torsion spring 5002 in the groove 6206 is limited by the retainer extension 6406 so that a partially unwound torsion spring 5002 biases the roller cage 5004 and the rollers 6404 to roll up the ramps 6202 and come to rest on a substantially flat portion 6203 of the traction ring 6200, which portion is located between inclined portions 6405 of the ramps 6202 (see FIG. 64F).

Upon assembly of the CVT 4700, the roller cage 5004 is turned relative to the traction ring 6200, thereby winding the torsion spring 5002 (see FIG. 64H), until the rollers 6404 come to rest substantially at a bottom portion 6407 of the ramps 6202. This assembly process ensures, among other things, that the torsion spring 5002 is preloaded to bias the rollers 6404 to up the ramps 6202 so that the rollers 6404 are properly staged for activation during operation of the CVT 4700. Additionally, this component configuration and assembly process facilitates the take up of stack up tolerances present during assembly of the CVT 4700. As can be seen, the sizes of the partially wound (FIG. 64F) and fully wound (FIG. 64H) configurations of the torsion spring 5002 are different for each subassembly of the roller cage 5004, rollers 6404, and traction ring 6200. Taking advantage of the winding and unwinding of the torsion spring 5002, as the torsion spring 5002 is housed between the cage roller extension 5004 and the traction ring 6200, it is possible to adjust the tightness or looseness of the CVT 4700 when the hub shell 4702 and the hub shell cover 4704 are coupled.

Figure 65A:
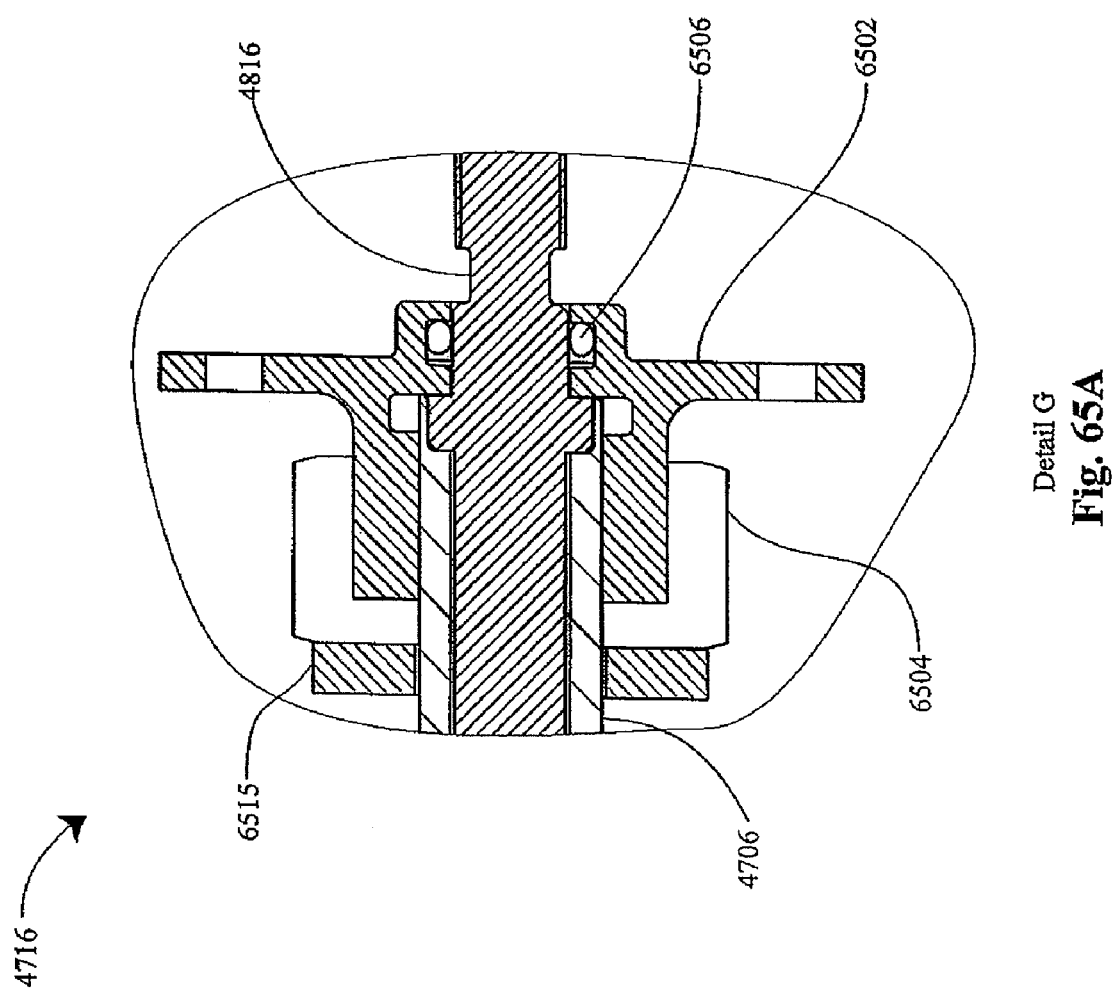
FIG. 65A is a detail view G, of the cross-section shown in FIG. 47, generally showing a shifter interface subassembly for a CVT.

A shifter and/or shift rod interface subassembly 4716 will now be described with reference to FIGS. 65A-65C. The shifter interface 4716 serves, among other things, to cooperate with a shifting mechanism (not shown) to actuate the shift rod 4816 for changing the ratio of the CVT 4700. The shifter interface 4716 also serves to retain the shift rod 4816 and constrain the axial displacement of the shift rod 4816. In the embodiment illustrated, the shifter interface 4716 includes a shift rod retainer nut 6502 adapted to receive the shift rod 4816 and to mount about the main axle 4706. The shifter interface 4716 may also include a nut 6504 adapted to be threaded on the shift rod retainer nut 6502 for, among other things, coupling the main axle 4706 to a dropout (not shown)

of a bicycle and to prevent the shift rod retainer nut 6502 from unthreading off the main axle 4706 during operation of the shifter mechanism. As shown in FIG. 65A, the shifter interface 4716 can also include an o-ring 6506 for providing a seal between the shift rod retainer nut 6502 and the shift rod 4816.

Figure 65B:
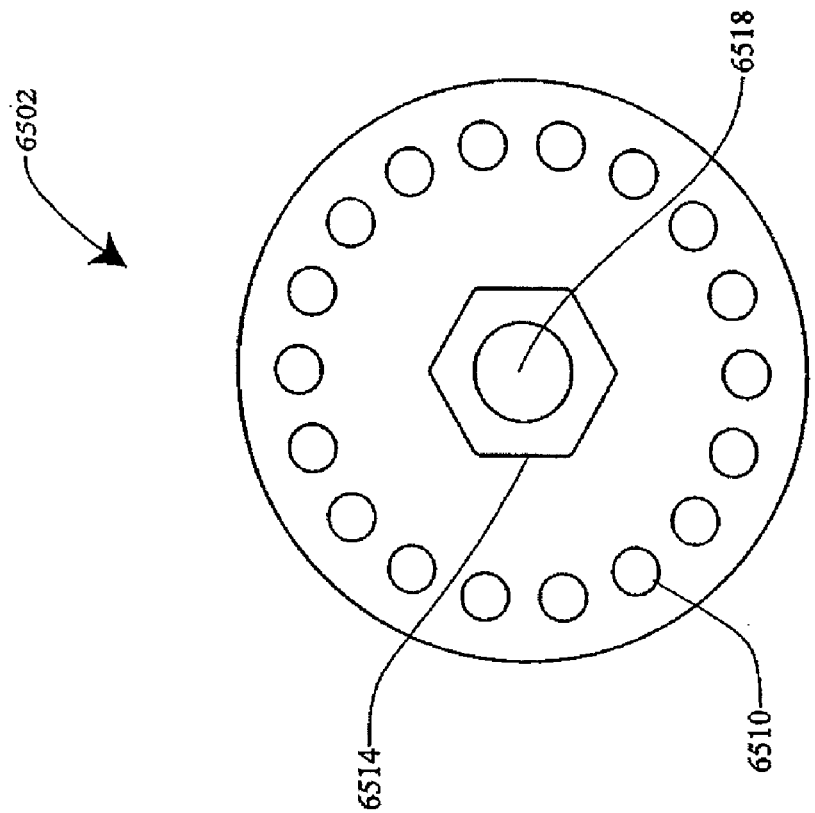
FIG. 65B is a plan view of a shift rod retainer as may be used with the shifter interface subassembly of FIG. 65A.
Figure 65C:
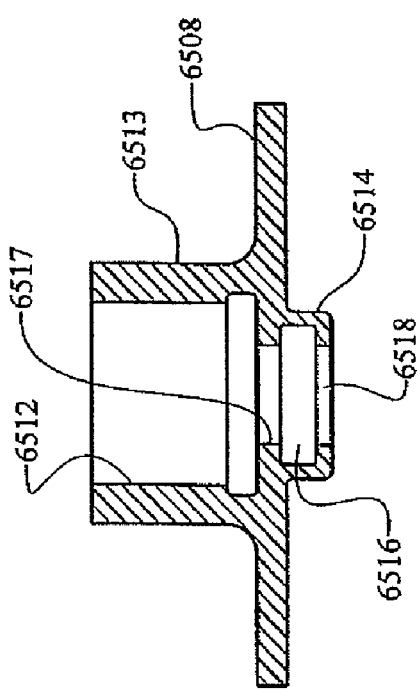
FIG. 65C is as cross-sectional view of the shift rod retainer of FIG. 65B.
Figure 65D:
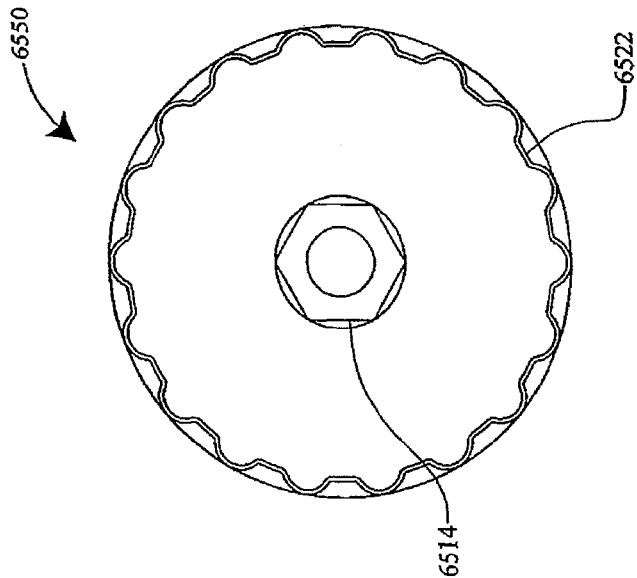
FIG. 65D is a plan view of the front side of an alternative shift rod retainer nut.
Figure 65E:
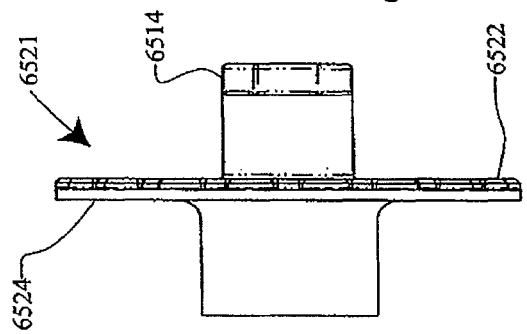
FIG. 65E is a plan view of the left side of the shift rod retainer nut of FIG. 65D.
Figure 65G:
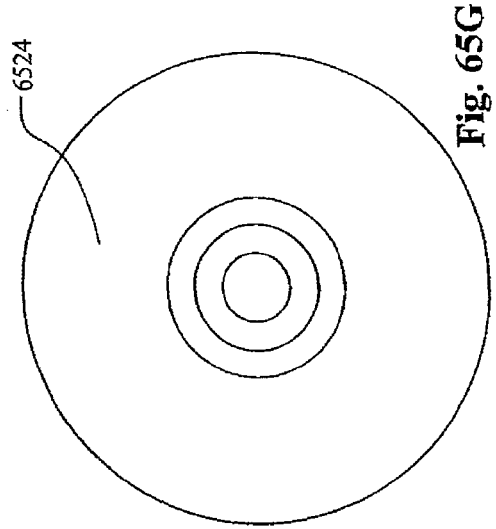
FIG. 65G is a plan view of the back side of the shift rod retainer nut of FIG. 65D.
Figure 65F:
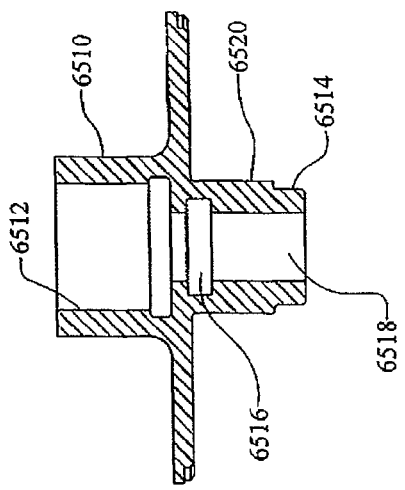
FIG. 65F is a cross-sectional view of the shift rod retainer nut of FIG. 65D.

As depicted in FIGS. 65B-65C, one embodiment of the shift rod retainer nut 6502 includes a flange 6508 having a number of through holes 6510. The through holes 6510 facilitate the coupling of the shifter mechanism to the shift retainer nut 6502, as well as aid in the indexing of the shifting mechanism for assembly, adjustment, calibration, or other purposes. An inner diameter 6517 of the flange 6508 is adapted to cooperate with the axle 4706 in axially constraining the shift rod 4816. The shift rod retainer nut 6502 includes a hexagonally shaped extension 6514 adapted to receive a tightening tool. It should be noted that in other embodiments the extension 6514 may have other shapes (for example, triangular, square, octagonal, etc.) that accommodate other common or custom tightening tools, such as for example hex nuts sized so as to be adjusted by tools common in shops such as by pedal wrenches for bicycles or other such tools for a particular application. The shift rod retainer nut 6502 has a threaded outer diameter 6513 for receiving the nut 6504. This configuration, in which the nut 6504 threads onto the shift rod retainer nut 6502, facilitates reducing the axial dimension of the CVT 4700, which is advantageous in certain applications of the CVT 4700.

The shift rod retainer nut 6502 is also provided with a threaded inner diameter 6512 that threads onto the main axle 4706. In this embodiment, the shift rod retainer nut 6502 additionally exhibits a recess 6516 adapted to receive an o-ring 6506 (see FIG. 65A) for providing a seal between the shift rod retainer nut 6502 and the main axle 4706. In one embodiment, the outer diameter of the flange 6508 is approximately 38 mm, and the thickness of the flange 6508 is about 1-3 mm. For certain applications, the length of the threaded portions 6512, 6513 is about 8-10 mm, the diameter of the recess 6516 is approximately 8-10 mm, the diameter of a central bore 6518 of the extension 6514 is about 5.5-7.5 mm, and the length of the extension 6514 is about 2-4 mm. In some embodiments, the shift rod retainer nut 6502 is made of, for example, an alloy steel of powder metal FN-25, or in other embodiments of SAE 1137 steel. However, the shift rod retainer nut can be made of any other material.

Referring to FIGS. 65D-65G now, another embodiment of shift rod retainer nut 6550 is illustrated. The shift rod retainer nut 6550 has a recess 6516, a threaded outer diameter 6510, a threaded inner diameter 6512, and an extension 6514, all of which are substantially similar in form and function to those similarly labeled features discussed above with reference to FIGS. 65B-65C. The shift rod retainer nut 6550 includes a support extension 6520 adapted to position and/or support a pulley, for example, that is part of the shifting mechanism.

The shift rod retainer nut 6550 also includes a flange 6521 having a splined side 6522 and a smooth side 6524. The splined side 6522 consists of a splined profile formed on a portion of the circumference of the flange 6521, which portion faces towards the extension 6514. The splined side 6522 is adapted to cooperate with a shifting mechanism (not shown), and the splined side 6522 provides similar functionality to the through holes 6510 of the flange 6508 discussed above. That is, the splines on the splined side 6522 facilitate, among other things, the positioning and/or indexing of the shifting mechanism.

The smooth side 6524 is provided with a smooth circumferential profile to facilitate the engagement of a housing (not shown) of the shifting mechanism; said housing snaps about the flange 6521 and is frictionally or otherwise retained by the smooth surface 6522. In some embodiments (not shown), the splined side 6522 extends completely across the circumference of the flange 6521. It should be noted that the profile of the splined side 6522 can have shapes other than that depicted in FIGS. 65D-65G. For example, the profile may be that of square splines, v-notches, keyways, or any other suitable shape.

FIGS. 65H-65K show yet another embodiment of a shift rod retainer nut 6555. Features of the shift rod retainer nut 6555 that are substantially the same as features of the shift rod retainer nut 6550 are similarly labeled. The shift rod retainer nut 6555 has a flange 6525 that includes a number of extensions 6526. In some embodiments, the extensions 6526 are integral to the flange 6525, while in other embodiments the extensions 6526 are separate pins or dowels that are received in corresponding orifices of the flange 6525. The extensions 6526 serve, in part, to facilitate the positioning and/or indexing of the shifting mechanism that couples to the shift rod 4816. It should be noted that in the embodiments described above, or other equivalent embodiments, of the mechanism to facilitate positioning and/or indexing of the shifting mechanism, uniform and/or non-uniform profile distributions may be used. The distribution of the extensions 6526 may form a circle, as shown in FIG. 65H, or may form other geometric figures, such as a square, triangle, rectangle, or any regular or irregular polygon. Moreover, the extensions 6526 may be positioned at any radius of the flange 6525.

Referencing FIGS. 66A-66D now, one embodiment of a main axle 4706 will be described. The main axle 4706 has a first end having a flat 6602 and a second end having a flat 6604 for, among other things, receiving the mounting bracket, chassis or frame members such as the dropouts of a bicycle, for example. A central portion of the main axle 4706 has a through slot 6606 for receiving the shift rod nut 4818. In certain embodiments, the main axle 4706 is provided with a central bore 6622 adapted to receive, for example, the shift rod 4816. As illustrated in FIG. 66C, the central bore 6622 need not go through the entire length of the main axle 4706. However, in other embodiments, the central bore 6622 may extend through the entire length of the main axle 4706 for providing, for example, an access port or lubrication port. One end of the central bore 6622, in this embodiment, has a counterbore 6624 adapted to cooperate with the shift rod flange 6108. In certain embodiments, the depth of the counterbore 6624 is selected such that for a given thickness of the flange 6108 the amount of backlash is substantially reduced. That is, the counterbore 6624 and the flange 6108 are manufactured so that the axial clearance between the counterbore 6624 and the flange 6108 is minimized to the clearance needed to allow the shift rod 4816 to rotate in place as it is retained by the shift rod retainer nut 6502. In some embodiments, the depth of the counterbore 6624 does not exceed the thickness of the flange 6108 by more than 1.5 mm. In certain embodiments, the thickness of the flange 6108 is less than the depth of counterbore by 1.0 mm, more preferably by 0.5 mm, and even more preferably by 0.025 mm.

The main axle 4706 also includes knurled or splined surfaces 6608 that engage the stator plates 4836 and 4838. In some embodiments, the main axle 4706 includes chip relief cutouts or recesses 6610 that are shaped, or adapted, to capture material that is cut from the stator plates 4836, 4838 as the stator plates 4836, 4838 are pressed in a self-broaching manner to the main axle 4706. Referencing FIG. 47 additionally, in one embodiment the main axle 4706 features a snap ring groove 6612 for receiving a snap ring (shown in FIG. 47 but not labeled) that provides axial positioning for the stator plate 4836. The main axle 4706 may also have a seal support seat 6614 for a seal 4720. In the embodiment illustrated in FIG. 66B, the main axle 4706 includes a bearing pilot portion 6616 for supporting a bearing 4718. Adjacent to the bearing pilot portion 6616, in the embodiment illustrated, the main axle 4706 includes a threaded surface 6618 adapted to engage with a retaining nut 4722 that provides axial support and positioning for the bearing 4718. Thus, the bearing 4718 is axially constrained between the retaining nut 4722 and a shoulder provided by the seal support seat 6614. The main axle 4706 may additionally include a bearing race piloting surfaces 6626, 6628 for supporting the bearing race 4914 (see FIG. 49A and accompanying text). In some embodiments, as shown in FIG. 66B, the piloting surface 6628 has a diameter that is smaller than the diameter of the piloting surface 6626. In certain embodiments, to improve the ease of assembly, the main axle 4706 may have a segment 6630 that is reduced in diameter as compared to the piloting surface 6628.

Still referencing FIG. 47 and FIGS. 66A-66D, one end of the main axle 4706, in certain embodiments, is provided with a threaded surface 6620 adapted to receive a cone nut 4724, which typically acts to secure the main axle 4706 to the dropouts, mounting brackets, chassis members or other frame member supporting the CVT 4700. The flats 6602, 6604 are adapted to receive and support an anti-rotation washer 6515 (see FIG. 65A) and an anti-rotation washer 4726 (see FIG. 47A), respectively. The anti-rotation washers 6515, 4726 are adapted to facilitate the reaction of torque moments from the main axle 4706 to the frame members, such as for example, bicycle dropouts or other mounting frame members, of the vehicle supporting the CVT 4700. In one embodiment, main axle 4706 may have a threaded surface 6632 for engaging the shift rod retainer nut 6502 and a jam nut 4926. The jam nut 4926 is adapted to, among other things, ensure the axial support and positioning of the bearing nut 4912.

For certain applications, such as for a bicycle or similarly size application for example, the main axle 4706 can be approximately 175-815 mm in length. The central bore 6622 can be about 5.5 to 7.5 mm in diameter. In certain embodiments, the depth of the counterbore 6624 is approximately 2.5-3.5 mm. For some applications, the length of the slot 6606 is approximately 25-45 mm, which depends in part on the shift ratio desired for the CVT 4700. The width of the slot 6606 may be, for example, 7-11 mm. In one embodiment, the main axle 4706 is made as a single piece from a material such as alloy steel AISI 4130, prehardened to RC 35-40. Of course, depending on the application, other materials may be used, such as magnesium, aluminum, titanium, composites, thermoplastics, thermosets, or other type of material.

FIGS. 67A-67E depict one embodiment of an input driver 4904. The input driver 4904 is a generally cylindrical and hollow shell having a flange 6702 at one end and a spline surface 6704 at the other end. Referring also to FIG. 94A, the input driver 4904 also includes bearing races 6706, 6708 for riding on ball bearings 4910A, 4910B. The input driver 4904 includes a groove 6710 for receiving a retainer clip that aids in retaining the freewheel 4902. The input driver 4904, in some embodiments, includes a surface 6712 for supporting a seal 4918. The input driver 4904 can also have a surface 6714 for supporting a bearing 4916 upon which the hub shell 4702 rides. The input driver flange 6702 butts up against the torsion plate 4906, which mounts on a torsion plate seat 6716 of the input driver 6904. In some embodiments, the torsion plate 4906 is coupled to the input driver 6904 via welds, bolts, screws, or any other suitable fastening means. In yet other embodiments, the input driver 4904 and the torsion plate 4906 are one single integral part. In some embodiments, the input driver 4904 and the torsion plate 4906 are coupled by a spline, keyway or other coupling means adapted to transmit torque.

For certain applications, the input driver 6904 can have an outer diameter of approximately 25-28 mm, and an inner diameter of about 24-27 mm at the thinnest portion. The bearing races 6704, 6706 can be approximately 5-7 mm in diameter. The total length of the input driver 6904, for certain applications, can be about 34-36 mm. The input driver 6904 can be made of, for example, an alloy steel SAE 8620, which may be heat treated to a HRC 58-62 to an effective depth of about 0.8 mm. In some embodiments, the input driver 6904 is made of magnesium alloys, aluminum alloys, titanium alloys or other lightweight material.

Figure 68B:
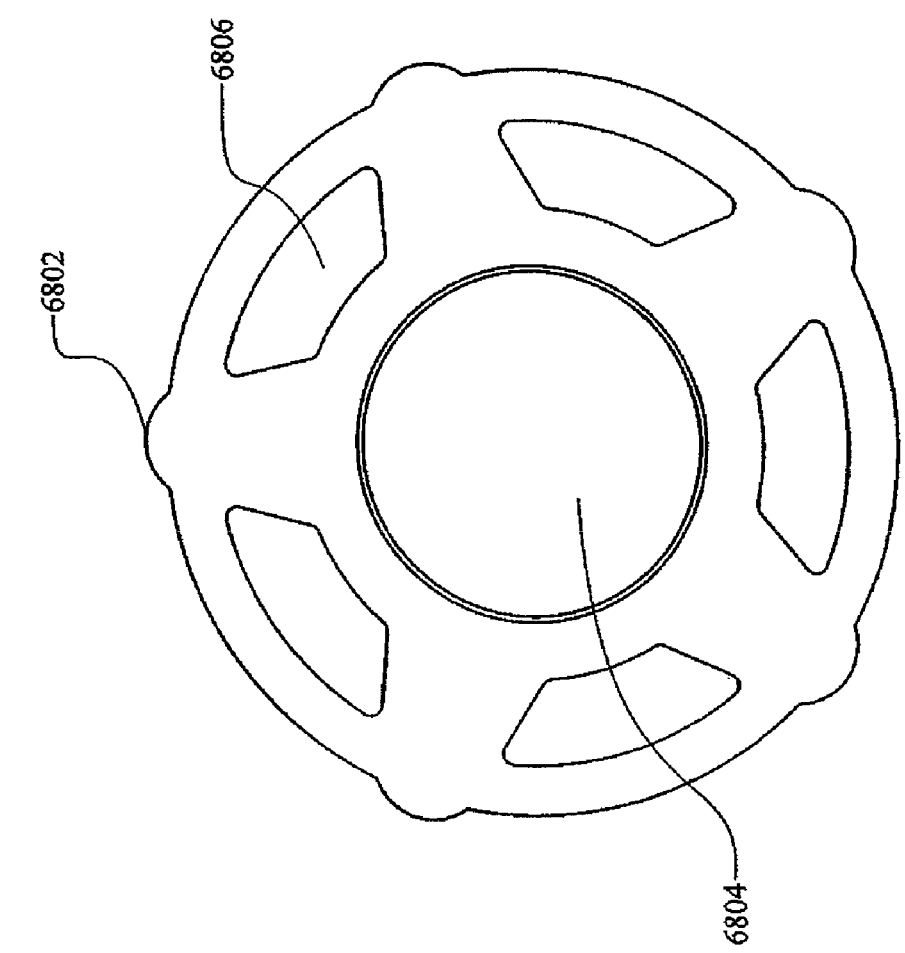
Figure 68A:
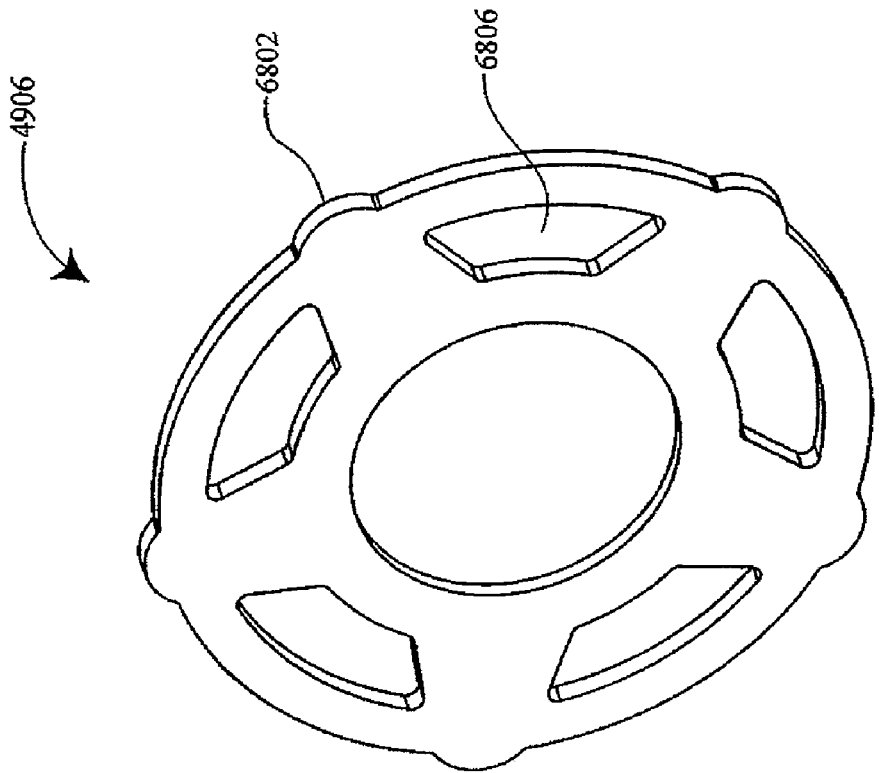

One embodiment of a torsion plate 4906 will now be described with reference to FIGS. 68A-68B. The torsion plate 4906 may be a generally circular plate having an outer diameter with a number of splines 6802 adapted to engage a mating splined surface of a cam driver 4908. In the embodiment of the torsion plate 4906 shown, there are five splines 6802; however, in other embodiments the number of splines can be any number from 1 to 10, for example, or more. Also, while the splines 6802 illustrated are rounded, in other embodiments the splines 6802 are square or any other shape capable of implementing the functions herein. The torsion plate 4906 also has a central bore 6804 adapted to receive the input driver 4904. In some embodiments, the central bore 6804 is fitted with splines to engage mating splines of the input driver 4904. In certain embodiments, such as the embodiment shown in FIGS. 68A-68B, it is preferable to provide cutouts 6806 for, among other things, reducing the weight of the torsion plate 4906. The number, shape, and placement of the cutouts may vary in any way so long as the structural integrity of the torsion plate 4906 is suitable for the specific operating conditions of any given application. In certain applications, the central bore 6804 is about 28-32 mm in diameter. The outer diameter of the torsion plate 4906 that does not include the splines 6802, in some embodiments, is approximately 60-66 mm. In one embodiment, the thickness of the torsion plate is about 1.5-3.5 mm. FIGS. 69A-69C, generally depict an input subassembly that includes the torsion plate 4906 and the input driver 4904.

Referencing FIGS. 70A-70C now, one embodiment of a cam driver 4908 will now be described. The cam driver 4908 is generally an annular plate having a central bore 7002 with female splines 7004 adapted to mate with the splines 6802 of the torsion plate 4906. In certain embodiments, the cam driver 4908 is provided with male splines and the torsion plate 4906 is provided with mating female splines. The cam driver 4908 also includes a load cam roller reaction surface 7006 adapted to react axial loads transmitted via the load cam rollers 6404 (see FIG. 50B). The reaction surface 7006 is generally a flat ring on the periphery of the cam driver 4908. It should be noted that in other embodiments the reaction surface 7006 may not be flat but, rather, can have other profiles, including ramps similar in shape, size, and number to the ramps 6202 of the traction ring 6200. In certain embodiments, as illustrated in FIG. 70C, the cam driver 4908 may be provided with a reinforcement circular rib 7008 about the central bore 7002. In the embodiment shown, the cam driver 4908 is also adapted with a shoulder 7010 for supporting the needle bearing 4924.

In one embodiment, the cam driver 4908 has an outer diameter of approximately 105-114 mm, and an inner diameter of about 63-67 mm to the surfaces not including the female splines 7004. The width of the reaction surface 7006 can be, for example, about 6-8 mm. In some embodiments, the major thickness of the cam driver 4908 is about 7-9 mm.

For certain applications, the cam driver 4908 is made of, for example, alloy steel AISI 52100, or titanium alloys or other light weigh alloys or materials.

With reference to FIGS. 71A-71C now, one embodiment of a freewheel 4902 will now be described. The freewheel 4902 is a one-way clutch that transmits the torque of a chain (not shown) in a first direction but not a second direction, because in the second direction a set of pawls rides over a set of ratchet teeth (none of this is shown as the free wheel functionality is common in mechanical design and there are many devices available that fulfill such functionality). Elements of a freewheel that are not common are described herein. The freewheel 4902 has a splined inner bore 7102 adapted to mate with the splines 6704 of the input driver 4904. In some embodiments, the freewheel 4902 has a set of teeth 7104 that is offset from the center of the body 7106 of the freewheel 4902. The number of teeth 7104 may be any number from 8 to 32, including preferably, 16, 17, 18, 19, 20, and 21. In some embodiments, the freewheel 4902 may be made of, for example, an alloy steel SAE 4130, 4140. In one embodiment, the splined inner bore 7102 may have an inner diameter of about 27-32 mm (not taking the splines into account) and an outer diameter of approximately 29-34 mm (including the splines). For certain applications the width of the body 7106 of the freewheel 4902 may be about 14-17 mm, with the teeth 7104 being off center by about 1.0-6.0 mm, or in some applications preferably 1.5 to 4.5 mm.

Referencing FIGS. 72A-72C now, one embodiment of a hub shell 4702 will now be described. The hub shell 4702 includes a generally cylindrical, hollow shell body 7202 having flanges 7204, which have orifices 7206 that are adapted for, in one embodiment, receiving the spokes of a bicycle wheel. In other embodiments, the flanges 7204 are replaced by the sheeves of a pulley for applications using a pulley or a belt for output. One end of the shell body 7202 has an opening 7208 generally adapted to cooperate with or receive a hub shell cover 4704 (see FIG. 47) to form a housing for various components of the CVT 4700. The shell cover 4704 may fasten to the hub shell 4702 by any suitable means such as, for example, bolts, threads, or snap rings. As best seen in FIG. 72C, the hub shell 4702 may have a snap ring groove 7216 for receiving a snap ring 5110 (see FIG. 51, showing a double loop snap or retaining ring 5110) that helps to fasten the hub shell cover 4704 to the hub shell 4702. The hub shell 4702, in one embodiment, has a cover engagement surface 7218 adapted to receive and mate with a hub shell cover, such as hub shell cover 4704 or other hub shell covers described here. The hub shell 4702 of some embodiments has a shoulder 7220 adapted to provide a positive stop for the hub shell cover 4704.

Another end of the hub shell body 7202 includes an integral bottom or cover 7210, which has a central bore 7212 adapted to receive the input driver 4904. In certain embodiments, as shown in FIG. 49A, the central bore 7212 is adapted receive and be supported by a radial bearing 4916. Hence, the central bore 7212 may have a recess 7226 for receiving the radial bearing 4916. The central bore 7212 may also include a groove 7228 for receiving a retaining clip that keeps the radial bearing 4916 in the recess 7226. In certain embodiments, the central bore 7212 may have a recess 7230 for receiving a seal 4918. The cover 7210, in one embodiment, is provided with a shoulder or seat 7224 for supporting the thrust washer 4922 (see FIG. 50A). In other embodiments, the cover 7210 is not integral to the shell body 7202 and is suitably fastened to the shell body 7202 via, for example, threads, bolts, or other fastening means. As shown in FIG. 72A, in certain embodiments the hub shell 4702 includes reinforcement ribs 7214 around the outside periphery of one or both of the flanges 7204. Similarly, as shown in FIG. 72B, the hub shell 4702 may include an integral, circular rib 7222 to reinforce the integral bottom cover 7210. The circular rib 7222, in some embodiments, reinforces the joint where the shell body 7202 joins to the bottom cover 7210. Where the bottom cover 7210 is not integral with the hub shell body 7202, the circular rib 7222 may be in the form of separate ribs, similar to ribs 7214, that reinforce the internal joint between the hub shell body 7202 and the bottom cover 7210.

For certain applications, the inner diameter of the shell body 7202 is about 114-118 mm, and the thickness of the shell body is about 3-5 mm. In one embodiment, the central bore 7212 is approximately 36-43 mm long, depending on the configuration of the bearing 4916 and the seal 4918 (see FIG. 49A), for example. In some embodiments, the distance between the flanges 7204 is about 48-52 mm. In certain embodiments, the hub shell 4702 can be made of, for example, cast aluminum A380, although in other embodiments the hub shell is made of titanium alloys, magnesium alloys or other lightweight or other material.

FIG. 73 shows one embodiment of a hub shell 7302 similar to the hub shell 4702. The hub shell 7302 includes a set of coarse splines 7304 on the circumference of the opening 7208. The splines 7304 are adapted to mate with a corresponding set of splines of a hub shell cover such, as for example, hub shell cover 4704. FIG. 74 illustrates yet another embodiment of a hub shell 7402 similar to the hub shell 4702. The hub shell 7402 includes a knurled surface 7404 on the circumference of the opening 7208. In some embodiments, the knurled surface 7404 is adapted to engage a corresponding knurled surface of a hub shell cover; in yet other embodiments, the knurled surface 7404 is adapted to cut into the material of the hub shell cover to form a rigid coupling thereto.

Referencing FIGS. 75A-75G, one embodiment of a hub shell cover 7500 is shown. The hub shell cover 7500 generally serves the same function as the hub shell cover 4704 shown in FIG. 47, that is, to cooperate with the hub shell 4702 to form a housing for components of the CVT 4700. The hub shell cover 7500 is a generally circular plate having a central bore 7502, which may be adapted to receive and be supported by a radial bearing 4718 (see FIG. 47). Extending from the central bore 7502, a splined extension or flange 7504 is adapted to receive a corresponding mating part for providing, among other things, a braking function or a cover function. One such corresponding mating part can be, for example, well known mechanisms known as roller brakes in the industry. In certain embodiments, the splined extension includes a recess adapted to receive the bearing 4718.

In the embodiment shown, the hub shell cover 7500 includes a knurled outer circumference or surface 7506 that is adapted to be self-broaching onto a hub shell, such as hub shell 4702 for example. In some embodiments, the knurled surface 7506 is made from straight knurls. In certain embodiments, the knurled surface 7506 is machined such that as the hub shell cover 7500 is pressed onto the hub shell 4702 the knurled surface 7506 cuts into the hub shell 4702, whereby the hub shell cover 7500 becomes securely pressed onto, or embedded into, the hub shell 4702, and vice versa. As the knurled surface 7506 cuts into the hub shell 4702, chipped material may come loose. Hence, in some embodiments, the hub shell cover 7500 includes a recess 7510 for receiving the chipped material. In one embodiment, the recess 7510 is formed such that the knurled surface 7506, at the edge of the knurled surface 7506 adjacent to the recess 7510, has an angular, sharp, cutting profile or sharp teeth.

As best seen in FIGS. 75E, 75G, in certain embodiments the hub shell cover 7500 has a pilot step 7514 that facilitates guiding the hub shell cover 7500 into the hub shell 4702 before the knurled surface 7506 engages with the hub shell 4702. In the embodiment shown, the hub shell cover 7500 is provided with a recess 7512 for receiving an o-ring 5105 that serves as a seal between the hub shell cover 7500 and the hub shell 4702. In some embodiments, the hub shell cover 7500 is provided with an orifice 7508 for supplying or draining lubricant into or out of the housing formed by the hub shell 4702 and the hub shell cover 7500.

In one embodiment, the central bore 7502 is approximately 26-29 mm in diameter, which varies depending on the configuration of the bearing 4718 and the seal 4720 (see FIG. 47). The outer diameter of the hub shell cover 7500, including the knurled surface, is about 118-122 mm. In certain embodiments, the outer diameter of the splined extension 7504 is approximately 34-37 mm. It should be understood, however, that the size of the outer diameter, as well as the number and specific type, of the spline extension may be determined by the characteristics of any commercially available or custom brake mechanism. In certain embodiments, the hub shell cover 7500 can be made of, for example, a forged steel alloy SAE 1045, but in other embodiments is made of aluminum alloys, titanium alloys, magnesium alloys of any other suitable material.

Turning to FIGS. 76A-76F now, yet another embodiment of a hub shell cover is illustrated as hub shell cover 7600, which shares a number of features similar to the features of the hub shell cover 7500. The hub shell cover 7600 includes a disc brake fastening extension 7602, which has a number of bolt holes 7604 for receiving bolts to fasten a disc brake to the fastening extension 7602. In this embodiment, the fastening extension 7602 is integral with the rest of the body of the hub shell cover 7600; however, in other embodiments, the fastening extension 7602 is another separate part that is adapted to fasten to the main plate of the hub shell cover 7600. The number, size, and positioning of the bolt holes 7604 can vary depending on the characteristics of any given disc brake mechanism. It should be understood that while the embodiments of the hub shell covers 7500, 7600 illustrated are provided with extensions 7504, 7602 for cooperating with a braking mechanism, in other embodiments extensions 7504, 7602 may not be integral to the hub shell covers 7500, 7600; rather, the hub shell covers 7500, 7600 may be configured with fastening features for receiving braking mechanisms that themselves incorporate the extensions 7504, 7602.

In certain embodiments of the hub shell 4702 and the hub shell cover 4704, either or both of the hub shell 4702 and the hub shell cover 4704 may be fitted with a torque transfer feature for output of torque out of the CVT 4700. For example, a sprocket (not shown) may be fastened to the hub shell cover 4704, whereby torque may be transmitted via a chain to a driven device. By way of yet another example, a sprocket (not shown) may be coupled to the hub shell 4702, in addition to or as replacement for the flanges 7204, for transmitting output torque via a chain, for example, from the CVT 4700.

With respect to FIGS. 47, 49, 52, and 67, one manner of operation of the CVT 4700 will now be described. Power, at a certain torque Ti and rotational speed Ni, is input to the CVT 4700 via the freewheel 4902. The input driver 4904, being splined to the freewheel 4902, transfers the power to the torsion plate 4906, which transfers the power to the load cam driver 4908. The cam rollers 6404, being energized by the load cam driver, ride up the ramps 6202 of the input traction ring 4810 and form a torque transfer path between the load cam driver 4908 and the input traction ring 4810. The cam rollers 6404 convert the tangential or rotational force of the torsion plate 4906 into an axial clamping component and a tangential or rotational component, which are both transferred by the power rollers 6404 to the input traction ring 4810. Through frictional or tractive contact, the input traction ring 4810 transfers power to the power roller 4802 at a rotational speed of about Ni.

Referring also to FIG. 49, when the power roller axles 4826 are parallel to the main axle 4706, the point of contact between the power rollers 4802 and the output traction ring 4812 is such that the power rollers 4802 transfer power to the output traction ring 4812 at a speed No that is substantially the same as Ni. When the power roller axles 4826 tilt to be closer to the main axle 4706 at the output side (as shown in FIG. 47), the contact point between the power rollers 4802 and the output traction ring 4812 is such that the power rollers transfer power to the output traction ring 4812 at a speed No that is greater than Ni. This condition is sometimes referred to as overdrive. When the power roller axles 4826 tilt to be closer to the main axle 4706 at the input side (not shown), the contact point between the power rollers 4802 and the output traction ring 4812 is such that the power rollers transfer power to the output traction ring 4812 at a speed No that is slower than Ni. This condition is sometimes referred to as underdrive.

The output traction ring 4812, having ramps 6203 similar (but not necessarily identical) to the ramps 6202 of the input traction ring 4810, energizes the load cam rollers 6405 such that the load cam roller 6405 provide a path for power transfer between the output traction ring 4812 and the hub shell cover 4704. Because the hub shell cover 4704 is rotationally fixed to the hub shell 4702, the hub shell cover 4704 transfers power to the hub shell 4702 at a speed No. The hub shell 4702, as previously described, is adapted in this case to receive bicycle wheel spokes for driving a bicycle wheel (spokes and wheel not shown). Hence, power is transferred to the bicycle wheel from the hub shell 4702 via the bicycle wheel spokes. In other embodiments of the CVT 4700, the power is transferred to another type of output device such as a pulley, a sprocket or any other type of power transmission device.

To manage and/or minimize slippage or creep at the contact points between the input traction ring 4810, idler 4814, and output traction ring 4812, the input AFG 4712 and the output AFG 4714 are used. To reduce the response time and to ensure sufficient contact force at low torque input, the torsion springs 5002, 5003 act upon, respectively, the input traction ring 4810 and roller cage 5004, and the output traction ring 4812 and roller cage 5005, to provide a certain amount of axial force or clamping (also referred to as "preloading") of the input traction ring 4810 and output traction ring 4812 against the power rollers 4802. It should be noted that in some embodiments only one of the input side or output side of the CVT 4700 is provided with a preloading mechanism as described.

Figure 50A:
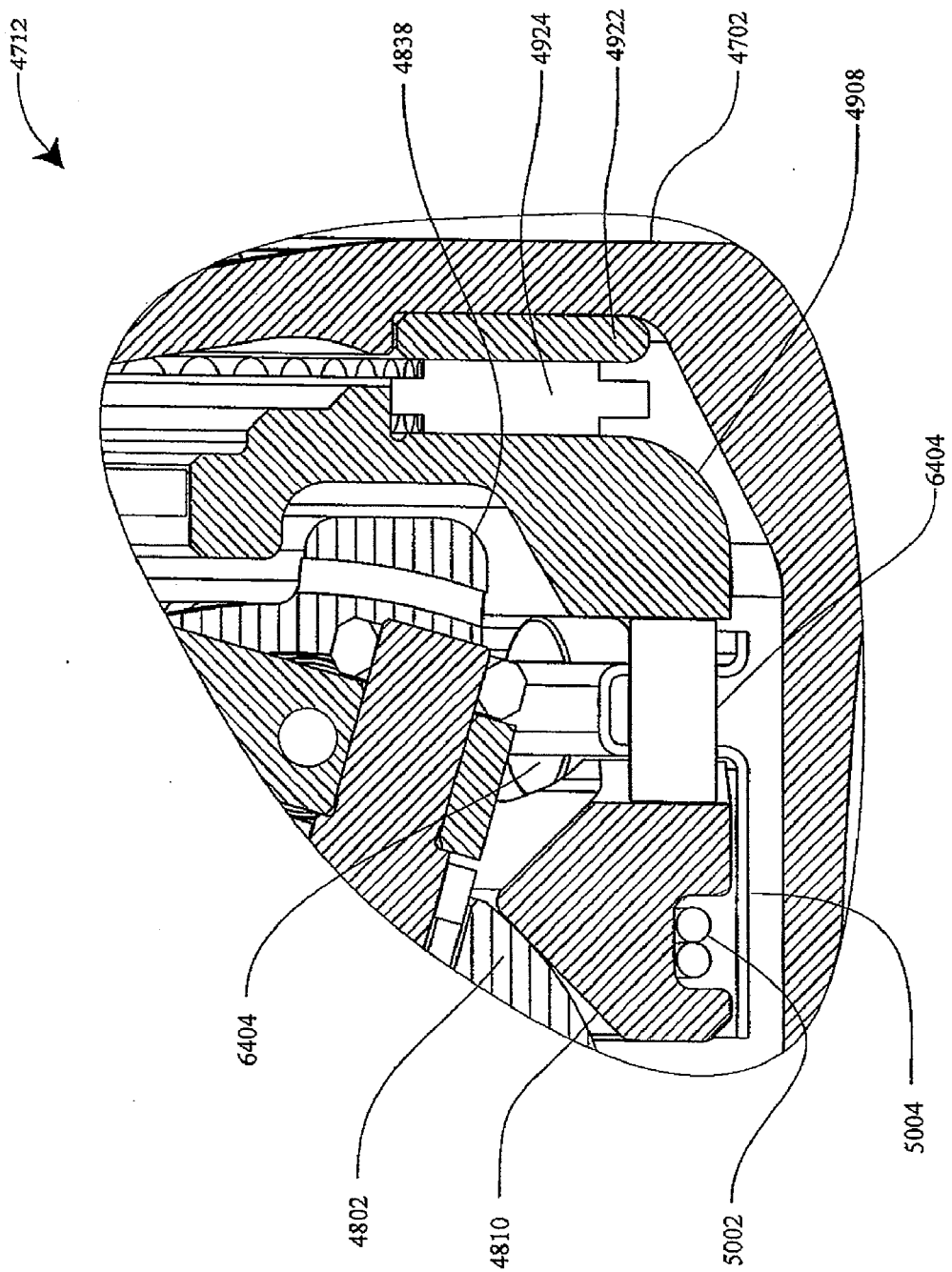
FIG. 50A is a detail view E, of the cross-section shown in FIG. 47, generally showing an input side axial force generation subassembly.
Figure 50B:
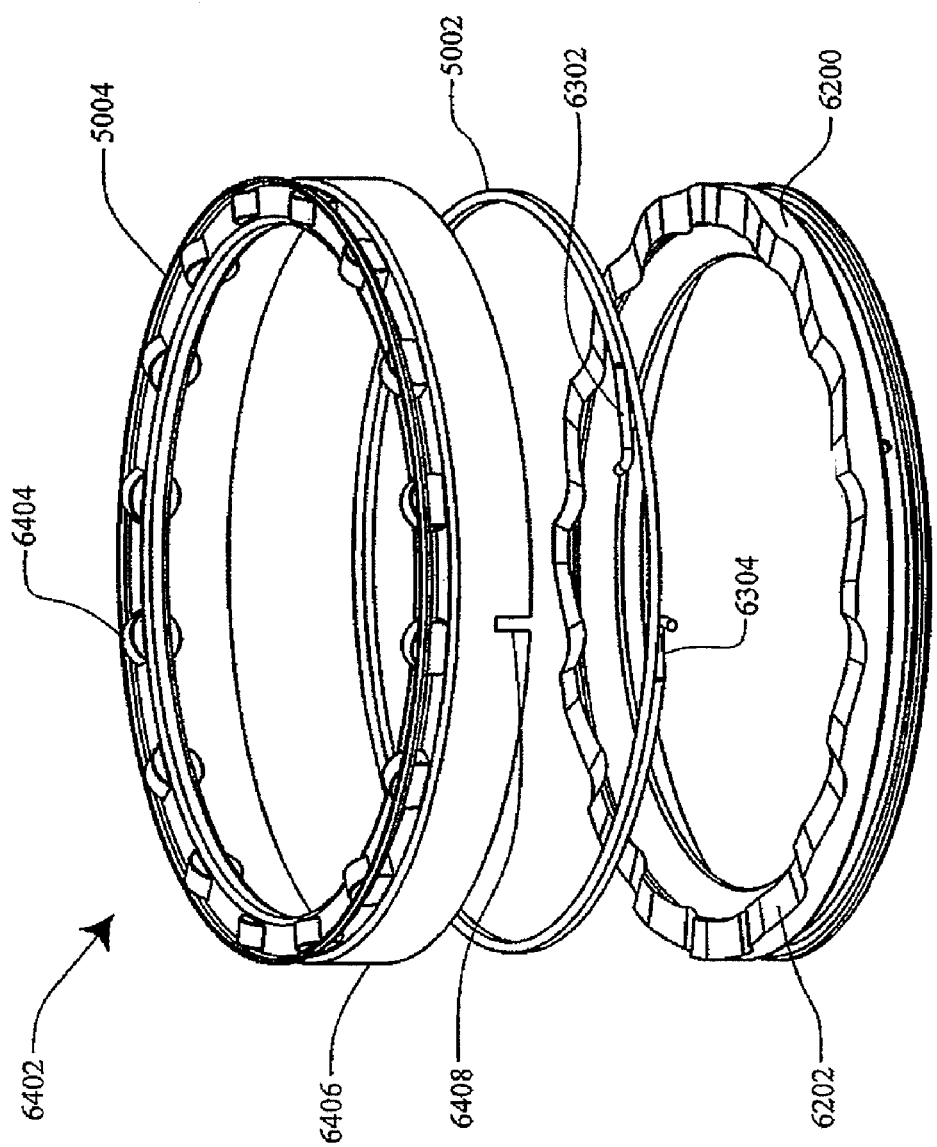
FIG. 50B is an exploded, perspective view of various components of the axial force generation subassembly of FIG. 50A.

As already discussed in relation to FIGS. 50A-50B and 51, during operation of the CVT 4700 axial force generation is produced by the interaction between the ramps on the input and output traction rings 4810, 4812, the rollers 6404, 6405, and the load cam driver 4908 and the hub shell cover 4704, respectively. The amount of axial force generated is approximately proportional to the torque transmitted through the input traction ring 4810 and the output traction ring 4812.

Referring to FIGS. 47, 48, and 61 specifically now, actuation of an adjustment in the transmission ratio of the CVT 4700 will now be described. A shifting mechanism (not shown), such as a pulley and wire system for example, couples to the splined end 6104 of the shift rod 4816 to induce a rotation of the shift rod 4816. Because the shift rod 4816 is constrained axially by the main axle 4706 and the shift rod retainer nut 6502, the shift rod 4816 rotates in place about its own longitudinal axis. This rotation of the shift rod 4816 causes the shift rod nut 4818 to translate axially along the threaded end 6102 of the shift rod 4816.

As the shift rod nut 4818 moves axially, the shift rod nut 4818 drives axially the idler bushing 4832, which is coupled to the shift cams 4820. Axial translation of the shift cams 4820 causes the shift cam rollers 4822 to roll along the profile of the shift cams 4820, thereby driving the motion of the legs 4824 that causes the tilting of the roller axles 4826. As described above, the relative tilt between the roller axles 4826 and the main axle 4706 determines the relative difference between input speed Ni and output speed No.

Various embodiments of idler subassemblies will now be described with reference to FIGS. 77-82D. Referencing FIG. 77, in one embodiment, the idler and shift cam assembly 7700 includes an inner bushing 7705 adapted to fit over a shaft 7710. The inner bushing may have an opening 7715 to receive a shift rod nut 7720 that threads onto a shift rod 7725. The inner bushing 7705 may be a generally cylindrical body having an inner bore and an outer diameter. A roller bearing assembly 7730 fits over the inner bushing 7705. An idler 7735 rides on the roller bearing assembly 7730. Shift cams 7740 are radially positioned by the inner bushing 7705. The idler and shift cam assembly 7700 can include one or more clips, for example, to keep the various components together. Although the shaft 7710, shift rod nut 7720, and shift rod 7725 are shown in FIG. 77, these components need not be part of the idler and shift cam assembly 7700.

In some embodiments, as will be described further below, the surface at the outer diameter of the inner bushing 7705 may provide a bearing race of the bearing assembly 7730. The surface at the inner diameter of the idler 7735 may provide a bearing race of the bearing assembly 7730. In some embodiments, one or both of the shift cams 7740 are configured to be an integral part with the inner bushing 7705. In yet other embodiments, one or both of the shift cams 7740 may provide a bearing race of the bearing assembly 7730. In other embodiments, the idler 7735 has one or more features to transfer thrust loads to the bearing assembly 7730.

Referencing FIG. 78 now, during operation, power rollers 7802 apply axial and radial loading to the idler 7735. Legs 7806, usually coupled to the power rollers 7802 via an axle 7804, react axial thrust loads of the idler and shift cam assembly 7700 as the shift rod 7725 and shift rod nut 7720 actuate the shift cams 7740 via the inner bushing 7705. As the power rollers 7802 rotate about the axles 7804, in some embodiments it is preferable that the idler 7735 rotate freely about the shaft 7710. The roller bearing assembly 7730 allows the free rotation of the idler 7735 and eliminates the frictional losses that otherwise would occur between the idler 7735 and the inner bushing 7705. The roller bearing assembly 7730 additionally must be capable of handling the axial and radial loadings present during operation of the idler and shift cam assembly 7700. In some embodiments, the idler 7735 and/or roller bearing assembly 7730 are adapted to transfer thrust loads from the idler 7735 to the roller bearing assembly 7730.

In some embodiments, for example in bicycle applications or similar torque applications, the idler 7735 is configured to withstand from about 5 GPa to about 50 GPa of compressive loading and is made of, for example, steel. In some embodiments, the idler 7735 is configured to rotate on the roller bearing assembly 7730 at rotational speeds of 2 revolutions per minute (rpm) to 400 rpm, 1 rpm to 20,000 rpm, or 60 rpm to 360 rpm, or 100 rpm to 300 rpm. The idler 7735 and roller bearing assembly 7730, in certain embodiments, are preferably configured to provide the capacity to react about 350 pounds of axial thrust.

The shift cams 7740, in some embodiments, are made to have a hardness of about RC 55 and may be made from a suitable material, such as steel, titanium, aluminum, magnesium or other material. In some embodiments, the inner bushing 7705 may be made of a metallic material, such as steel, and it is preferred that the inner bushing 7705 have a hardness of about RC 20 or higher.

The roller bearing assembly 7730 may include one or more needle roller bearings, radial ball bearings, angular contact bearings, tapered bearings, spherical rollers, cylindrical rollers, etc. In some embodiments, the roller bearing assembly 7730 consists of rolling elements configured to roll on races that are integral to one of more of the idler 7735, the shift cams 7740, or the inner bushing 7705. In yet other embodiments, the roller bearing assembly 7730 comprises roller elements, cages for the rollers elements, and races; in these embodiments, the roller bearing assembly 7730 may be press fit (or interference fit), for example, between the idler 7735 and the bushing 7705. In some embodiments, for manufacturing purposes, a clearance location fit may be used.

Referencing FIGS. 79A-79D now, an idler and shift cam assembly 7900 includes an inner bushing 7905 having a generally cylindrical body and having an opening 7907 cut through the cylindrical body about its midsection and generally perpendicular to the main axis of the cylindrical body. The opening 7907 is adapted to receive a shift rod nut, as discussed above. In this embodiment, the inner bushing 7905 includes grooves 7909 for receiving retaining clips 7910.

Two angular contact bearings 7912 mount on the inner bushing 7905; the bearings 7912 may be slip fit over the inner bushing 7905, for example. In this embodiment, the bearings 7912 may be typical bearings having roller elements 7916, an inner race 7918, and an outer race 320. An idler 7914 can be coupled to the outer races 320 of the bearings 7912 by, for example, an interference fit. As shown in FIG. 79C, the idler 7914 in this embodiment has a thrust transferring feature 7922 (thrust wall 7922) to transfer thrust between the idler 7914 and the bearings 7912.

Shift cams 7924 are positioned on each side of the idler 7914. The shift cams 7924 have a cam profile 7926 configured to operably couple to the legs of a ball-leg assembly 48320 (see FIG. 48A), such as legs 7706 shown in FIG. 78, for example. In this embodiment, the shift cams 7924 are allowed to rotate about a longitudinal axis of the idler and shift cam assembly 7900. Additionally, in this embodiment, the inner bushing 7905 provides shoulders 7928 that receive the bores of the shift cams 7924.

With reference to FIGS. 80A-80D, an alternative idler and shift cam assembly 8000 includes an inner bushing 8005 having a generally cylindrical body and having an opening 8007 cut through the cylindrical body about its midsection and generally perpendicular to the main axis of the cylindrical body. The opening 8007 may have any profile adapted to receive the shift rod nut of a shifting mechanism for a continuously variable transmission. For example, the profile of the opening 8007 may be circular, square, oval, irregular, etc. The inner bushing 8005 includes grooves 8009 that receive retainer clips 8010.

In the embodiment shown in FIGS. 80A-80D, shift cams 8024 are configured to provide a race 8018 for roller elements 8016. The roller elements in this case are spherical ball bearings. In some applications the ball bearings have a diameter of about 0.188 inches. However, in other embodiments, the ball bearings may be of any size suitable to handle the static and dynamic loading applied to the idler and shift cam assembly 8000. Additionally, the number of ball bearings is chosen to meet the performance requirements of the idler and shift cam assembly 8000. The idler 8014 is configured with a portion that provides a race 8020 for the roller elements 8016. The idler 8014 additionally has a thrust wall 8022 for transferring thrust to the roller elements 8016. In some embodiments, such as that illustrated in FIGS. 80A-80D, a roller element separator 8028 might be provided to keep the roller elements 8016 from interacting with each other in a manner detrimental to the performance of the idler and shift cam assembly 8000.

The shift cams 8024 provide a shoulder 8032 for receiving a locator ring 8030, which facilitates the assembly of the idler and shift cam assembly 8000 by providing a means of locating the shift rod nut 7720, for example. The shift cams 8024, in this embodiment, are also configured with a retaining key 8034 that engages the shift rod nut 7720 and prevents it from rotating about the longitudinal axis of the idler and shift cam assembly 8000.

FIGS. 81A-81D illustrates another embodiment of an idler and shift cam assembly 8100. An inner bushing 8105 includes a through hole 8107 generally perpendicular to the main axis of the generally cylindrical body of the inner bushing 8105. As in other embodiments, the profile of the through hole 8107 may be of any shape suitable to receive the shift rod nut 7720, for example. The inner bushing 8105 also includes grooves 8109 that receive retainer clips 8110. In this embodiment, a thrust washer 8130 fits between the retainer clip 8110 and a shift cam 8124, which is configured with a recess for receiving the thrust washer 8130. In some embodiments, the shift cam 8124 further includes a recess 8132 for receiving a spring (not shown) that provides a preload.

The shift cams 8124 of the idler and shift cam assembly 8100 have a profile in a portion of the inner bore that provides a retaining key 8134 for the shift rod nut 7720. The shift cams 8124 provide a race 8118 for roller elements 8116. In some cases, a roller element separator 8128 is provided to keep the roller elements 8116 apart. The idler 8114 has a thrust wall 8122 and a portion that provides a race 8120 for the roller elements 8116.

Referencing FIGS. 82A-82D now, an alternative embodiment of an idler and shift cam assembly 8200 is illustrated. An idler 8214 is configured with a portion that provides a race 8220 for roller elements 8216. The idler 8214 further includes a thrust wall 8222. A roller separator 8228 keeps rollers 8216 from interfering with each other during operation of the idler and shift cam assembly 8200.

A shift cam 8225 has a cam profile 8227 and a portion that provides a race 8218 for roller elements 8216. The shift cam 8225 includes an inner bore that has a through hole 8207 which is generally perpendicular to the generally cylindrical body of the shift cam 8225. The through hole 8207 is adapted to receive a shift rod nut 7720, for example. The shift cam 8225 may further include a shoulder 8235 for receiving the inner bore of shift cam 8224.

The shift cam 8224 has a cam profile 8227 similar to the cam profile of the shift cam 8225. The inner bore of the shift cam 8224 fits over a portion of the outer diameter of the shift cam 8225. A retainer clip 8210, received in groove 8209 of the shift cam 8225, keeps the shift cam 8224 in place over the shift cam 8225. The shift cams 8224 and 8225 cooperate to receive the shift rod nut 7720. In this embodiment, a locating ring 8230 is provided to facilitate assembly of the idler and shift cam assembly 8200 to the shift rod nut 7720 and a shift rod 7725. The locating ring fits partially over the outer diameter of the shift cam 8224 and between the shift cams 8224, 8225 and the idler 8214.

In some embodiments, the length of the inner bushing 7705 (see FIG. 77), for example, is controlled to the center cutout 7715 for the shift rod nut 7720. The lengths of the portions of the inner bushing 7705 extending from the cutout 107 may be different. In some embodiments, the ends of the bushing 7705 abut fixed surfaces which determine the limits of the shift stroke to control maximum and minimum available ratio in a CVT.

Turning now to FIGS. 83A-83D, a shifter quick release (SQR) mechanism 8300 will now be described. The SQR mechanism 8300, in some embodiments, includes a backing plate 8302 that couples to an indexing plate 8304. The backing plate 8302 is adapted to receive a retainer ring 8306 and a release key 8308. An axle 8310 of a CVT, for example, is provided with a groove 8312 for receiving the retainer ring 8306.

The backing plate 8302, indexing plate 8304, and retainer ring 8306 mount coaxially about the axle 8310. A shifter mechanism (not shown) couples to the backing plate 8302 ensuring that the release key 8308 is retained between the backing plate 8302 and a part of the shifter mechanism, such as the housing, for example. The SQR mechanism 8300 is held in place axially by the retainer ring 8306 in the groove 8312 and certain components of the shifter mechanism housing (not shown).

The retainer ring 8306 consists of a generally circular ring 8314 that has an opening at which retainer ring extensions 8316 extend outward forming a v-shape. The release key 8308 has a v-shaped end 8318 substantially adapted to actuate a spreading apart of the retainer ring extensions 8316 when the v-shaped end 8318 is introduced into the v-shaped opening formed by the retainer ring extensions 8316. The release key 8318 may be further provided with retaining extensions 8320 that facilitate supporting and guiding the release key 8308 when fitted in the backing plate 8302.

The indexing plate 8304 is a generally flat plate having a central bore 8322 with flats 8324 adapted to mount over flats 8234 of the axle 8310. The indexing plate 8304 additionally may have a number of indexing slots 8326. In some embodiments, the backing plate 8302 includes a retainer ring recess 8328 adapted to receive the retainer ring extensions 8316 and the v-shaped end 8318 of the release key 8308. The backing plate 8302 may also have a release key recess 8330 adapted to receive the retaining extensions 8320 of the release key 8308. The backing plate 8302 additionally has a central bore 8332 that has a beveled edge 8334 adapted to urge the retainer ring 8310 into the groove 8312 as the SQR mechanism 8300 is pulled toward the axle end 8336 of the axle 8310. The backing plate 8302, in some embodiments, includes a recess 8338 adapted to receive the indexing plate 8304. The diameter of the recess 8338 may be selected so that the outer diameter of the indexing plate 8304 served as a guide and/or support surface for the backing plate 8302.

The SQR mechanism 8300 is fastened to the shifter mechanism and mounted over the axle 8310 by pressing on the release key 8308, which opens up the retention ring 8306 and allows the SQR mechanism to slide over the axle 8310. The backing plate 8302, fastened to the shifter mechanism using bolt holes 8342 for example, can be positioned angularly relative to the indexing plate 8304 to provide the desired position of the shifter housing to receive, for example, wires or cable for shifting. The backing plate 8302 is then secured to the indexing plate by bolts (not shown) that fit through bolt holes 8340 of the backing plate 8303 and the indexing plate slots 8326.

When the SQR mechanism 8300 is pulled toward the axle end 8336, the beveled edge of the backing plate 8302 wedges against the retaining ring 8306 to prevent the SQR mechanism 8300 from coming off the axle 8310. However, when the v-shaped end 8318 of the release key 8308 is pressed against the ring extensions 8316, the retaining ring 8306 expands and is then large enough to clear the groove 8312. The SQR mechanism 8300 can then be pulled off the axle 8310 along with the shifter mechanism fastened to the SQR mechanism 8300. Hence, once installed the SQR mechanism 8300 allows, among other things, removal of a shifter mechanism by simply actuating the release key 8308.

Referencing FIGS. 84A-84E now, a shifter interface mechanism 8400 includes a pulley 8402 mounted on an axle 8404 adapted to receive a shift rod 8406. A shift rod nut 8408 threads to the shift rod 8406 and is coupled to the pulley 8402 via a dowel pin (not shown). A backing plate 8410 mounts on the axle 8404 and couples to the pulley 8402. A retaining clip 8412 is positioned in a groove (shown but not labeled) of the axle 8404.

The pulley 8402 may have a number of grooves 8414 for receiving and guiding a cable, for example, of a shifter mechanism (not shown). The pulley 8402 may include a recess 8416 for receiving the shift rod nut 8408. In some embodiments, a recess 8418 of the pulley 8402 is adapted to receive the backing plate 8410. In one embodiment, the pulley 8402 includes a number of bolt holes 8420 for receiving bolts (not shown) that fasten the pulley 8402 to the backing plate 8410. In the embodiment illustrated, the pulley 8402 has a recess 8422 for receiving a dowel pin (not shown) that couples the pulley 8402 to the shift rod nut 8408. In some embodiments, the pulley 8402 also includes a number of bolt holes 8424 for axially retaining the shift rod nut 8408 in the recess 8416 of the pulley 8402. In certain embodiments, the pulley 8402 includes a shift cable channel 8426, through which the shift cable (not shown) runs from the pulley grooves 8414 towards the recess 8416, that facilitates entrainment of the shift cable or wire in the pulley 8402.

Referencing FIG. 84D specifically, the backing plate 8410 is generally a flat, circular plate having a central bore 8428 for mounting the backing plate 8410 about the axle 8404. The backing plate 8410, in some embodiments, has a number of bolts holes 8430 that facilitate fastening the backing plate 8410 to the pulley 8402. As shown in FIG. 84E, a shift rod nut 8408 is generally circular in shape and adapted to fit in the recess 8416 of the pulley 8402. The shift rod nut 8408 has a threaded central bore 8432 for threading on the shift rod 8406. In one embodiment, the shift rod nut 8408 includes a notch 8434 for receiving a dowel pin (not shown) that rotationally fixes the shift rod nut 8408 to the pulley 8402. In certain embodiments, the shift rod nut 8408 is constrained axially by the axle 8404 and/or the pulley 8402 and the heads of the bolts that fit in the bolt holes 8424 of the pulley 8402.

During operation of the shifter interface 8400, the pulley 8402 is rotated in a first angular direction about the axle 8404. Since the shift rod nut 8408 is rotationally fixed to the pulley 8402 and is constrained axially by the axle 8404 and the shifter housing, the shift rod nut 8408 causes the shift rod 8406 to translate in a first axial direction. Rotating the pulley 8402 in a second angular direction causes the shift rod nut 8408 to actuate the shift rod 8406 to translate in a second axial direction. The backing plate 8410 and the retainer clip 8412 prevent the shifter interface subassembly 8400 from sliding out of the axle 8402. The interaction between the pulley 8402 and the retainer clip 8412 prevents the shifter interface subassembly 8400 from translating axially along the main portion of the axle 8404.

Turning to FIGS. 85A-85E now, one embodiment of a power input assembly 8500 will be described. The power input assembly 8500 includes an input driver 8502 adapted to couple to a torque transfer key 8504. In certain embodiments, the input driver 8502 is a generally tubular body having a set of splines 8506 at one end of the tubular body and torque transfer extensions 8508 at an extension 8507, that is, the other end of the tubular body. The torque transfer extensions 8508 are generally semi-circular in shape and are formed by cutouts on the circumference of the extension 8507. The torque transfer extensions 8508 include torque transfer surfaces 8510. The extension 8507 also includes torque transfer key retention surfaces 8512. In some embodiments, the input driver 8502 includes a flange 8514, which is adapted to couple to a torsion plate. In some embodiments, the input driver 8502 includes a retainer clip groove 8513 formed in the torque transfer extensions 8508.

For certain applications, the torque transfer key 8504 is provided with torque transfer tabs 8516 adapted to engage the torque transfer surfaces 8510. In some embodiments, the torque transfer key 8504 includes concentricity surfaces 8518 adapted to ensure concentricity between the input driver 8502 and the torque transfer key 8504. Typically, the concentricity surfaces 8518 have a semi-circular contour selected to concentrically engage the torque transfer extensions 8508. In certain embodiments, for manufacturing purposes, the torque transfer key 8504 may have a number of cutouts 8520 as a result of machining operations to form the torque transfer tabs 8516 and, in some instances, in order to reduce weight. As best seen in FIG. 85C, in one embodiment the torque transfer key 8504 includes a beveled edge 8522 adapted to facilitate the mounting of a torque transfer device, such as a freewheel for example, to the torque transfer key 8504. In some embodiments, the torque transfer key 8504 may also include a threaded, splined, or keyed surface 8524 for engaging a correspondingly mating torque transfer device, such as a ratchet, sprocket, freewheel, or other such device or structure.

For certain applications, the torque transfer key 8504 is mounted on the input driver 8502 such that the concentricity surfaces 8518 mate to the outer diameter of the torque transfer extensions 8508, and such that the torque transfer surfaces 8510 mate to the torque transfer tabs 8516. The torque transfer key 8504 may be retained on the input driver 8502 as the torque transfer tabs 8516 are constrained between the torque transfer key retention surfaces 8512 and a retaining clip (not shown) placed in the retainer clip groove 8513. During operation, a torque transfer device such as a sprocket, freewheel, or pulley acts to rotate the torque transfer key 8504, which then transfers the torque via the torque transfer tabs 8516 to the torque transfer extensions 8505 of the input driver 8504. Torque is then transferred from the input driver 8504 via the splines 8506 to a torsion plate, for example.

The combination of the torque transfer key 8504 with the torque transfer extensions 8508 provides reduced backlash during torque transmission and accurate, concentric location between the input driver 8502 and the torque transfer key 8504. Additionally, the torque transfer features, such as torque transfer extensions 8508 and torque transfer tabs 8516, can be manufactured by, in some instances, using solely a standard axis mill and lathe, in order that more complex machining equipment is not necessary.

Yet another embodiment of a continuously variable transmission, including components, subassemblies, or methods therefor, will be described with reference to FIGS. 86-148.

Components or subassemblies that are the same as previously described will have the same reference numbers in FIGS. 86-148. Referencing FIGS. 86-87 specifically now, a CVT 8700 includes a housing or hub shell 8702 adapted to couple to a hub shell cover 8704. In one embodiment, the hub shell cover 8704 can be provided with an oil port 8714 and a suitable oil port plug 8716 therefor. As will be further discussed below, in some embodiments, the hub shell 8702 and the hub shell cover 8704 can be adapted to fasten together with threads. In some such embodiments, it might be preferable to provide a locking function or device to prevent the hub shell cover 8704 from unthreading off the hub shell 8702 during normal operation of the CVT 8700. Accordingly, in the embodiment illustrated, a locking tab 8718 is adapted to mate to features of the hub shell cover 8704 and to fasten via a bolt or screw 8720 to the hub shell 8702. Additional discussion of the locking tab 8718 and of the associated features of the hub shell cover 8704 is provided below.

The hub shell 8702 and the hub shell cover 8704 are supported, respectively, by bearings 4916 and 4718. An input driver 8602 mounts coaxially about a main axle 4709 and supports the bearing 4916. The main axle 4709 shares features with the main axle 4706 described above with reference to FIGS. 66A-66D; however, the main axle 4709 has been adapted to support the bearing 4718 axially inward of the seal 4720 (see FIG. 47 for contrast). The input driver 8602 couples to a torsion plate 8604, which couples to a cam driver 4908. A traction ring 8706 is adapted to couple to the cam driver 4908 via a set of rollers 6404 housed in a roller retainer 5004. A number of power rollers 4802 contacts the traction ring 8706 and a traction ring 8708. An output drive ring 8710 couples to the traction ring 8708 via a set of rollers 6405 housed in a roller retainer 5005. The output drive ring 8710 is adapted to couple to the hub shell cover 8704. In some embodiments, to aid with handling tolerance stack up and ensure adequate contact and positioning of certain components of the CVT, one or more shims 8712 can be positioned between the output drive ring 8710 and the hub shell cover 8704.

Additionally referencing FIG. 88, an idler assembly 8802 is generally adapted to, among other things, support the powers rollers 4802 and to aid in shifting the ratio of the CVT 8700. In one embodiment, the idler assembly 8802 includes an idler bushing 8804 mounted coaxially about the main axle 4706. The idler bushing 8804 is adapted to receive and support shift cams 8806. A support member 8808 mounts coaxially about the shift cams 8806 and is supported by bearing balls 8810 positioned to roll on bearing races 8812, 8814 formed on, respectively, the support member 8808 and the shift cams 8806. The idler bushing 8804, in some embodiments, is adapted to receive a shift rod nut 8816 that is positioned between the shift cams 8806, and the shift rod nut 8816 can be made to receive a shift rod 4816. In this configuration of the idler shift assembly 8802, the shift reaction forces that arise during shifting of a CVT are substantially transmitted through the shift cams 8806 to the shift rod nut 8816 and to the shift rod 4816, and thus, the binding and drag caused by the transmittal of shift reaction forces through the bearing balls 8810 is substantially avoided. A shift rod nut collar 4819 mounts coaxially with, and is supported by, the shift cams 8806. The shift rod collar 4819 facilitates location of the shift rod nut 8816 to aid in the threading of the shift rod 4816 into the shift rod nut 8816.

The main axle 4706 passes through the central bores of the hub shell 8702 and the hub shell cover 8704. The main axle 4706 is adapted to support stator plates 4838 which, in one embodiment, connect together via stator rods 4840. One end of the axle 4709 is adapted to receive an acorn nut 4724 and an anti-rotation washer 4726. The axle 4709 is further adapted with an internal bore for receiving the shift rod 4816. A shift rod retainer nut 6502 mounts coaxially about the shift rod 4816 and threads onto the main axle 4709. A nut 6504 is used, among other things, to prevent the shift rod retainer nut 6502 from unthreading from the main axle 4709. An anti-rotation washer 6515 can be placed between the nut 6504 and a member of a vehicle frame such as, for example, the dropout of a bicycle frame (not shown).

Turning now to FIGS. 89-93, the hub shell cover 8702 can include a set of threads 8802 adapted to engage a corresponding set of threads 9202 formed on the hub shell cover 8704. In some embodiments, for a bicycle application for example, the hub shell 8702 includes flanges 8902, 8904 adapted to transfer torque to, for example, spokes of a bicycle. As illustrated in FIG. 90, in one embodiment, the flanges 8902, 8904 do not extend to the same radial distance from the central bore of the hub shell 8702. In other embodiments, however, a hub shell 8703 can include flanges 8902, 8906 that do extend to substantially the same radial length. To allow fastening of the locking tabs 8718, the hub shell 8702 can be provided with one or more threaded screw or bolt holes 8804.

Referring to FIGS. 92-93, more specifically, in one embodiment a hub shell cover subassembly 9200 can include the hub shell cover 8704, the oil port plug 8716, the bearing 4718, a seal 9206, a clip ring 9208, and an o-ring 9210. As illustrated, the hub shell cover 8704 can have a central bore 9204 that is adapted to receive the bearing 4718, the seal 9206, and the clip ring 9208. Referencing FIGS. 94-98 additionally, the set of threads 9202 can be formed on the outer diameter or periphery of the hub shell cover 8704. Additionally, the hub shell cover 8704 can include on its outer diameter an o-ring groove 9602 for receiving the o-ring 9210. In one embodiment, the central bore 9204 is provided with a seal groove 9702 and a clip groove 9704. The groove 9702 aids in retaining the seal 9206 in the hub shell cover 8704. To prevent damage to the seal 9206 and improve its retention, the seal groove 9702 can have a radius 9706. The clip groove 9704 is adapted to receive and retain the clip ring 9208, which helps to retain the bearing 4718 in the central bore 9204. In one embodiment, the hub shell cover 8704 can have an integral flange 9410 having a set of splines 9802 for providing, among other things, an adapter for a brake, such a roller brake of a bicycle (not shown). Referencing FIG. 98 specifically, in one embodiment, the splines 9802 have a substantially u-shaped profile that facilitates manufacturability of the splines 9802; however, in other embodiments, the spline 9802 can have other shapes including one having square corners. In some embodiments, as shown more specifically in FIG. 97, a recess or neck 9725 can be provided on the flange 9410 (or at the juncture of the flange 9410 and the hub shell cover 8704) to engage a rib 9833 of, for example, a shield 9832 (see FIGS. 114-115 and accompanying text).

Referencing FIGS. 95, 96, 99 and 100, now, the hub shell cover 8704 can be provided with a number of retaining bosses or keys 9604 adapted to engage with extensions 8750 of the output drive ring 8710 (see also FIG. 87). The keys 9604 act both as anti-rotating as well as retaining features for the output drive ring 8710 and/or the shims 8712. In one embodiment, the hub shell cover 8704 includes a number of threaded holes 9502 adapted to receive bolts 9808 for securing a disc brake adapter plate 9804 (see FIG. 107). As shown in FIG. 99, the holes 9502 are preferably blind holes to ensure that no leaking or contamination is possible via the holes 9502.

As previously mentioned, in certain embodiments, the hub shell cover 8704 can include locking features or functions to prevent the hub shell cover 8704 from unthreading off the hub shell 8702 during normal operation of the CVT 8700. In one embodiment, the thread locking function can be provided by using a thread locking compound such as those sold by the Loctite Corporation. For some applications, a suitable thread locking compound is the Loctite® Liquid Threadlocker 290™. In yet other embodiments, referencing FIG. 101 now, the hub shell cover 8704 is provided with a number of locking teeth or grooves 9910, which are generally formed on the external face, and near the outer diameter, of the hub shell cover 8704. The locking grooves 9910 are adapted to mate with corresponding locking grooves 9912 (see FIGS. 102-103) of the locking tab 8718. In one embodiment, the locking grooves 9910 are spaced about 10 degrees apart in a radial pattern about the central bore 9204. However, in other embodiments, the number and spacing of locking grooves 9910 can be different.

Referencing FIGS. 102 and 103 now, the locking tab 8718 includes a number of locking grooves 9912 having crests 9914 that are spaced apart by an angle alpha between lines that pass through the center of the hub shell cover 8704. The angle alpha can be any number of degrees; however, in one embodiment the angle alpha is about 10 degrees. The locking tab 8718 includes a slot 9916 that is generally elliptical. The foci of the elliptical slot 9916 can be angularly separated by an angle beta, which is preferably about one-half of the angle alpha. The lines forming the angle beta extend from the center of the hub shell cover 9704. As FIG. 103 shows, one focus of the elliptical slot 9916 aligns radially with a crest 9914, and the other focus aligns radially with a trough 9915, of the locking tab 8718. When the locking tab 8718 is flipped or reversed about a perpendicular axis (on the plane of FIG. 103), the locking tab 8718 then presents a mirror-image configuration of its previous configuration. Hence, it is always possible to achieve the correct alignment of the locking grooves 9912 and the locking grooves 9910 by a combination of moving the slot 9916 on the bolt 8720 and/or flipping over the locking tab 8718. In other embodiments, the locking tab 8718 can have a configuration where the foci of the slot 9916 both are angularly aligned with crests 9914, meaning that the locking tab 8718 would no longer be asymmetrical about a perpendicular axis.

In one embodiment, the locking tab 8718 spans an arc of about 28-32 degrees and has a thickness of about 1.5-2.5 mm. For certain applications, the locking tab 8718 can be made of, for example, a steel alloy such as 1010 CRS. As shown in FIG. 104, the locking tab 8718 is secured to the flange 8902 of the hub shell 8702 by a bolt 8720. The locking grooves 9912 of the locking tab 8718 mate with the locking grooves 9910 of the hub shell cover 8704 and, thereby, ensure that the hub shell cover 8704 stays threaded to the hub shell 8702. Of course, in some embodiments, a thread locking compound can be used in conjunction with unthreading devices such as the locking tab 8718 and hub shell cover 8704 having locking grooves 9910. In one embodiment, as illustrated in FIG. 102A, a locking ring 8737, having a number of locking tabs 9912 and slots 9916, can be used in conjunction with a hub shell cover having locking tabs 9910.

Turning to FIGS. 105 and 106 now, in embodiment the hub cover shell 8704 can be provided with a shield 9920 that is adapted to, among other things, provide a cover for the flange 9410 and the splines 9802. Additional description of the shield 9920 is provided below with reference to FIGS. 114-115 and accompanying text. In yet another embodiment, the cover shell 8704 can be fitted with a disc brake adapter kit 9803, as shown in FIG. 106. Referencing FIGS. 107-110, the disc brake adapter kit 9803 can include a fastening plate 9804 coupled to an adapter plate 9810. In one embodiment, as shown in FIG. 107, the fastening plate 9804 and the adapter plate 9810 can be one integral part rather than separate parts. The fastening plate 9804 has one or more bolt holes 9806 for receiving bolts 9808 that facilitate coupling the fastening plate 9804 to the hub shell cover 8704. The bolts 9808 are received in the bolt holes 9502 of the hub shell cover 8704 (see FIG. 101, for example). The adapter plate 9810 includes a number of bolt holes 9850 for receiving bolts that fasten a disc brake rotor to the adapter plate 9810. The number of bolt holes 9850 can be adjusted to conform to the number of bolt holes required for standard or custom disc brake rotors. The disc brake adapter kit 9803 can also include a shield 9812 adapted to cooperate with a cupped washer 9814 to provide a seal against dirt and water at the interface between the adapter plate 9810 and the main axle 4709. In some embodiments, the disc brake adapter kit 9803 also includes a jam nut 9816, the bolts 9808, and an o-ring 9818. The o-ring 9818 is placed between the fastening plate 9804 and the hub shell cover 8704 to provide sealing against, for example, water or other non-pressurized contaminants.

It should be noted that in certain embodiments the fastening plate 9804 is provided with a recess 9815 for receiving the flange 9410 of the hub shell cover 8704. However, in other embodiments, the hub shell cover 8704 does not include the flange 9410 and, hence, the recess 9815 is not used. In yet other embodiments, the hub shell cover 8704 integrally incorporates the fastening plate 9804 and the adapter plate 9810. In one embodiment, the central bore 9817 of the adapter plate 9810 includes a shield groove 9819 adapted to receive and retain the shield 9812.

With reference to FIGS. 111-113, in one embodiment the shield 9820 includes a number of fastening fingers or tabs 9822, which extend from a generally annular body having a dome-shaped outer portion 9824 and a conical inner portion 9828. A recess 9830 between the dome-shaped portion 9824 and the conical portion 9828 is adapted to cooperate with, for example, the cupped washer 9814 to provide a labyrinth-type seal. In one embodiment, the conical portion 9828 tilts away from a vertical line in the plane of the cross-section shown in FIG. 113 at an angle of about between 8 degrees and 12 degrees. In some embodiments, the width of the shield 9820 from an end 9861 of the fastening tabs 9822 to an end surface 9863 of the dome-shaped portion 9824 is about 8-13 mm. The central bore 9826 defined by the conical portion 9828 has, in certain embodiments, a diameter of about 13-18 mm. The annular diameter delineated by the end surface 9863 is about 20-28 mm. The shield 9820 can be made of, for example, a resilient material such a plastic or rubber. In one embodiment, the shield 9820 is made of a material trademarked as Noryl GTX 830.

A shield 9832 similar in shape and function to the shield 9820 above is shown in FIGS. 114-115. The shield 9832 is substantially annular and has a dome-shaped outer portion 9837, a conical inner portion 9836, a central bore 9834, and a recess 9838. In one embodiment, the recess 9838 is adapted to receive and cover the splined flange 9410 (see FIGS. 92 and 105, for example). In one embodiment, the distance between a surface 9839 and a surface 9840 of the shield 9832 is about 16-29 mm. The outer diameter of the shield 9832 can be, for example, about 33-40 mm. The inner diameter of the shield 9832 at the recess 9838 can be, accordingly, between 31-38 mm. The central bore 9834, in some embodiments, has a diameter of about 12-18 mm. The shield 9832 can be made, in certain embodiments, of a resilient material such as plastic or rubber. In one embodiment, the shield 9832 can be made of a material trademarked as Noryl GTX 830.

Turning now to FIGS. 116-118, an idler bushing 8804 is shown. Certain embodiments of the idler bushing 8804 share some features with embodiments of the inner bushings described above with reference to FIGS. 77-82D relating to idler assemblies. The idler bushing 8804 has a generally tubular body 9841 with an outer diameter of about 16-22 mm, an inner diameter of about 13-19 mm, and a length of about 28-34 mm. The idler bushing 8804 additionally includes a through opening 9847 adapted to receive the shift rod nut 8816. In one embodiment, the opening 9847 is cut such that the distance between flat surfaces 9849 thereof is about 9-14 mm. In one embodiment, the idler bushing 8804 is additionally provided with clip grooves 9845 for receiving clips 9891 that help retain the shift cams 8806 (see FIG. 88).

As illustrated in FIGS. 119-120, a shift rod nut 8816 is generally a rectangular prism having a countersunk threaded bore 9855, which is adapted to thread onto the shift rod 4816. In one embodiment, the shift rod nut 8816 includes beveled surfaces 9851 that provide for clearance with other components of the idler assembly 8802 (see FIG. 88) but yet allow the shift rod nut 8816 to maximize the reaction contact surface between the shift rod nut 8816 and the abutting surfaces of the shift cams 8806. In one embodiment, the shift rod nut 8816 has a height of about 20-26 mm, a width (the dimension perpendicular to the bore 9855) of about 6-12 mm, and a depth of about (the dimension parallel to the bore 9855) of about 7-13 mm.

Turning now to FIGS. 121-125, a shift cam 8806 is generally an annular plate having a cam profile 9862 on one surface and a cam extension 9863 extending axially on the side opposite of the cam profile 9862. The cam extension 9863, in some embodiments, includes a bearing race 8814 formed thereon. The bearing race 8814 is preferably adapted to allow free rolling of bearing balls and to carry axial and radial loads. In one embodiment, the shift cam 8806 is provided with a beveled edge 9860 on a side opposite to the cam profile 9862 in order to facilitate flow of lubricant into the inner radial components, including the bearing races 8814, 8812, of the idler assembly 8802 (see FIG. 88). In some embodiments, the beveled edge 9860 tilts at an angle of about 6-10 degrees from vertical (on the plane of the cross-section shown in FIG. 123).

For certain applications, the shift cam profile 9862 is produced according to the values tabulated in the table shown in FIG. 125. The Y value is referenced from the center of the central bore 8817, and the X value is referenced from the end surface 8819 of the shift cam extension 9863. The first point PNT1 of the shift cam profile 9826 is on the surface 8821, which is at a horizontal distance of about 7-9 mm from the surface 8819, but more precisely in the embodiment illustrated at a distance of 8.183 mm. In one embodiment, the outer diameter of the shift cam 8806 is about 42-50 mm, while the diameter of the central bore 8817 is about 16-22 mm. In one embodiment, the radius of the bearing race 8814 is about 2-4 mm. In certain applications, the shift cam 8806 can be provided with a beveled edge 8823, which inclines at an angle of about 13-17 degrees from horizontal (on the plane of the cross-section shown in FIG. 123). Among other things, the beveled edge 8823 aids in providing sufficient clearance between the shift cam 8806 and the power rollers 4802 when the ratio of the transmission is at one of its extremes. The shift cam 8806 can be made of, for example, a steel alloy such as bearing quality SAE 52100.

Referencing FIGS. 126-130, a traction ring 8825 will be described now. The traction ring 8825 is a generally annular ring having a traction surface 8827 adapted to contact the power rollers 4802 and to transmit torque via friction, or across a traction fluid layer, between the traction surface 8827 and the power rollers 4802. Preferably, the traction surface 8827 does not have inclusions. In one embodiment, the traction ring 8825 is integral with an axial load cam 8829 for facilitating the generation of axial, clamping forces and torque transfer in the CVT 8700. The traction ring 8825 can also be provided with a groove 8831 adapted to receive, support, and/or retain a torsion spring, such as torsion spring 5002 (see FIGS. 63A-63F) or torsion spring 8851 (see FIGS. 131-134). Additional details relating to embodiments of traction rings are provided above with reference to FIGS. 62A-62E and accompanying text.

The axial load cam 8829, in one embodiment, includes a set of ramps having a ramp profile 8833 that is best shown in FIG. 129. In some embodiments, the ramp profile 8833 includes a first inclined, substantially flat portion 8835 that blends into a radiused portion 8836. The radiused portion 8836 transitions into a substantially flat portion 8837, which transitions into a radiused portion 8839 that is followed by a second inclined portion 8841. For clarity of description, the features of the ramp profile 8833 have been exaggerated and slightly distorted in FIG. 129. Additionally, in some embodiments, the ramps are helical and this feature is not shown in FIG. 129. Preferably, the transitions and blending of the portions 8835, 8836, 8837, and 8339 are tangential and no sharp or abrupt segments or points are included. As previously mentioned, a set of rollers (rollers 6404, 6405 for example) is provided to transmit torque and/or axial force between a traction ring and a drive member (such as the cam driver 4908 or the output drive ring 8710). Although the rollers 6404, 6405 shown are cylindrical rollers, other embodiments of the CVT 8700 can use spherical, barrel, or other type of rollers.

If it is assumed that the rollers used have a radius R, the radiused portion 8836 preferably has a radius of at least one-and-a-half times R (1.5×R), and more preferably at least two times R (2×R). In one embodiment, the radiused portion 8836 has a radius between 6-11 mm, more preferably 7-10 mm, and most preferably 8-9 mm. The flat portion 8837 in some embodiments has length of about 0.1-0.5 mm, more preferably 0.2-0.4 mm, and most preferably about 0.3 mm. The radiused portion 8839 preferably has a radius of about one-quarter R (0.25×R) to about R, more preferably about one-half R (0.5×R) to about nine-tenths R (0.90×R). In one embodiment, the radiused portion 8839 has a radius of about 2-5 mm, more preferably 2.5 to 4.5 mm, and most preferably 3-4 mm. The inclined portion 8841 is inclined relative to a flat surface 8847 and along a line 8845 at an angle theta of about 30-90 degrees, more preferably about 45-75 degrees, and most preferably about 50-60 degrees.

During operation of the CVT 8700, the rollers 6404, for example, will tend to ride upward in the direction 8843 to generate axial load and transfer torque as the CVT 8700 is actuated in the drive direction or under torque. When the CVT 8700 is actuated in the direction 8845 that is opposite to the drive direction 8843 (meaning the unloading direction, for embodiments where the load cam 8829 is not bidirectional), the rollers 6404 ride down the first inclined portion 8835, follow the first radiused portion 88365, roll along the flat portion 8837, and encounter, in effect, a positive stop in that the rollers 6404 cannot roll inside the radiused portion 8839 and cannot move beyond the relatively steeply inclined portion 8841. The ramp profile 8833 ensures that the rollers 6404 do not bind or become trapped at the bottom of the ramps, which ensures that the rollers 6404 are always in position to provide the torque or axial loading demanded. Additionally, the ramp profile 8833 ensures that when the CVT 8700 operates in the direction 8845 the rollers 6404 do not generate an axial or torque loading effect that degrades the freewheeling state of certain embodiments of the CVT 8700. It should be noted that in some embodiments, the flat portion 8837 is not included in the load cam profile 8833. In such embodiments, the radiused portions 8836 and 8839 can have the same or different radius. In one embodiment, the flat portion 8835 simply transitions into a radiused portion 8836 that has a radius substantially conforming to the radius of the roller, and flat portion 8837, the radiused portion 8839 and the flat portion 8841 are not used.

Moving to FIGS. 131-134 now, certain embodiments of a torsion spring 8851 share some features with embodiments of the torsion spring 5002 described above with reference to FIGS. 63A-63F. In the embodiment shown in FIGS. 131-134, the torsion spring 8851 need not be provided in a coiled state. Rather, the torsion spring 8851 can be provided as a length of spring wire having the requisite bent ends 8853, 8855. The bend end 8855 has a bend portion 8857 that bends at about 90 degrees relative to the long portion 8861 of the torsion spring 8851; in some embodiments, the bend portion 8857 has a length of about 3-4 mm. The bend end 8853 has a bend 8859 that bends at about 160 degrees relative to the long portion 8861. In some embodiments, the bend 8859 is about 10-14 mm long. The bend 8859 then transitions into a bend 8863 that is approximately 3.5-4.5 mm long and at about 75-85 degrees relative to a parallel line to the bend 8859. In one embodiment, the total center length of the torsion spring 8851 is about 545-565 mm.

Turning to FIGS. 135-138 now, certain embodiments of an input driver 8602 share some features with embodiments of the input driver 6904 described above with reference to FIGS. 67A-67E. The input driver 8602 includes a helical groove 8865 on a portion of its inner diameter to facilitate the flow of lubrication to the bearing races 6706, 6708. In one embodiment, the input driver 8602 can also include a set of splines 8867 wherein at least one spline 8869 is of a different circumferential length than the rest of the splines. In the embodiment illustrated, the spline 8869 has a longer circumferential dimension than the rest of the splines; however, in other embodiments, the spline 8869 can have a shorter circumferential dimension than the rest of the splines. The distinguishable spline 8869 can be used to, for example, aid in assembly by ensuring that components such as the freewheel 8890 (see FIGS. 148-147) are mated in the proper configuration to the input driver 8602.

Referencing FIGS. 139-141 now, certain embodiments of a torsion plate 8604 share some features with embodiments of the torsion plate 4906 described above with reference to FIGS. 68A-68B. The torsion plate 8604 can be provided with a set of splines 8871, wherein each spline has a driving contact 8873 and a transition portion 8875. The driving contact 8873 is preferably made to conform to the profile of mating splines in the cam driver 4908 (see FIGS. 70A-70C and accompanying text). The transition portion 8875, in some embodiments, can have the same conforming profile of the driving contact 8873; however, as shown in the embodiment of FIGS. 138-140, the transition portion 8875 can be flat, which can result in lower manufacturing costs, among other things. The torsion plate 8604 can be made of, for example, a medium carbon steel having a minimum HRC 20-23. In one embodiment, the torsion plate 8604 is made of a steel alloy such as 1045 CRS. Due to the torque levels involved in certain applications, it has been found that it is not preferable to make the torsion plate 8604 from a soft material. FIGS. 142-143 show an input assembly 8877 that includes the input driver 8602 and the torsion plate 8604. In one embodiment, the input driver 8602 is welded to the torsion plate 8604. In other embodiments, however, the input driver 8602 can be fastened or coupled to the torsion plate with suitable adhesives, dowel pins, bolts, press fit, etc. In yet other embodiments, the input assembly 8877 is one integral piece combining features of the input driver 8602 and the torsion plate 8604.

One embodiment of a roller axle 9710 is shown in FIGS. 144-146. Certain embodiments of the roller axle 9710 share some features with embodiments of the roller axles 4826, 4827 described with reference to FIGS. 54A-55. The roller axle 9710 can be provided with a bind-free groove 9712 for aiding in the retention of the skew rollers 5206 (see FIGS. 52A-52B, for example). During assembly of the roller-leg assembly 4830, skew roller 5206 is mounted on an end 9714 of the roller axle 9710. In order to retain the skew roller on the axle 9710 and abutting against the leg 4824, the countersink drill hole 5502 is expanded with a suitable tool. As the sides of the countersink drill hole 5502 expand radially, the groove 9716 partially collapses and the ends 9716 arc towards the skew roller 5206. In this manner, the ends 9716 retain the skew rollers on the roller axle 9710. In effect, after expansion of the countersink drill hole 5502, the ends 9716 function as built in retainer clips.

Referring to FIGS. 147-148 now, a freewheel 8890 will now be described. Certain embodiments of the freewheel 8890 shares some features with embodiments of the freewheel 4902 described above with reference to FIGS. 71A-71C. In one embodiment, the freewheel 8890 includes a set of internal splines 8892. A spline 8894 of the set of splines 8892 is of a different circumferential dimension that the other splines. Preferably, the spline 8894 is selected to mate with the corresponding spline bottom of the input driver 8602. In this manner, the asymmetrically splined freewheel 8890 mates with the asymmetrically splined input driver 8602. In the embodiment shown in FIGS. 148-147, the freewheel teeth 8896 are centered relative to the width of the freewheel 8890.

Referring now to FIG. 149, it shows a torsion spring 1492 similar to the torsion spring 5002 (see FIGS. 63A-63E) and the torsion spring 8851 (see FIGS. 131-134). The torsion spring 1492 can exhibit a combination of the features of the torsion springs 5002, 8851. In some embodiments, the torsion spring 1492 can include a conforming bend 1494 and/or a conforming bend 1496. In one embodiment, the bend 1494 and/or the bend 1496 are segments along the torsion spring 1492 that have a biased curvature which facilitates conformance of the torsion spring 1942 to the roller cage 5004.

Referencing FIG. 150, in some embodiments (depending on the diameter and/or stiffness of the spring wire) without the bends 1494, 1496 the torsion spring 1492 exhibits segments 1494A, 1496A that do not conform to the curvature of the roller cage 5004 and, consequently, tend to bind the traction ring 6200 in the grooves 6206 (see FIGS. 62A-62E). However, the bends 1494, 1496 facilitate the assembly, and significantly improve the operation, of the axial force and/or preloading subassembly shown in FIGS. 64E-64H. As illustrated in FIG. 151, in some embodiments, when the torsion spring 1492 is in its operational state (housed and wound in the traction ring 6200 and the roller cage 5004), the bends 1494, 1496 lie toward to the retainer extension 6406; thereby, tending to diminish any binding generated by the torsion spring 1492 on the traction ring 6200.

As best shown in FIG. 150, the segments 1494A, 1496A that can have the biased curvature of bends 1494, 1496 can be provided at the terminal 0-90 degrees of the torsion spring 1492 relative to its wound state in the roller cage 5004. More preferably, the bends 1494, 1496 are formed on the terminal 5-80 degrees, and most preferably on the terminal 10-70 degrees. In some embodiments, the bends 1498, 1499 at the extremes ends of the torsion spring 1492 are not included in the segments identified above. That is, the bends 1494, 1946 do not include the bends 1498, 1499 and/or short segments of the torsion spring 1492 near the bends 1498, 1499. In some embodiments, the bend 1494, 1496 can have a radius that is 110-190% of the radius of the roller cage 5004. The length of the arc of the bend 1494, 1496 is defined by an angle ranging preferably from about 0 to at least 90 degrees, more preferably 0 to at least 60 degrees, and most preferably 0 to at least 30 degrees, for example.

It should be noted that the description above has provided dimensions for certain components or subassemblies. The mentioned dimensions, or ranges of dimensions, are provided in order to comply as best as possible with certain legal requirements, such as best mode. However, the scope of the inventions described herein are to be determined solely by the language of the claims, and consequently, none of the mentioned dimensions is to be considered limiting on the inventive embodiments, except in so far as anyone claim makes a specified dimension, or range of thereof, a feature of the claim.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. An idler assembly for a transmission, the idler assembly comprising:
    an inner bushing having a cylindrical body and having an opening cut through the cylindrical body about an axis perpendicular to the main axis of the cylindrical body, the cylindrical body comprising two retainer clip grooves, each groove adjacent to a shift cam;
    two angular contact bearings mounted on an outer diameter of said cylindrical body;
    an idler mounted on said angular contact bearings; and
    two shift cams, mounted about the cylindrical body, wherein the idler is located between the shift cams.

2. The idler assembly of claim 1, wherein the idler comprises a thrust wall adapted to separate the two thrust bearings.

3. An idler assembly for a transmission, the idler assembly comprising:
    an inner bushing having a cylindrical body and having an opening cut through the cylindrical body about an axis perpendicular to the main axis of the cylindrical body;
    a locator ring mounted about the cylindrical body;
    two shift cams, mounted about the cylindrical body, each shift cam having a shift cam bearing race and comprising a shoulder for supporting the locator ring;
    a plurality of bearing rollers; and
    an idler having two idler bearing races, wherein the idler bearing races and the shift cam bearing races are adapted to form angular contact bearings when the plurality of bearing rollers are interposed between the idler bearing races and the shift cam bearing races.

4. The idler assembly of claim 3, wherein each shift cam comprises a retaining key adapted to rotationally constrain a shift rod nut.

5. An idler assembly for a transmission, the idler assembly comprising:
    an inner bushing having a cylindrical body and having an opening cut through the cylindrical body about an axis perpendicular to the main axis of the cylindrical body;
    two shift cams, mounted about the cylindrical body, each shift cam having a shift cam bearing race;
    a plurality of bearing rollers;
    an idler having two idler bearing races, wherein the idler bearing races and the shift cam bearing races are adapted to form angular contact bearings when the plurality of bearing rollers are interposed between the idler bearing races and the shift cam bearing races; and
    wherein each shift cam comprises an extension having a retaining key adapted to rotationally constrain and radially locate a shift rod retainer nut.

6. The idler assembly of claim 5, wherein the cylindrical body further comprises retaining clip grooves, at least one groove adjacent to each shift cam.

7. The idler assembly of claim 6, further comprising retaining clips located in the retaining clip grooves.

8. The idler assembly of claim 7, further comprising thrust washers located between the retaining clips and the shift cams.

* * * * *